(12) United States Patent
Sefton

(10) Patent No.: US 10,942,632 B1
(45) Date of Patent: Mar. 9, 2021

(54) SELF-CLUSTERING REARRANGEABLE STACKS OF VISIBLE INFORMATION AND ACTIVE IN SITU LINK PORTALS IN AN INFINITELY ZOOMABLE SPACE ON A GRAPHICAL COMPUTING DEVICE

(71) Applicant: Zocomotion Ltd., Northwood (GB)

(72) Inventor: David Sefton, Northwood (GB)

(73) Assignee: Zocomotion Ltd., Northwood (GB)

( * ) Notice: Subject to any disclaimer, the term of this patent is extended or adjusted under 35 U.S.C. 154(b) by 0 days.

(21) Appl. No.: 16/182,435

(22) Filed: Nov. 6, 2018

Related U.S. Application Data

(60) Provisional application No. 62/582,273, filed on Nov. 6, 2017.

(51) Int. Cl.
  *G06F 3/0484* (2013.01)
  *G06F 3/0482* (2013.01)
  *G06F 3/0481* (2013.01)

(52) U.S. Cl.
  CPC ........ *G06F 3/04845* (2013.01); *G06F 3/0482* (2013.01); *G06F 3/04817* (2013.01); *G06F 2203/04806* (2013.01); *G06F 2203/04808* (2013.01)

(58) Field of Classification Search
  CPC ............. G06F 3/04845; G06F 3/04883; G06F 3/0482; G06F 3/04817; G06F 2203/04808; G06F 2203/04806
  See application file for complete search history.

(56) References Cited

U.S. PATENT DOCUMENTS

| | | | | |
|---|---|---|---|---|
| 6,133,914 A | * | 10/2000 | Rogers | G06F 3/0482 345/473 |
| 2002/0180800 A1 | * | 12/2002 | Taylor | G06F 3/0481 715/788 |
| 2009/0234721 A1 | * | 9/2009 | Bigelow | G06Q 10/10 705/12 |
| 2013/0093695 A1 | * | 4/2013 | Davidson | G06F 3/0416 345/173 |
| 2013/0205244 A1 | * | 8/2013 | Decker | G06F 3/0483 715/777 |
| 2018/0307406 A1 | * | 10/2018 | Pokrzywka | G06F 3/04883 |

* cited by examiner

*Primary Examiner* — Matthew Ell
(74) *Attorney, Agent, or Firm* — Morgan, Lewis & Bockius LLP

(57) ABSTRACT

An electronic device has a graphical user interface that displays a viewport of a canvas containing positioned and sized graphical information units. Smaller units are displayed in front of overlapping larger units. Relative size determination uses a specific-size-metric such as unit width. The device uses parentage determination rules to deduce a current hierarchical relationship between two units according to current sizes and positions. When there is full or partial overlap, the larger unit of each pair is deduced as the parent; otherwise there is no direct relationship. Clusters of decreasingly sized descendants result. User input adjusts the size and/or position of a selected unit while concurrently applying the adjustment proportionally to all descendants. Throughout continuous input, each adjusted and other canvas units are independently displayed with smaller in front of overlapping larger units. After the adjustment, subsequent parentage determination may deduce changed hierarchies across adjusted and other canvas units.

22 Claims, 88 Drawing Sheets

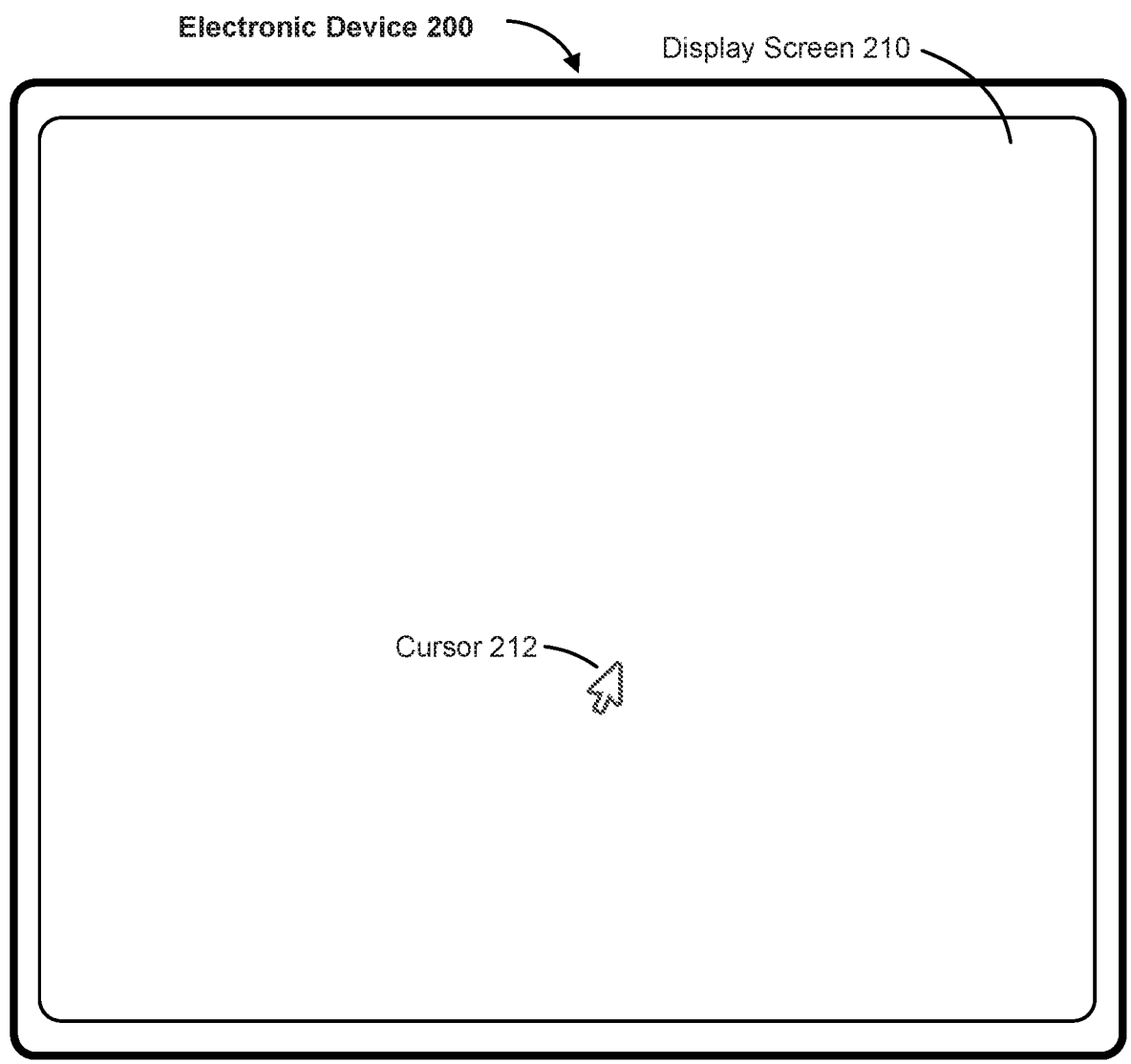
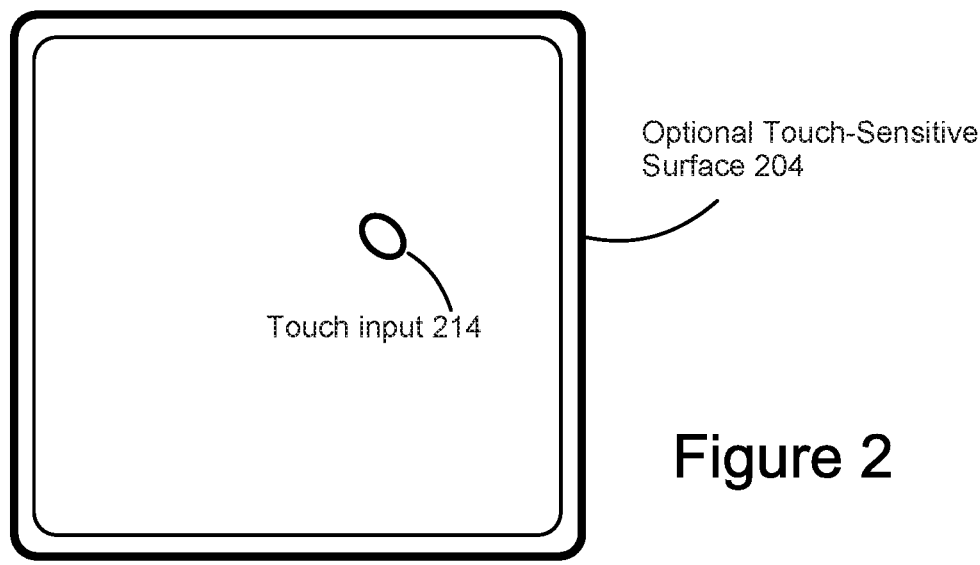
Figure 2

Export to a Word-Processing Document

Musical Instruments
Some basic descriptions are given here.

1. Orchestral Instruments
   Together they comprise an orchestra.

1.1 String section
   Often plays the melody and other harmonies.

1.1.1 Violin
   Most often plays the main melody.

1.1.2 Cello
   Ideal for mellow harmonies.

2. Rock music instruments
   Often comprising the basis for popular music.

2.1 Guitars
   Lead, Rhythm and Bass are often present.

2.1.1 Lead guitar
   Adds distinct elements to music.

2.1.2 Rhythm guitar
   Creates the main chord foundation for music.

SELF-CLUSTERING REARRANGEABLE STACKS OF VISIBLE INFORMATION AND ACTIVE IN SITU LINK PORTALS IN AN INFINITELY ZOOMABLE SPACE ON A GRAPHICAL COMPUTING DEVICE

CROSS-REFERENCE TO RELATED APPLICATION

This application claims priority to U.S. Provisional Application Ser. No. 62/582,273, filed Nov. 6, 2017, entitled "Self-Clustering Rearrangeable Stacks of Visible Information and Active In-Situ Link Portals in an Infinitely Zoomable Space on a Graphical Computing Device," which is incorporated by reference herein in its entirety.

TECHNICAL FIELD

This invention relates generally to systems and methods for graphically displaying and structuring vast quantities of detailed information.

BACKGROUND

Users interact with large amounts of information and data on a daily basis. In some instances, the information is stored in a hierarchical file system, a relational database, a spreadsheet, an unstructured database (such as NoSQL), or an XML or JSON file. In each case, the tools and associated interfaces limit the way in which users view, comprehend, and interact with the information and do not promote organic development and restructuring of the information over time as users have more information or have a better idea of how to organize the information.

SUMMARY

Consequently, there is a need for faster, more efficient methods and interfaces for viewing, managing and grouping detailed levels of information. Such methods and interfaces may complement or replace conventional methods.

The above deficiencies and other problems associated with managing information are reduced or eliminated by the disclosed methods, devices, and storage media. Various implementations of methods, devices, and storage media are within the scope of the present disclosure, and there are many aspects, no single one of which is solely responsible for the attributes described herein.

In some implementations, user interactions with a computing device include various gestures, such as a tap gesture, a drag gesture, a swipe gesture, a pinch gesture, or an unpinch gesture. In some implementations, the computing device is a tablet computer, desktop computer, notebook computer, smartphone, large-display-based device, small-display-based device, VR (Virtual Reality including Augmented Reality) device, or other computing device. In some implementations gestures are determined using fingers, mice, trackpads, keyboards and/or other input devices for determining user intent. In some implementations, the input device is a VR (Virtual Reality including Augmented Reality) device and the gestures are created using VR gloves (e.g., the finger and/or hand movements are not in proximity to a touch screen). In some implementations, the input device is a VR device that determines the positions of a user's hands and/or fingers using optical tools or otherwise without the use of gloves or other wearable apparatus.

In some implementations, a computing device includes a display, one or more processors, memory, and one or more programs stored in the memory. Some implementations include a touch-sensitive surface. The one or more programs are configured to be executed by the one or more processors. The one or more programs include instructions for performing any of the methods described herein.

In accordance with some implementations, an electronic device has a display, one or more processors, and memory. The electronic device has a graphical user interface having a viewport of a canvas containing a plurality of individually positioned and sized graphical information units, which are sometimes referred to as Zzotes.

In some implementations, the canvas is effectively (theoretically) infinite space and can be zoomed in to any magnification level without theoretical limit (e.g., the viewport can be zoomed in or out to a magnification of $10^{-6}$, $10^{-3}$, $10^{-1}$, 1, $10^2$, $10^3$, $10^6$, or many or theoretically unlimited orders of magnitude higher/lower in some implementations). The viewport is a window that can be moved and zoomed to show any portion of the canvas at any level of magnification. In particular, the viewport is adjustable, by user input to zoom and/or move, to show a user-selected portion of the canvas at a user-selected magnification.

The user interface displays each graphical information unit (the ones that are at least partially in the viewport), including always displaying smaller graphical information units "above" (in front of) larger fully/partially overlapping graphical information units (if any) according to relative size determination using a specific-size-metric. Some implementations use the specific-size-metric of width. Other implementations use a different specific-size-metric such as area or height. The term "above" here means considering the display screen as a stack of layered Zzotes, with layers that are "closer" to the user in the stack being above the layers that are further from the user. The term "above" is also consistent with the metaphor of the computer display screen being a desktop. Hence "above" is sometimes used in this context synonymously with "in front of", with "above" relating to a theoretical z-axis, though this is regardless of whether an actual z-axis is specifically used by an implementation in order to create the "stacked"/layered effect.

In some implementations, rendering of the contents of the viewport is graphically realized by ensuring that before every frame is rendered, all visible graphical information units (i.e., those units which are first determined to be visible in the viewport's visible region of space) are rendered onto the display starting from largest to smallest (using the specific-size-metric such as width of graphical information units). Such a rendering technique ensures that the graphical information units (Zzotes) appear to be "stacked" upon each other as required. The display can be drawn anew for every "frame" of the display. Other implementations may use further additional capabilities of GPU (Graphics Processing Unit) hardware as is familiar to computer graphics programmers.

The electronic device uses rules (sometimes referred to as "parentage determination rules") to deduce a current respective hierarchical relationship between each pair of graphical information units according to their current respective sizes and positions. Specifically, there is no deduced relationship between the respective pair of graphical information units when there is no overlap between them. When a pair of graphical information units do have full or partial overlap, a larger graphical information unit is determined according to relative-size using the specific-size-metric, and the larger graphical information unit of the pair is deduced as the parent of the other graphical information unit in the respective pair. Because the relative-size comparison specific-size-metric used by these rules is the same comparison specific-size-metric used by the prior viewport rendering, a deduced-as "child" graphical information unit will always visually appear in front of ("above") all of its deduced-as "parent" graphical information units. In some implementations, such a rendered "stacked" visual display-order may exist prior to (and independently of) any deduction of any parentages.

In some implementations, the application of these rules thereby result in deduced hierarchical clusters of graphical information units (starting from any given unit) through theoretically unlimited levels of such parents/children relationships. The specific-size-metric (e.g., width) of graphical information units at increasing levels of descendant graphical information units are thereby decreasing while visually progressing through the hierarchy. An ancestor of a graphical information unit B is any graphical information unit A for which there is a sequence of one or more parent/child relationships $A/C_1, C_1/C_2, \ldots, C_n/B$ with $n \geq 0$. (When $n=0$, A is a parent of B, and when $n>0$, there are n intermediate graphical information units $C_i$.) In some implementations, the possibility thereby exists that a further descendant of a given ancestor beyond that of direct-child (i.e., from grand-child, great-grand-child onwards) may in some instances not overlap the given ancestor at all. It also follows that some deduced hierarchical clusters of graphical information units from a given starting unit may consist of no descendants, and this is thereby a cluster constituted of just the one given starting unit itself.

In some implementations, the size and/or position of a selected graphical information unit is adjusted according to user input. A descendant of the selected graphical information unit is any graphical information unit that can be reached from the selected graphical information unit through a sequence of one or more parent/child relationships. Adjusting the size and/or position of the selected graphical information unit applies concurrently and proportionally with all its descendants (if any) according to the hierarchical relationships as deduced prior to the user input. Therefore, the graphical information units that comprise being in the cluster (the cluster is the selected graphical information unit and any such prior-deduced descendants) do not change throughout the duration of this user input. In some implementations, this is because the determination of parentage applies to graphical information units that have had their positions/sizes "finalized," which occurs only after the completion of such user input.

The selected graphical information unit and its prior-deduced descendants (that effectively "belong" to it) thereby comprise being a cluster (or a cluster of one if there are no descendants). In some implementations, during such continuously varying user input, the viewport displays both the adjusted graphical information units (i.e., the moving/resizing cluster of individual graphical information units), and the other (non-adjusted) graphical information units on the canvas according to all of their individual current sizes and positions. This rendering occurs with individual smaller graphical information units always displayed in front of ("above") overlapping larger graphical information units according to relative size determination using the specific-size-metric. In some implementations, this visually (dynamically—as the display is updated throughout the user input) suggests to the user the possible tentative hierarchical relationship changes that may next be deducible by the parentage determination rules were the user to complete ("finalize") their user-input altering of graphical information units sizes/positions at any given moment. In some implementations, this dynamic visualization of possible future hierarchical relationship changes is the graphical realization of consistent application of the same rendering rules which apply to the viewport at all times.

As previously described, during the continuous user input, cluster membership of the set of descendants being altered does not change regardless of resultant new sizes and positions of the adjusted graphical information units relative to existing graphical information on the canvas. However, after such user input is complete, when subsequent parentage determinations are required, new determinations (using the previously described parentage determination rules) may subsequently deduce changed hierarchies of descendants starting from any given unit (including the same originally selected unit) across both the adjusted graphical information units and other existing graphical information units on the canvas.

For example, in some circumstances a subsequent attempt to move/resize the same originally selected graphical information unit may then involve it now forming a different cluster of moving/resizing descendants to that which had been moved/resized in the just previous user action. This may for example be as a result of new instances of full/partial overlap between individual units in the previously defined cluster of moved/resized graphical information units and any number of other graphical information units already on the canvas. The hierarchical relationships as deduced prior to such a subsequent second user input may thereby have resulted in a differently constituted cluster of descendants from the same selected graphical information units now being controlled by such a second user input.

In some implementations, there are instances when a first graphical information unit and a second graphical information unit which does not overlap with the first unit, are both deduced as parents of a third graphical information unit. This is because the third unit is smaller than both the first and second units (with relative-size determined according to the specific-size-metric), while overlapping them both. Consequently, adjusting a size or position of either the first graphical information unit or the second graphical information unit causes a concurrent adjustment of the third graphical information unit. In this scenario, the third graphical information unit is deduced as having two parents, so it moves/resizes when either of its parents moves/resizes. Note that the move/resize operation based on one parent may affect the subsequently deducible relationship of the third graphical information unit with the other parent. For example, if the move/resize causes the third graphical information unit to no longer overlap the other parent, the parent/child relationship with the other parent will be subsequently deducible as severed after the completion of the move/resize gesture. From the previously described principles, such a possible outcome would have been visually apparent to the user during the gesture before the actual completion of the user input.

A user input can reverse the roles in a parent/child relationship. For example, consider the following scenario: at a first time $T_1$ a first graphical information unit (fully or partially) overlaps a second smaller (according to relative size determination using the specific-size-metric) graphical information unit and therefore the display shows the second graphical information unit in front of the first graphical information unit. The first graphical information unit is hence deducible as a parent of the second graphical information unit. (A theoretical attempt to move and/or resize the first graphical information unit would therefore cause concurrent proportionate moving and/or resizing of the second graphical information unit. However, a theoretical attempt to move and/or resize the second graphical information unit would not cause concurrent moving and/or resizing of the first graphical information unit.)

At a subsequent time $T_2$ after a completed first user action to resize the second graphical information unit so that it is larger (according to relative size determination using the specific-size-metric) than the first graphical information unit while still (fully or partially) overlapping it, the first graphical information unit is now displayed in front of the second graphical information units. The second graphical information unit is now deducible as a parent of the first graphical information unit. (It should be noted that in some implementations, throughout this first user action that occurred between times $T_1$ and $T_2$, the display continuously updated the size/position of the second graphical information unit. Of significance, in some implementations, the apparent display stacking order would also have been continuously updated dynamically according to the previously described display stacking order rules (displaying smaller graphical information units in front of ("above") overlapping larger graphical information units according to relative size determination using the specific-size-metric). Therefore, at the moment that the second graphical information unit became larger (according to relative size determination using the specific-size-metric) while still overlapping the first, the second graphical information unit would have been displayed beneath the first graphical information unit, and this dynamic visual feedback would have been useful to the user in dynamically indicating the new possible tentative hierarchy.)

Consider now a third time $T_3$, which is subsequent to the second time $T_2$. In response to a newly initiated second user action to begin to move/resize the second graphical information unit at time $T_3$, the user interface begins to concurrently and proportionally move and/or resize the first graphical information unit according to the new deduction of hierarchical relationships (as deduced prior to the new second user input) of the second graphical information unit as a parent of the first graphical information unit. This illustrates how the first user input (completed at time $T_2$) had thereby successfully reversed the roles in the parent/child relationship.

In some implementations, the graphical user interface includes a toolbar displaying a plurality of graphical information unit pads. In some implementations, this toolbar is referred to as the "Add Bar." Each graphical information unit pad is a source of blank "potential" graphical information units that are colored according to the respective graphical information unit pad.

A "potential" graphical information unit is defined such that it is a graphical information unit that exists separately from the graphical information units already on (and saved to) the canvas, with a separate lifecycle such as only existing throughout the duration of a specific user gesture, and being possibly displayed on user interface locations other than the canvas. When being positioned over the canvas by user input (e.g., during a continuous user gesture), a potential graphical information unit is a graphical information unit displayed along with the plurality of other graphical information units on the canvas. This means potential graphical information units are non-"finalized" graphical information units and are rendered above and below other canvas units (and other potential units) according to relative size determination using the specific-size-metric, just as any other graphical information unit. However, a potential graphical information unit is only saved to the canvas ("finalized") upon completion of such user input actually over the canvas. After such "finalization," the potential graphical information units are then new "finalized" canvas graphical information units. This also means that those new "finalized" graphical information units may only then be deduced to be in hierarchies with other canvas graphical information units, forming clusters depending on their positions/sizes.

In some implementations, the ("Add Bar") toolbar is displayed only when the user has selected the "Add" mode of interaction, though in some implementations this mode may persist as long as required while still allowing other types of user-interactions (e.g., viewport panning/scaling and adjustments to existing graphical information units).

In response to initiation of a user gesture in the ("Add Bar") toolbar, the user interface creates a "potential" graphical information unit from a first graphical information unit pad at a location where the user gesture was initiated. The identity of the first graphical information unit pad is inferred from the location where the user gesture was initiated. In some implementations, this inference is by identifying the centroid point of user touch/interaction points (or singular touch/interaction point) and calculating whether this point is contained within the shape of a graphical information user pad. In some implementations, the relevant touch/interaction points must be on the "Add Bar." The potential graphical information unit is colored according to the first graphical information unit pad, and in some implementations is blank.

In some implementations, potential graphical information units may be created using a single-finger gesture starting at (e.g., within the shape of) one of the graphical information unit pads in the toolbar (sometimes referred to as the "Add bar"), and then the new potential unit possibly dragged onto the canvas, with the position thus determined by the user's finger. As described herein, a "potential" graphical information unit may become an "actual" "finalized" graphical information unit on the canvas if the gesture completes over the canvas area.

In some implementations, potential graphical information units may be created using a two-finger gesture. In some implementations this can be starting with the centroid of the two fingers within the shape of one of the graphical information unit pads in the "Add bar", and then the new potential unit possibly dragged onto the canvas. (In some of those implementations, the centroid can still be determined to be initially within the shape of the graphical information unit pad even if only one or none of the touch/interaction points actually started within the shape. In some such implementations all of the relevant touch/interaction points must be within the area of the "Add bar".) In some implementations, a two-finger user gesture uses two of the user's fingers to simultaneously control both position and size. In this scenario, moving the two fingers in a same direction causes the potential graphical information unit to move in that same direction. Reducing the separation of the two fingers causes the potential graphical information unit to shrink in size. And increasing the separation of the two fingers causes the potential graphical information unit to increase in size.

In some implementations, the shrinking in size or increasing in size is according to a multiplicative "magnification" factor of the corresponding reduction or increase in the separation of the two fingers. This multiplicative "magnification" factor is further to the basic multiplication/transformation needed to transform physical-screen-space distances to canvas-space 1:1 at the current viewport scale. For example, some implementations use a multiplicative "magnification" factor of 1.5, 2.0, 2.5, or 3.0. (Or 1.0 for no multiplicative "magnification" effect.) For example, with a multiplicative "magnification" factor of 2.0, increasing the separation of the fingers by 3 millimeters increases the size of the potential graphical information unit by 6 millimeters as it appears on the display at the current viewport scale.

Such a multiplicative "magnification" factor (sometimes referred to herein as "sizing acceleration"—although it may not actually be a literal form of acceleration) facilitates a rapid increase to a large size on the display with minimal/ reduced actual movement of fingers. (As described herein, when the object(s) under the user's fingers' control contain actual content, this "sizing acceleration" capability also provides a reversible and rapid preview facility.) "Sizing acceleration" is beneficial and convenient to the user as it overcomes limitations of limited finger-span and saves time/ effort. Also, when used for the opposite effect of rapidly reducing size (by decreasing the finger separation), an additional benefit exists. Namely that in some implementations, the further multiplicative "magnification" factor means that an object shrunk to a very small on-screen size may be still be visible in-between the fingers even as they are pinched closer, rather than be obscured by the fingers if the object "grab-points" had just remained effectively "fixed" to the fingers without such a further multiplicative "magnification" factor.

Some implementations support both single finger gestures and two finger gestures, and support dynamically switching between them in the middle of a gesture. For example this may mean controlling movement using one or two fingers, and enabling two-finger resizing when two fingers are used for the gesture. Some implementations may feature an auto-sizing feature when just one finger is being used for the gesture.

In some implementations, these features apply both to "potential" graphical information units (individually or in clusters when appropriate) and the adjustments of existing graphical information units already on the canvas (individually or in clusters when appropriate).

In some implementations, during user gestures which are controlling a "potential" graphical information unit over the canvas, the potential graphical information unit is displayed such that it is always displayed in front of ("above") already displayed overlapping graphical information units having larger specific-size-metric and behind ("beneath") already displayed overlapping graphical information units having smaller specific-size-metric. This is consistent with a "potential" graphical information unit being a graphical information unit, and the previously described rules for rendering graphical information units in the viewport (smaller always in front of ("above") overlapping larger based on the specific-size-metric). In effect, this provides the user with the visual appearance of a "tentative" hierarchical position of the potential graphical information unit with respect to graphical information units already displayed on the canvas at each point in time during the user gesture. For example, the potential graphical information unit will always appear to be in front of any other graphical information units that would be deduced as its parents at the current tentative mid-gesture position/size of the potential graphical information unit. This appearance of such a "tentative" hierarchy is because of the previously described viewport rendering rules which use the same specific-size-metric as any subsequent hierarchy determinations, and which apply throughout the gesture. However, in some implementations, no actual hierarchical relationship changes occur during the gesture.

Potential graphical information units become "finalized" graphical information units saved to the canvas with finalized canvas positions/sizes if the gesture completes in the canvas area. As specific hierarchies of graphical information units are next deduced, there may therefore be resultant (possibly interwoven) changes in hierarchical relationships in terms of the hierarchies of both the newly finalized (formerly "potential") canvas graphical information units, and (previously "finalized") canvas graphical information units that were already on the canvas.

When hierarchies are next deduced, new graphical information units (e.g. formerly "potential" graphical information units that have been "finalized" to the canvas) are inserted into the existing hierarchies according to the size and position of the new graphical information unit relative to the graphical information units already displayed. For example, a new graphical information unit can be deduced as intervening in an existing parent/child relationship. Consider the scenario where (prior to the user gesture) a first graphical information unit fully or partially overlaps a second graphical information unit that is smaller than the first graphical information unit according to relative size determination using the specific-size-metric. Therefore, prior to the user gesture, the first unit would be deduced as the parent of the second unit which appears in front of ("above") it.

Suppose the user is mid-way through a user input gesture in which they are positioning/sizing a (new) potential graphical information unit so as to be overlapping both the first graphical information unit and the second graphical information unit such that that the potential graphical information is smaller than the first graphical information but larger than the second graphical information unit. (Relative size comparison uses the specific-size-metric.) From the disclosed "smaller above overlapping larger" rendering rule, the visual on-screen "stack" would then be rendered during the gesture (from bottom to top) as: first graphical information unit, new potential graphical information unit, second graphical information unit. Based on this, the user can visually infer a possible new deducible tentative hierarchical position of the new potential graphical information unit as a child of the first graphical information unit and a parent of the second graphical information unit.

If the user decides to end the gesture at this point, this completes the placing here thereby saving ("finalizing") the potential graphical information unit as a new graphical information unit on the canvas. Because the formerly potential unit has now been finalized as a new unit on the canvas, a new hierarchy can now be deduced. This will deduce the new (formerly "potential") graphical information unit as a child of the first graphical information unit and a parent of the second graphical information unit. This actual deduction will hence be exactly as was visually tentatively presented to the user before they decided to complete the placement of position/size here.

In some implementations, a potential graphical information unit becomes a "finalized" graphical information unit saved to the canvas upon completion of the user gesture only if the potential graphical information unit is actually on the canvas at the end of the user action.

In addition to the graphical information unit pads, some implementations include a toolbar including one or more cluster icons, with each cluster icon representing a previously created cluster of graphical information units. In some implementations, this functions as a visual cluster clipboard.

In response to initiation of a user gesture in the toolbar on a first icon representing a cluster, the graphical user interface creates a cluster of potential graphical information units represented by the first icon. The user gesture may continue to locate the potential cluster over the canvas according to size and position specified by the user gesture. While the potential cluster is being moved and/or resized over the canvas, all of the cluster's potential graphical information units move and resize concurrently and proportionally together. In continuous response to the user gesture, while over the canvas the potential graphical information units in the cluster are displayed along with the plurality of graphical information units on the canvas. Therefore, from the previously described viewport rules, the entire plurality of graphical information units (all potential units and units already on the canvas) are displayed according to their current sizes and positions with smaller graphical information units always displayed above any larger overlapping graphical information units according to relative size determination using the specific-size-metric.

If the user action completes over the canvas then the potential graphical information units in the cluster become "finalized" graphical information units saved to the canvas with finalized canvas positions/sizes. When specific hierarchies of graphical information units are next deduced, there may therefore be resultant (possibly interwoven) changes in hierarchical relationships in terms of the hierarchies of both the newly finalized (formerly "potential") canvas graphical information units, and (previously "finalized") canvas graphical information units that were already on the canvas.

In some implementations, the above described behavior of the visual cluster clipboard (also referred to as cluster icons on a toolbar) thereby enables "unpinch to preview" (as described herein). A user can select any of the cluster icons (including clusters of just one item) from a toolbar such as the visual cluster clipboard, and begin an unpinch gesture to get a preview of the corresponding cluster of graphical information units. In some implementations, this occurs as a result of the manner in which a cluster of potential graphical information units is created via a continuous user gesture from the cluster icon. Via this preview facility, unpinching further expands the size of the potential cluster and pinching shrinks the size of the potential cluster. In some implementations, this "unpinch to preview" facility directly results from the use of a "two finger drag" to move/size a cluster of potential graphical information units or a single potential information unit (i.e., cluster of just one item). The cluster of potential graphical information units that is previewed can become "finalized" saved graphical information units on the canvas if the gesture ends over the canvas as previously described. But in some situations, the user may not wish for this to occur.

In some implementations, the previewed cluster of potential graphical information units collapses back to its originating "cluster" icon if the centroid of the fingers is not over the canvas at the end of the gesture. In some implementations, this ability to reversibly and rapidly preview (in as much detail as required) is possible because if the centroid of the fingers is still over the visual cluster clipboard itself, that is not regarded as being over the canvas (and therefore the "potential" graphical information units will not proceed to be saved as graphical information units on the canvas). Therefore an unpinch gesture that remains over the clipboard can simply be released by the user if they decide upon "unpinching" (and seeing it in sufficient expanded detail) that they do not wish to use it, or if their entire intention had only been to preview it. Alternatively, the user can continue the same gesture to position/size the cluster onto the canvas if they do wish to use the cluster on the canvas. In some implementations, "magnification" or "sizing acceleration" (as described herein in the context of two fingered move/resize gestures) facilitates a rapid preview to a large size on the display with minimal actual movement of fingers. In some implementations, such sizing acceleration is the result of multiplying the actual change in the distance between fingers by a multiplicative "magnification" factor. (This multiplicative "magnification" factor is further to the basic multiplication/transformation needed to transform physical-screen-space distances to canvas-space 1:1 at the current viewport scale.)

Graphical information units on the canvas can be moved and/or resized. In some implementations this is part of a single action, but throughout which the user may have variable control with visual feedback. In some implementations, such a move/resize of a graphical information unit occurs concurrently and proportionally to all of its descendent graphical information units (as deduced prior to the user input) so they concurrently and proportionally move/resize as a cluster. This was described above for user input that adjusts position and/or size. Some implementations process specific forms of user input gestures as the means of such input.

In some implementations, a user can indicate that a gesture is intended to move/resize existing graphical information units (rather than pan/zoom the viewport for example) by initiating the gesture with an initiating "press and hold" for a short period of time (e.g., 0.01 to 0.2 seconds with the user's fingers in the same locations within a margin of error such as <1 mm of allowed movement for each finger) before moving/pinching/unpinching as required. In some implementations, this may be required regardless of whether the object was already "selected" or not. In some implementations, such an enforced "press and hold" requirement has benefits in circumstances such as a massively-zooming environment. The requirement helps distinguish a user's intention to actually move/resize visually large objects that may occupy a large proportion of the visible canvas (at the current viewport scale-factor), from the more common intention to pan/zoom the viewport itself (which does not require such an initial "press and hold"). However, in some implementations that do require "press and hold" for moving/resizing existing objects on the canvas, such an initiating "press and hold" for a short period of time (e.g., 0.01 to 0.2 seconds) is not required before grabbing a new ("potential") object/cluster from a toolbar (such as the "add bar" or "visual cluster clipboard").

In some implementations, a user can move/resize a graphical information unit (and thus also all of its descendants in the cluster formed by the graphical information unit itself and its descendants) using a two finger gesture. First, the user selects a cluster. This can be accomplished by placing two fingers on a single one of the graphical information units, in which case the cluster consists of that graphical information unit and all of its descendants. As an alternative, a user may place one finger on a first graphical information unit and a second finger on one of its descendants. This has the same effect as if both fingers touched the first graphical information unit.

In a third scenario, a user touches two distinct graphical information units where neither of the graphical information units is a descendant of the other.

If the two graphical information units have no common ancestors, then no cluster is selected. Note that an ancestor of a graphical information unit B is any graphical information unit A for which there is a sequence of one or more parent/child relationships $A/C_1, C_1/C_2, \ldots, C_n/B$ with $n \geq 0$.

(When n=0, A is a parent of B, and when n>0, there are n intermediate graphical information units $C_i$, i=1, . . . n.)

Consider the case where the two distinct graphical information units do have at least one common ancestor (but neither of the distinct graphical information units is the ancestor itself). Different implementations treat this case differently. (There are also other possibilities other than the ones described below.) In some implementations, when the two graphical information units share at least one common ancestor (e.g., a parent), then the cluster selected consists of all of the descendants of that nearest common ancestor, but the nearest common ancestor itself is not included in the cluster of graphical information units that will be moved and/or resized by the gesture. This can be useful, for example to move and/or resize together all the descendant graphical information units belonging to the nearest common ancestor (e.g., to use a single gesture to simultaneously shrink and reposition them all in order to make space for more descendant graphical information units within this ancestor).

In other implementations, the selected set of graphical information units consists of all descendants of the nearest common ancestor that are contained within an axis-aligned rectangle formed by the two touch points. In these implementations, the nearest common ancestor is excluded. In some implementations that use a rectangle to define inclusion in the selection, the set of included graphical information units consists of all of the descendants that at least partially overlap the rectangle, and for any given descendent graphical information unit that at least partially overlaps the rectangle, all of its own descendants are also included (irrespective of whether they themselves overlap the rectangle) because they are regarded as components of the given graphical information unit.)

After selecting a cluster (or set) as described above, the user can continue the gesture using the two fingers. When the two fingers move in a same direction, the user interface moves the cluster in that same direction. Some implementations use a multiplicative factor so as to track at a constant lateral offset from the on-display position to the centroid of the user's fingers. When the separation of the two fingers is reduced, the user interface shrinks each of the graphical information units in the cluster in proportion to the separation reduction (maintaining constant relative sizing and positioning relative to each other). When separation of the fingers increases, the user interface expands each of the graphical information units in the cluster in proportion to the separation increase.

In some implementations, the shrinkage or expansion uses a multiplicative factor, which is often independent from the multiplicative factor used for movement. Some implementations may use a multiplicative factor such that any change in size tracks on-display the change in finger separation precisely, but many implementations also use a further multiplicative "magnification" factor. This further multiplicative "magnification" factor is the same "magnification"/"sizing acceleration" as described above. This further scaling "magnification" factor is alongside the basic multiplication needed to translate physical-screen-space distances to canvas-space 1:1 at the current viewport scale. For example, some implementations use a further multiplicative "magnification" factor of 1.5, 2.0, 2.5, or 3.0. (Or 1.0 for no "further" multiplicative "magnification" effect.)

In some implementations that allow user manipulation of the size of graphical information units and clusters, aspect ratios of the graphical information units under user-control are preserved during user input (e.g., irrespective of factors such as rotation of the fingers during a two finger gesture). In some implementations, aspect ratio consistency increases the viability of the combined two finger positioning and sizing operation because the two fingers only need to control sizing in one dimension. Regardless of how users alter the positions of their two fingers, only the width of the Zzote needs to be determined from the distance between the two finger-points. The height is calculated to maintain its existing aspect ratio (or vice versa). This is beneficial to users as in some implementations, a principle aim of resizing graphical information units/clusters is to alter their relative scale compared to other graphical information units, not distort their aspect ratio into a different squashed/elongated shape. In some implementations other/alternative methods are used to resize objects (e.g., "sizing dots"). In some implementations, other such alternative resizing methods may also preserve the aspect ratio upon resizing by the user although in some situations it may be possible to alter the aspect ratio if specifically intended by the user.

In some implementations, a user can adjust a graphical information unit (and thus also all of its descendants in the cluster formed by the graphical information unit itself and its descendants) using a one finger gesture. Some implementations support both single finger gestures and two finger gestures, and support dynamically switching between them in the middle of a gesture. For example this may mean controlling movement using one or two fingers, and enabling two-finger resizing when two fingers are used for the gesture. Some implementations may feature an auto-sizing feature when just one finger is being used for the gesture.

In some implementations, the electronic device creates and displays link graphical information units that contain links to source clusters of graphical information units. A link graphical information unit is sometimes referred to as a Zzote-Link or an "in situ link portal." The inner contents of link graphical information units are shared graphical information units.

In some implementations, the inner contents of a link graphical information unit is defined by a single linked-to "source" graphical information unit that is thereby shared. The term "link" is therefore indicative of a reference to a "source" that the link graphical information unit points to. All the deducible descendants of a single linked-to source graphical information unit constitute an entire source cluster of graphical information units because they are regarded as "belonging to" (are a part of) the single linked-to source graphical information unit. Therefore, in effect, it is the entire deduced cluster of graphical information units of the single linked-to source graphical information unit that is visually represented within the link graphical information unit and thereby each descendant graphical information unit is also shared within the link graphical information unit.

The deduced descendants of any graphical information unit are such that the specific-size-metric (e.g., width) of graphical information units at increasing levels of descendant graphical information units are thereby decreasing while visually progressing through the hierarchy. In some implementations, a single link graphical information unit points to (and therefore visually represents) a single linked-to source graphical information unit. The single linked-to source graphical information unit may have many levels of descendants which are also visually represented. Therefore, a single link graphical information unit may effectively have within it a very large number of further descendant (and consequently also shared) graphical information units through many/theoretically-unlimited levels of hierarchy.

The zooming nature of some implementations means that all of these descendants can be easily viewed in situ as and when required from within a link graphical information unit. A user can easily "zoom in" to see more detailed levels of descendant graphical information units within any link graphical information unit. This may be alternatively described such that a "link graphical information unit" has effectively created an "in situ link portal" through which the user can effectively seem to "travel"/"zoom into" in order to view the link's content in increasing detail as required.

Of benefit to the user's contextual understanding of information connections, the linked-to content visually appears to exist within the environment/information context of the placement/size of the specific link graphical information unit itself. Depending on how far the user zooms into the link, they can see both the inner content of the link, and the surrounding contextual information from the link's placement (outside of the link). If the user does zoom a long way into the link such that the link's environment is no longer visible, they can easily zoom out again as part of a continuum when they want to see the link's content back in the context of the link's placement.

There can be one or more equivalent link graphical information units to the same single linked-to source graphical information unit. These multiple equivalent link graphical information units to the same single linked-to source graphical information unit (containing both a shared representation of the single linked-to source graphical information unit alongside shared representations of all of its descendant graphical information units) may be located at distinct positions/sizes on the canvas and thereby often overlapping various different other graphical information units and hence being deducible as being at various different levels within other hierarchies of graphical information units.

In some implementation, it is possible for the same single linked-to source graphical information unit to be viewed/edited at the possible multiple simultaneous places/sizes throughout the canvas where the various link graphical information units (which reference it) are located. Because they are links, there is really only one "version" and the various links just points to the same master version of the content. Changes to any of the depictions of the same "shared" unit are therefore visually reflected in all the other representations (sometimes referred to as virtual representations) of the same unit when they are visible. The same applies in turn to each of the descendants of the single linked-to source graphical information unit which are also (virtually) represented within the same links, they have hence also been shared (effectively automatically) and can similarly be viewed/edited.

Therefore, in some implementations upon selection of a first source graphical information unit (whether it is linked-to itself, or a descendant of a linked-to unit), adjusting the first graphical information also adjusts each linked representation of the first graphical information unit concurrently to user input on the first graphical information unit.

Similarly, upon selection of a first virtual graphical information unit as represented inside a first link graphical information unit, adjusting this first virtual graphical information unit adjusts the corresponding source graphical information unit and each linked representation of the corresponding source graphical information unit, including the first virtual graphical information unit. Note that such a first virtual graphical information unit can be either a virtual representation of a link graphical information unit's single linked-to source unit itself, or a virtual representation of any of the descendants of a link graphical information unit's single linked-to source unit.

In some implementations, a non-transitory computer readable storage medium stores one or more programs. The one or more programs are configured for execution by one or more processors of an electronic device having a display. The one or more programs include instructions for performing any of the methods described herein or implementing any of the electronic devices described herein.

Some implementations include a graphical user interface on an electronic device having a display, memory, and one or more processors configured to execute one or more programs stored in the memory. The graphical user interface includes user interfaces displayed in accordance with any of the methods or electronic devices described herein.

Thus, computing devices with displays and touch-sensitive surfaces (and/or other input devices) are provided with faster, more efficient methods and interfaces for managing detailed information, thereby increasing the effectiveness, efficiency, and user satisfaction with such devices. Such methods and interfaces may complement or replace conventional methods.

BRIEF DESCRIPTION OF THE DRAWINGS

The present disclosure illustrates features of various implementations, some of which are described in more detail in provisional application 62/582,273, to which the present application claims priority. The drawings and associated descriptions describe features that may be present in various implementations, and implementations can include various combinations of the illustrated features. In addition, some implementations include features that are not described herein. Illustrating specific pertinent features does not limit the disclosure to those specific features or specific combinations of features.

FIG. 2 illustrates an electronic device in accordance with some implementations.

FIG. 9 illustrates a word processing document exported from a cluster of graphical information units, in accordance with some implementations.

FIG. 33 also shows the ability to add further graphical information units to a new graphical information unit in accordance with some implementations.

FIG. 34 also illustrates an additional graphical information unit beginning to be added using a one-finger gesture in accordance with some implementations.

FIGS. 41A-41F illustrate storing a cluster of graphical information units to the visual cluster clipboard according to some implementations.

Figure 1:
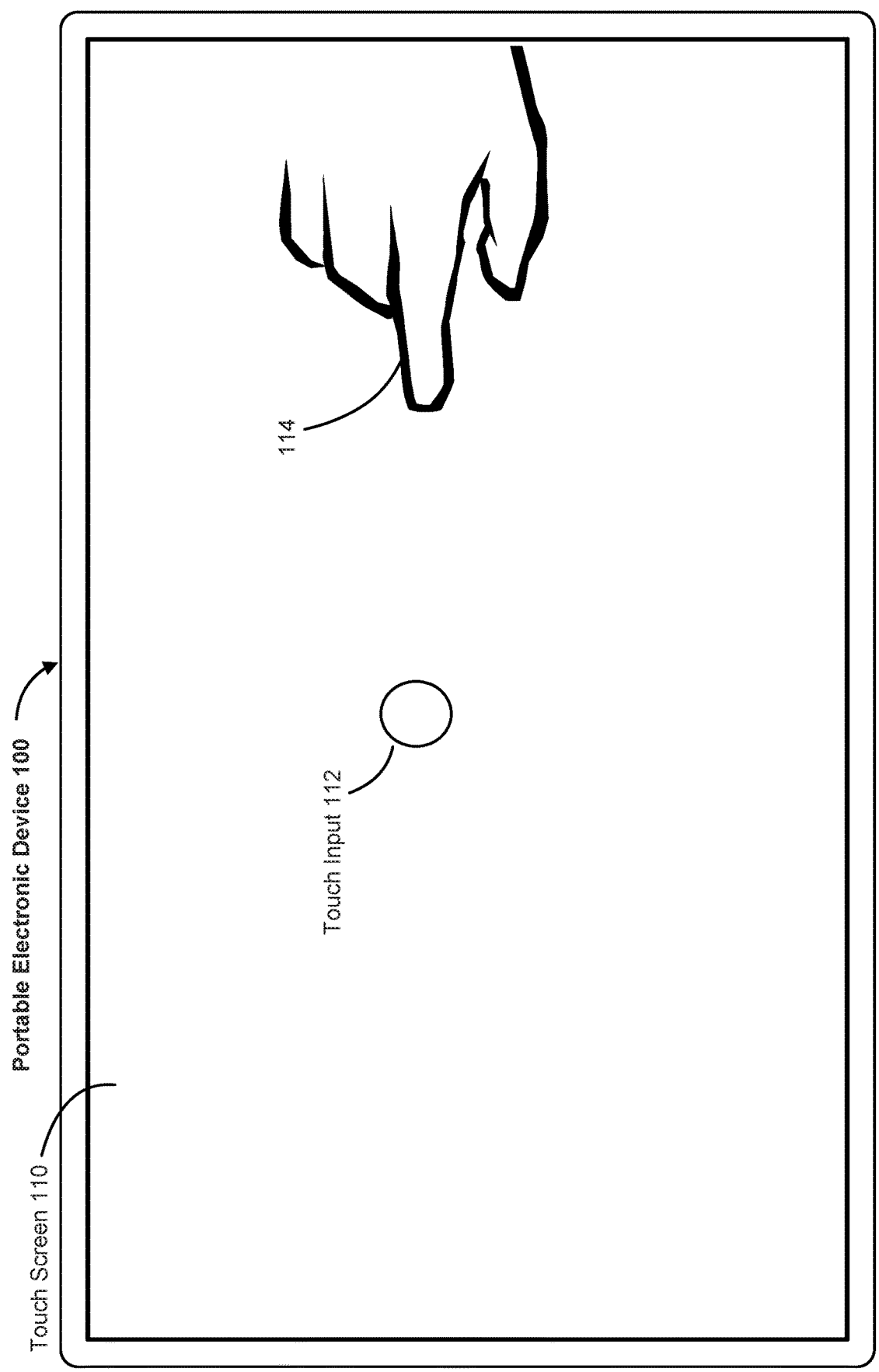
FIG. 1 illustrates a portable electronic device having a touch screen, in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system or device. Finally, like reference numerals may be used to denote like features throughout the specification and figures.

DESCRIPTION OF IMPLEMENTATIONS

Reference will now be made in detail to implementations, examples of which are illustrated in the accompanying drawings. In the following description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Attention is now directed toward implementations of portable devices, which may include touch-sensitive displays. Implementations of electronic devices and user interfaces for such devices are described. In some implementations, the device is a portable communications device, such as a mobile telephone, that also contains other functions, such as PDA and/or music player functions. Other portable electronic devices include laptops or tablet computers with touch-sensitive surfaces (e.g., touch screen displays and/or touch pads). It should also be understood that, in some implementations, the device is not a portable communications device, but is a desktop computer with a touch-sensitive surface (e.g., a touch screen display and/or a touch pad). In the discussion that follows, an electronic device that includes a display and a touch-sensitive surface is described. It should be understood, however, that the electronic device may include one or more other physical user-interface devices, such as a physical keyboard, a mouse, a microphone, and/or a joystick.

Many of the features described herein can also be applied to virtual reality or augmented reality. In these cases, the electronic device may be a headset or other virtual reality display and/or input device.

In some cases, the term "graphical information unit" is used as a descriptive alternative for the term "zzote" or "Zzote".

FIG. 1 illustrates a portable electronic device 100 having a touch screen 110, in accordance with some implementations. In some implementations, device 100 is a mobile phone, a laptop computer, a personal digital assistant (PDA), or a tablet computer. The touch screen 110 is also sometimes called a touch-sensitive display and/or a touch-sensitive display system. In some implementations, the touch screen 110 displays one or more graphics within a user interface (UI). In some implementations, a user is enabled to select one or more of the graphics by making a touch input (e.g., a touch input 112) on the graphics. In some instances, the touch input is a contact on the touch screen. In some instances, the touch input is a gesture that includes a contact and a movement of the contact on the touch screen. In some instances, the gesture includes one or more taps, one or more swipes (e.g., from left to right, right to left, upward and/or downward) and/or a rolling of a finger (e.g., from right to left, left to right, upward and/or downward) that has made contact with the device 100. For example, a touch input on the graphics is optionally made with one or more fingers 114 (not drawn to scale in the figure) or one or more styluses. In some implementations, selection of one or more graphics occurs when the user breaks contact with the one or more graphics. In some circumstances, inadvertent contact with a graphic does not select the graphic. For example, a swipe gesture that sweeps over a visual mark may not select the visual mark when the gesture corresponding to the selection is a tap. In some implementations, the device 100 also includes one or more physical buttons and/or other input/output devices, such as a microphone for verbal inputs.

FIG. 2 illustrates an electronic device 200 in accordance with some implementations. The device 200 need not be portable. In some implementations, the device 200 is a laptop computer, a desktop computer, a tablet computer, or an educational device. The device 200 includes a screen 210. In some implementations, the device includes a touch-sensitive surface 204. In some implementations, the screen 210 displays one or more graphics within a UI. In some implementations, a user is enabled to select one or more of the graphics by making a touch input (e.g., the touch input 214) on the touch-sensitive surface 204 such that a corresponding cursor (e.g., the cursor 212) on the screen 210 selects the one or more graphics. For example, when an input is detected on the touch-sensitive surface 204 while the cursor 212 is over a particular user interface element (e.g., a button, window, slider, or other user interface element), the particular user interface element is adjusted in accordance with the detected input.

Figure 3A:
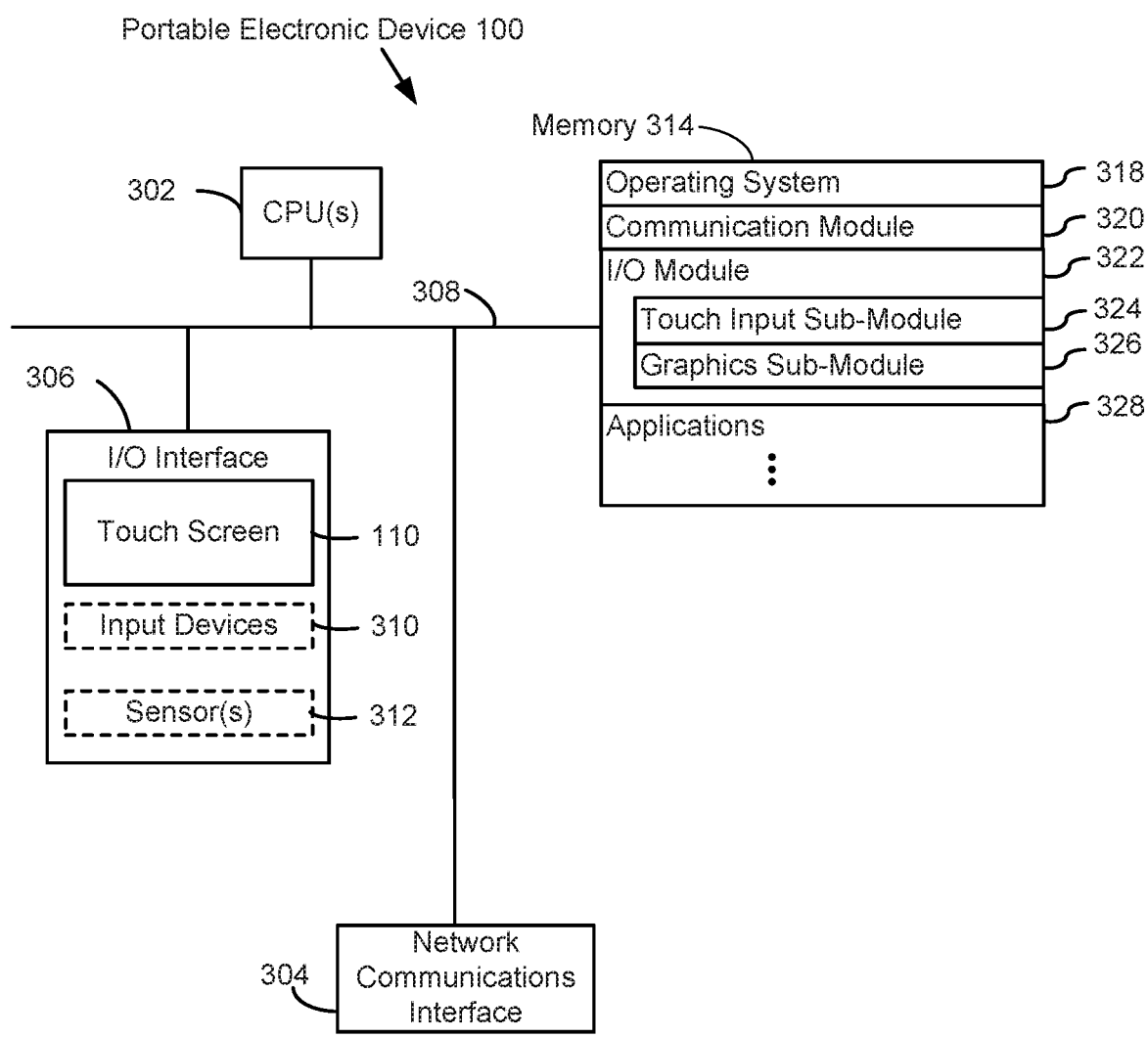
FIG. 3A is a block diagram illustrating a portable electronic device having a touch screen, in accordance with some implementations.

FIG. 3A is a block diagram illustrating portable electronic device 100, in accordance with some implementations. It should be appreciated that the device 100 is only one example of a portable electronic device, and that the device 100 may have more or fewer components than shown, may combine two or more components, or have a different configuration or arrangement of the components. The various components shown in FIG. 3A are implemented in hardware, software, firmware, or a combination of hardware, software, and/or firmware, including one or more signal processing and/or application specific integrated circuits.

The device 100 includes one or more processing units (CPU's) 302, an input/output (I/O) subsystem 306, memory 314 (which may include one or more computer readable storage media), and a network communications interface 304. These components may communicate over one or more communication buses or signal lines 308. The I/O subsystem 306 includes a touch screen 110. In some implementations, the I/O subsystem 306 includes one or more input devices 310, such as a keyboard and/or a mouse. In some implementations, the I/O subsystem 306 includes one or more sensors 312, such as optical, acceleration, proximity, and/or touch-sensitive sensors.

In some implementations, the communication buses 308 include circuitry (sometimes called a chipset) that interconnects and controls communications between system components.

The memory 314 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from processor(s) 302. The memory 308, or alternatively the non-volatile memory devices within the memory 314, comprises a non-transitory computer-readable storage medium.

In some implementations, the software components stored in the memory 314 include an operating system 318, a communication module 320, an input/output (I/O) module 322, and applications 328. In some implementations, one or more of the various modules comprises a set of instructions in the memory 314. In some implementations, the memory 314 stores one or more data sets in one or more databases.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware, software, and/or firmware components.

The communication module 320 facilitates communication with other devices over one or more external ports and also includes various software components for handling data received from other devices.

The I/O module 322 includes a touch input sub-module 324 and a graphics sub-module 326. In some implementations, the touch input sub-module 324 detects touch inputs with the touch screen 110 and other touch sensitive devices (e.g., a touchpad or physical click wheel). The touch input sub-module 324 includes various software components for performing various operations related to detection of a touch input, such as determining if a contact has occurred (e.g., detecting a finger-down event), determining if there is movement of the contact, tracking the movement across the touch-sensitive surface (e.g., detecting one or more finger-dragging events), and determining if the contact has ceased (e.g., detecting a finger-up event or a break in contact). The touch input sub-module 324 receives contact data from the touch-sensitive surface (e.g., the touch screen 110). In some implementations, these operations are applied to single touch inputs (e.g., one finger contacts) or to multiple simultaneous touch inputs (e.g., "multitouch"/multiple finger contacts). In some implementations, the touch input sub-module 324 detects contact on a touchpad.

In some implementations, the touch input sub-module 324 detects a gesture input by a user. Different gestures on the touch-sensitive surface have different contact patterns. Thus, a gesture is detected by detecting a particular contact pattern. For example, detecting a finger tap gesture includes detecting a finger-down event followed by detecting a finger-up (lift off) event at the same position (or substantially the same position) as the finger-down event (e.g., at the position of an data mark). As another example, detecting a finger swipe gesture on the touch-sensitive surface includes detecting a finger-down event followed by detecting one or more finger-dragging events, and subsequently followed by detecting a finger-up (lift off) event.

The graphics sub-module 326 includes various known software components for rendering and displaying graphics on the touch screen 110 or other display, including components for changing the visual impact (e.g., brightness, transparency, saturation, contrast or other visual property) of graphics that are displayed. As used herein, the term "graphics" includes any object that can be displayed to a user, such as data visualizations, icons (such as user-interface objects including soft keys), text, digital images, and animations. In some implementations, the graphics sub-module 326 stores data representing graphics to be used. In some implementations, each graphic is assigned a corresponding code. The graphics sub-module 326 receives from applications one or more codes specifying graphics to be displayed along with, if necessary, coordinate data and other graphic property data, and then generates screen image data to output to the display or touch screen.

In some implementations, the applications 328 include an application for visualizing large amounts of detailed information and forming useful clusters of information. Examples of other applications that may be stored in the memory 314 include word processing applications, email applications, and presentation applications.

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. In some implementations, the memory 314 stores additional modules and data structures not described above.

Figure 3B:
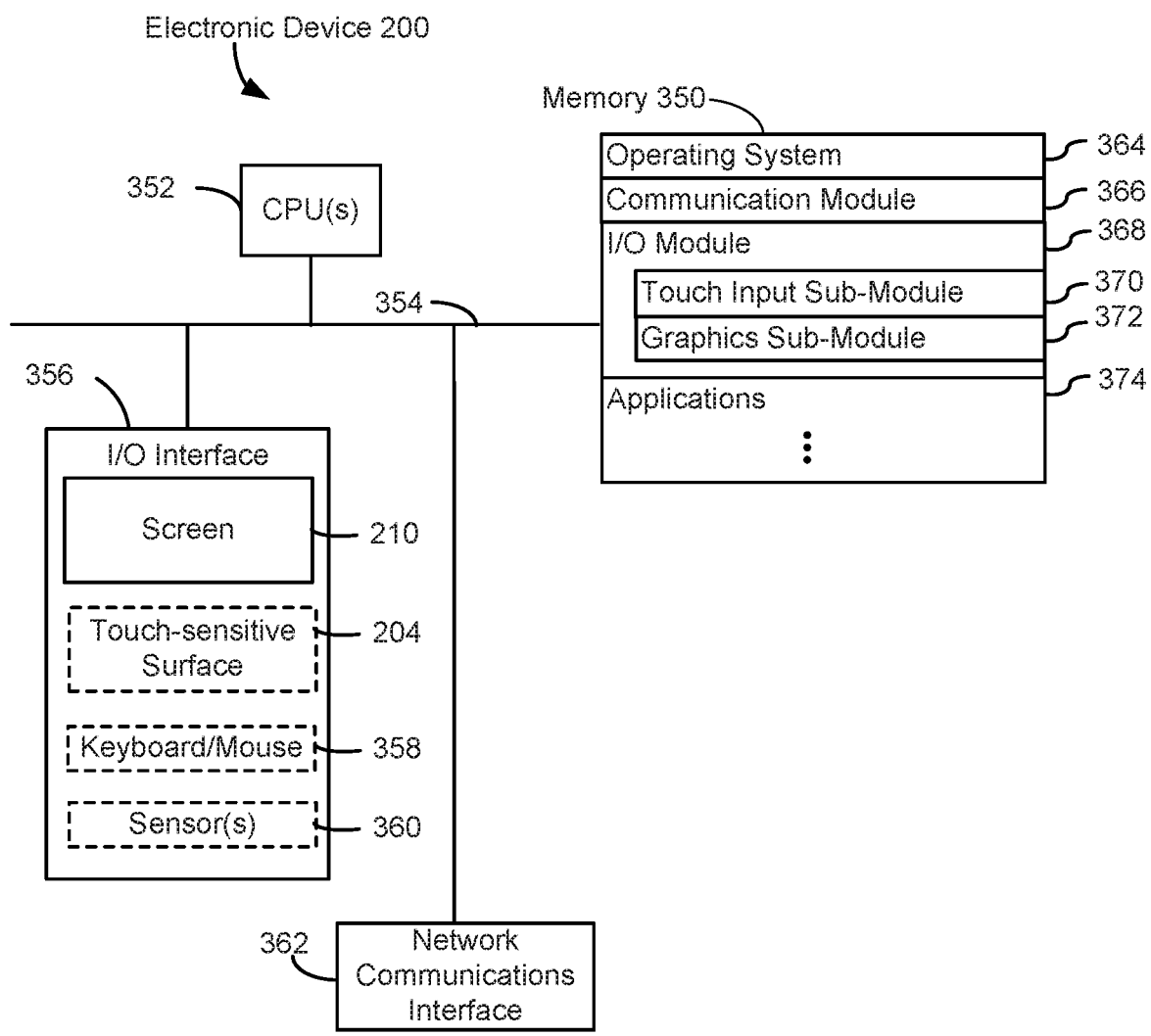
FIG. 3B is a block diagram illustrating an electronic device in accordance with some implementations.

FIG. 3B is a block diagram illustrating electronic device 200, in accordance with some implementations. It should be appreciated that the device 200 is only one example of an electronic device, and that the device 200 may have more or fewer components than shown, may combine two or more components, or may have a different configuration or arrangement of the components. The various components shown in FIG. 3B are implemented in hardware, software, or firmware, or a combination of hardware, software, and/or firmware, including one or more signal processing and/or application specific integrated circuits.

The device 200 typically includes one or more processing units/cores (CPUs) 352, one or more network or other communications interfaces 362, memory 350, an I/O interface 356, and one or more communication buses 354 for interconnecting these components. The communication buses 354 optionally include circuitry (sometimes called a chipset) that interconnects and controls communications between system components.

The I/O interface 356 comprises a screen 210 (also sometimes called a display), and may include a touch-sensitive surface 204, and one or more sensor(s) 360 (e.g., optical, acceleration, proximity, and/or touch-sensitive sensors). In some implementations, the I/O interface 356 includes a keyboard and/or mouse (or other pointing device) 358. The I/O interface 356 couples input/output peripherals on the device 200, such as the screen 210, the touch-sensitive surface 204, other input devices 358, and one or more sensor(s) 360, to the CPU(s) 352 and/or the memory 350.

The screen 210 provides an output interface between the device and a user. The screen 210 displays visual output to the user. In some implementations, the visual output includes graphics, text, icons, data marks, and any combination thereof (collectively termed "graphics"). In some implementations, some or all of the visual output corresponds to user-interface objects. In some implementations, the screen 210 uses LCD (liquid crystal display) technology, LPD (light emitting polymer display) technology, or LED (light emitting diode) technology, although other display technologies are used in other implementations.

In addition to the touch screen, the device 200 may include a touch-sensitive surface 204 (e.g., a touchpad) for detecting touch inputs. A touch-sensitive surface 204 accepts input from the user via touch inputs 214. A Touch-sensitive surface 204 (along with any associated modules and/or sets of instructions in the memory 350) detects touch inputs and converts the detected inputs into interaction with user-interface objects (e.g., one or more icons, data marks, or images) that are displayed on the screen 210. In some implementations, a point of contact between the touch-sensitive surface 204 and the user corresponds to a finger of the user.

The memory 350 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 350 may include one or more storage devices remotely located from the CPU(s) 352. In some implementations, the software components stored in the memory 350 include an operating system 364, a communication module 366, an input/output (I/O) module 368, and applications 374. In some implementations, one or more of the various modules comprises a set of instructions in the memory 350. In some implementations, the memory 350 stores one or more data sets in one or more databases. In some implementations, the I/O module 368 includes a touch input sub-module 370 and a graphics sub-module 372.

In some implementations, the memory 350 stores programs, modules, and data structures analogous to the programs, modules, and data structures stored in the memory 314 of the portable electronic device 100, or a subset thereof. In some implementations, the memory 350 stores additional programs, modules, and data structures not present in the memory 314 of the portable electronic device 100. In some implementations, the memory 350 of the device 200 stores drawing, presentation, and word processing applications, while the memory 314 of the portable electronic device 100 typically does not store these modules.

The device 200 also includes a power system for powering the various components. In some implementations, the power system includes a power management system, one or more power sources (e.g., battery, alternating current (AC)), a recharging system, a power failure detection circuit, a power converter or inverter, a power status indicator (e.g., a light-emitting diode (LED)), and other components associated with the generation, management, and distribution of power in portable devices.

Each of the above identified elements in FIG. 3B may be stored in one or more of the previously mentioned memory devices. Each of the above identified modules corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 350 stores a subset of the modules and data structures identified above. In some implementations, the memory 350 stores additional modules and data structures not described above.

Some terms are used to identify some of the novel elements. A basic unit of information is a "graphical information unit," and is typically referred to as a "Zzote." A Zzote is the basic unit of information, and has a unique graphical form and behavior (e.g., "infinite"-zooming/typically extensive zooming, self-stacking, and inherently containing any other smaller Zzote that overlaps it). The term "Zzote" is an arbitrary word used for convenience in this application.

In addition to the word "Zzote" there are several other related terms that are derived from it. A "Zzote-Link" (or "Zzote link") is a Zzote that contains a novel form of link to a shared source Zzote (and thereby a shared source Zzote cluster). A Zzote-Link can also be described as a "link graphical information unit" or an "in situ link portal." Though there may be many Zzote-Links to the same source Zzote (cluster), a Zzote-Link does not separately store the content of the source Zzote, the Zzote-Link always points to the current data in the source Zzote (and its cluster). A Zzote-Link has specific behavior, which is described in more detail below. (The Zzote-Link model illustrated in FIGS. 42-48 is a "source-Zzote based Zzote-Link model" as used by some implementations. As an alternative to a "source-Zzote based Zzote-Link model", some alternative implementations use a "Share-Link" model in which two or more Zzotes share common content without any of them being designated as the source. (The "Share-Link" model of some alternative implementations is sometimes alternatively described herein as a "'shared Zzote' model for 'Zzote-Links' without a specific 'source'"—although it should be emphasized that the "source-Zzote based Zzote-Link model" also features shared Zzotes.)

A "Zzote-Link Annotation" is an annotation to a "Zzote-Link." A Zzote-Link Annotation is a local-only annotation (e.g., placed on a specific "Zzote-Link" only) to a common shared graphical information unit and is not shared with other links to the same source. It is described in more detail below.

A "Zzote-Link Lister" is an on-screen tool for advanced navigation of Zzote-Links and Zzote-Link Annotations. A Zzote-Link Lister has unique behavior, as described in more detail herein.

Zzotes dynamically form hierarchies based on size and overlap. Within a Zzote hierarchy, the terms "parent," "child," "ancestor," and "descendant" are used to describe certain Zzotes. In some cases, a Zzote is referred to as a "sub-Zzote." A smaller Zzote that overlaps a larger Zzote can be referred to as a "sub-Zzote" or a child Zzote of the larger Zzote. The larger Zzote can then be referred to as a "parent Zzote" of the sub-Zzote. The terms "ancestor" and "descendant" are similar to parent/child, but allow for zero or more parent/child relationships in a sequence. For example, if A and B are Zzotes and there is a sequence of one or more parent/child relationships $A/C_1, C_1/C_2, \ldots, C_n/B$ with $n \geq 0$, then A is an ancestor of B and B is a descendant of A. Note that when $n=0$, there are no intermediary Zzotes $C_i$ and A is a parent of B.

In general, a sub-Zzote is a "detail" of the larger parent Zzote. The "sub-Zzote" is considered to belong to the parent Zzote. For example, if a parent Zzote is moved, any sub-Zzote moves with it. In fact, all of the levels of descendants (sub-Zzotes of sub-Zzotes and so forth) of the parent Zzote move and resize as the parent moves and/or resizes. A Zzote-Link to a parent Zzote inherently contains any sub-Zzotes (and in turn any sub-Zzotes of those sub-Zzotes and so forth to all the levels of descendants) along with the parent Zzote.

Because parent/child relationships are created dynamically as Zzotes are moved and/or resized, a Zzote may have more than one parent Zzote based on the geometry of its location and size. Because of this, it is more accurate to refer to "a parent" of a Zzote rather than "the parent." When a Zzote has multiple parents, moving and/or resizing any of the parents applies the same moving and/or resizing to the child (maintaining constant relative sizing and positioning of the adjusted parent and child relative to each other).

In some instances, the term "Zzote cluster" is used to emphasize that a Zzote has children. Any Zzote that contains other Zzotes may be referred to as a "Zzote cluster." Any Zzote can become a Zzote cluster at any time because sub-Zzotes can be added dynamically at any time and clustering is based on the sizes and positions of the Zzotes. (Also, in some descriptions the phrase "cluster" may be used in general terms even when a specific cluster actually just consists of a single Zzote with no descendants. This is a cluster of just one item.)

When a new Zzote is added to the canvas from the "Add Bar", it does not yet contain any information or other Zzotes. On the other hand, when new Zzotes are added from the "visual cluster clipboard" (sometimes referred to as from "cluster icons" on a toolbar), they may already contain information and other Zzotes. Actions taken on a Zzote apply to all descendants of the Zzote (e.g., moving and resizing).

In some instances, the term "single-Zzote" is used to refer to the basic singular Zzote itself, ignoring any sub-Zzotes it may have. Sometimes the canvas is referred to as "Zzote-Space." In some implementations, Zzote-Space is effectively theoretically infinite/extensive in both size and capability for zooming. Each Zzote is located in Zzote-Space, and users can navigate within the Zzote-Space. In addition, in some implementations a user can create any number of distinct Zzote-Spaces if they prefer this to a single all-encompassing Zzote-Space. Where distinct Zzote-Spaces are used, each Zzote-Space typically has a specific theme, subject matter, or sometimes new Zzote-Spaces are created because a user wishes to start working in a completely empty new space. In some implementations, Zzotes can be moved, copied and "Zzote-Linked" between different Zzote-Spaces.

In general, all of the Zzotes exist within a Zzote-Space. However, there are some exceptions. One of the exceptions is a "potential" Zzote, which may or may not become a Zzote in the Zzote-Space depending on the user's actions. For example, consider a user action to create a new blank Zzote (e.g., from the Add Bar). At this stage, the newly created item is a potential Zzote. It remains a potential Zzote until (and if) the user actually finalizes the placement on the canvas (into Zzote-Space). As the user positions and sizes the potential Zzote (over the canvas), it is being rendered above and below other Zzotes in Zzote-Space according to the viewport rendering rules, even though it is not yet a "real" element in Zzote-Space. Visually, the user can see how the potential Zzote clusters with the existing Zzotes, but it is not yet clustered with any of the Zzotes in Zzote-Space because it is not yet "finalized"/saved to the canvas. If the user abandons the action (e.g., by terminating the gesture outside of the displayed viewport/canvas), nothing changes in the Zzote-Space.

Likewise a potential Zzote is created when an image or source (such as web page) is being transformed by the user into a Zzote in Zzote-Space. In this case, the item being positioned and sized by the user remains a potential Zzote until the placement is finalized. If the user abandons the action, there are no changes to the Zzote-Space, and the potential Zzote is abandoned.

In addition, potential Zzotes are created as a cluster begins to be added from the Visual Cluster Clipboard. As noted above, during the add process, a user gets a preview of the potential cluster, and each of the Zzotes in the cluster is a potential Zzote during the add process. As with other potential Zzotes, the entire potential cluster creates actual Zzotes ("finalized" to the canvas) only if the add gesture completes within the viewport, and all of the potential Zzotes in the potential cluster are abandoned otherwise. Note, however, that the clusters in the Visual Cluster Clipboard are stored as part of the clipboard. During the add operation from the Visual Cluster Clipboard, there is a "potential" cluster with respect to the Zzote-Space. In addition, because the items on the Visual Cluster Clipboard are stored, they can be shared as Zzotes externally (e.g., with other users). In some implementations, the items stored on the Visual Cluster Clipboard are also described as "Potential" Zzotes. However, in some implementations it is newly created "dragged" representations of such "Potential" Zzotes that are dragged out by the user to be possibly placed in Zzote-Space.

Zzotes are placed within a Zzote-Space. Often, Zzotes are stacked on other Zzotes. If a Zzote is not placed on any other Zzote, then it can be viewed as being at the top-level of the hierarchy. Sometimes this is referred to as being on the Zzote-Desk. (This is similar to a computer desktop.) Sometimes a Zzote that is on the Zzote-Desk is referred to as a "Base-Zzote" because it is at the base of any stack and has no parents.

Zzote-Links enable the same graphical information units (Zzotes) to be simultaneously shared in multiple locations/scales within the same Zzote-Space (or across several Zzote-Spaces). Some implementations distinguish between the original "source" Zzote (and any descendants) that actually exists in "Real" Zzote-Space, and the multiple "artificial" (virtual) representations of this "source" as viewed/edited within Zzote-Links. Zzote-Links hence behave as synthesized portals enabling the user to zoom-in starting from where the Zzote-Link is located/scaled but into a different "source" region of Zzote-Space. For example, a user may view and edit a source (a Zzote and its descendants) from within a Zzote-Link that is located and scaled somewhere entirely different from the "source" Zzote. In this case the inner-information is not actually stored at the Zzote-Link; the user is interacting with an artificial view created on-the-fly. When the user edits within the artificial view depicted within a Zzote-Link, the changes are really applied at the "Real" source (in "Real" Zzote-Space) only. It appears to the user that these edits are effectively propagated out to the inner content of all the Zzote-Links pointing to the same source. In some implementations the data only exists once (at the source) and the same content is being rendered in multiple places as required to create this illusion. Such edits within a Zzote-Link can include altering the information content of the "source" Zzote itself or its descendants, adding/removing descendant Zzotes to the "source" Zzote, and repositioning/resizing descendant Zzotes. (It is also possible to create/view/edit new Zzote-Links that point to entirely different "Source" Zzotes from within the first Zzote-Link and so forth. This can be described as nesting Zzote-Links within Zzote-Links. This can include (theoretically) infinite recursions as described in more detail below.)

In some implementations, Real Zzote-Space is defined as the genuine regions of Zzote-Space that exist at actual locations (e.g., there are corresponding entries in a database of the Zzotes in the Zzote-Space). All information is stored in Real Zzote-Space.

In some implementations, real Zzote-Space is where the original source is located for any Zzote-Link. A Zzote-Link has its own independent location and size in Zzote-Space, but it points to a shared source Zzote for its inner content. FIGS. 42-48 are of such a "source-Zzote based Zzote-Link model". (As an alternative implementation to such a "source-Zzote based Zzote-Link model", some alternative implementations use a "Share-Link" model (sometimes alternatively described herein as a "'shared Zzote' model for 'Zzote-Links' without a specific 'source'"—although it should be emphasized that the "source-Zzote based Zzote-Link model" also features shared Zzotes). In such alternative implementations, once a Zzote has a first Zzote-Link connected to it, both the original Zzote and the Zzote-Link are treated as "equal" Zzote-Links to a common "shared Zzote" of information. Thus in these alternative implementations there is no specific "source" Zzote represented, just a common "shared Zzote". Subsequently, in those alternative implementations, there is no specific location (i.e., in "Real Zzote-Space") for this "shared Zzote", but it can be accessed from (and is virtually represented within) any Zzote-Link to it. In some of those alternative implementations, if the number of Zzote-Links to a "shared Zzote" returns to one again (because the user deletes Zzote-Links for example), then the remaining Zzote-Link returns to being a normal Zzote once more.)

A user can drag items between different regions of the Zzote-Space. In addition to moving Zzotes and/or the content of Zzotes around in Zzote-Space, a user can move Zzotes and/or their contents (including recursively) between Zzote-Links and the contents (including recursively) of other Zzote-Links and Real Zzote-Space. When a user drags an item from one such region into another, this can be described as crossing the Zzote-Link Boundary (sometimes this is referred to as a "Barrier" even though the barrier does not prevent copying, moving, or linking across).

The canvas is considered infinite because there is nothing conceptually that imposes any artificial limit on the size or magnification level. However, some implementations do impose practical limits, which can depend on such factors as the maximum and minimum sizes of floating point numbers. However, some implementations provide appropriate data structures to overcome common physical limitations.

The term "viewport" is used to specify a user's current view of the Zzote-Space. The viewport has a position in the Zzote-Space and a scale (or magnification) of the projection onto the computer display. The position and magnification specify how Zzote-Space is mapped onto an area of the real computer display that the user is viewing and interacting with. Some implementations allow a user to have more than one viewport in use at the same time.

Sometimes the term "canvas" is used as an alternative to the term "Zzote-Space." Alternatively, the term "canvas" can be used to identify the portion of "Zzote-Space" that is currently visible in the viewport. A user can interact with the canvas. Placing a Zzote "on the canvas" means that the Zzote is placed within the "Zzote-Space." Typically, this also means that the Zzote is placed in the currently visible area of the viewport.

Some implementations provide a Visual Cluster Clipboard (also sometimes referred to as a "Visual clipboard"), whose contents are typically entirely visible (though may need to be scrolled into view if there are many items). The Visual Cluster Clipboard contains Zzotes (generally Zzote clusters), and in some cases Zzote-Links. The Visual Cluster Clipboard can also be described as a toolbar including one or more cluster icons (the cluster icons depict Zzote clusters). Such items can be dragged in and out (as items which are clusters—including clusters which may be just a single Zzote). The Visual Cluster Clipboard can contain multiple items simultaneously. The "unpinch to preview" feature can be used to quickly look at the items on the Visual Cluster Clipboard. In addition to drag and drop operations, in some implementations a user can use the commands Cut, Copy, or "Create Zzote-Link" to add selected items and clusters to the Visual Cluster Clipboard. Additionally, in some implementations, "Paste" commands may be used to add Zzote Clusters from the Visual Cluster Clipboard to the canvas.

In general, a "Zzote" may be a Zzote cluster. However, in some contexts the term "Zzote" is used to refer to a Single-Zzote, as noted above. (Also, in some descriptions the phrase "cluster" may be used in general terms even when a specific cluster actually just consists of a single Zzote with no descendants. This is a cluster of just one item.)

Disclosed implementations improve the ability of a computing device to graphically display, structure, edit, and add to vast quantities of theoretically near-infinitely/extensively detailed information and linkages between them. This is particularly well-suited for the innate spatial memory abilities of the human brain. This saves time, gives humans improved understanding of the information, and enables better informed decisions on any acquired or created knowledge.

As noted above, this uses a conceptually "infinitely" zoomable and "infinitely" sized canvas within the graphical display of a computing device. A user places units of information ("graphical information units" or "Zzotes") within this space. Smaller units of information are stacked on top of larger units automatically (and dynamically) when they partially or fully overlap. Smaller units contained within larger units are considered to be semantically contained by the larger. Larger concepts contain smaller concepts, so larger units are placed behind the smaller units automatically. When larger units containing smaller units are moved/resized in space to place their meaning in the different context of other larger units or empty space, any units they contain move/resize with them because they "belong" to the larger units. By zooming and panning into the viewport of the display using the unique facility of a graphical computing device, smaller stacked units can appear to the user as comparable to the first larger unit in apparent visible size. This stacking can continue without theoretical limit/extensively because there is theoretically no maximum or minimum level of zooming. Stacking can also be achieved easily "from below" an existing structure of units by placing larger units beneath structures of smaller units. As noted above, a larger unit is automatically placed below the smaller units, so the user does not have to specify that it is placed below the smaller units. Links to other units (and hence all of their sub-units) exist as scaled representations within Link-Units (sometimes referred to as "link graphical information units," or "Zzote-Links"). Link-Units are effectively portals into completely different regions of information-space (or into a shared information space in some alternative implementations). Link-Units can be zoomed into without theoretical limit. Link-Units effectively contain shared graphical information units. Links-Units can contain other Link-Units. Even when there is a theoretically infinite recursion (because a structure of links is linked back on itself), the system displays the relevant portion in a short time. In particular, the rendering of the display stops as soon as the sizes of the rendered objects are below a certain level of granularity (e.g., less than a pixel). The user can manipulate and edit the contents of Link-Units in a manner exactly the same way as manipulating the source. An outer-frame of a Link-Unit can contain Link-Annotations (sometimes referred to as "local-only annotations to a common shared graphical information unit" or "Zzote-Link annotations") that relate to the context of that Link only. The Link-Units are also referred to as Zzote-Links or "link graphical information units". Zzote-Links can be described both as containing shared graphical information units and as being "in situ link portals."

This enables the machine (with minimal additional effort by the user) to structure the information into hierarchies and create easily understandable linkages and associations in a manner far simpler than alternative techniques.

Zzotes effectively eliminate the need for a filing system separate from the documents themselves. In addition, Zzotes eliminate the need for an inflexible collection of folders.

Zzotes naturally cluster information into increasingly complex building blocks (in varied shapes, arrangements, and colors easy for humans to remember), which reflect reality in a simpler and more powerful manner than previous techniques. In addition, Zzotes are visually intuitive to humans, engaging the natural spatial capacities of the mind. A (theoretically) infinite Zzote-Space enables a human to organize more information and more clearly than would be possible by a human mind alone.

Disclosed implementations are also a significant improvement over conventional computer links, because the information now appears in situ without the need to jump elsewhere. Each link (containing shared graphical information units) behaves as a portal into a completely different region of information space. This is a unique new way of representing connections between information. The user can simply zoom into the information. Everything is visually apparent, even for links within links (potentially theoretically ad infinitum). Because the use and creation of links (sometimes referred to as "Zzote-Links"/"link graphical information units" containing "shared graphical information units") in the disclosed implementations is visually integral to the information, it is far easier for a human to use, create, and edit them in context.

Disclosed implementations enable complicated information associations to be created by the machine in a manner that is easy for humans to understand, modify, and extend. The machine automatically creates a database of potentially (theoretically) limitless associations, all of which is presented by the machine in an entirely human-understandable graphical form. Nothing is hidden, including theoretically infinite recursions if they occur. Importantly, this does not require the input of a specialized database or programming expert. The self-building database naturally models a (theoretically) infinite number of exceptions as the real-world knowledge leads, without having to impose any previous structure upon it. A human can choose to impose whatever limitations are desired.

Based on simple user input, the disclosed implementations can structure complex information in a transparent and fluid manner. An important benefit is that humans can remember, understand, update, extend, and clearly see associations in theoretically infinitely/extensively detailed information that would otherwise not be apparent. The ease with which the information effectively files itself encourages humans to organize their information. With other tools, users are less likely to even attempt organizing vast amounts of data because the tools require a well-designed plan upfront, with significant difficulty changing later when the information is better understood.

Previously, humans were often unable to see emerging patterns in their information. Nor could people "shape" and add to the information on the fly as they learn more about the data. With the disclosed implementations, human users can now save time and make better informed decisions because they can fluidly see meaningful structures of the big picture, precise details, and everything in between.

Figure 4:
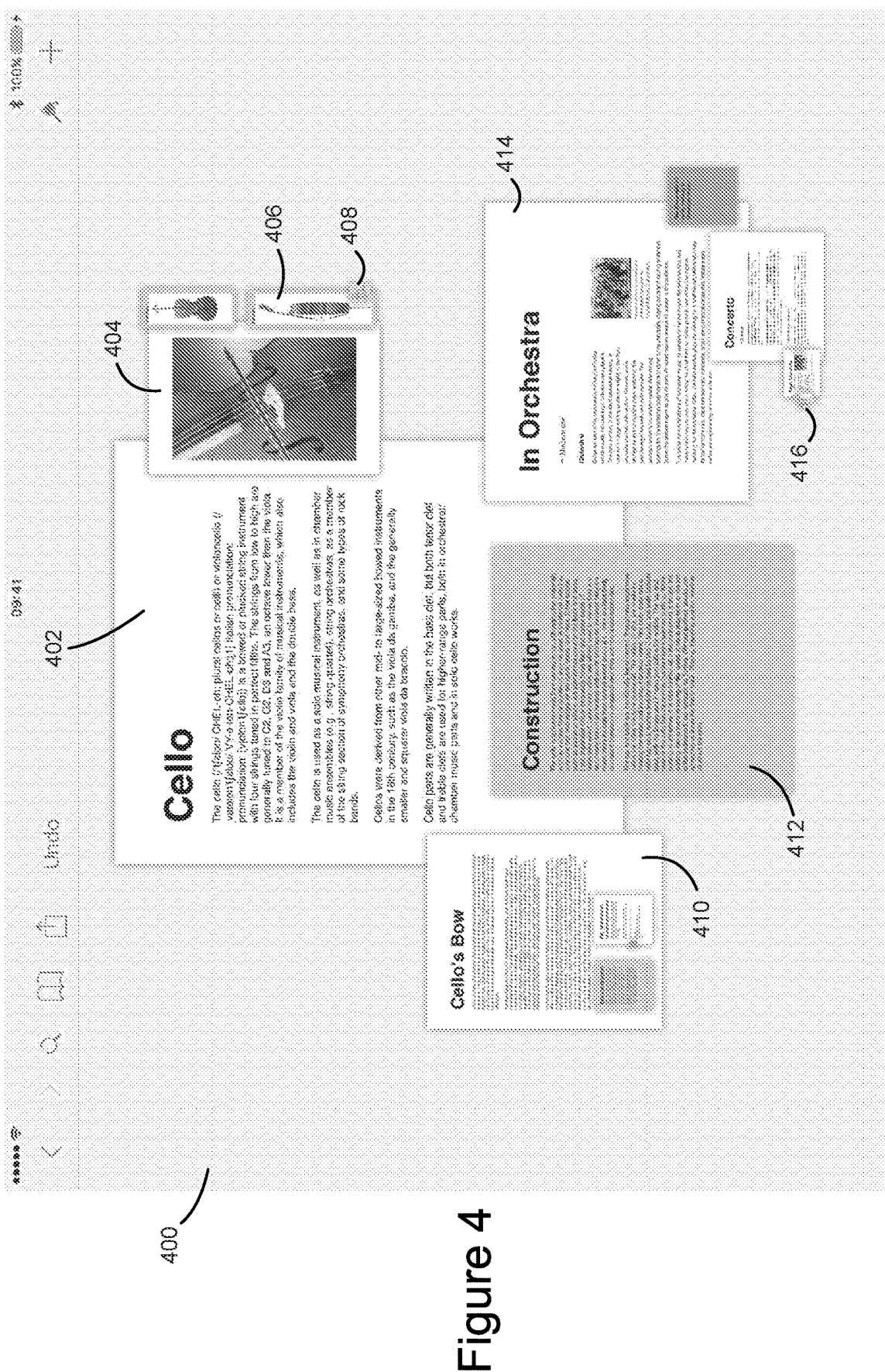
FIG. 4 provides an example of a cluster of graphical information units in accordance with some implementations.

FIG. 4 provides a simple example of a Zzote-Space providing information about cellos. Below the toolbar (or menu bar) at the top of the screen is the viewport 400 with a variety of Zzotes, including a base Zzote 402, which currently contains all of the other Zzotes displayed in the viewport 400. At the second level in the hierarchy are four more Zzotes, including a photographic Zzote 404, a second Zzote 410 describing the cello's bow, a third Zzote 412 describing the construction of a cello, and a fourth Zzote 414 (sourced directly from part of a webpage) describing the use of a cello in an orchestra. Note that the construction Zzote 412 has a different color (blue in the original image). This Figure also shows how the Zzotes are nested based on the sizing of the Zzotes. In this case, the first photographic Zzote 404 has two child Zzotes, including a side image Zzote 406. This side image 406 also has a child Zzote 408. At the current magnification it is apparent that the child Zzote 408 has text, but it is not possible to read it. However, when the information is needed, it is a quick gesture away. The user can easily zoom in on the child Zzote 408 to read the text. As illustrated by the tiny descendant Zzote 416, the nesting can proceed theoretically indefinitely.

Modern computing devices and the Internet present humans with vast quantities of text and images. There are many ways for users to take notes of ideas and plans in documents and lists. This can become overwhelming for the human mind. Using current graphical computing "metaphors," users may:

Navigate using "Scroll," "Page," or "Swipe," and jump back and forth using "Back" and "Forward" buttons;
Deal with multiple items of information by opening dozens of Internet web browser tabs, or create various documents, spreadsheets, or other file types. If related, items and parts of items can be copied and pasted, and various links (e.g., hyperlinks or text references of where to look) between items can be created. Many systems use the metaphor of "folders" or "directories."
Visually represent storage by saving items of information in lists, filing systems, and remote "clouds."

Conventional systems fail to build a coherent mental picture of where information is located. In fact, computing devices just store bits of data in randomly located hardware. This is inconsistent with the human mind, which is used to dealing with spatial environments as found in nature. The brain inherently expects there to be some relationship between where something is located and its meaning. Failing to make this connection means that natural features of the brain are not being utilized.

Arranging real world objects and documents helps in their classification, and aids understanding. The success of graphical user interfaces over earlier text-based displays demonstrates the natural preference of humans for visual representation of concepts in a computing device.

Earlier "spatial" models are limited. For example, the model of displaying computer windows on a screen runs up against the limited space on the display screen, and trying to display too many windows commonly creates an unusable mess. In common computing metaphors the positioning of windows is typically just transitory, and users often have to move or close them due to lack of space. Computer windows typically represent only fairly large-scale divisions between information sources.

Arranging information in grids creates a different problem. By definition, all grids look the same in their basic layout. There are no memorable features for humans to remember (unlike the varied structures found in nature for example). In addition, when a computing device presents a large grid of items, the user typically has to scroll to find something. The size and lack of visual context can cause the user to feel overwhelmed by the information.

Grouping things into folders has a distinct set of problems. Typically, the contents of folders are either hidden away, or are difficult to distinguish between at the higher level where the folder itself is viewed. Furthermore, when folders are nested, it can become difficult to find the desired item.

Over time, it often becomes necessary to reclassify or reorganize information as more information becomes known and/or the user has a better understanding of how the information should be organized. With folders, it typically requires a lot of effort to subsequently reclassify and move items around between folders. The organizational process of moving items between folders and creating new folders is completely separate from the process of document creation, which is the primary focus of the user.

The "folder within folder" metaphor is also fundamentally flawed. A major flaw in the folder metaphor is that it is inconsistent with real-world folders. The resulting depiction of multi-leveled hierarchies often becomes complex and confusing for users. However, information classification often does require such hierarchies.

Depicting information in trees instead of folders. is also problematic. This is not based on a genuine spatial model, so it can be visually alienating.

Another problem with existing models for information storage is running out of space. Inherently, any spatial model will soon run out of space. Often, a user instinctively wishes to fit everything on one "screen" that can be understood, but by definition there is only finite space. The alternative is to allow scrolling, but then the user does not see the complete picture. For example, users often find useful the basic idea of placing important and recent documents on their computer desktop. Here, users often choose not to arrange files in a grid, but in arbitrary patterns of their choosing. However, they soon run out of space on the desktop, and it becomes hard to find anything in the jumble (and hard to find space for the next item).

In theory, it is often intended by previous computing metaphors, that the user should break the desktop down into folders, and follow a similar spatial arrangement. In practice this is rarely the case. When users do use folders, often the content is simply a grid or list. This may be due (at least in part) to the inherently unnatural concept of folders, which breaks with the easily understandable picture of the initially spatial computer desktop.

Disclosed implementations address these issues with conventional techniques of storing information.

Spreadsheets create a different set of problems for storing large quantities of information. A spreadsheet has a grid of rows and columns. Users often design a logically arranged series of column headings for a given spreadsheet. The purpose of the spreadsheet is often that columns represent attributes of a given body of information. Rows are typically specific examples of objects with variations in these attributes.

In real-world use, it is inevitable that new instances will emerge of objects that require additional columns, possibly only for a small subset of the total information. In this case the user may be required to insert new column headings just to accommodate these exceptions. The result is that a previously well-defined manageable number of columns needs to grow in ways that will leave large gaps in the entire grid, and prevent easy viewing of the information.

Although relational databases can store lots of data in predefined tables, they are both rigid and opaque. The above problem with spreadsheet columns applies to database tables as well, with potentially even greater problems because a database can have many different related tables. Relational databases are also not readily accessible to have their structure altered by typical computer users.

In addition to adding new columns, a database with multiple tables has even more complex scenarios to support database changes. Typical users are not able to alter the database structure, nor do they readily understand the abstract concept behind making database changes. Altering the database structure even by an expert often causes problems for the rest of the database unless it is managed carefully. Hence, users typically attempt to make do with existing fields or cram new types of information into unstructured general purpose "memo" fields. Database designers cannot anticipate every possible scenario in advance, particularly when subsequent demands are based on new data that was not even contemplated at the time the database was designed. In addition, many database tools are visually complex rather than intuitively helpful. Also, unstructured databases (such as NoSQL), XML and JSON files do not provide a sufficiently intuitive means for easy comprehension, viewing and restructuring of datasets.

To address many of the problems associated with conventional techniques of information storage, disclosed implementations provide a spatial, robust, yet (theoretically) infinitely flexible form of information structuring.

Consider the case of a well-defined business model for a well-defined and unvarying business. In this case, the rigidity of a relational database's design can be adequate and encourages adherence to the rules of the business. However, although such a model can be of use, real-world situations are often more complex and subtle than this. More commonly, planning for situations and business models that are not yet fully understood can benefit from the flexibility to grow organically from very specific details upwards to more general groupings and principles as they emerge. Here, the rigidity of current database formats is a hindrance.

Furthermore, a typical user cannot easily visualize the structure of a relational database. When the structure of databases is immediately visually apparent (as in disclosed implementations), users are more readily able to adapt it themselves. Ideally, the structure should not be rigid at all. The model for the entire machine should be inherently flexible yet robust so that it can accommodate change to the structure on the fly without breaking earlier rules.

With disclosed implementations, a typical user may create new structures based on the actual information just as often as entering just text in previously defined fields. Knowledge acquisition is as much about inferring new patterns as it is about filling in data in previously defined patterns.

Disclosed implementations provide an entire structure for a "database," which uses a comprehensible new and adaptable spatial model. All users can understand and improve upon the structure with ease.

To make sense of knowledge, it helps to be able to see memorably visual patterns and shapes, and these patterns and shapes should emerge naturally with no additional effort. Remembering the shapes of ideas open up natural visual pathways in the human mind. In the disclosed implementations, a user can arrange the information in whatever shape desired. A user naturally clusters knowledge of ever increasing complexity using basic Zzote units based on consistent principles.

In this way, a user can address increasingly complex concepts as they emerge. This includes moving, resizing, and copying Zzotes to be placed in improved context, and linked to. As more detailed information is known and/or understood, a user can insert Zzotes with this additional information at any time without disturbing the previous order, or taking up more space. In addition, new information such as text and images can be added without taking away from the bigger picture. Existing and new Zzotes can be "shrunk" without theoretical limit into the existing space as required. As the structure gets more complex, it also becomes more useful to use links, which allows the same information to appear in two or more distinct locations while maintaining only a single copy of the information content. Links appear and act as part of the structure in which they are linked from so there is no abrupt change of context.

Disclosed implementations include various design principles that address all these issues:
  graphical information units (Zzotes) can shrink down to fit within larger graphical information units;
  there is a (theoretically) unlimited continuous change of viewing scale to provide a fluid continuum of context;
  users can create interesting shapes and colors with the information, which aids human memory and other natural faculties of the mind;
  graphical information units self-stack themselves into clusters, which become new units as a user progresses to create and collate information;
  clusters can be moved, resized, and copied to make improved semantic sense of the information;
  the space itself (Zzote-Space) is effectively (though not literally) "stretched" to make room for new information;
  in situ link portals ("Zzote-Links"/"link graphical information units") can be created to transparently connect regions of space (via shared graphical information units) and allow in situ viewing, editing, and additions; and
  the entire design has an intuitive interface based on deep consistent principles.

The fundamental unit of information is a "graphical information unit," which is referred to herein as a "Zzote" for brevity. Zzotes are positioned and sized in Zzote-Space, which is sometimes referred to as the canvas. A Zzote is visualized within a graphically displaying computing device. The (theoretically) infinite/extensive zooming available in Zzote-Space cannot be achieved in a static diagram or in the real-world, nor could they depict the items as they are manipulated or visually linked to.

A Zzote encapsulates information on any given subject. Because of the theoretically unlimited size and flexibility, a Zzote is both a new form of document and a filing system simultaneously. Zzotes are information-containing shapes.

In some implementations, the Zzotes are rectangular, other implementations provide for a greater variety of shapes and/or irregular shapes.

Zzotes are positioned and sized within a theoretically infinitely/extensively sized and scalable computer-graphic space referred to as "Zzote-Space." A viewport displays a portion of Zzote-Space at a specific location and magnification, and includes Zzotes at that location. A user can easily adjust the position and/or scale of the viewport. There is no conceptual limit to how far the viewport can be zoomed-in or zoomed-out.

A user typically zooms in and out of specific Zzotes frequently. The zooming affects the entire viewport, so all of the Zzotes are scaled accordingly. With a computer graphical device this is typically a smooth, fluid, and natural motion. This benefits user acceptance of the Zzote-Space user interface.

All Zzotes typically behave in the same way regardless of their scale relative to other Zzotes, and there is no conceptual point of maximum or minimum zoom. At any time, any Zzote can be considered the focus of the user's attention and enlarged as desired.

One way that information is encapsulated is by automatic raising and lowering of Zzotes based on size. When two Zzotes overlap their area in any way, the larger Zzote is automatically displayed beneath the smaller Zzote. (This uses relative size-determination according to the specific-size-metric such as Zzote width.) The larger Zzote is seen as a semantically broader area of information that encapsulates the smaller Zzote.

This "vertical" (along a theoretical or actual z-axis) placement within the stack of Zzotes applies regardless of whether there is complete overlap (the smaller Zzote is entirely within the outline of the larger Zzote) or partial overlap. In particular, when a smaller Zzote is not entirely contained by the area of the larger Zzote (e.g., overhanging the margin of the larger Zzote), the smaller Zzote is still designated as "contained" by the larger Zzote. It is often useful to place related "contained" information around the margin in this way.

Every Zzote can be a Zzote cluster because the dynamic parentage applies constantly. For example, a Zzote itself may initially contain a (small) finite amount of (just its own direct) information and no sub-Zzotes. It is not yet a cluster. (In some rigorous definitions it may still be generically described as a cluster, albeit of just one item.). However, the amount of detail regarding the subject continues to grow as the user shrinks and stacks new smaller Zzotes (sub-Zzotes) and links (Zzote-Links, which are also then sub-Zzotes) onto the Zzote. The Zzote therefore becomes a cluster of theoretically limitless knowledge as more smaller sub-Zzotes are added to it. Any of the sub-Zzotes can itself become a cluster as well if even smaller Zzotes are added to it.

Once stacked together, Zzotes and their sub-Zzotes are implicitly clustered together to be effectively one unit. These can then be moved and sized as one.

Because Zzotes features (theoretically) infinite zooming, it is possible to keep adding information as it becomes available.

In order to see more information, the user simply zooms in the viewport. Zzotes that previously appeared small on the display at a given viewport scale (e g, a sub-Zzote of a larger Zzote) now appear as large as desired as the viewport scale is adjusted. Because of this, it is easy to add sub-Zzotes to existing sub-Zzotes and so on, without theoretical limit (although some implementations ultimately impose some form of limits).

The arrangement of Zzotes can form interesting patterns that are memorable and meaningful to humans. This helps the human mind to make sense of information and emerging concepts, which arise from collections of groups of information.

Because such new information is added by shrinking it in, a Zzote takes up no more space as more information is added. The stability of existing patterns of Zzote layouts can generally be preserved if desired, thereby helping with user's spatial-memory of the patterns of information. (However, as described below, some Zzotes clusters may be re-arranged when a user feels this is useful to better organize and understand the information.)

Each Zzote can become an increasingly information-dense cluster. By changing the viewing-scale, understanding can be formed of the subject at varying degrees of context. Because of the easy access to zooming, users can zoom in and out of aspects of any details when required. By zooming out, a user sees the big picture and zooming in provides more specific detail for certain aspects.

Zzote-Space obviates the need for conventional folders. It is easy to re-arrange and re-group the stacks (clusters) of Zzotes as new meanings of the information become apparent. By changing just the position and size of a Zzote, it can drastically alter its position in an information hierarchy.

Any Zzote can contain any other Zzotes just by changing their relative positions and sizes. Therefore, every Zzote is both a document and a possible folder simultaneously.

Color helps enforce meaning and importance. Zzotes can be assigned colors. This helps in several ways. First, Zzote colors stand-out both individually and in potentially pattern-forming aggregates, even when Zzotes appear small due to the scale of the viewport at that time. For example, it is generally possible to recognize the color of a Zzote even when the Zzote is miniscule. Color can also represent importance or urgency of any Zzote. In addition, color can be used to make it easier to remember how various Zzotes (and the varied structured or random emerging color patterns within a cluster) appear to look.

Zzote-Links (link graphical information units) provide portals between shared information. Zzote-Links can also be described as containing shared graphical information units. Zzote-Links can be added into Zzote-Space as a form of Zzote that contains shared information. Zzote-Links behave as portals between different regions of information. The user simply zooms into them from where the link (the Zzote-Link) has been placed in its new context. In some implementations, a user can modify and extend the contents of Zzote-Links entirely in situ in the new location. The modifications affect all views of this same information wherever else it may be in Zzote-Space.

Zzote-Links are implemented entirely in situ as portals rather than requiring the user to jump away as with conventional computer links.

The depiction of a Zzote-Link is rendered in real-time as the viewer is viewing it. In some implementations, the source only exists at the original location in real Zzote-Space. There can be one or more links to the same source Zzote. (In other implementations, there is no specific source for Zzote-Links, just shared information that can be accessed by multiple Zzote-Links.)

Any changes to the inner contents of a Zzote-Link (i.e., the source or any of the source's sub-Zzotes and further descendants) are shared by all Zzote-Links pointing to the same source and apply to the common source.

There is no (theoretical) limit to how far Zzote-Links can be zoomed into. In addition, Zzote-Links can be placed within Zzote-Links without (theoretical) limit (including theoretically infinite recursions).

The entire current visible space in a viewport can be within a Zzote-Link within a Zzote-Link within a Zzote-Link for example.

Zzote-Link Annotations enable specific local contextual annotations to be applied only at the site of a specific Zzote-Link itself. This enables different local additions to common shared information.

Some implementations use Zzote-Link Dots, which enable a user to rapidly jump between other occurrences of the same Zzote-Linked shared information wherever the Zzote-Links are located in Zzote-Space. Some implementations place these dots in the top left of each Zzote-Link or source Zzote.

Some implementations provide a Zzote-Link Lister tool when a Zzote-Link Dot is tapped. The Zzote-Link Lister provides object-database abilities, enabling a user to view and jump to associated information in alternative ways. For example, the user may rapidly inspect and optionally 'jump' between other occurrences of the same 'source' where-ever they are located in Zzote-Space. Another example is that all of the local-only specific annotations (Zzote-Link annotations) to the same common information can be rapidly inspected and jumped to when needed.

Users can transfer and duplicate Zzotes across Zzote-Link barriers/boundaries. A Zzote-Link barrier is the edge between regions of Zzote-Space that are depicted as Zzote-Link portals. A user can transfer or duplicate existing Zzotes across Zzote-Link barriers. Users can also create new Zzote-Links across Zzote-Link barriers. In addition, Users can create new Zzotes within any Zzote-Link by traversing the Zzote-Link barriers as they decide where to position and size a new potential Zzote.

Figure 5:
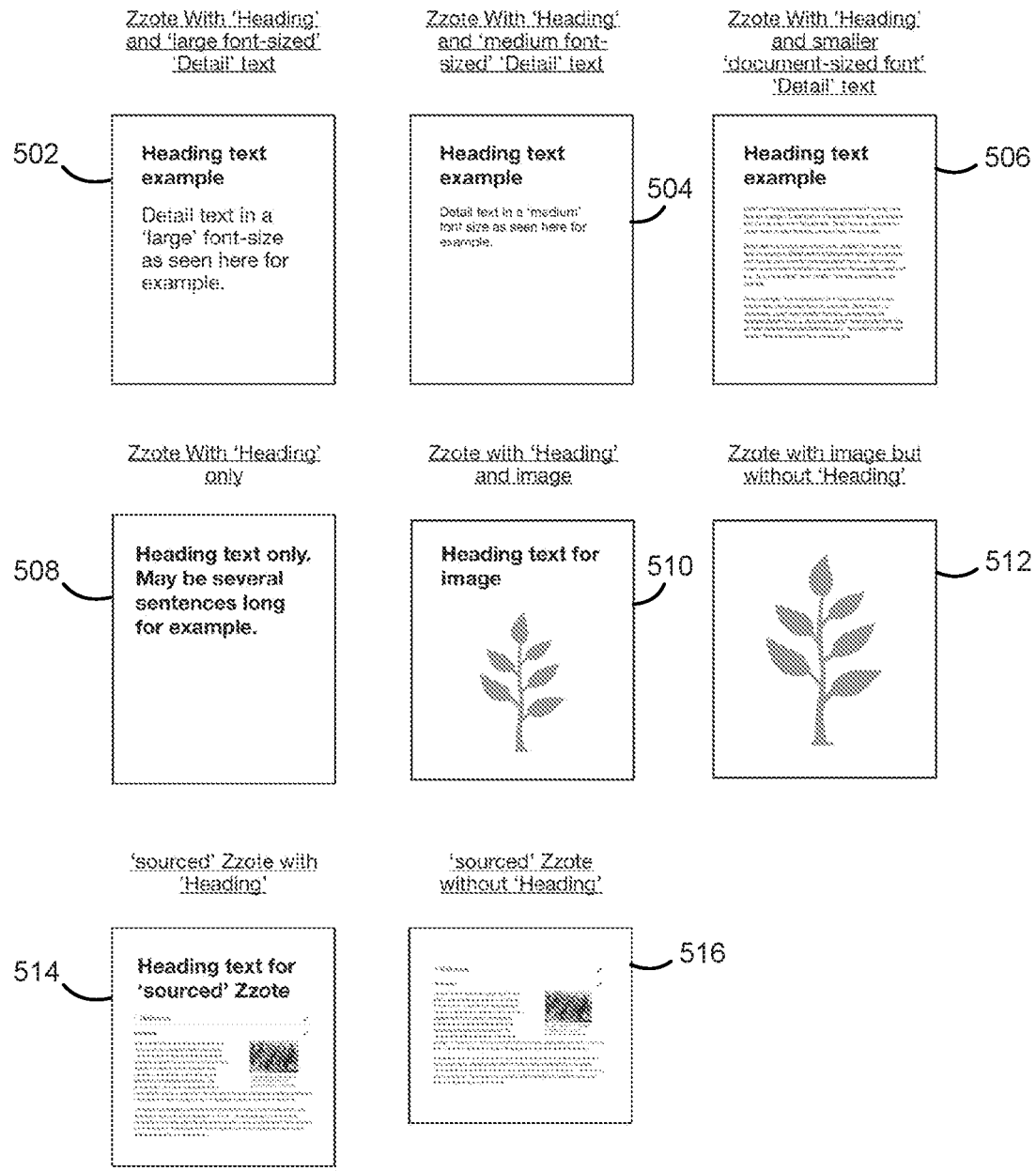
FIG. 5 provides some examples of single graphical information units in accordance with some implementations.

FIG. 5 provides examples 502-516 of Zzotes with different characteristics to display different types of information. Typical characteristics are heading, detail text, images and "sourced" information (such as an extract from a web page). Examples 502-506 illustrate that the detail information can be displayed at various font sizes, which may be user specified and/or determined by the amount of detail text. Zzotes 514 and 516 are "sourced" from external sources, such as web pages or documents stored on a network (local or remote). The components of these samples are optional. For example, some Zzotes may have no heading and/or no margin. In other implementations and as an option within various implementations, Zzotes contain totally free-form variable multi-formatted text and/or images in any combinations. In other implementations and as an option within various implementations, Zzotes contain other digital content such as 'windows' of other computer applications.

Figure 6:
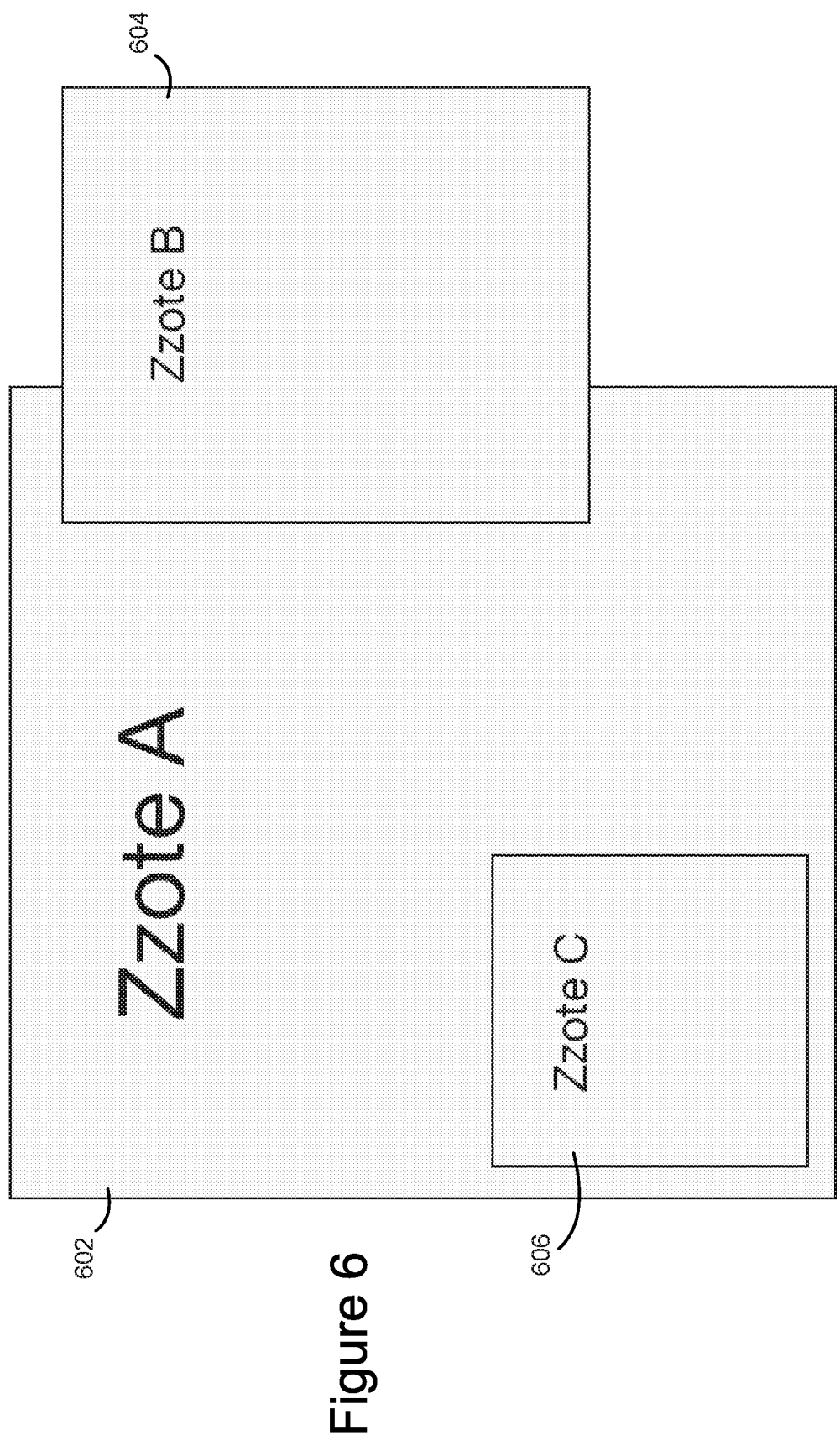
FIGS. 6 and 7 illustrate clustering and parent/child relationships between graphical information units according to some implementations.

Zzotes are automatically stacked on top of each other, with smaller Zzotes on top of larger Zzotes. This creates clusters of information. Zzotes can be positioned and/or sized anywhere in Zzote-Space. The spatial arrangement of Zzotes can be used to indicate the conceptual relationship between the Zzotes, as illustrated in FIG. 6. In this figure, the largest Zzote A 602 is the parent of the two child Zzotes (referred to as sub-Zzotes) Zzote B 604 and Zzote C 606, which are smaller. As illustrated in this figure, a child Zzote can be fully contained within the parent such as Zzote C 606 or just partially overlapping the parent such as Zzote B 604. Conceptually, the child Zzotes (sub-Zzotes) should provide further details about the parent.

In some implementations, these general principles encapsulate information by automatic raising and lowering internal shapes based on size, and can be summarized as:

Zzotes contain information. They are positioned and sized anywhere in Zzote-Space. Inferences about the relationships between Zzotes is inferred from their position and size relative to one another.

The next three rules below are applicable when the area of Zzote "B" intersects the area of Zzote "A" (i.e., they fully or partially overlap):

if the size of Zzote "B" is less than the size of Zzote "A," Zzote "A" is displayed below (behind) Zzote "B" on the computer graphic display. When the position/size is finalized (i.e., when this is intended to be the final location/size), then Zzote "B' behaves as though it "belongs" to Zzote "A." Hence, Zzote "A" is then a parent Zzote of its sub-Zzote Zzote "B" (which can be described as "a parentage determination rule");

if the size of Zzote "A" is less than the size of Zzote "B," Zzote "A" is displayed above (on top of) Zzote "B" on the computer graphic display. When the position/size is finalized (i.e., when this is intended to be the final location/size), then Zzote "A" behaves as though it "belongs" to Zzote "B." Hence, Zzote "B" is then a parent Zzote of its sub-Zzote Zzote "A" (which can be described as "a parentage determination rule"); and if the size of Zzote "A" is equal to the size of Zzote "B," then it is arbitrary which Zzote is the parent of the other (which can be described as "a parentage determination rule"). Some implementations take no action to avoid this outcome, but other implementations avoid this by ensuring that equality does not occur, and that the size of one of the Zzotes is altered by a very small amount (relative to its own size) so that the sizes are not identical.

In some implementation there are additional rules, which can be summarized as:

in information terms, a sub-Zzote is regarded as being a detail of the parent Zzote. (As any sub-Zzote can itself be a parent Zzote containing its own sub-Zzotes and so forth, all of a theoretically unlimited hierarchy of increasingly small descendants are also ultimately regarded as details of the original parent Zzote);

subsequent to the parentage determination, if a parent Zzote is moved and/or resized, all of its sub-Zzotes (and thus including all levels of descendants because they are in turn sub-Zzotes of the sub-Zzotes and so forth) are moved/resized with the parent while maintaining the same proportions relative to each other. The sub-Zzotes (including all levels of descendants) are effectively "attached" to the parent Zzote and their information content is effectively a detail of the parent's information content;

if Zzote B is a sub-Zzote of Zzote A, navigation of the contents of Zzote A will reveal an inner hierarchy containing Zzote B and any other such sub-Zzotes. (If sub-Zzotes such as Zzote B themselves have their own sub-Zzotes and onwards to further levels of descendants, then the hierarchy can be increasingly navigated through all such descendants of Zzote A);

if a parent Zzote is "linked to" by a Zzote-Link, then all of its sub-Zzotes are effectively "linked to" within it. That is, a Zzote-Link (in situ) "portal" which links to the parent Zzote will see all of the sub-Zzotes of the parent Zzote, the sub-Zzotes of those sub-Zzotes and so forth through the theoretically unlimited levels of increasingly small descendants. (In some implementations, a viewport is zoomed into as required to view/edit/add/delete to such levels of descendants within the Zzote-Link portal);

from the above rules it is possible for a given Zzote to have more than one parent Zzote in some implementations. (However, some alternative implementations prevent a Zzote from having more than one parent.) Indeed, (in multi-parent allowing implementations) many parents can all share the same Zzote as their sub-Zzote. In this case, navigating (hierarchically downward) from any of the parent Zzotes will indicate the same Zzote within its hierarchy. If any of the parent Zzotes is moved/resized, its sub-Zzotes (and their descendants) will move/resize with that parent Zzote. This may result in some of the sub-Zzotes (and/or further levels of descendants) no longer belonging to some of their former parent Zzotes depending on the specific movement and/or resizing that occurred. In addition, as a result of a move and/or resize, a given sub-Zzote (and/or further levels of descendant) may gain one or more new parent Zzotes. This results from the above rules that determine parentage;

any Zzote that is already a sub-Zzote of another Zzote of greater size than itself, can become a parent Zzote to other (overlapping) Zzotes of smaller size than itself in the same manner;

there is no theoretical limit to the allowed maximum or minimum size of a Zzote. Similarly, there is no theoretical limit to the maximum levels of the Zzote hierarchy (sub-Zzotes within sub-Zzotes and so forth). However, some implementations impose fixed limits on any of these aspects, while other implementations have very large maximums (and small minimums) or no limits; and there is no theoretical maximum or minimum level to the scale of a viewport within which a computing display can render the Zzote structures. Thereby in some implementations a Zzote of any given size may be viewed/edited by the user at an appropriate scale as required. However, some implementations impose fixed viewport scale limits, while other implementations have very large maximums (and small minimums) or no limits.

Some implementations have more specific variations to these general rules (the specific variations are used in the implementation described herein, but one or more are omitted in other implementations).

in some implementations, the "size" of a Zzote (as referred to in the above rules) is measured by the width of the Zzotes (this is used in the implementation described herein), but in other implementations, the size is measured as the area of the Zzotes, the height of the Zzotes, or an alternative attribute that measures size. How the "size" of a Zzote is measured in an implementation with regard to such relative size determination (e.g., by width of Zzote) is also referred to as the specific-size-metric;

in some implementations, Zzotes are allowed to have shapes that are not rectangular. However, if Zzotes are rectangular, then it follows from geometry that to check whether the area of a smaller Zzote intersects/overlaps the area of a larger Zzote, it is sufficient to check whether any of the smaller Zzote's vertices are within the area of the larger Zzote. (Those of ordinary skill in the art will be aware that although this is sufficient for most situations, this is an approximation and more geometrically rigorous techniques for testing for the intersection of two rectangles can be used instead); and suppose that a Zzote Y is initially determined from the above rules to have multiple parents based on position and size. If any of these initial determined parents is itself an ancestor (e.g., parent or grandparent) of any other of the initially determined parent of Zzote Y, then in some implementations they are not counted as also being a "parent" of Zzote Y. This prevents labelling an ancestor in multiple way, such as both a parent and a grandparent of Zzote Y (e.g., so labelled as a grandparent of Zzote Y only).

Some implementations have variations and/or omit one or more of all the above rules for general principles for encapsulating information by automatic raising and lowering internal shapes based on size.

Figure 7:
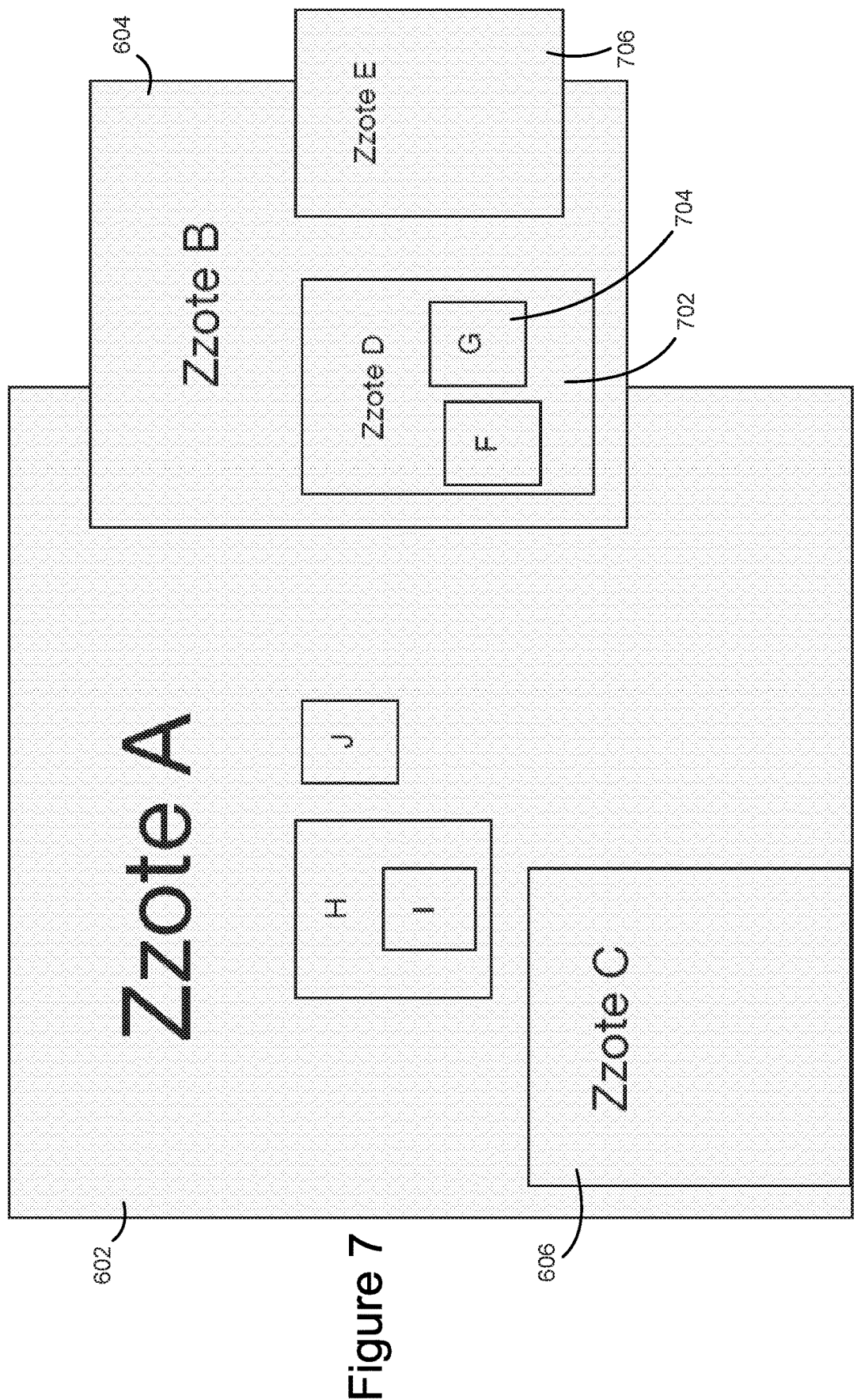

As an example, it can be seen how these rules apply to FIGS. 6 and 7. In FIG. 6, Zzote B 604 overlaps Zzote A 602 and is smaller than Zzote A 602. Therefore, Zzote B 604 is displayed above Zzote A 602 automatically. Zzote B 604 is regarded as 'belonging to' or being 'contained' by Zzote A 602. It is referred to as a sub-Zzote of Zzote A 602. Zzote A 602 is referred to as a parent of Zzote B 604. The information in Zzote B 604 is regarded as some form of detail of Zzote A 602.

Zzote C 606 has the same relationship to Zzote A 602 as Zzote B 604 does. Zzote B 604 and Zzote C 606 can be regarded as siblings.

Zzote A is a Zzote cluster consisting of itself, Zzote B, and Zzote C.

FIG. 7 expands the set of Zzotes from FIG. 6 to provide a slightly more complex example. In FIG. 7, Zzote B 604 now has smaller Zzotes (sub-Zzotes) of its own. Zzote B 604 has child Zzotes D 702 and E 706 only. It is more commonly phrased that Zzote D 702 and Zzote E 706 are the only sub-Zzotes of Zzote B 604.

Zzote D 702 has the sub-Zzotes Zzote F and Zzote G 704. And so on. As illustrated in this figure, Zzote B 604 is a sub-Zzote of Zzote A 602 and is a parent of Zzote D 702. Similarly, Zzote D 702 is a sub-Zzote of Zzote B 604 and is a parent of Zzote G 704.

Note that Zzote B 604, Zzote D 702, and Zzote G 704 are all descendants of Zzote A 602. Conversely, Zzote A 602 is an ancestor of Zzote B 604, Zzote D 702, and Zzote G 704.

Note also that Zzote E 706 is a descendant of Zzote A 602 even though Zzote A 602 and Zzote E 706 do not overlap at all. The lineage goes through Zzote B 604. This illustrates that the overlap requirement applies only within a direct parent/child relationship.

Because Zzote-Spaces can be arbitrarily large, a user may configure an entire computer-world as an all-encompassing personal Zzote-Space. A user can thus navigate all of the data on a computer using the personal Zzote-Space. In some cases, the Zzote-Space expands beyond a single user or single device. For example, a single Zzote-Space can include the data of multiple concurrent users across the Internet for example.

Zzote-Links ("link graphical information units" containing shared graphical information units) provide zoomable and editable in situ link portals to existing Zzotes (including all of an existing Zzote's sub-Zzotes and further descendants). Creation and use of Zzote-Links is illustrated below by the examples in FIGS. 42A-48. If the user wishes to re-use/reference existing content from another part of the Zzote-Space, disclosed implementations provide an alternative to moving or copying it. The user can create a link portal to an existing Zzote. In some implementations, a Zzote-Link represents its source in situ at the new location, surrounded by an outer Zzote-Link frame (sometimes referred to as a Zzote-Link border) and placed within the narrow margin of a Zzote-Link background. In terms of inner content, however, it is identical to the original source Zzote (and all of the source Zzote's descendants if applicable). The user can then zoom into this region and modify and add to it in a manner identical to working within the source region.

The user can treat these Zzote-links as if the content were actually located in the new contextual location of the Zzote-Link in addition to the original source location (which is the actual source of the content).

A user can zoom into Zzote-Links as much as desired and place further Zzotes and other Zzote-Links within them without limit. It appears to the user as though Zzote-Space now extends (through zooming-in as many other things do in Zzote-Space) directly into this linked region. Each Zzote-Link behaves as a portal into a completely different region of Zzote-Space. This is a unique new way of representing connections between information. In some implementations, the only visible way to recognize being inside of a Zzote-Link (or multiple Zzote-Links) is by seeing the distinctive Zzote-Link frame and Zzote-Link background, which appear around the outside of each Zzote-Link.

In some instances, a user may zoom so far into a Zzote-Link that the Zzote-Link Frame and the Zzote-Link background cannot be seen. This is not regarded as a problem because a user can navigate, move Zzotes, resize Zzotes, edit Zzotes, and add new sub-Zzotes regardless of whether the current location is inside a Zzote link or not. Users need not worry about whether they are within a Zzote-Link (or nested levels of Zzote-Links) or not.

Some implementations include a "Path bar," which provides the user with a precise "Zzote-Link aware" description of a user's location within any number of nested Zzote-Links.

Some implementations of Zzote-Links (shared graphical information units) overcome the disadvantage of traditional links, such as web-page links, which transport the user in a discordant way to a completely different area as soon as a link is selected (e.g., tapped). With conventional links, all sense of the original subject where the link was located is lost.

The creation of Zzote-Links is described in more detail below. Additionally, FIGS. 46A-48 illustrate how some implementations feature local-only annotations (sometimes referred as Zzote-Link Annotations) to specific instances of Zzote-Links (that contain common shared graphical information units). FIGS. 47A-47C also illustrate that some implementations feature a tool (sometimes referred to as a Zzote-Link lister) to navigate and preview differing contexts and local-only annotations across specific instances of Zzote-Links to common shared graphical information units.

As noted above, in some implementations Zzote-Links can contain other Zzote-Links within them, without (theoretical) limit.

In some cases a user inadvertently or intentionally creates a series of two or more Zzote-Links that is circular, creating what is theoretically an infinite loop. Some implementations address this situation using only a small finite amount of time and resources. The user can keep zooming in as much as desired and perform edits. The ability to keep zooming within this region of Zzote-Space without limit is not problematic because the visual rendering stops when further nested Zzotes would no longer be visible on the display. Some implementations ultimately impose a finite limit to how far the user can zoom in manually, but the visual representation of the Zzote-Links at any scale is always completed in a finite small time.

Infinite rendering is avoided within links because the links are displayed on-the-fly as the viewport needs to render it. The graphical viewing engine only resolves its display down to a certain size (e.g., a single pixel or a small enough region on the display at the current zoom level such that a human viewer would not notice if any aspect of the small detail was missing) and does not needlessly continue rendering past that point.

Therefore, even if a Zzote cluster would create an infinite number of recursions for a given view, the rendering engine only performs a finite number of drawings down to the smallest scale that can be reasonably seen and then stops.

As noted above, it is possible to edit, delete, and add to Zzotes within a Zzote-Link portal, including nested Zzote-Links. When a user reaches through a portal to manipulate objects or add to them, the user interface infers the intent. In some implementations, the user interface works out how the source object (not the representation in the Zzote-Link) needs to be altered in order for the representation in the Zzote-Link to be altered according to the user interaction through the portal.

For example, if the user "moves" an object by a distance x in the representation in a Zzote-Link, which is in a representation in another Zzote-Link, which is in a representation in yet another Zzote-Link within the viewport, some implementations compute the amount by which the user's current view of the object is scaled compared to the true scale of the object at its source. The user interface multiplies the user's movement by a ratio that takes that into account. The end result for the user is that it appears exactly as if the user had modified the representation in the Zzote-Link in the representation in the other Zzote-Link in the representation of the "yet another" Zzote-Link of the objects as they would expect.

However, it is important to note that the only objects actually being manipulated, edited, and added-to exist in real Zzote-Space. The representation in the Zzote-Link is only a visual rendering that does not exist separately from the source. "Existence" in this context means having its own entry in the internal database of Zzotes. A Zzote-Link itself is at its foundation a form of conventional Zzote which in some implementations has an entry in a standard database of Zzotes (as described in more detail below). This "standard Zzote" basis of a Zzote-Link has parameters such as position, width, and height in Zzote-Space. A standard Zzote's parameter for background color is in this case typically rendered as the color of the Zzote-Link frame/border (described below). Importantly, in some implementations, a Zzote-Link points to a single linked-to source Zzote.

When some implementations render a Zzote-Link, the main inner rectangle of the Zzote-Link (otherwise described as the "Zzote-Link background" containing the "source" contents) is a rendered depiction of the (single linked-to) source Zzote and its descendants. As described below, in some implementations, it is ensured that the entire scope of the (single linked-to) source Zzote and its descendants are rendered to fit within the main inner rectangle (Zzote-Link background) of the Zzote-Link without overlapping outside of it (sometimes referred to as "Descendant aware positioning of the source"). Subsequently, in some implementations, the main inner rectangle ("Zzote-Link background)) of the Zzote-Link appears as an outer 'buffer zone" to the "source"-which is rendered to fit within. (The "Zzote-Link background" is described and illustrated below.) In summary then, when the drawing engine of some implementations comes to render the main inner rectangle of a Zzote-Link, the engine draws within the "Zzote-Link background" a scaled representation of the Zzote-Link's (single linked-to) source Zzote and the source Zzote's descendants. This is a potentially recursive routine without (theoretical) limit as the source may itself contain further (possibly nested) Zzote-Links and so-on. In some implementations, the drawing engine will always stop rendering once the onscreen representations became too small, hence the routine will come to an end in a finite time.

As noted above, a user can transfer existing Zzotes (and new potential Zzotes) across Zzote-Link barriers. Indeed, the term "barrier" is somewhat of a misnomer, because the "barrier" does not prevent anything from crossing it.

A consequence of some implementations of the present disclosure is that the theoretically unlimited representation of complex connections and associations is now physically viewable and understandable. Massively complicated interconnections can now be spatially comprehended by humans. The physical view could not exist other than in a typically massively zooming representation on a graphical computing device.

Creating New Clusters of Graphical Information Units

A first example illustrates creating Zzotes that contain only text. The basic principles covered apply to all other types of Zzote, including Zzotes that contain images, web pages and other sourced information, and various document types.

Figure 8:
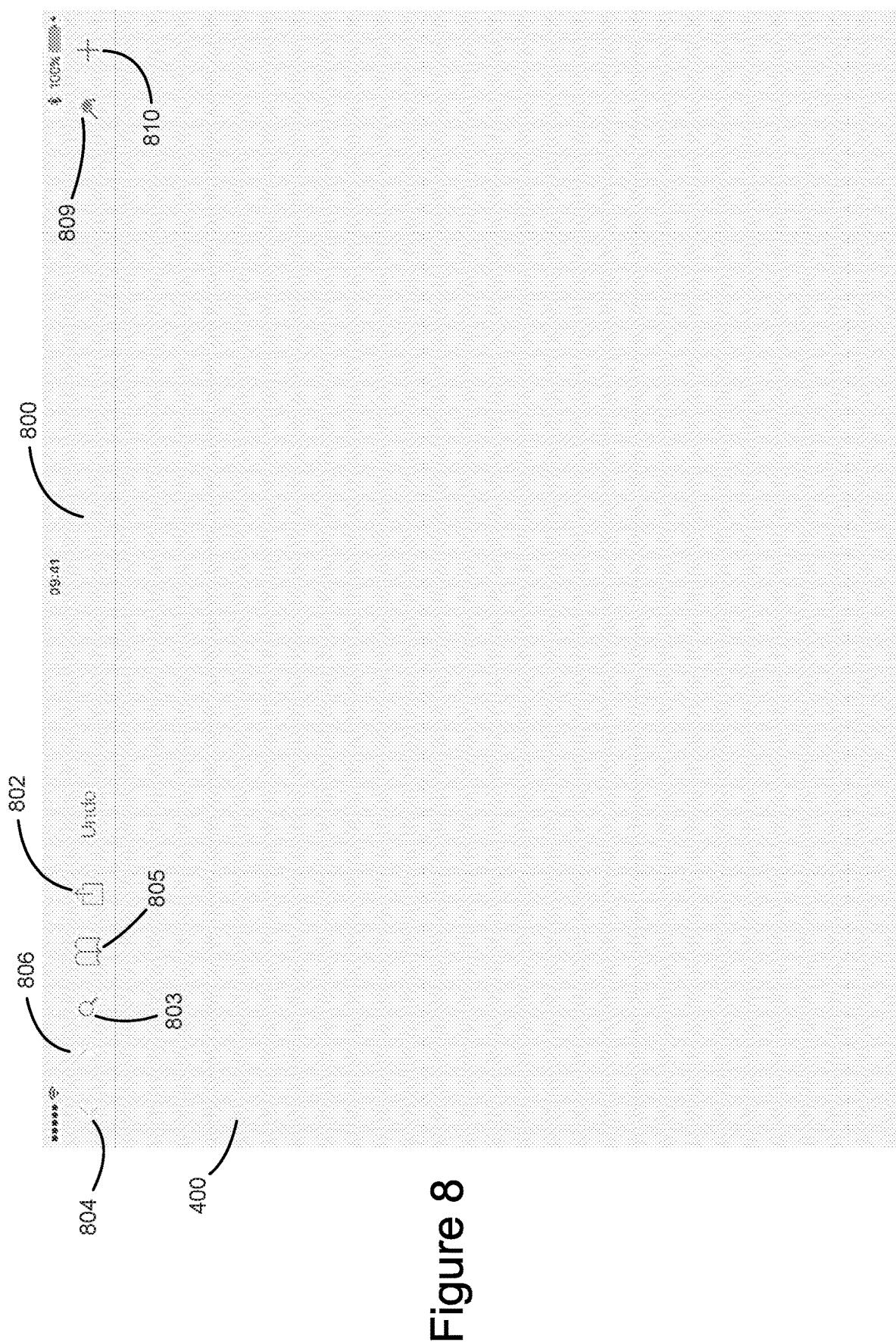
FIG. 8 shows a blank canvas and associated tools for viewing, navigating, and placing of graphical information units according to some implementations.

At the outset the user interface displays an empty canvas 400 and a main toolbar 800, as illustrated in FIG. 8. The main toolbar 800 is at the top of the screen in FIG. 8. (In the illustrated implementation, the main toolbar 800 is not the "Add bar" or "Visual Cluster Clipboard" which are also sometimes described as different toolbars with specific additional functions.) The toolbar 800 contains a number of buttons or icons. The main toolbar provides the user with a consistent means to control the user interface, as it is present throughout almost all use. Many aspects of the main toolbar and other user interface details can vary between implementations. The main toolbar is one means of accessing some of the useful features provided by the user interface, but alternative user interface methods can be used. The main (currently blank) region 400 beneath the toolbar is the viewport (which can be alternatively described as a form of "canvas").

A principle function of the user interface is to enable the user to navigate the theoretically infinite/typically very large space that the user perceives is contained within the viewport. The space is referred to as Zzote-Space. All of the information is represented as Zzotes within this Zzote-Space. In some implementations, the Zzote-Space is theoretically infinite in both size and the ability to zoom. Because of this, there is typically no conceptual minimum or maximum level of scale either for viewing or editing. (Although some such implementations may ultimately have min/max limits.)

A user can manually manipulate the position and zoom-level of the viewport. These values control how the Zzote-Space is mapped onto the real computer display that the user is viewing and interacting with. This enables a user to view the contained information (Zzotes) at various locations and zoom-levels.

In FIG. 8, the portion of Zzote-Space in the viewport is empty. However, other regions of the Zzote-Space may in fact contain Zzotes. The viewport may simply not see them at its current position and zoom-level. For example, another portion of Zzote-Space may have a collection of Zzotes, such as those illustrated in FIG. 4.

The position and zoom-level viewport variables determine the mapping back and forth between actual positions on the computer display and locations and sizes in the Zzote-Space. Computing offsets from the viewport position variable and computing a ratio from the viewport zoom-level enable translating positions of Zzotes in a database of positions and sizes in the Zzote-Space internal scale to that of the actual computer display.

The Zzote-Space internal scale is ultimately arbitrary because it will be multiplied by a ratio from the viewport zoom-level to make it viewable.

Likewise, an inverse translation function translates the location of any user interaction (e.g., the location of fingers within the actual screen of a device when the implementation is on a touch-screen device) back into the Zzote-Space internal scale when required.

Any added or repositioned Zzotes are translated from their apparent position and size on the physical display into the Zzote-Space internal scale by the same function. Only Zzote-Space internal scale coordinates and sizes are written to the internal database of Zzotes.

Zzote-Links complicate these viewport translation formulas. The user interface often infers whether a specific region on-screen (such as the location of a user's finger if the implementation is on a touch-screen device) is within any Zzote-Links (including recursively), and in many cases needs to map back to the real source locations using a recursive scaling function.

When Zzotes are displayed in the viewport, they can be selected. In some implementations, at any one time, a viewport can have a single Zzote selected (or none at all). When a Zzote is selected, there is a visible indication to the user of the selection. Typically, a selected Zzote has a distinctive ring around it as shown later. In some implementations, when Zzotes or Zzote clusters are moved/resized, it involves a different form of being "selected," which is sometimes referred to as Zzotes being "Picked Up." The action of Zzotes being "Picked Up" is hence also a form of graphical information units being selected according to user input. In some implementations, when Zzotes are "Picked Up," this may be indicated by an increased shadow around specific Zzotes. In some implementations there can be more than one Zzote "Picked up" (e.g., multiple graphical information units being "selected") at the same time.

A user typically selects a Zzote by tapping on it. Zzotes can be selected in other ways as well, such as a jump from a list. In addition, in some implementations, when a Zzote is created or just moved, it will be selected by default. The selected Zzote determines other available functionality, such as what is presented in the main toolbar.

FIG. 8 illustrates some of the features provided by the user interface in some implementations.

The functions of buttons or icons in the main toolbar are contextually varied depending on which Zzote (or none) is selected. For example, if the user presses the "share" button 802 in the main toolbar 800, the action is taken on the selected Zzote (and its cluster). Actions taken when no Zzote is selected depends on the implementation and the specific function. In some variations of implementations, if nothing is selected and the user chooses the share button 802, everything is shared.

Some implementation that display a Path bar use the selected Zzote as the basis for the information shown. Some implementations have a viewport recorder, which logs each user interaction. In these implementations, selecting a Zzote causes a new "state" to be recorded by the viewport recorder.

Some implementations support a special function for two-finger taps. This special function selects the tapped Zzote and adjusts the viewport for clear visibility of the selected Zzote. The adjustments to the viewport automatically scale and position the viewport so that the Zzote can be clearly seen. This is based on a viewport resizing formula, as described herein. (This is generally so that the text is readable, but it is also designed to present images and sourced material (e.g., content from web pages) at an appropriate scale. The formula also takes into account whether the Zzote has sub-Zzotes.) If the user has just carried out a two finger tap to zoom-in a specific Zzote (and has not subsequently adjusted the viewport), in some implementations a second two finger tap to the same Zzote will cause the viewport to restore its position and scale to what it was before the first two finger tap.

Zzote-Space is typically a massively scaling environment. Because of this, the apparent on-screen size of Zzotes can vary greatly based on how the viewport is scaled at that time.

Any Zzote can have sub-Zzotes, those sub-Zzotes can have sub-Zzotes, and so forth. Each level of sub-Zzote is smaller than its parent. Therefore, a great-grandfather Zzote may appear very large when viewed together with a sub-sub-sub-Zzote. Often all that can be seen of this great-grandfather Zzote is part of its background when a sub-sub-sub Zzote of it is viewed at, for example, ¼ the width of the viewport.

Selecting an object is typically achieved by tapping it. If the Zzote has an on-screen size that is comparable to the viewport size (e.g., 5% and 80% of the viewport), selecting in this way makes sense. However, if the user taps the background of a very large great-great-great-grandfather Zzote, it does not typically make sense for the user to see this as selecting a Zzote. In fact the user may consider that Zzote to be the background of the display in the viewport. The fact that it is really part of a very large Zzote providing some context to the view (such as its color, identifying aspects of very large text, or part of an image), is not the immediate focus of the user.

Also, under those circumstances there may be no empty background to tap if the user wanted to unselect everything. Therefore, from a selecting point of view, if the user taps such a viewed very large Zzote, some implementations do not actually select the tapped Zzote. Instead, the user interface acts as though the user has un-selected everything.

This implementations has several advantages, including prevention of selecting objects that are too large based on the current scale. This gives the user greater control of interactions within a massively (or theoretically infinitely) zoomable space.

Similarly, some implementations do not select a Zzote when it appears so small (at the current scale) in the viewport that it cannot be clearly seen. In this case, a parent (or other ancestor) whose size is above a certain threshold may be selected instead.

Preventing selection of objects that are too small at the current scale is another novel feature of some implementations. This too gives the user greater control of interactions within a massively (or theoretically infinitely) zoomable space.

The precise point and criteria by which implementations cut off selections for objects that are too large or too small varies. For example, some implementations determine cut-off for objects that are too large taking into account how many vertices of a Zzote can actually be seen in the viewport. In some implementations, as long as one or more vertices of a (viewed large) Zzote can be seen in the viewport, it may be allowed to be selected regardless of its viewed size.

Other implementations do not have cut-offs for objects that are either too small or too large. In some implementations, size considerations on when a Zzote can be selected may also apply to whether typing mode can be started.

In some implementations double-tapping a very-large viewed Zzote may cause that Zzote to be displayed at a reasonable size but not in a typing-mode as might otherwise be expected.

In other implementations, double-tapping a Zzote may start typing mode regardless of size. The rules for allowing typing mode within an implementation may vary from any implemented rule for allowing selection (as above) or may be the same.

These rules help users. In some instances, the user may not want to start typing into a Zzote whose scale had been either too big or too small, preferring instead just to see what it is.

The main toolbar 800 contains multiple icon buttons. These buttons enable the user to perform actions. In some cases, some buttons appear, disappear, become visibly active, or become visibly inactive based on context. In some cases, buttons will invert to indicate that the toolbar has entered a specific mode based on that button. In some cases, buttons cause other screens, partial screen overlays, or windows to appear.

A user can use the Navigate Back button 804 and the Navigate Forward button 806 to retrace previously selected Zzotes and retrace previous viewport positions and zoom-levels. In some instances, there is no selected Zzote at the viewport position and scale jumped to using the back button 804 or forward button 806.

These buttons are somewhat analogous to the Back and Forward buttons in web browsers. However, because spatial information is included (in addition to any selected objects), the benefits are greater. For example, the exact position and zoom-level of the viewport at the time of viewing the previous item is also reproduced when going Back or Forwards.

"State" refers to the viewport configuration as it was at a previous time or at the present. This configuration information includes the viewport location and zoom-level in Zzote-Space, and also includes the selected Zzote (or none).

Where possible, the viewport animates the movement between states, simulating travel between the positions and scales in Zzote-Space where the viewport was at the different time. If the jump is too great to be visually useful to the user, the viewport position may simply jump instantly. Where animated travel between states occurs, it provides a real cognitive benefit, including a comforting sense of a smooth understandable change of context. The animation helps to enforce the relationship between states to the user.

In contrast with the disclosed techniques, conventional navigation between (for example web pages in a web browser) provides no such smooth change of context in a comprehensible information spatial sense.

Some implementations utilize a viewport recorder, and the data captured by the viewport recorder are used by the Back button 804 and the Forward button 806. The list of states along which the Back and Forward buttons travel is determined by the states that are captured by the viewport recorder. In some implementations, the viewport recorder used by the Back and Forward buttons always contains the information for a viewport's scale and position. Some implementations record the selected Zzote as well (or none if nothing is selected). When the recording does specify the selected Zzote, jumping to that state will cause the recorded selected Zzote to be selected. When the recording specifies that no Zzote was selected, then jumping to that state deselects all Zzotes within the viewport.

In some implementations, the viewport recorder always records a new viewport state whenever a new Zzote is selected (e.g., as indicated by a distinctive outline/ring). Whenever a user is typing into a Zzote, it is inherently selected, even if the selected distinctive ring does not appear, so a state will always be recorded at this point.

In some instances, the viewport recorder does not necessarily record a state when the user simply moves the viewport manually for zooming or panning. In addition, use of the Back or Forward buttons themselves does not record a new state.

A user may use other features to jump to another region of Zzote-Space. These features include use of: i) Search/Contents list button 803; (ii) Bookmarks/Recent list button 805; and (iii) a Zzote-Link lister tool (one implementation of such a tool is illustrated in FIGS. 47A-47C below). In these cases, the viewport recorder always records a state for the viewport position and any selected Zzote at the moment just before the jump, and a new state for the reached destination, which normally includes a new selected Zzote.

Some implementations provide a Wrap-around Split-Screen, which effectively exists at all times regardless of whether the screen is currently displaying a Split-screen or not. Each of the two viewports maintains its own independent viewport recorder alongside its independent viewport. The viewport recorder for each of the viewports is retained even when the viewport is removed by the user, making it available again in the future if the user restores the Split. This can be useful so that what is available does not depend on which side of a viewport is displaying an object. This is based on the novel concept of a "Wrap-around split screen," which maintains two independent viewports that can appear on alternating actual sides of the display when the Split-screen is active. It also enables either viewport to become full-screen at any time. This is described in more detail herein. Similar aspects apply in implementations that use a more conventional Split-screen display.

The viewport recorder can be thought of as a list to track the above information. In some instances, the viewport recorder amends the previous entry, instead of saving a new state, when the new state is deemed sufficiently similar to the previous entry. This avoids requiring the user to press the Back button 804 many times without much change occurring.

The ability to quickly move Back and Forward provides the user with the confidence to easily get back to a previous visual state for the viewport. The visual state includes the location, zoom level in Zzote-Space, and what Zzote was selected (if any). This encourages user investigation and analysis of new information.

The Search/Content list button 803 has the dual function of both Search and Contents list, and adapts to the current context. When the Search/Content list function displays a list, the user can drag out Zzotes from the list with novel one-finger or two-finger gestures. Some implementations provide the "unpinch to preview" feature for these and other lists presented within the associated user interface of an implementation. In some implementations, "sizing acceleration" (as described below and sometimes referred to as a multiplicative "magnification" factor) helps to make the "unpinch to preview" feature particular convenient for the user to reversibly see a temporarily large preview with minimal finger movement. In some implementations, the presentation of each list-item within the lists can be largely or only text (e.g., abbreviated heading and an excerpt of detail text). Alternatively/complementarily, the list-item can include a 'thumbnail' representation of the Zzote (including its cluster within the thumbnail depending on viewing options) of any list-item. The user may be able to alter the viewing format of list-items from the UI.

In some implementations, features of this and other user-interface lists also commonly allow the user to select a "list item" in-order to select a different Zzote in the active viewport. In some implementations, this causes the viewport to adjust its position and scale as required (often with a smooth 'travelling' animation if appropriate) in order to best view the newly selected Zzote (typically via the "viewport adjustment algorithm" described below). In some cases, such list-item selection allows the user to rapidly "jump" to a completely different portion of Zzote-Space (and/or at a vastly different scale to the existing view) where the selected Zzote resides.

The Bookmarks icon 805 calls up the list of Bookmarks created by the user or recent edits by the user. Bookmarks identify Zzotes that a user wishes to jump to quickly at any time. A user can drag out Zzotes from the list with one-finger or two-finger gestures. Some implementations also provide the "unpinch to preview" feature for bookmarks.

In some implementations, the Bookmarks list also includes a "Recents" option. Some implementations provide a toggle control, which allows the user to switch between the bookmark list and the list of recent edits. In some implementations, the toggle control is at the bottom right of the Bookmark list window. The "Recents list" is a complete history of last edited Zzotes in order by date and time, with the most recently edited Zzote at the top of the list. The behavior of the Recents list (including the ability to unpinch to preview and drag from) is effectively the same as the Bookmarks list.

In some implementations, the main differences between the Bookmark list and the Recent list are: (i) the Recent list cannot be edited (they cannot be deleted and they are displayed in order by date and time); and (ii) the Recent list has an additional visible time stamp, which shows the last date (and time in some implementations) when the Zzote was edited.

The Share button 802 allows a user to export individual "selected" Zzote clusters or other areas of Zzote-Space. Implementations share information in various formats and utilize various functionality. Some implementations export in various ways such as data files and other means of sharing data. For example, in some implementations data can be sent via email, or electronically "shared" via other means. Some implementations feature live "cloud" sharing options which may include built-in security permissions. Some implementations include multi-user concurrent access to the same Zzote-Spaces via the Internet. Some implementations feature live concurrent updating of a common server-based (such as over the Internet) database. Some implementations utilize the creation of exportable and importable file formats, and the use of multi-user Internet based databases. These implementations use techniques of exporting/importing and database sharing as is known in the art.

Some implementations enable exporting to conventional structured document formats. For example, Zzote clusters can be depicted as word processing type documents with multiple levels of document headings. These exports can be created so that the highest document heading level corresponds to the highest level of ancestor in a Zzote cluster. Other such document formats can use numbering notations not limited by the number of different font-styles available for document heading levels.

For example, a Zzote-Space with information about musical instruments could be exported to a word-processing document, as illustrated in FIG. 9. In some implementations, this is generated by first selecting a Musical Instruments Zzote, the 'cluster' of itself and its descendants 'contains' the information shown in FIG. 9. Then the user presses the Share icon followed by an option to select the document type and/or method of sharing.

In many cases, however, useful information and comprehensibility is lost in a conversion from Zzote-Space to a conventional text document. In most situations, a conventional document format is not able to adequately depict Zzote-Space. For example, the loss of a spatial sense is often a great loss to a person's perception of the data. In addition, the inability to zoom into detailed aspects of a subject risks having a text document that is overwhelmed by details. In some implementations, Zzote-Space utilizes zooming to avoid these problems.

The depiction of Zzote-Links is in some ways possible in an exported text document. Some implementations depict Zzote-Linked items with a "*" (plus source information) to indicate that the content comes from elsewhere. However, this is also not as satisfactory as the Zzote-Space depiction of such situations, which can be many orders of magnitude more complex while still remaining comprehensible.

Even though text exports from Zzote-Space are limited compared to an actual Zzote-Space viewer, they can be of use in some circumstances.

Referring again to FIG. 8, the Formatting/Paintbrush button 809 places the main toolbar into a mode for formatting and changing colors. It enables the user to change the color of selected Zzotes very quickly.

In order to populate Zzote-Space with Zzotes, the user must create new Zzotes, import Zzotes, or link to existing Zzotes. The essential spatial information required for a Zzote is its position and size (e.g., width and height).

Implementations typically store a basic data list of Zzote attributes, though the precise number of attributes and their attribute-types/usage vary by implementation. How the data is represented in computer memory for rapid access can use optimized data-handling techniques as is known in the art. Some implementations store these Zzote attributes: (i) a unique identifying Key (e.g., "Zzote-ID"); (ii) position; (iii) size; (iv) heading text; (v) detail text; (vi) detail text font size; (vii) background color; (viii) created date (ix) last edited date; (x) reference to source URL when applicable; (xi) reference to source image file when applicable. In some implementations, for Zzotes that are Zzote-Links, a Zzote-Link is a real Zzote stored in the database with its own position and size, and additionally a Zzote-Link points to a single "source" linked-to Zzote. (In some implementations, a Zzote-Link visually represents within its inner content both the single "source" linked-to Zzote, and the descendants of the single "source" linked-to Zzote which thereby comprising a cluster as described herein.)

This information may be complemented in some implementations with an associated stored list of connections between Zzotes. These connections may describe the multi-parent to multi-sub-Zzote connections. In some implementations, these connections may be deduced and updated whenever the spatial arrangement of Zzotes changes. In some implementations, the supplemental associated list of connections includes parent/child ID pairs, such as (parent Zzote-ID, sub-Zzote Zzote-ID). These connections can be used by some implementations for navigating and listing the contents of clusters, navigating structures, and so on. Across all the stored Zzote attributes and any stored supplemental information, some implementations include different and/or additional fields, may not include any number of the fields described above, and may use alternative data structures. Some implementations implicitly allow for a multi-parent architecture for any given sub-Zzote. However, alternative implementations enforce a one-parent-per-sub-Zzote architecture.

In some implementations, a list of bookmarks refers to the Zzote-ID fields in a related table of data.

Some implementations represent the data stored (e.g., identifying position, width, and height) for each Zzote in various forms of numeric systems. One such numeric system is an absolute coordinate system. Other implementations represent position, width, and height in alternative numeric systems. In some other alternative implementations that use alternative numeric systems, the position, width, and height parameters for a Zzote are stored relative to the Zzote's parent-Zzote. In this case, the scaling of these numbers does not get increasingly small for increased levels of sub-Zzote. In this case, when calculating the effective scale of a given Zzote, the user interface traverses the graph of Zzotes from top of hierarchy-downwards to gather the information required to display any given viewport at a given scale.

Figure 10:
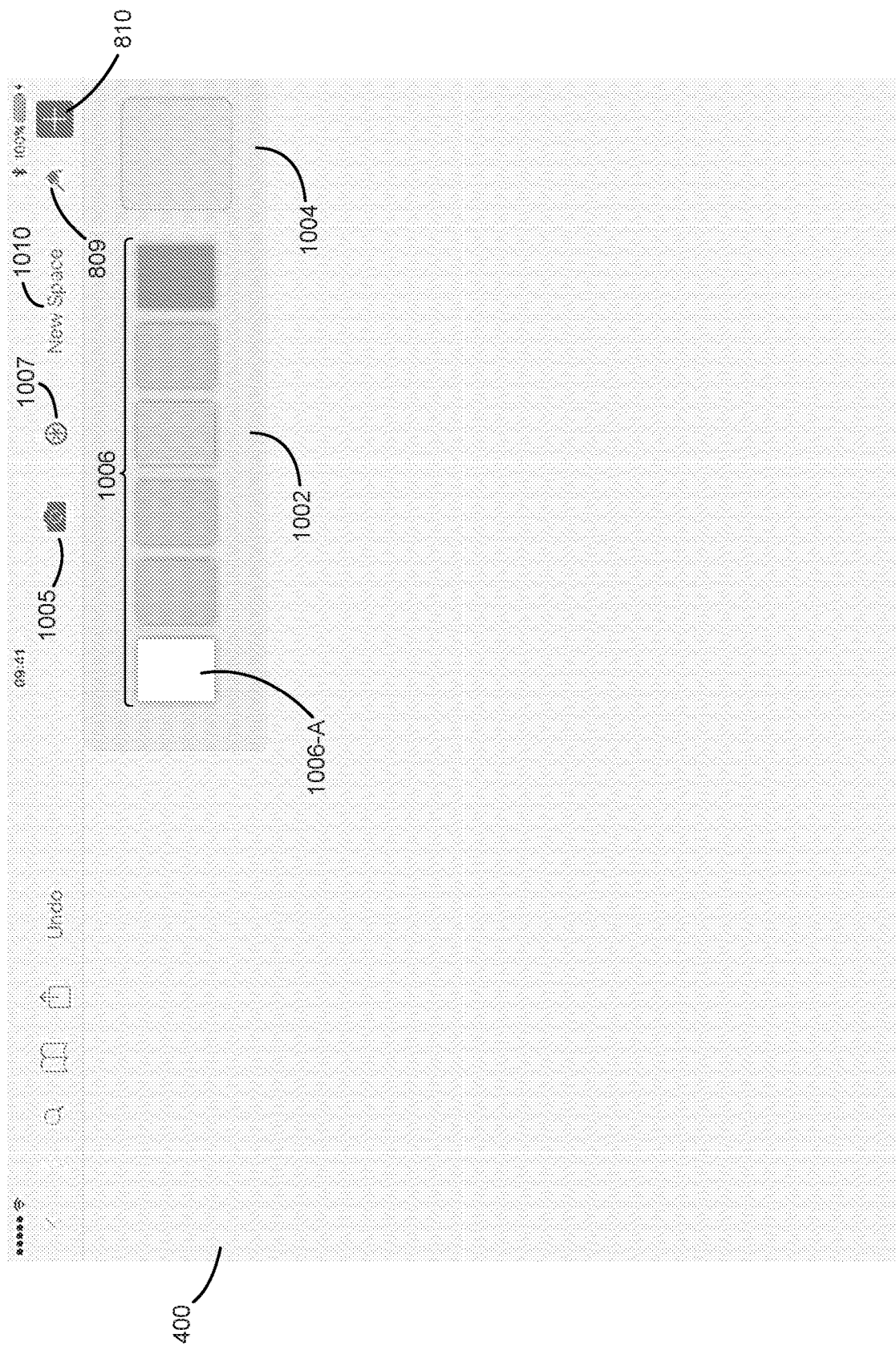
FIGS. 10-25 illustrate using a graphical user interface to insert and modify a graphical information unit in accordance with some implementations.

Users can add Zzotes to the canvas using the Add Bar 1002 (FIG. 10), which is displayed in response to pressing the Add button 810 in the toolbar (such as seen in FIG. 8). The result of pressing this Add button is illustrated in FIG. 10. In FIG. 10, the main toolbar has entered into "Add mode," which is indicated by the "+" icon 810 being inverted in the toolbar. (If the user presses the "+" icon 810 again, the main toolbar exits from Add mode. If the user presses the Formatting/Paintbrush icon 809 next to the "+" icon 810 while in Add mode, the display exits Add mode and enters into the Formatting/color changing mode.)

In some implementations, there are three overall modes: (i) Add mode; (ii) Formatting/color changing mode; and (iii) neither Add nor Formatting.

A feature of Add mode is the appearance of the Add bar 1002. In some implementations, the Visual Cluster Clipboard 1004 also appears. In some implementations, the Visual Cluster Clipboard 1004 is part of the Add bar 1002. Additionally, some relevant new buttons and/or icons appear on the main toolbar.

In some implementations, the Add bar 1002 (which is sometimes also described as a "toolbar") is displayed as a rectangular region below the main toolbar, and contains multiple Zzote pads 1006 (sometimes referred to as "graphical information unit pads") of different colors. In this implementation, the Add bar 1002 extends from just before the horizontal center of the canvas to the right edge (including the Visual Cluster Clipboard 1004). In some implementations, the height of the Add bar is approximately 2.5 times that of the main toolbar.

The Add bar 1002 provides multiple Zzote pads 1006, each of which is a source of potential Zzotes having a specified color. In some implementations, the Add bar 1002 also includes the Visual Cluster Clipboard 1004 (sometimes referred to as a toolbar containing one or more "cluster icons"). The clipboard 1004 is used both as a drop location for placing existing Zzote clusters as well as a source for making copies of those Zzote clusters or creating links to clusters.

In some implementations, the background of the Add bar 1002 is a grey fairly transparent layer. If a user initiates a gesture (e.g., beginning a drag gesture) within the Add Bar area, it is not interpreted as a gesture on the main canvas. Instead, any user touches detected on this area is interpreted as initiating the use of a potential Zzote (either from a Zzote pad 1006 or from the Visual Cluster Clipboard 1004).

Implementations provide a variety of colored Zzote pads, and creating a potential Zzote from one of the Zzote pads 1006 creates a potential Zzote that is the same color as the corresponding Zzote pad. In some implementations, there are 6 rectangular Zzote pads 1006 within the Add Bar 1002. In some implementations, their colors are (from left to right) White (1006-A), Blue, Green, Yellow, Orange, and Red.

The primary use of the Add bar 1002 is for the user to drag potential Zzotes onto the canvas at a position/size selected by the user. The user can start a drag operation with one or two fingers. If the user intends to start a drag operation with two fingers on the background of the Add bar 1002, a center point of the finger presses is used to determine the appropriate Zzote pad 1006 from which to initiate a potential Zzote. Therefore, in some cases, neither finger may actually be initially touching the chosen Zzote pad.

The Visual Cluster Clipboard 1004 includes a special "Drag to Zone." In some implementations this "Drag To Zone" is denoted by the large inner rounded-cornered rectangle within the region 1004. Existing Zzotes (typically clusters) can be dragged to this zone, which then prompts the user to specify whether to "Cut," "Copy," or "Create Zzote-Link." This action is equivalent to the alternative method of selecting "Cut," "Copy," or "Create Zzote-Link" for a selected Zzote from a contextual menu.

When the Visual Cluster Clipboard contains one or more items (Zzote clusters), a drop down thumbnail source draglist appears as described later. In some alternative implementations, the "Drag to Zone" on the Visual Cluster Clipboard 1004 includes a number to indicate how many items the clipboard contains. In some implementations, the Visual Cluster Clipboard acts as an "In Box" for items (including "shares" such as a newly "shared" Zzote-Link) received from external sources such as other users.

As shown in FIG. 10, three new buttons appear on the main toolbar when in Add mode, including a Photos/Camera button 1005. This button launches a new window for navigating to existing images, capturing new images from a source such as a camera, and cropping areas of an image to place on the canvas as a new Zzote. In some implementations, the Photos/Camera button 1005 appears only in Add mode because it relates primarily to selecting new items to add into Zzote-Space. In other implementations, this button appears at all times.

In Add mode there is also a button 1007 to locate External sources, which launches as an internal web browser to browse the Internet in some implementations. The internal web browser can also access local, networked, or Internet-sourced files. Using the External sources interface, a user can select and crop sourced material form the Internet to place on the canvas as a new Zzote.

Like Photos, some implementations display the External sources button 1007 only in Add mode as it relates primarily to selecting new items to add into Zzote-Space. In other implementations, this button appears at all times.

In some implementations, in Add mode, the main toolbar also includes a "New Space" button 1010. In some implementations, selecting the "New Space" 1010 button moves the viewport to a new empty region of Zzote-Space in anticipation of the user choosing to add new Zzotes there. All of Zzote-Space can be thought of as one giant 'universe'. In other implementations, the "New Space" button 1010 creates a separate new Zzote-Space and places the viewport in the new Zzote-Space.

In any single Zzote-Space, new Zzotes on unrelated subjects can simply be placed next to each other without overlap. In some implementations, there is no theoretical maximum area for the space (and the viewport allows horizontal/vertical scrolling). In some implementations, there is theoretically unlimited (or very extensive) zooming-in and shrinking of existing Zzotes as required. Thus in some implementations there is never a problem with running out of visual space for vast amounts of information even within just a single Zzote-Space.

However, in some implementations, a new space can be designated if the user feels that the Zzotes within it would be completely unrelated to those in another space. Human psychology is key, hence the feeling of being able to be somewhere completely empty is 'nice', even if logically unnecessary as everything could occur in one infinite 'universe' (Zzote-Space).

In some implementations that do feature multiple Zzote-Spaces from the user's perspective, there are a number of ways of creating this effect. In some implementations, the different Zzote-Spaces are really within the same single Zzote-Space, but just positioned very far apart from each other (somewhat akin to galaxies in the universe). In other implementations, each separate Zzote-Space is in fact a genuinely separate space completely (directly) unreachable from other Zzote-Spaces. (For example, such a genuinely separate Zzote-Space may have a totally independent co-ordinate system and be identified with a unique number identifying that specific Zzote-Space). Regardless, in many implementations which feature such models including models with such genuinely separate Zzote-Spaces, it is still possible for the user to move, copy and Link Zzotes between the different Zzote-Spaces.

In order to populate Zzote-Space with Zzotes, a user creates Zzotes. Two important characteristics for a new Zzote are position and size (e.g., width and height). Various implementations therefore use various possible techniques for creating and repositioning/resizing Zzotes and their clusters. In some implementations, as described in more detail below, potential Zzotes can be moved and sized from the Add bar 1002 to the canvas using one-finger dragging, two-finger dragging or a combination of both. In some implementations, the same technique is the basis for dragging Zzotes from other sources (such as Search Listings, Bookmark Listings, the Visual Cluster Clipboard, or external sources such as images and web pages). In some implementations the same or similar techniques are used for moving/resizing Zzotes already in Zzote-Space to other regions/scales of Zzote-Space, and across Split-Screens or across Zzote-Link boundaries.

During a dragging operation (of new "Potential Zzotes", existing Zzotes already on the canvas, and from other sources such as "Search Listings"/"Bookmarks Listings"/ "Visual Cluster Clipboard"), the user interface ensures that each Zzote's physical location on the screen tracks the position of the user's fingers. Dragging can use either one finger or two fingers. In some implementations, the user can switch between the two options at any time during the drag itself.

Two-finger dragging enables a user to both reposition and resize a Zzote in a single gesture. The user drags a Zzote with two fingers simultaneously placed on or around it. The on-display position of the moving Zzote tracks the position of the centroid of the user's finger. The distance between the two fingers times a multiplicative "magnification" factor determines the size of the Zzote dynamically during the gesture. In some implementations, the multiplicative "magnification" factor is 1.0 (no scaling beyond the basic multiplication/transformation needed to translate physical screen-space distance to canvas-space 1:1 at the current viewport scale), but implementations typically use a multiplicative "magnification" factor (sometimes referred to as "sizing acceleration") that is greater than 1.0 (e.g., 1.5, 2.0, 2.5, or 3.0). In this way, a user controls both position and size simultaneously.

The "size" of a Zzote is completely under the direct control of the user. In particular, in some implementations there is no automatic zooming and panning of the viewport. As a Zzote is held between two fingers, it can be small yet still be visible. Because of this, automatic zooming or panning of the viewport is not essential for two-finger dragging. In some implementations, if a user desires automatic zooming and panning, the user can always switch to single-finger dragging, (e.g., temporarily).

Users can also use single-finger dragging. In some implementations, with single-finger dragging the user is in manual control of the position, but the Zzote has automatic sizing during the gesture. Sometimes a user wants to add a new Zzote as a sub-Zzote of an existing Zzote. For example, the user may have just completed typing a Zzote, and wants to add a new sub-Zzote that provides additional detail to it. The user knows that the new sub-Zzote must be smaller than the first. Automatic sizing with single-finger gestures provides a consistent starting-point for a sub-Zzote based on a suggested Zzote to sub-Zzote ratio. The user drags a Zzote with a single finger. The on-display position of the moving Zzote generally tracks the position of the user's finger. The size of the moving Zzote is automatically varied by some implementations. This automatic sizing occurs in response to the environment of the moving Zzote (the environment is essentially the other Zzotes around it as it is being moved).

During a single-finger gesture of a given Zzote, the routine ascertains an estimate of an "optimal" second Zzote (or none) to be the parent of the given Zzote at that location. Some implementations then assign a suggested size to the moving Zzote at that location. When the given Zzote is effectively suggested as a sub-Zzote of the second Zzote, its size is made smaller than the second Zzote by a calculated amount. (When the given Zzote has no suggested parent, a default size can be used, or it can match the size of nearby zero-parent Zzotes.)

Some implementations set a default size factor between the given Zzote and the suggested parent (e.g., the given Zzote may be sized to have ¼ the width of the suggested parent Zzote). However, once a Zzote already has existing sub-Zzotes at whatever Zzote to sub-Zzote ratio is actually used, then in some implementations another sub-Zzote of the same Zzote may have a suggested size that is the median size of all its sibling Zzotes.

If the given Zzote is determined that it would have no suggested parent Zzote, then an alternative size-calculation is used. In some implementations, a default zero-parent size can be used or it can match the size of nearby zero-parent Zzotes.

In some implementations, automatic sizing uses a sophisticated and finely tuned algorithm, which takes velocity of movement and inferred intention of the user into account. For example, if the user is moving the finger rapidly, automatic sizing may be deferred until the finger has slowed down. It also effectively includes a glide-down/up to its new size feature.

Although the actual positioning of a Zzote in motion according to a single-finger gesture essentially tracks the user's finger, in some cases auto-sizing causes the grab point to deliberately slip in order for the automatic change of sizing to take place while the user is still moving the finger.

In some instances, the suggested new automatic size of the moving Zzote is smaller than the area of the user's finger, so the user cannot see it. In other instances, the suggested size becomes excessively large. In some instances, a user may have dragged the Zzote to the edge of the viewport, and would ideally like the viewport to automatically scroll to show space in the direction of the drag. For these reasons, some implementations support automatic zooming and panning of the viewport during single-finger dragging. This ensures that the on-display size of the moving Zzote is within accepted boundaries. It also provides automatic scrolling in some instances.

Automatic zooming and panning of the viewport essentially adjusts the apparent on-display size of the moving Zzote to be as required by adjusting the zoom-level and position variables of the viewport itself. A similar technique is used when the user's finger is at the edge of the screen to move the viewport's position variables to scroll the display as required. Implementations of automatic zooming and panning of the viewport make these changes to the viewport in a smooth animation to provide continuity for the user. The animation is effectively the same as the animation used by the viewport when changing itself in an animated fashion to provide the illusion of transportation from one set of values (position, zoom-level) to another. In some implementations, when automatic zooming and panning of the viewport occurs, the viewport position variables are specifically adjusted alongside any required change of the viewport's scaling variable. This occurs in order to maintain the moving Zzote's effective position beneath (or near) the finger of the user despite the change in viewport scale and the apparently (but not literally) larger or smaller moving object.

Automatic zooming and panning of the viewport uses a sophisticated and finely tuned algorithm, which accounts for velocity of movement and inferred intention of the user. For example, when the finger is moving quickly, automatic zooming and panning of the viewport may be deferred until the finger has slowed down.

Implementations also allow dynamic switching between one finger and two fingers at any time during the gesture, and the behavior described above applies dynamically based on the number of fingers in the gesture at each point in time. When the user is using two fingers, the user can release one of the fingers at any time in order to switch to single-finger dragging. In some implementations, this turns on automatic sizing and automatic zooming and panning of the viewport. Conversely, if the user is using one finger, the user can add a second finger to the gesture at any time for precise manual control of sizing.

Figure 11:
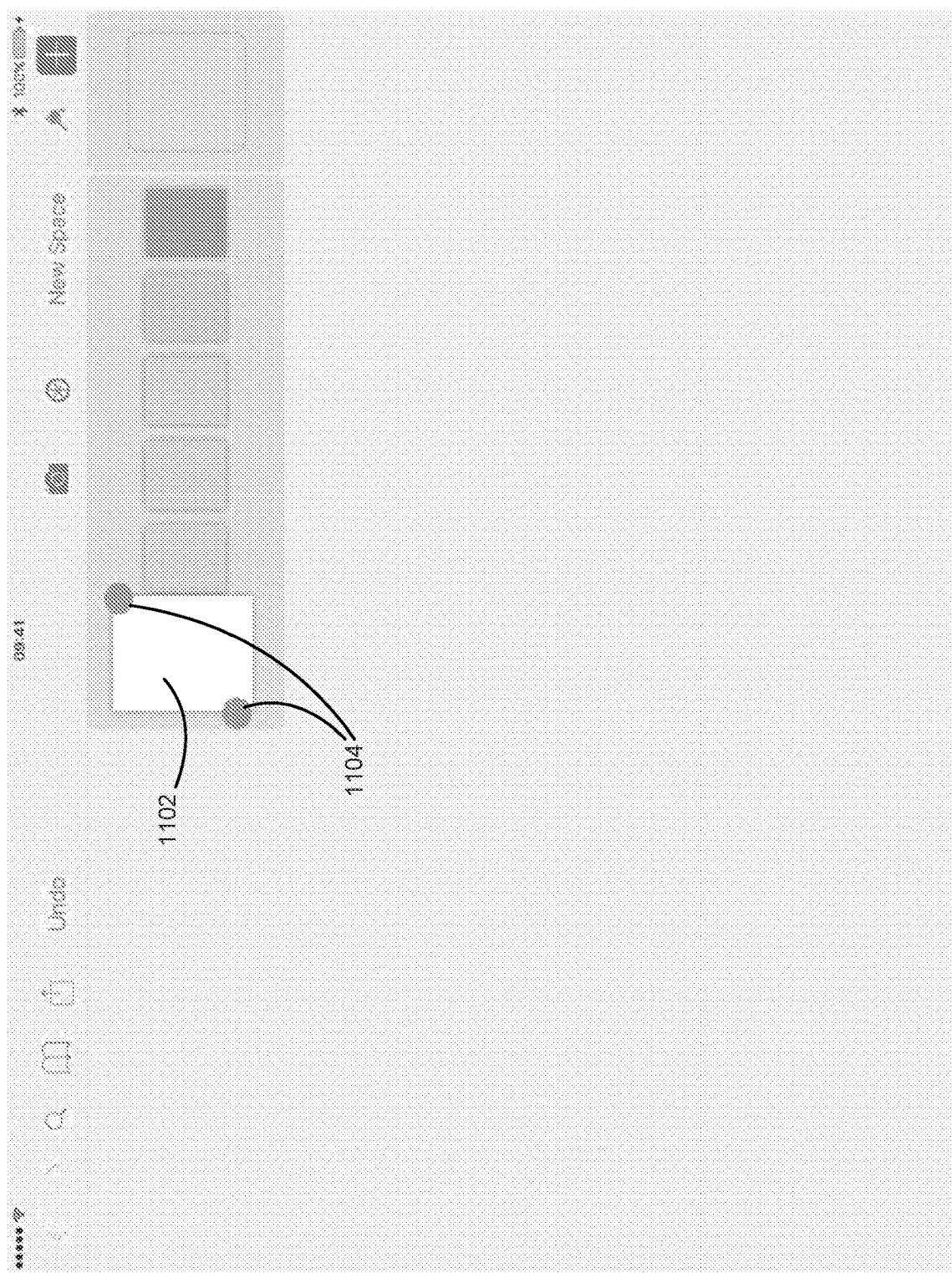

FIG. 11 illustrates initiating the creation of a potential Zzote 1102 using a two-finger gesture. (The Add bar 1002 can alternatively be described as a toolbar. A Zzote pad such as 1006-A in FIG. 10 can alternatively be described as a graphical information unit pad on a toolbar.) The user places two fingers at two touch points 1104 around the Zzote pad 1006-A (shown in FIG. 10) on the Add bar 1002 (shown in FIG. 10) to pick it up. The positions of the two fingers are indicated in FIG. 11 by the two dots 1104. The intended potential Zzote 1102 has increased in size (from the starting size/position of 1006-A in FIG. 10) because it was picked up. Both fingers can touch entirely on the selected Zzote pad 1006-A or, as in FIG. 11, can be centered around the Zzote pad 1006-A as long as both fingers are within the area of the Add bar's background.

In FIG. 11, the position of the two fingers indicates that immediately prior to the picked up item growing in size, their positions were not actually on the Zzote pad 1006-A, but around it. (In contrast, to pick up a Zzote already in Zzote-Space, the touch points must either be within the area of the Zzote, or with one finger within the Zzote area and the other within the area of a descendent.)

The potential Zzote 1102 increases in size and centers itself around the centroid of the two fingers immediately as it is picked up. This both provides visual feedback to the user, and ensures that the Zzote is at an optimal starting size and position relative to the fingers, ready for manipulation. (In contrast, when picking up a Zzote already in Zzote-Space, the Zzote does not increase in size and does not center itself around the centroid of the number of fingers pressed. This is because the user may need to make a fine adjustment to its current position and size.)

Unlike moving and/or sizing a Zzote already in Zzote-Space, in some implementations there is no need to press and hold for a short period of time before the Zzote is picked up from the Add bar. Therefore, an immediate slide down action from the Add bar to the canvas is possible. This saves the user time, and makes adding Zzotes easier.

Alternatively, the user can use a single-finger gesture to add a Zzote. As noted above, the user can also alternate between one and two fingers any time before completing the gesture.

Figure 12:
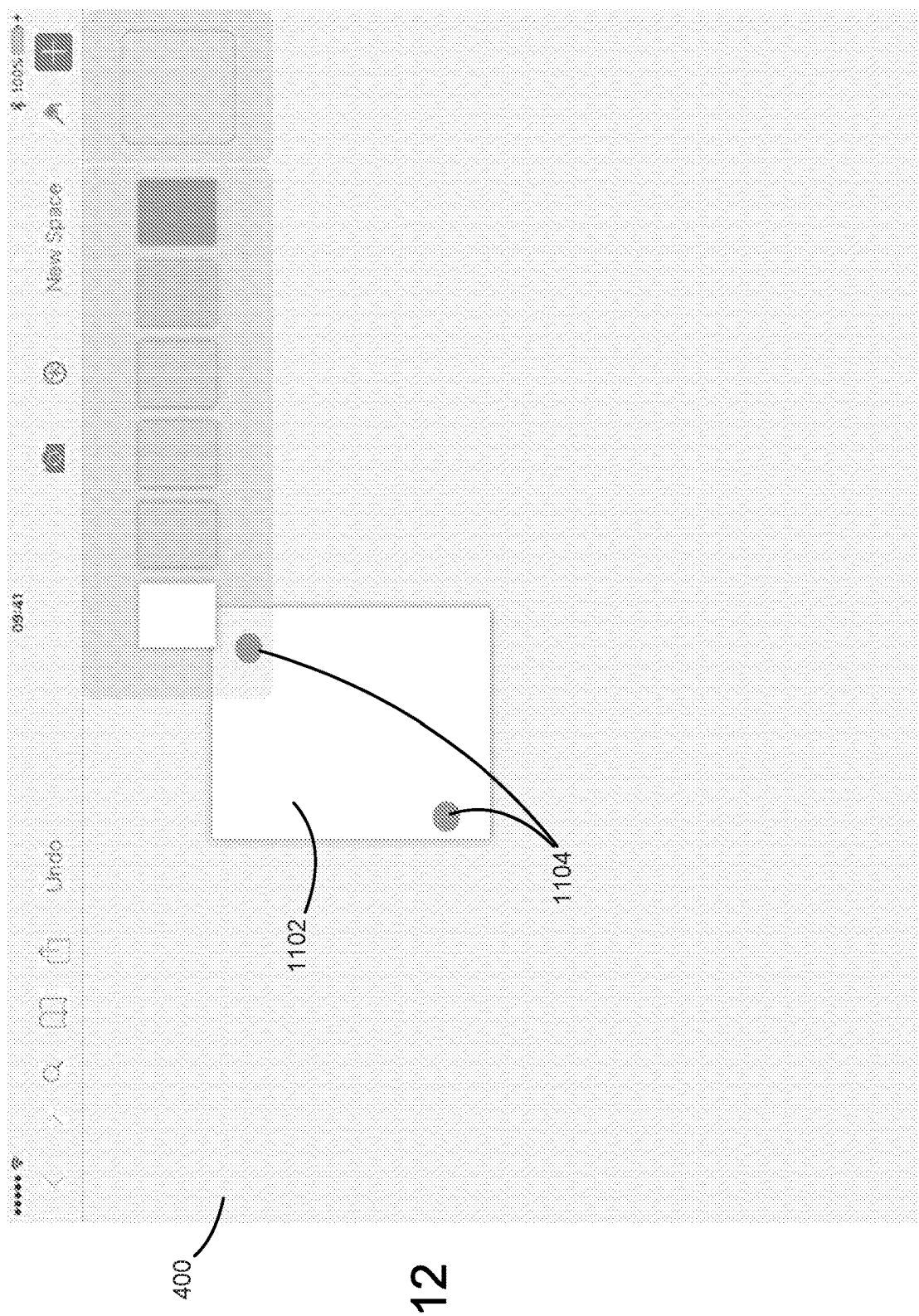

As illustrated in FIG. 12, the potential Zzote 1102 is being dragged with two fingers, as indicated by the two dots 1104. The position and the size of the new potential Zzote 1102 are being controlled manually and precisely by the user. As shown in FIG. 12, the new potential Zzote 1102 has now been dragged from the Add bar onto the canvas 400. If the user were to release the fingers at this point, the potential Zzote would be added at the displayed location and size, becoming an actual ("finalized") Zzote saved to the canvas. If the user had released the fingers while the center of the potential Zzote was still over the Add bar, the potential Zzote would simply have an animated return to the Add bar and nothing would have been added to the canvas.

The position of the new potential Zzote tracks the centroid of the position of the two finger locations. The size of the new Zzote is proportional to the distance between the two finger locations times a scaling factor. Sometimes this scaling factor is referred to as a sizing acceleration. The value of this scaling "magnification" factor depends on the implementation. When the scaling factor is 1.0, the finger spacing directly relates to changes in size of the new Zzote as it appears scaled by the current viewport variables. However, a value larger than 1.0 can be beneficial because the "acceleration" enables resizing more quickly. On the other hand, if the scaling factor is too large, the size change of the Zzote compared to finger spacing change is too exaggerated and difficult for the user to control. Because of this, typical scaling factors are in the range of 1.0 to 3.0 (although it varies by implementation and can depend for example on the physical size of the display relative to the size of a human hand for example). The scaling factor enables the small spacing change between a user's fingers to resize Zzotes up to the size of a larger display.

An appropriately chosen scaling factor magnifies the effect of varying the distance between fingers. It means that within the limited range that humans can pinch and unpinch their fingers, they can resize Zzotes over a broader range.

The scaling factor chosen depends on the implementation and the physical size of the display screen relative to the size of a human hand. Common values are in the range of 1.5 to 2.0. The scaling factor is useful because it expands the ability of a user to precisely resize Zzotes over a reasonable on-screen range.

In some implementations, the aspect ratio of a Zzote does not vary during resizing, regardless of whether the resizing is manual or automatic. This is desirable from the point of view of Zzotes. Zzotes are consistent in their internal structure regardless of their scale, which can be varied at any time the user wishes to place them in a different context. When a Zzote has a certain aspect ratio (e.g., height=1.2× width) when it is small, that same aspect ratio is maintained if the users makes it larger or even smaller. This behavior is unlike sizing operations in other software applications (e.g., a CAD application) where users can alter the aspect ratio.

Aspect ratio consistency increases the viability of the combined two finger positioning and sizing operation as described above, because the two fingers only need to control sizing in one dimension. Regardless of how users alter the positions of their two fingers, only the width of the Zzote needs to be determined from the distance between the two finger-points. The height is calculated to maintain its existing aspect ratio (or vice versa).

Note that if this were not the case, subtle changes in the angles of the user's fingers could distort the aspect ratio of the Zzote. With the present implementation, users can pinch and unpinch their fingers with confidence that the aspect ratio stays constant.

Some implementations enable explicit changes to the aspect ratio of Zzotes, but doing so is discouraged. For example, in some cases a user may wish to increase the height of a Zzote quite deliberately, without changing the width, which seemingly provides additional internal space within a Zzote for more information such as further text. This is discouraged because it detracts from the generally encouraged idea that all Zzotes have the uniform quality of having the same aspect ratio. (Note that in some implementations sourced Zzotes containing items such as images and parts of web-pages, have differing individual aspect ratios that are initially chosen to match the shape of the required part of the source material.)

Changing aspect ratios is also discouraged because once a Zzote has been placed in Zzote-Space, its external footprint should not have to grow just because it is to contain more information. The recommended alternative is achieved by allowing new information to shrink within it. For example, increasing amounts of detail text shrink in font size to fit into the existing footprint. Also, increasingly small sub-Zzotes can be added (and existing sub-Zzotes shrunk), all without the external footprint of the parent Zzote needing to increase. Because its external footprint does not increase, its surrounding Zzotes need not be affected by its newly contained information.

The dynamically changing viewport scale is another reason why the actual size of a Zzote never needs to increase. The content can be shrunk without theoretical limit and simply viewed at a greater zoom-factor in the viewport. Thus, in some ways the Zzote may seem to be larger, when in fact this has not occurred at all.

However, one recommended reason to increase the external footprint of a Zzote is when a user wishes to re-frame the entire semantic context of a Zzote relative to other Zzotes. Even in this case, however, the aspect ratio should ideally be maintained.

Despite the desirability of aspect ratio consistency, some implementations provide an option to increase the actual height of a Zzote without changing its width, or vice versa. To do this, some implementations allow a user to "pull" on a dot placed on its lower border. Such an action would quite deliberately alter its aspect ratio, while creating new blank space within it, beneath existing content. Note that this is a different and separate process from general sizing (e.g., sizing based on two finger pinching/unpinching) as described.

The same principles for creating new Zzotes are also applied to manipulating existing Zzotes.

Figure 13:
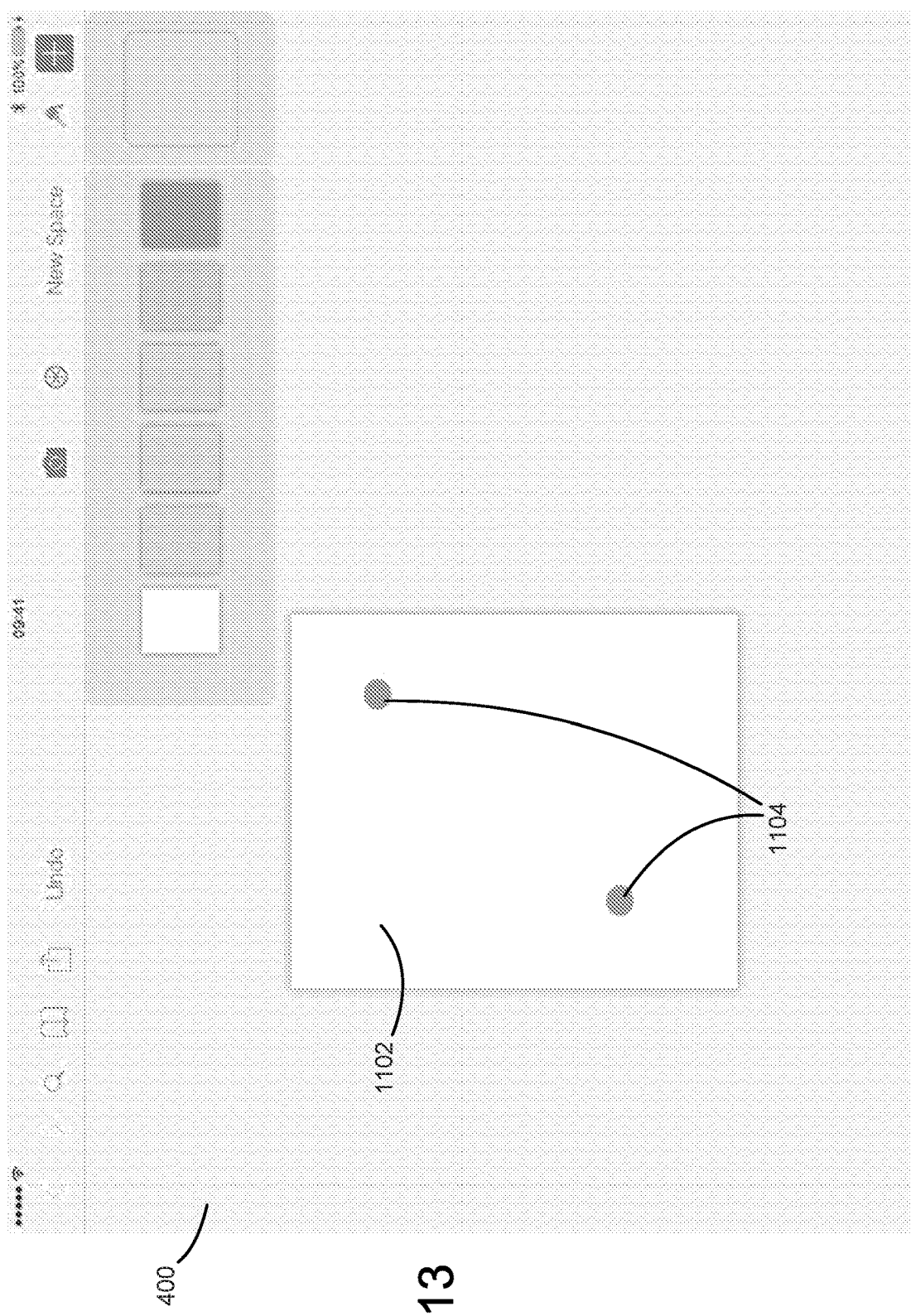

In FIG. 13, the user continues the dragging operation and unpinches the fingers further to increase the size of the potential Zzote 1102. As seen in FIG. 13, the spacing of the fingers 1104 relative to the edges of the outer rectangle of the Zzote 1102 has changed due to the finger-distance scaling-factor. This is sometimes described as sizing acceleration. The Zzote has increased in width at a greater rate than the actual increase in the distance between fingers. Note that the aspect ratio has not changed.

Figure 14:
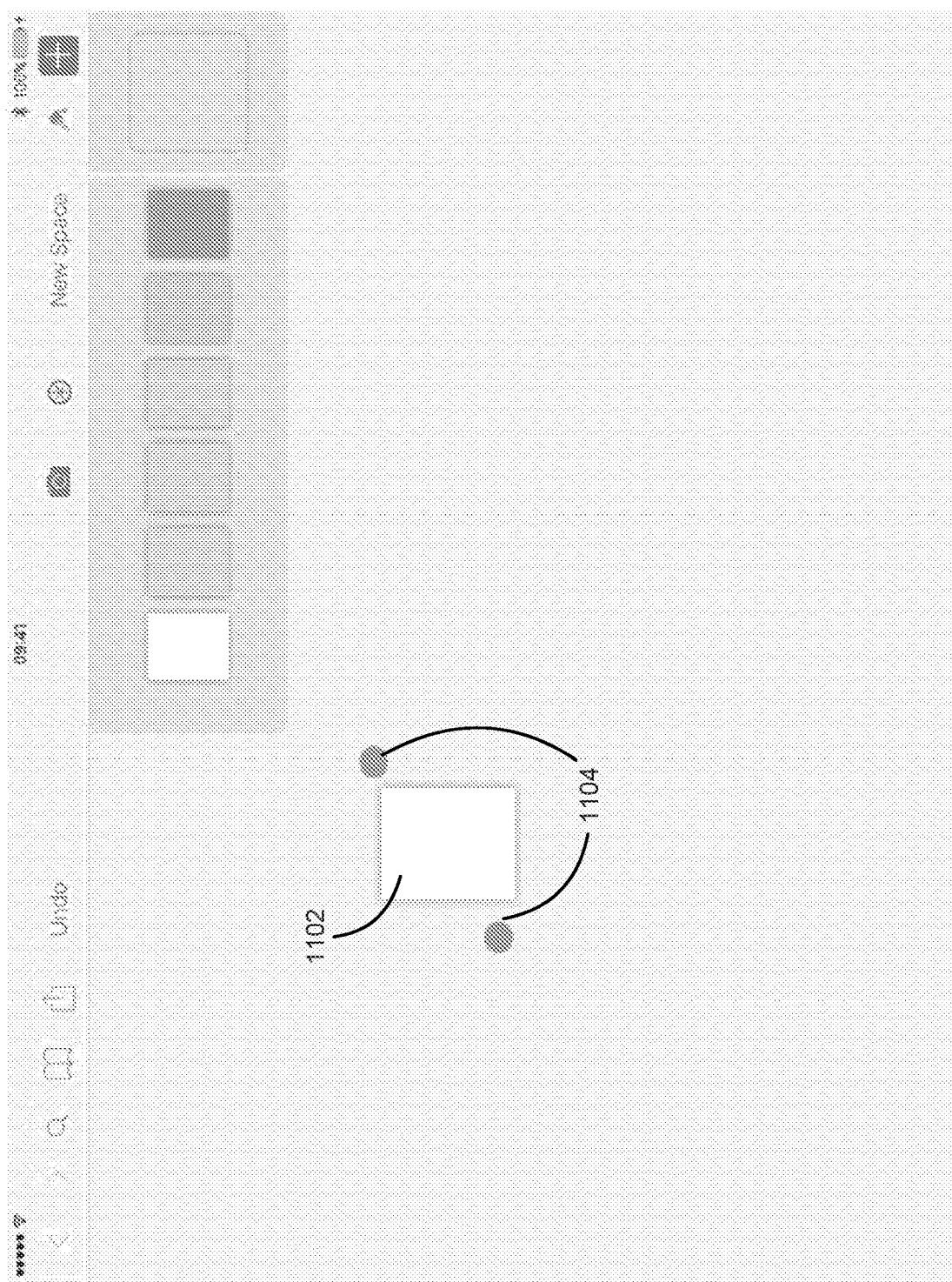
Figure 15:
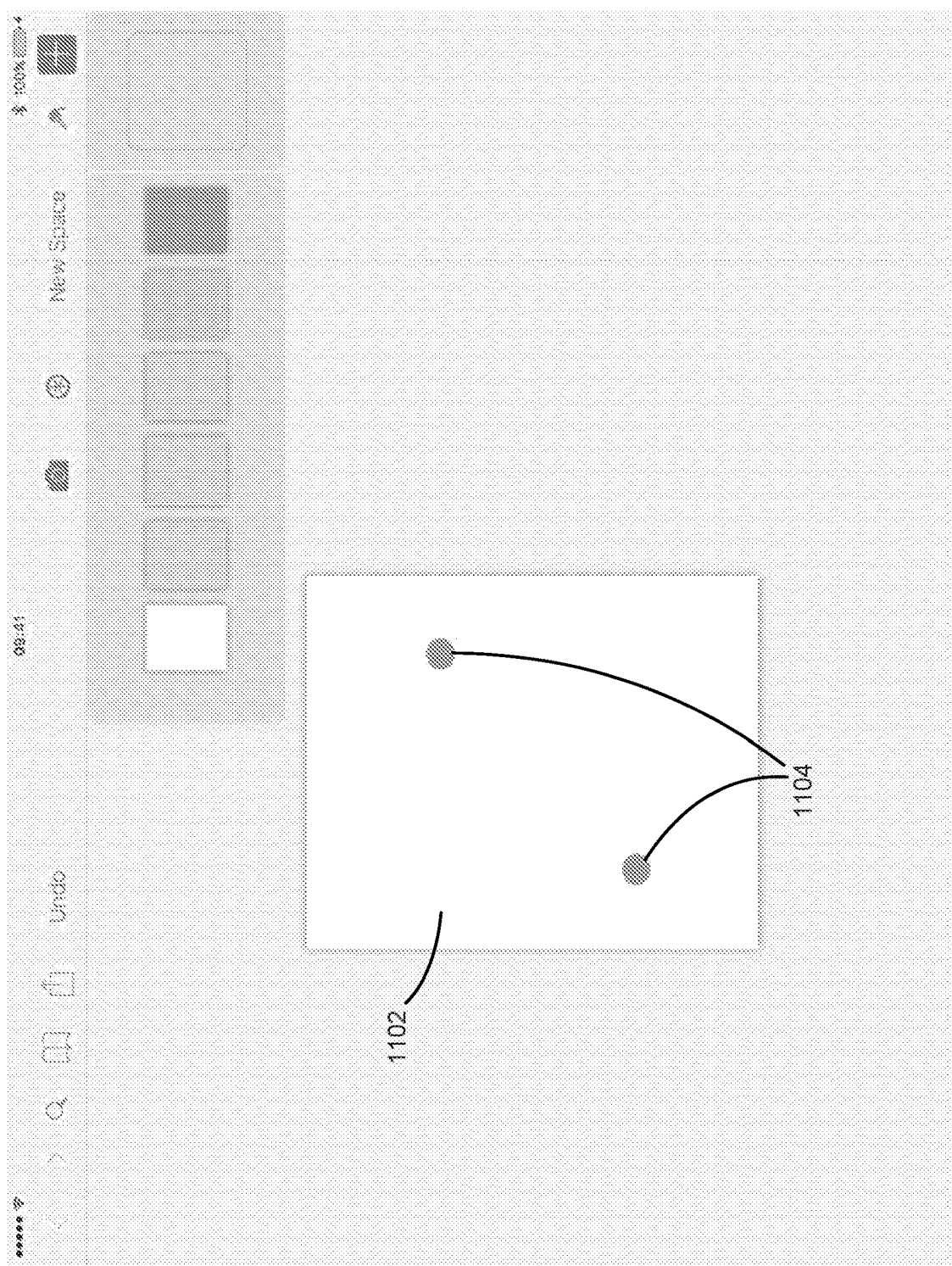

In FIG. 14, the user pinches the fingers to make the potential Zzote 1102 smaller. (After the pinch in FIG. 14, the user decides that the larger size is preferred, and reverses the sizing using an unpinch gesture, as illustrated in FIG. 15.)

As illustrated in FIG. 14, the relative scaled position of the fingers (the two dots 1104 in the figure) relative to the edges of the rectangle of the Zzote 1102 has changed due to the finger-distance scaling-factor. This is sometimes referred to as "sizing acceleration" or the multiplicative "magnification" factor. The Zzote has decreased in width at a greater rate than the actual decrease in the distance between fingers. Because of this, the fingers are no longer "in contact" with the Zzote. This is not a problem and has the beneficial consequence that the small Zzote is not obscured by the fingers. Some implementations keep the same initially picked up Zzote under control until the user releases the finger(s). Note that the aspect ratio of the Zzote has not changed. In FIG. 14, the user has actually altered the angle formed by the fingers, but the angle change has had no effect on sizing or position. The inadvertent angle change has not caused any undesirable effects (e.g., a change in the aspect ratio).

Because the interface provides constant visual feedback to the user as the fingers move, the user has precise control over the size and position.

With two fingers, it is possible for the user to shrink a Zzote to a very small size on the screen. This can be far smaller than illustrated in FIGS. 13 and 14. However, such a small Zzote can still be seen on the screen because it is between the two fingers and not obscured. Therefore, automatic zooming and panning of the viewport (as used in the case of single-finger dragging) is not needed. But under one finger control, a small Zzote could easily become hidden by the user's finger, so automatic zooming and panning of the viewport is the most common implementation in that circumstance.

Because the sizing is under manual control during two-finger gestures, the size of the Zzote under control typically cannot be adjusted much larger than the computer display. Automatic zooming and panning of the viewport is not needed to reduce the scale of the viewport because the Zzote cannot typically become too large.

In FIG. 15, the user has increased the size of the Zzote once more using the principles just described. This final position and size is where the user wishes to place the Zzote. The user has simultaneously specified both the position and size of the Zzote with great precision using a fluid gesture. The entire process has been one very simple flowing motion from beginning to end. Humans are naturally highly dexterous with their fingers. This implementation has utilized this natural move and pinch/unpinch process to enable high precision moving and sizing in a computing environment. The result is substantially faster than techniques used by other applications while still maintaining very high accuracy. As the size is changed (by pinching or unpinching), aspects of the position are inevitably affected. Using the disclosed technique, the user can very naturally account for this and adjust the position (of the centroid of their fingers) to compensate.

The fact that this process is easy yet accurate encourages users to add many Zzotes with speed and accuracy. Users are then able to take advantage of the other benefits achieved by breaking down the information into many Zzotes.

In addition to the two-finger gestures, some implementations also support one-finger positioning with automatic sizing, which is complementary to the two-finger techniques. Indeed, a user can dynamically switch between one finger operation and two finger operation during a gesture as often as desired. For example, some users may start off with a single-finger dragging operation, then switch over to a two-finger gesture to precisely fine-tune the size and position just before final placement of the Zzote.

In contrast to the two finger positioning and sizing gesture illustrated here, conventional techniques for positioning and sizing an object (e.g., in a conventional computer-aided-design application) typically involve first a positioning operation and then a separate sizing operation (e.g., by dragging corner dots on the shape). This typical technique is far more laborious for the user, and has many disadvantages when compared to the techniques disclosed here, including: (i) a user must first position an object and then resize the object as a second process; (ii) after sizing, the user may then need to re-position the object based on the new size, and this two-step process may need to be repeated a number of times because changing the size effectively alters aspects of the position as well; (iii) in many conventional implementations (e.g., ones with corner-dot sizing), the user can easily distort the aspect-ratio inadvertently; and (iv) the presence of corner dots on the object are a distracting visual abstraction.

By positioning and sizing in a single step, it avoids any overlapping smaller Zzotes becoming unintentionally 'stuck' (as sub-Zzotes) to the new Zzote while the new Zzote was at an interim position and size. This is another reason why conventional techniques are not ideal here. However, other implementations enable the use of "sizing dots." For example, some users with many years of experience using CAD systems may feel more comfortable having displayed sizing dots. Other implementations using sizing dots display them at various times such as when Zzotes are "selected", or throughout all adding and adjusting of Zzotes.

Because the Zzote 1102 in FIG. 15 is the first Zzote on the canvas, the position and size chosen for it are entirely arbitrary. Scaling is relative within Zzote-Space. It is only as other Zzotes are placed relative to each other that any particular choice of size becomes relevant. Note that the user need not know the absolute "Zoom Factor" currently in effect for the viewport because the range is effectively (theoretically) infinite. Because Zzotes can be resized at any time (making them bigger or smaller with respect to other Zzotes in Zzote-Space), the concept of an absolute zoom factor is not useful.

Figure 16:
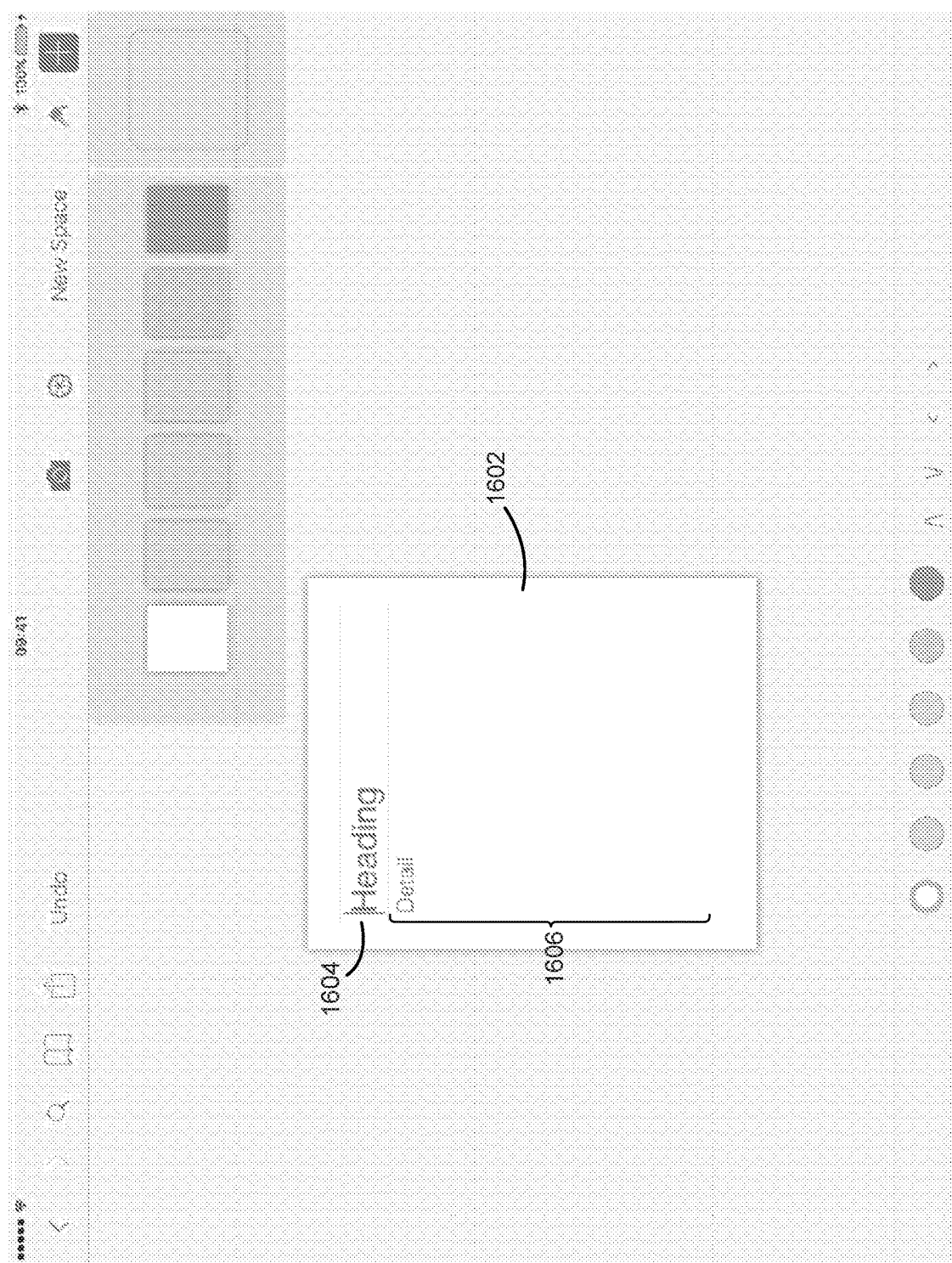

In FIG. 16, which follows immediately after FIG. 15, the user has released the fingers to finalize (and hence save to the canvas) the placement of the new Zzote 1602 (it is no longer a "potential" Zzote 1102). The user interface then adjusts the viewport and prepares for text entry by displaying placeholders, including a heading placeholder 1604 and a detail placeholder 1606. Some implementations automatically enter into typing mode, as illustrated by the vertical bar in the heading placeholder 1604.

Before typing begins, the viewport readjusts itself so that the "Heading" and "Detail" text (or their placeholders if they are currently empty) are within readable size parameters. In other words, the user should be able to comfortably read the text. For example, if the user had placed a new Zzote on the canvas at a very small size, the viewport increases its zoom-factor so that the same Zzote will appear large enough to read before text entry begins.

In addition, the viewport may be panned so that the horizontal and/or vertical position of the Zzote is adjusted to show the entire Zzote. This is useful both aesthetically and to avoid being blocked by other on-screen items, such as the Add bar. The actual position and size of Zzotes in Zzote-Space are not affected; the position and zoom-level values just specify how objects are seen in the viewport.

When there is an automatic adjustment to the viewport position or scale (e.g., an increased scale and a slight shifting up and left), the user interface generally animates the transition from the earlier configuration to the new configuration. This can appear to the user as though "travelling" through Zzote-Space. If the change is too great for a meaningful animation, the user interface just jumps to the new configuration. Jumping is uncommon when preparing to enter text because the changes in position and scale of the viewport are generally small.

These techniques for viewport adjustment are used in other scenarios as well, such as selecting an existing Zzote for viewing. Sometimes these techniques are referred to as the "viewport adjustment algorithm" (or "viewport re-adjustment algorithm").

The algorithm has variable parameters depending on how the viewing of the selected Zzote is prioritized. For example, it may be important that the content of the Zzote is easy to read, as in the case of text entry here. In some instances, it is more important to see a selected Zzote in its context than to read detail text. In this case, Zzotes are initially viewed with smaller unreadable detail text but with its parent more clearly seen. For example, this is the case when jumping between multiple instances of the same Zzote-Link.

In some implementations, when a Zzote contains sub-Zzotes, it is designated by the viewport adjustment algorithm to be displayed at a larger size in a viewport than it would be otherwise. In this context, a user generally wants to see the sub-Zzotes, at least at a summary level. The sub-Zzotes are effectively the detail of the parent Zzote, so it useful to see them. In many cases, the headings (if not the detail text) of sub-Zzotes are visible and readable when the parent Zzote is selected.

In addition, when a selected Zzote has small detail text, it may require a larger display size regardless of whether it contains sub-Zzotes or not.

In some implementations, in a standard text-only Zzote there are two regions of text. These are Heading 1604 and the Detail 1606. When a Zzote contains no text in either of these regions, the respective placeholder appears. In the example of FIG. 16 showing a new Zzote, both Heading 1604 and Detail 1606 start off empty, so they are both placeholders. Once either of these regions contains text, that text replaces the placeholder.

Both the Heading 1604 and the Detail 1606 are optional. However, for a text-only Zzote, it is rare to not have heading text. Leaving the detail text empty is more common.

Figure 17:
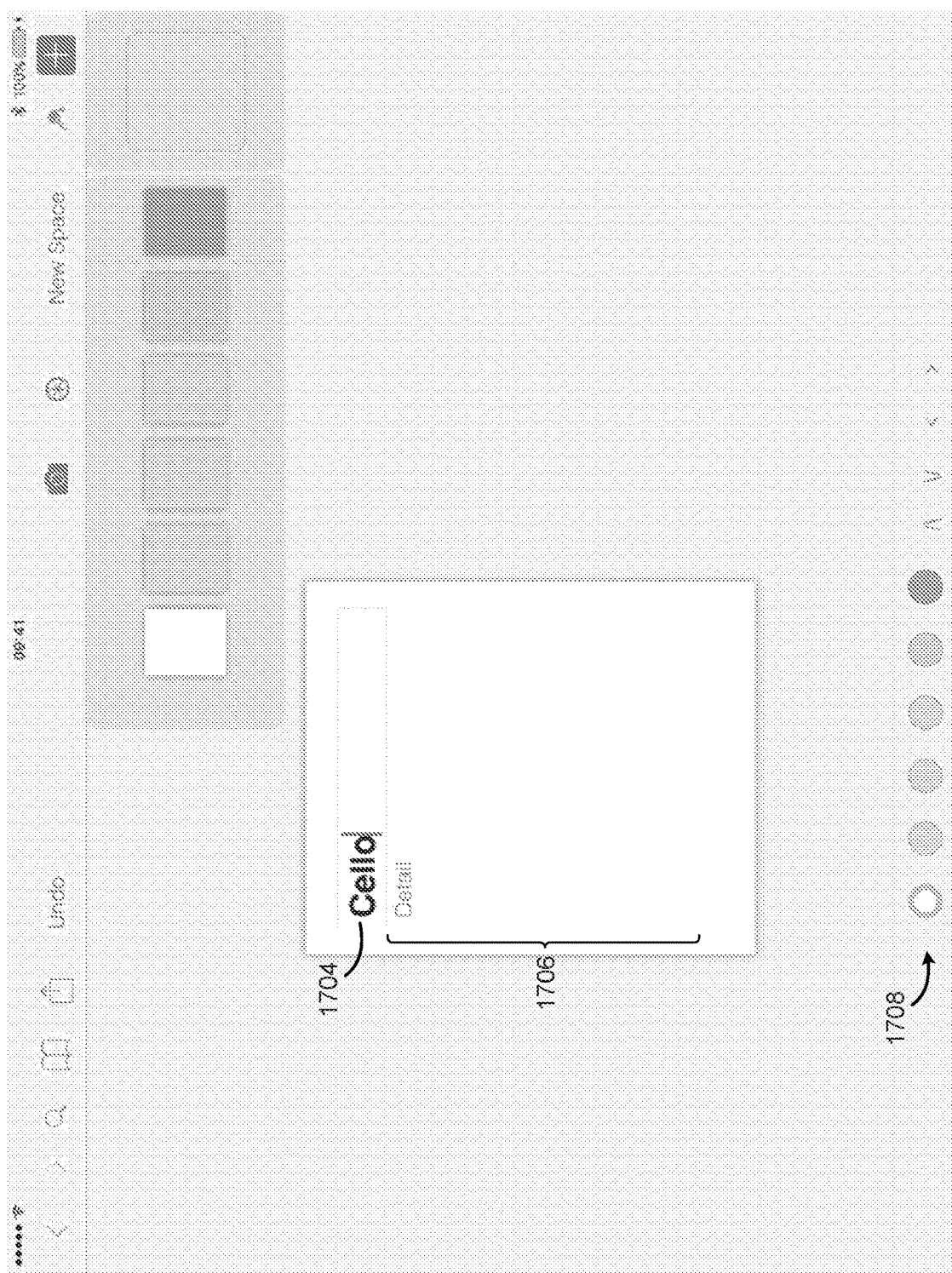

In FIG. 17, a user enters Heading text 1704, then either presses Return or taps on the Detail placeholder 1706.

The Heading entry 1704 will word wrap if the end of the line is reached and grows downwards as required. This moves down the vertical starting position of Detail (text or placeholder) 1706. Pressing Return or tapping on the Detail placeholder 1706 switches the focus of typing to be the Detail 1706 rather than Heading 1704.

In some implementations, the user interface displays a Text Entry toolbar 1708 at the bottom of the screen. In FIG. 17, the toolbar 1708 includes six circular color options and 4 arrows. Other implementations have more, fewer, and/or different icons in the toolbar 1708. In some implementations, the font size for the Heading 1704 is system-determined to be a fixed size for all Zzotes, so there is no toolbar icon or other option to change the heading font size. Other implementations do allow adjustment to heading font sizes.

Typically, the Heading is a title for a piece of information, which conveys a concise overview of the topic. It is commonly a single sentence, short phrase or word. In situations where the total text for a Zzote is a single word, short phrase, concept description, or a single sentence, that information may be placed in a Zzote Heading without any Detail. As illustrated below, the scale of the viewport at any moment determines whether a Heading is the heading of the user's view or appears to be a small detail of a larger context.

As noted above, some implementations fix the sizes of the fonts used in the headings of Zzotes. A fixed-size font for headings provides various advantages, including: (i) aesthetic consistency between Zzotes; and (ii) the fixed-size is deliberately slightly larger (relative to the size of the Zzote itself and to the smallest Detail font sizes) than may be thought typical for a Heading according to typographic conventions. The larger size means that even when a Zzote is scaled to quite a small size within the viewport (e.g., when the focus of attention is on a larger parent or grandparent of this Zzote), there is a greater chance that the Heading will still be readable even if the Detail is too small to read.

In other implementations, the font-size of heading text can be varied per-Zzote in a similar manner to the font-size of detail text (as described below). In alternative implementations, individual characters of both heading and detail text can have their font size and other attributes individually modified with the total freedom of a conventional word processor.

Figure 18:
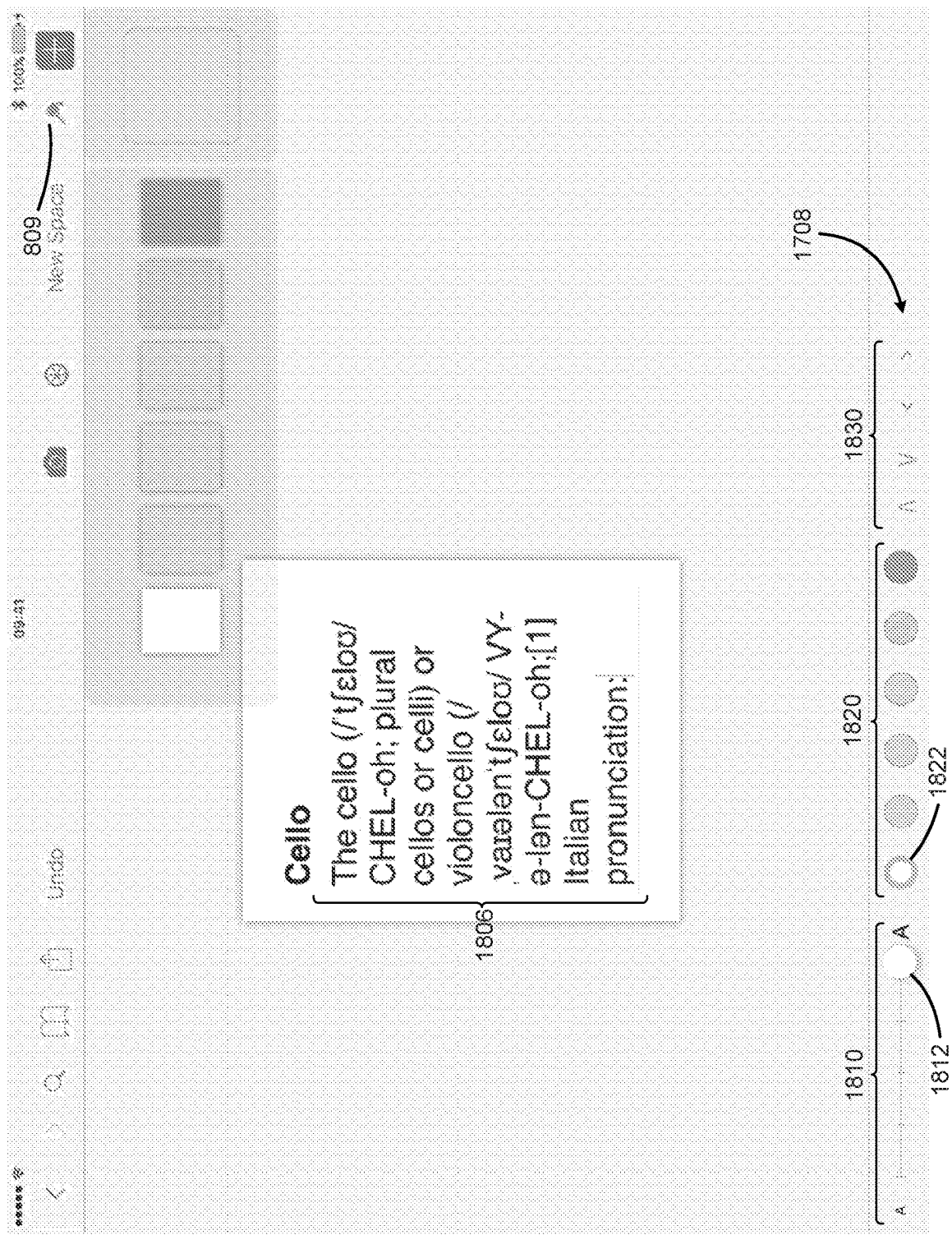

In FIG. 18, the user has typed some information 1806 into the Detail text, but is still mid-way through the typing process. The Text Entry toolbar now includes a font-sizing option 1810. In this implementation, the font-sizing option includes a slider 1812 to vary the font-size of the Detail text 1806.

"Detail text" can be broadly defined as "greater detail about the subject of a piece of information." This can vary from a few words or a sentence up to the full text of a document. When there are existing paragraphs of text about a subject, it often makes sense for these paragraphs to be the Detail text in a Zzote. Of course, some Zzotes have no detail text at all (e.g., when the heading by itself is sufficient).

In addition, many circumstances are best handled using sub-Zzotes instead of Detail text, particularly when the information is hierarchical by nature. For example, it may be better to use additional sub-Zzotes whose headings provide the same information.

The font size for detail text can be varied by the user. Varying the font size can substantially alter how the Zzote is perceived by a user. The Detail text in a Zzote can vary from being the same font size as the heading, in which case the entire text contents of the Zzote is akin to a short note. At this font size, one advantage is that the text is still as readable as the Header font even when the viewport is depicting the entire Zzote at quite a small on-screen size. This occurs, for example, when the focus of attention is on a larger parent or grandparent of this Zzote.

At the other extreme, the Detail font size can be equivalent to the small (e.g., 12 point) font size used in typical word-processing documents. At this font size, for text reading the user should manually scale the viewport (this may also occur automatically in some cases, or be the result of a specifically functioned "two finger tap" as described above) so that the entire Zzote is often nearly full-screen on some typical devices. Alternatively, if this Zzote is fairly small on-screen (e.g., when the focus of attention is on a larger parent or grandparent of this Zzote), the user is aware that this is a document but may only be able to make out the broad "shape" of the paragraphs. Innate human pattern memory still gives the user a sense of this document even though it cannot actually be read. The user is still likely to be able to read the heading due to its larger font size. If the user momentarily wishes to read or further inspect this Zzote document, the user can simply zoom-in and pan the viewport as required. This is easily reversible when the user wishes to return the focus to the larger contextual picture within which this Zzote appears quite small.

One aspect of the shown implementation is that the user is not explicitly told the font size numerically. This is because any actual viewed size is entirely relative to the current scale of the viewport. At different times viewing the same information, the apparent font size of the same text is different both visually and semantically. Other implementations, however, do enable precise numerical point or font size selection, despite the effects of zooming on the relative perception of any absolute font size value.

The Text Entry toolbar 1708 displayed in FIG. 18 provides options for editing Detail text and other features such as Zzote-color adjustment. In some implementations, the Font sizing slider 1812 in the Font-sizing control 1810 appears only when entering Detail text. Some implementations do not enable this for heading font size, as discussed above. (However, other implementations do enable this for heading font size.) Moving the slider 1812 varies the font size of the text. The slider 1812 can be dragged horizontally in this implementations. In this implementation, left is for the smallest font size and right is for the largest font size.

Rather than allow an effectively unlimited continuum of font sizes, the illustrated implementation restricts allowed font sizes to discrete positions, as shown by the markers on the slider line. This enforces some typographical "neatness" to documents.

Some alternative implementations provide a finer level of font size granularity, or effectively allow totally continuous changes in font size.

When the slider 1812 is in the rightmost position, the font size is at a maximum. In this case, the size is the same size as the font size for the corresponding heading in the Zzote. In the illustrated implementation, however, the font for Detail text is not bold, unlike the Heading text. Such a large Detail font size is ideal, for example, when the user wishes to be able to read this Detail text even when the Zzote is a small sub-Zzote. FIG. 18 depicts the Detail 1806 at this maximum font size.

When the slider is at the leftmost position, the font size is at a minimum, which in some implementations is approximately equivalent to a 12-point font in a conventional document. At this size, the text resembles that of a conventional word processing document when the viewport is zoomed-in so that the text is readable. On many devices, the entire Zzote may be nearly full-screen at such a point. This Zzote would then appear to be the "main document" and the focus of the user's attention.

When the font size is that small, the detail text may not actually be readable when the Zzote is displayed at a smaller scale. The user is expected to zoom-in whenever it is necessary to read the text, but has the benefit of seeing the smaller representation when looking at it in the context of its parent (or grand-parent) Zzote for example.

In some implementations, the font size does not explicitly refer to any actual point or font size (e.g., 12, 16, 24, 36 points). The displayed size of all text varies depending on the current scale of the viewport, so no actual "font size" number is displayed in some implementations.

For example, the above definition of a Cello in FIG. 18 may seem to be large "important" text. However, if this same Cello Zzote is viewed as a small sub-Zzote of a more general Zzote (e.g., an Orchestra Zzote), this same Zzote and its text would seem to be small (and therefore less important information) from the point of view of a user.

Other implementations do enable precise numerical font size selection when this is preferred for consistency with conventional word processing.

In some implementations, the user interface automatically changes the scale of the viewport as a result of font size change. This ensures that when the user changes the font size, the viewport is still at such a scale (and position) that text at the new size can still be read comfortably.

In some implementations, changes to the font size (based on movement of the slider 1812) occur immediately, even if the text is momentarily un-readable. The immediate feedback allows the user to see the current results, and therefore may choose to continue to move the slider further (either in the same direction, or in the reverse direction). Having reached a certain font size, the user may decide that the font size should be even smaller, and therefore continue to slide further leftwards. Likewise, the user could continue to slide the slider 1812 in either direction until the new font size seems right. The user receives immediate visual feedback because the size of any existing text (or the placeholder text if there is no text) immediately shows proportionately how it will appear within the Zzote.

In some implementations, when the user has not moved the position of the slider for a short period of time (e.g., 0.1 seconds for such a delayed response), the viewport uses its automatic repositioning and scaling algorithm (sometimes referred to as an automatic viewport adjustment algorithm) to ensure that the new font size is displayed as readable. For example, this may be achieved by zooming-in to the entire Zzote if the new font size is now too small to comfortably read. In the illustrated implementation, this change in viewport is performed via a smooth animation. If a user's finger is still touching the slider 1812, the user is free to continue the adjustment. The viewport may then continue to use this delayed response to respond to another new font size if necessary.

This delayed response of the automatic viewport change is visually satisfying because it first shows how the new font size looks in the existing context (even though it may be too small to read), before animating to the new readable context. This also avoids too many un-necessary animations zooming in and out, which may appear disjointed and distracting to the user. In some implementations, this is because the allowed font sizes are deliberately quantized. The single delayed viewport resizing (and associated repositioning) animation occurs instead of multiple steps of viewport resizing (and associated repositioning) corresponding to each of the intermediate sizes.

Some alternative implementations provide simultaneous continuous animated changes to the viewport as the font size changes.

Each Zzote has a color. In some implementations, this is the background color of its shape. There are many reasons to alter the color. The reasons include aesthetics, arbitrary but memorable variation, indicating importance, group membership, or urgency of information. The six colored circles 1820 that are displayed in the toolbar 1708 enable the user to change the colors of Zzotes. The number of color options and the specific colors used vary by implementation. In the illustrated implementation, the circle matching the current color of the selected Zzote (here the first circle 1822) has an additional ring around it to indicate it is highlighted.

In FIG. 18 the Zzote is paper-white in color, so the first circle 1822 (also depicting paper-white) has the highlighting ring around it. If the user presses another of these circles in the color selection region 1820, the background color of the Zzote changes, and the highlighted circle becomes the circle just pressed.

Some implementations also provide a format button 809 in the main toolbar, which enables the user to alter the color of a Zzote at any time. Some implementations provide such complementary alternative ways of changing color for ergonomic and psychological convenience. One advantage of the color selection region 1820 appearing when the user is typing is that it may seem to be near where the user is typing and relatively near to the keyboard in some implementations. The color of a Zzote can be used as a possible information attribute on par with text itself. (Such use of color is encouraged where appropriate.) In this implementation, when the main toolbar is in Add mode, the immediate ability to change background colors from the main toolbar is not presented to the user. Because of this, presenting the color change circles 1820 in the Text Entry toolbar 1708 is more critical.

The navigation buttons 1830 navigate within the Zzote cluster structure. In this implementation in FIG. 18, the navigation buttons 1830 appear as Up, Down, Left, and Right arrows in the typing toolbar 1708 just to the right of the color circles 1820. In order to understand the navigation, it is useful to review how Zzotes are spatially ordered in Zzote-Space. The "Cello" Zzote depicted in FIG. 18 is not yet in a cluster. A visual example of a Zzote already within an actual cluster is the "Cello's Bow" Zzote 410 as seen in FIG. 4. In that case, the parent (hierarchically upward) of Zzote 410 is the "Cello" Zzote 402. Zzote 410 has as siblings (hierarchically at the same level) the "Construction" Zzote 412 and "In Orchestra" Zzote 414. Zzote 410 has two sub-Zzotes (hierarchically downward) seen placed just below its detailed text.

If an example Zzote A is a parent to ten sub-Zzotes (smaller Zzotes that overlap Zzote A), all ten of these sub-Zzotes are all regarded as "siblings" because they have Zzote A as their common parent. There are various ways of perceiving the "order" of these sibling sub-Zzotes. In some implementations, the ordering is arbitrary; in some implementations, the sub-Zzotes are alphabetically ordered by their heading text.

In the illustrated implementation, the ordering is based on a form of spatial order. This can be phrased as Left-To-Right Top-Down. In other words, rank the order of the sub-Zzotes starting from the top left of a parent Zzote, then going across to the right edge of the parent Zzote noting any sub-Zzotes along the path, then go down to the next "line" and continue.

Because the arrangement of Zzotes is inherently irregular, a function to achieve this is slightly fuzzy in interpreting the order. When the ordering of two sub-Zzotes is ambiguous, some implementations make an arbitrary decision. This Left-To-Right Top-Down order is somewhat analogous to reading text when a reader scans a page from left to right and top down.

Other forms of spatial ordering are used in different implementations. For example, some implementations use Right-To-Left Top-Down or Top-Down Left-To-Right.

This algorithm for determining the spatial order of the Zzotes of a common parent is used in multiple places in the interface, including the Search Listing and Sharing (including Export). This algorithm is also the basis of the Next/Previous buttons described below.

The Next (right) and Previous (left) buttons 1830 jump the selected Zzote to the next or previous sibling within a Zzote structure. This is based on the ordering scheme used. When possible, the "jump" animates the travel of the viewport The Up and Down buttons 1830 specify "drill-in" and "drill-out" operations. These buttons cause a jump of the selected Zzote "Up" to its "Primary" Parent Zzote (if it exists) or "Down" to the first sub-Zzote of a Zzote if it exists (the first is the one on the top left, based on the same spatial order just described). The jump animates the travel of the viewport when possible. (The definition of "Primary" parent with regard to Zzote-Space is provided below.)

In this way, the navigation buttons 1830 create a novel enhanced form of "spreadsheet grid." In this context, the Zzotes can be thought of as possessing some of the benefits of cells in a spreadsheet, despite the fact that Zzotes have many other properties, as described herein. Some implementations provide an automated grid creation option or enable manual actions by a user to arrange sub-Zzotes in a spreadsheet-like grid layout if appropriate.

Other implementations have optional position and sizing alignment options to enable perfect grid creation. Other implementations enable adding pre-made grids of sub-Zzotes to a Zzote. Other implementations allow the grids to be amended by shrinking the sub-Zzotes to allow rows and columns to be inserted. Other implementations have buttons that navigate up and down within the same hierarchical level, alongside left and right. This is therefore literally navigating a grid of Zzotes (as seen in a conventional spreadsheet for example). Such precise grid navigation buttons may then be complemented by additional hierarchical up ("drill-out") and down ("drill-in") buttons equivalent to the functions of the Up and Down buttons 1830, as depicted and previously described.

One major advantage that Zzotes have compared to spreadsheet cells is the additional ability to hierarchically go up and down to deeper levels of Zzotes within Zzotes.

In most cases, the patterns of Zzote shapes are not grid-like, unless that is explicitly required. In fact, it is recommended for a user to avoid creating regular grids because unique shapes of Zzote clusters are more memorable than grids. In some implementations, the user interface enables the same Zzote principle to establish something more directly equivalent to a conventional spreadsheet grid, but with additional recursive ability and the many other described benefits of Zzotes over spreadsheet cells. The use of Zzotes as described herein provides the same benefits of such navigable cells, complete with unique recursive stacking abilities, Zzote-Linking, easy internal shrinking, and other benefits. Zzote clusters also have the aesthetic advantage of more interesting and memorable patterns of information being formed.

Other implementations include additional buttons to automatically create sibling/sub-Zzotes while editing or having selected a first Zzote. This is an easy way to create a new Zzote without the user having to drag anything in. In some implementations, a create button appears at other times as well, and not just when in typing mode.

In some implementations that provide for automatic creation of sibling Zzotes, the location for the next Zzote is determined by "filling-in" the next "grid entry location" to the right of the current Zzote. If the current Zzote is at the most rightmost edge of the parent, the newly created Zzote is located down and positioned from the left edge. If a parent Zzote is completely "filled up," in some such implementations the user interface performs an automatic shrink operation of the existing sub-Zzotes to make more space.

In this way, the user avoids having to drag in new Zzotes to create them. Although this has some efficiency for speed of use, it sometimes results in relatively uniform (non-unique) grids, which defeats some of the benefits of the Zzote interface.

Some implementations address this over-regularity by automatically imposing some randomness or variation in the placement of new sibling Zzotes. The user can then tweak the system-generated position. (However, in implementations that feature automatic creation of Zzotes, users are often then less inclined to personalize the arrangement from such automatic defaults. This can lead to identical looking rectangular grids or meaningless patterns of Zzotes. Therefore some implementations deliberately do not feature such an option in order to encourage the user to create their own more memorable human-generated patterns of Zzotes that subjectively relate better to their information.)

The "drag-in to add" interface as described is as effortless as possible so that dragging is not much more effort than pressing a button to create a new Zzote. In addition, the "drag-in to add" enables users to be creative, which promotes human engagement by being more fun.

Some implementations include another button to immediately zoom-in the current Zzote and create a new sub-Zzote of it next to its existing sub-Zzotes, following a left-to-right top-down pattern. When the current Zzote has no sub-Zzotes, the created new sub-Zzote is positioned starting at the top left of the detail section of the Zzote to become its first sub-Zzote.

These buttons to automatically create new Zzotes are not provided in all implementations. The illustrated implementation in the figures does not include these auto-create buttons.

Figure 19:
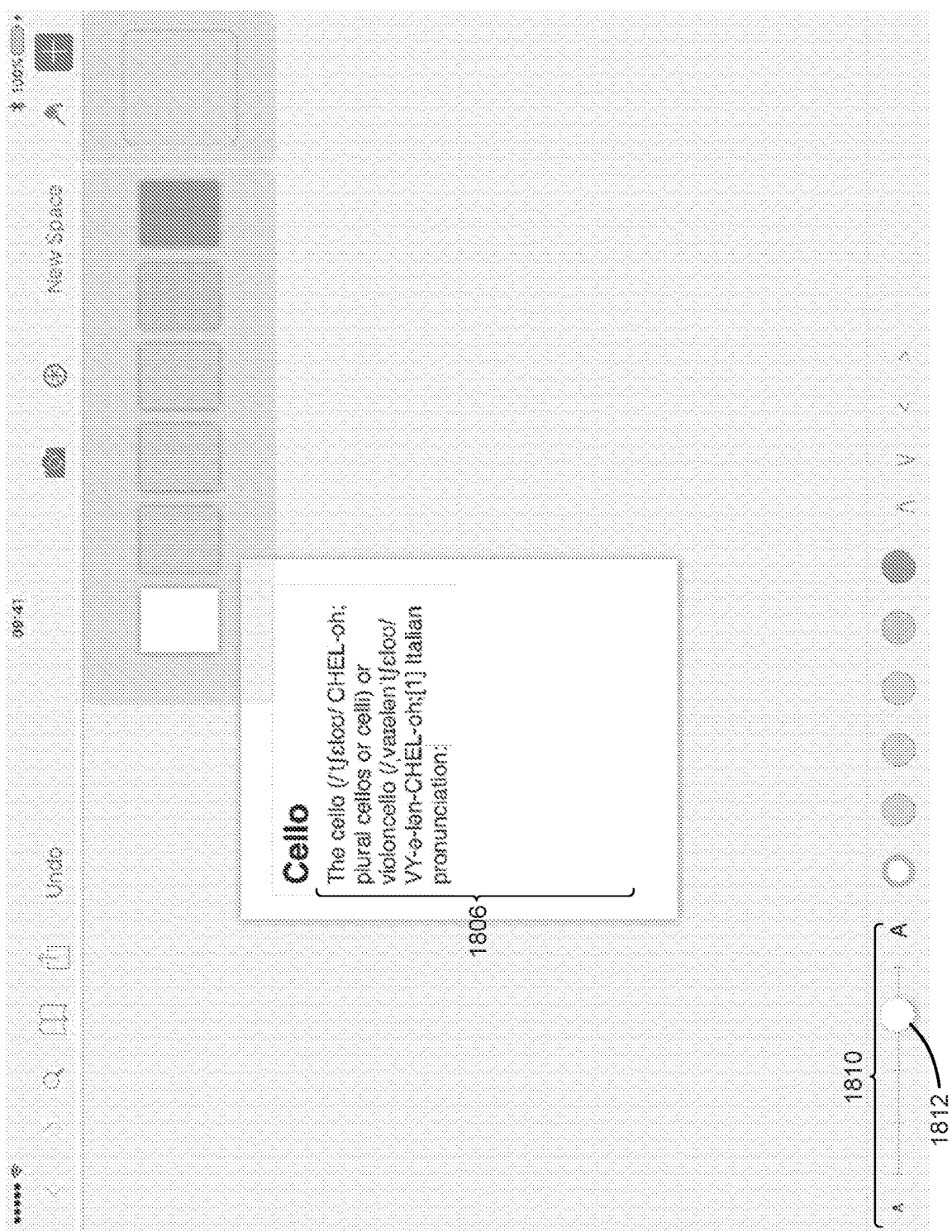

In FIG. 19, the user reduces font size of Detail text by sliding font size slider 1812 to the left. Note that the Detail text 1806 in FIG. 19 is smaller than the same text in FIG. 18. In some implementations, the possible font sizes are quantized, as illustrated by the vertical marks where the slider 1812 may be positioned. This avoids the resultant typographical messiness that would otherwise occur when multiple Zzotes are alongside each other with similar but inconsistent font size to Zzote width ratios. The vertical division lines shown within the font size control 1810 represent the different font size options. In this implementation, as shown in FIG. 19, there are five allowed font sizes. Other implementations have more or fewer allowed font sizes. In some implementations, the font sizes can be selected on a continuous scale, or on a very fine level of granularity so that it is effectively continuous.

In this example illustrated in FIG. 19, the new font size is still readable without adjusting the position or scale of the viewport. In this example, because the detail on-screen font size has not fallen outside of any min/max parameters of readability, the viewport did not need to change scale to accommodate the smaller text size.

Figure 20:
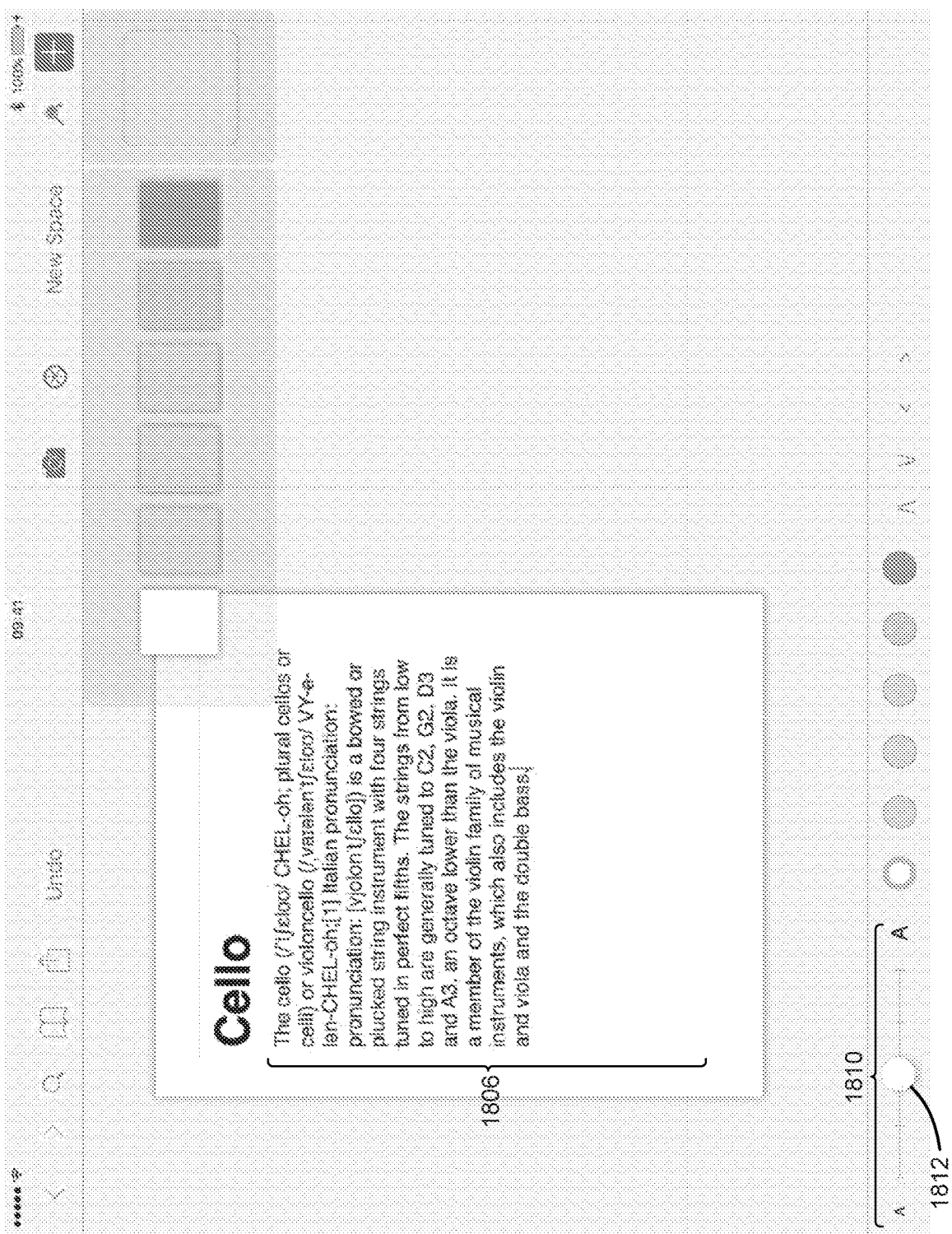

FIG. 20 illustrates making the font size even smaller, and having the viewport adjust automatically. In this case, the user reduces font size further before entering more Detail text 1806. The smaller font size caused the viewport to automatically zoom-in and pan. This maintained a readable size for the text.

The user reduced the font size of the detailed text by sliding the Font size slider 1812 leftwards by one position. The viewport automatically zoomed-in so that the Detail font-size is still readable. The new parameters of the viewport (position and scale) were determined by applying the viewport re-adjustment algorithm to focus on the typing Zzote.

The Cello Zzote appears larger on-screen than in FIG. 19. The actual size of this Zzote within Zzote-Space has not been affected.

The slider 1812 was moved by the user discretely to the marked position as a result of a finger drag. In real time, this caused a discrete font size change (or series of discrete changes in examples where more marked intervals are slid across) to the Detail text (or placeholder) 1806, and the user interface automatically reformatting the text in the Zzote at the pre-existing viewport configuration of scale and position. Then, once the user interface has inferred that there has been no font-size-change within a specific small amount of time (e.g., 0.1 seconds), the viewport re-adjustment algorithm is applied. This results in a rescale and pan of the view to allow the text in the document to be readable.

The result is an immediate feedback of the font size change at the existing viewport scale, but only a consolidated viewport adjustment (animated in the described implementation) when the user's action is either complete (as is the most likely situation, and the one depicted in the figure), or when the user has paused in the sliding process controlling the slider and would find the updated viewport to be useful.

The viewport adjustment animation helps the user because it visually explains what is happening. The change in context is happening in a fluid motion as the user interacts with the user interface. What could have been seen as a small note on the subject of "Cello" is now becoming a more substantial document.

The user has then been able to fit additional Detail text into the Zzote as shown in FIG. 20. The user has entered a number of additional sentences.

At the previous font size, the Detail text 1806 seen in FIG. 20 would not have fit into the Zzote.

Figure 21:
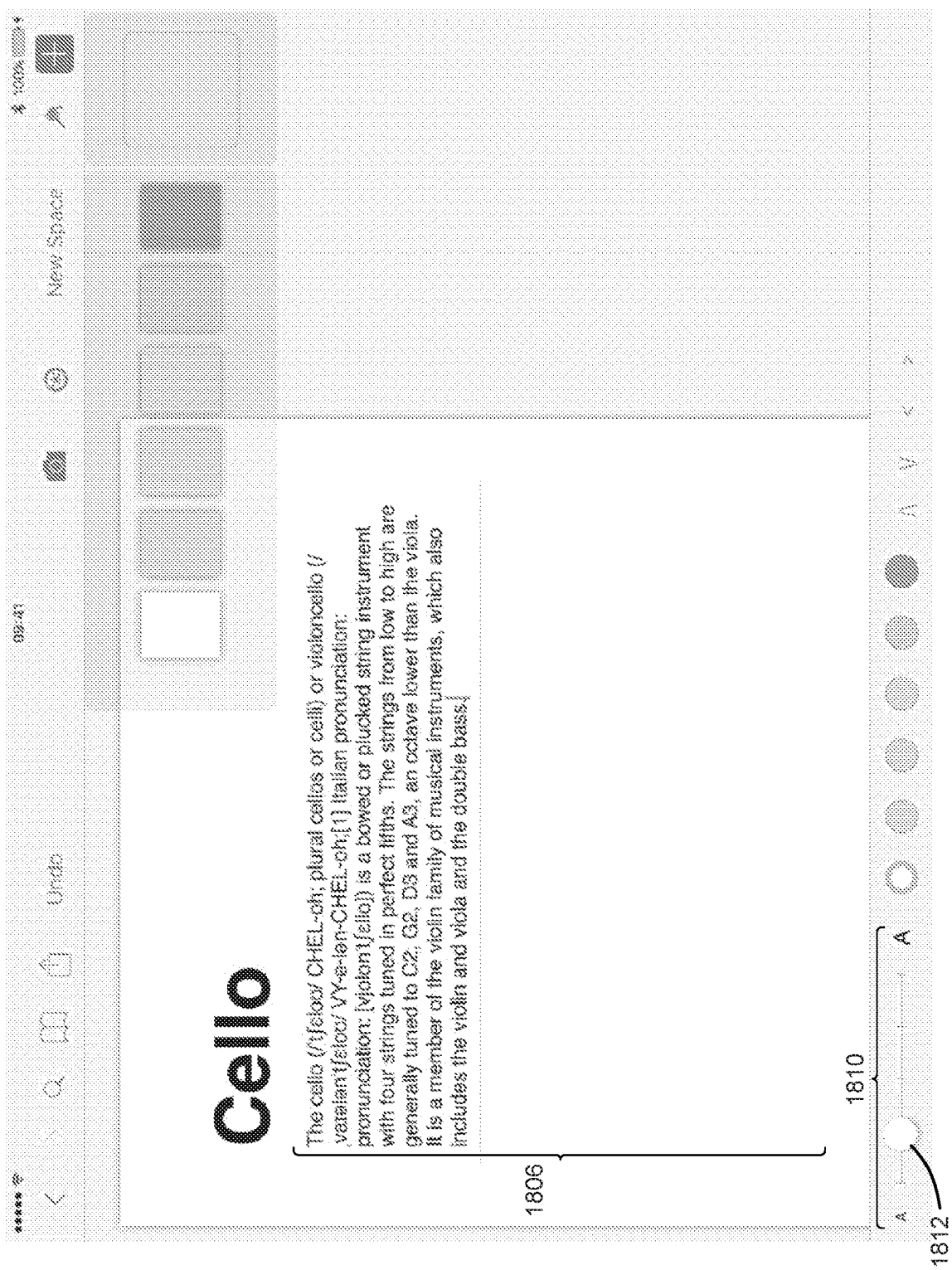

In FIG. 21, the user decreases font size further, causing the automatic viewport adjustment to once again increase the apparent on-screen size of the Zzote. The Zzote has not actually changed size. The user again reduced the font size of the Detail text 1806 by sliding the Font Size slider 1812 leftwards by one position. The viewport has automatically zoomed-in so that the Detail text is still readable. The Cello Zzote now appears even larger on-screen than in FIG. 20. The actual size of this Zzote within Zzote-Space has not been altered. As before, the adjustment of the viewport occurs as an animation to provide a smooth change in context.

What had appeared to be a small note is now appearing far more like a word-processing style document, even though its actual size has not changed. This is one of the novel features of Zzote-Space.

Figure 22:
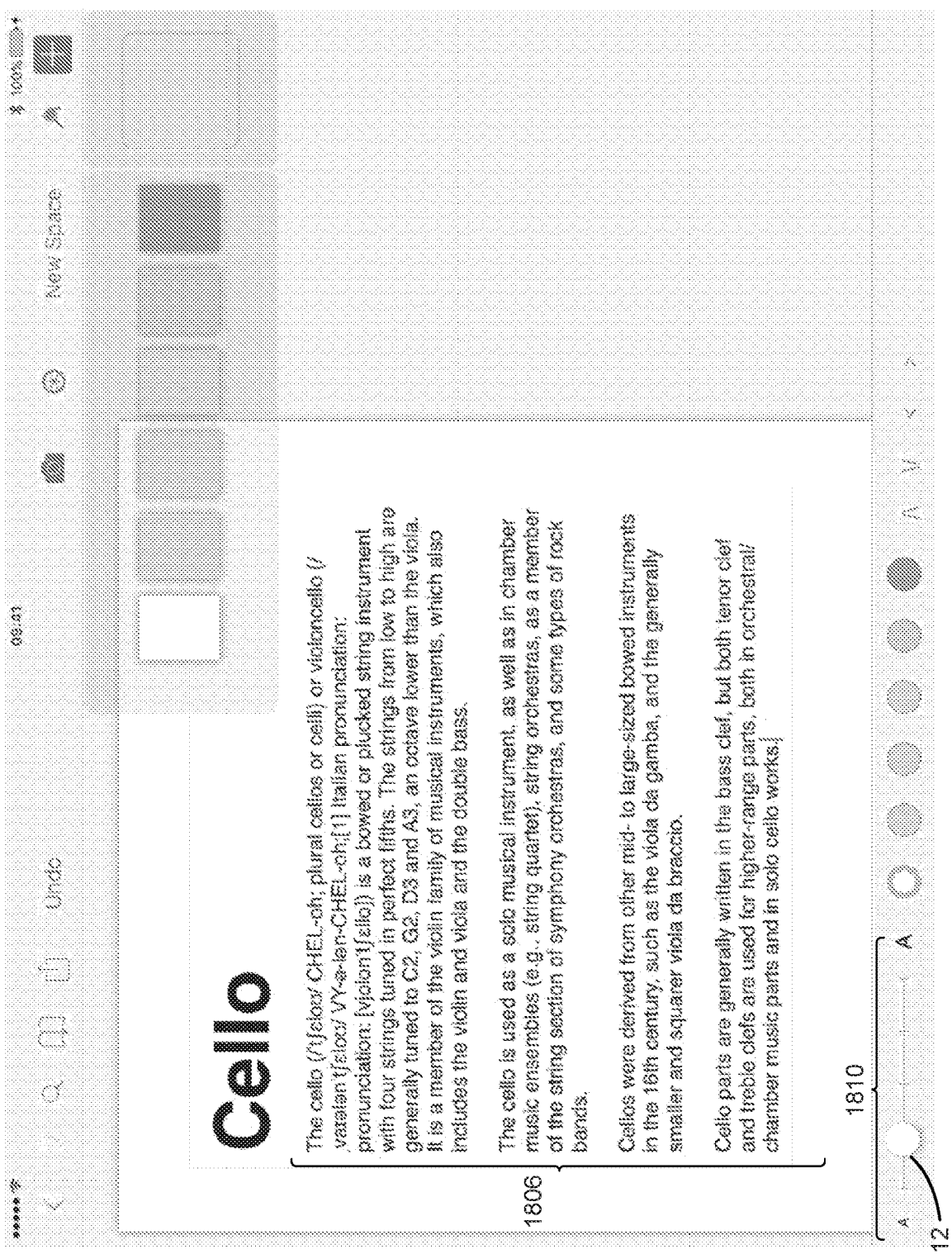

Now there is additional space for further text within the Zzote at this font size, so the user adds additional paragraphs of Detail text 1806 as shown in FIG. 22. The same-sized Zzote now looks more like a word-processing style document.

In contrast to the four conventional paragraphs of text now depicted within the single "Cello" Zzote of FIG. 22, subsequent figures will illustrate building clusters of Zzote text (and other sources described herein) from additional Zzotes and increasingly complex Zzote building blocks. Compare the conventional information-conveying text of FIG. 22 within 1806, to an already built Zzote cluster example as seen in FIG. 4. The zooming structure of Zzotes (and their clusters) provides a novel form of computer-assisted human language. It could not exist outside of a computer graphical device because of the required computer graphic based massive zooming required and other factors. Clusters of Zzotes can provide an alternative to the structure of words, sentences, paragraphs, sections, chapters, books, and libraries. One advantage of the Zzote equivalent over a conventional language depiction of information is that Zzote clusters are inherently spatial and therefore can be more natural for humans to see, understand, and remember at fluidly-changing levels of appropriate context. This is possible because of the (theoretically) unlimited zooming, clustering and portal linking features of some implementations.

Zzote clusters possess novel qualities, which enable them to convey the complex semantic tree structures of human languages. In some interpretations of the brain, human language can be seen to rely on the recursive abilities of the brain's human language parse-tree. It appears to be limited to a certain number of levels that can be easily comprehended by people. For example, consider a hypothetically complex sentence: "The person who owned the house, which belonged to a second person that the first person had once bought a car from just before a third person had last spoken to the second person about the first person's garden, went for a walk to find the car, which used to belong to the third person before they sold it to the second person."

The brain may have innate language abilities able to parse such a complex sentence. However, at this level of recursiveness, it is difficult for the brain to make sense of the information. An equivalent visual and zooming-based Zzote cluster can present similar levels of complex information in easier ways for humans to understand.

In contrast to conventional sentences, the novel graphical recursions as visualized in some implementations can go on without (theoretical) limit while still being entirely visible at whatever level of context is required. A human may find it easier to visually comprehend (including zooming to see further aspects of interest as required) a very complex Zzote cluster than to comprehend a very complex sentence.

In fact, it is generally easier for humans to comprehend and remember these new Zzote clusters than words, sentences, and paragraphs, which were designed to be transcribed before graphical computing devices were available. With Zzote clusters, complex sub-clauses need only be viewed in detail (by zooming in) as and when the user needs to inspect them further. A user can comprehend the "bigger picture" without the need to see the contextually placed detail until it is required to zoom-in to it.

In contrast, a complex sentence of a natural language needs to be read from beginning to end before attempting to form some mental-model of its (typically entire) meaning. Conventional computer lists and grids are not as useful in this regard. Lists and grids are not graphically memorable and do not adequately show relationships at dynamically changing scale. Further, other forms of network diagrams, are not as easy to follow as Zzote clusters.

With Zzote clusters, even as new detail is added, the overall shape/structure of higher levels of concept do not need to change. Zzote clusters can be easily moved, resized, and Zzote-linked to refine meaning. Even when Zzote clusters are moved and resized, aspects of their shape still retain familiarity for users. Zzote clusters can utilize color to further communicate information in ways that make great use of human faculties to deduce possible patterns and pin-point colors from afar.

Figure 23:
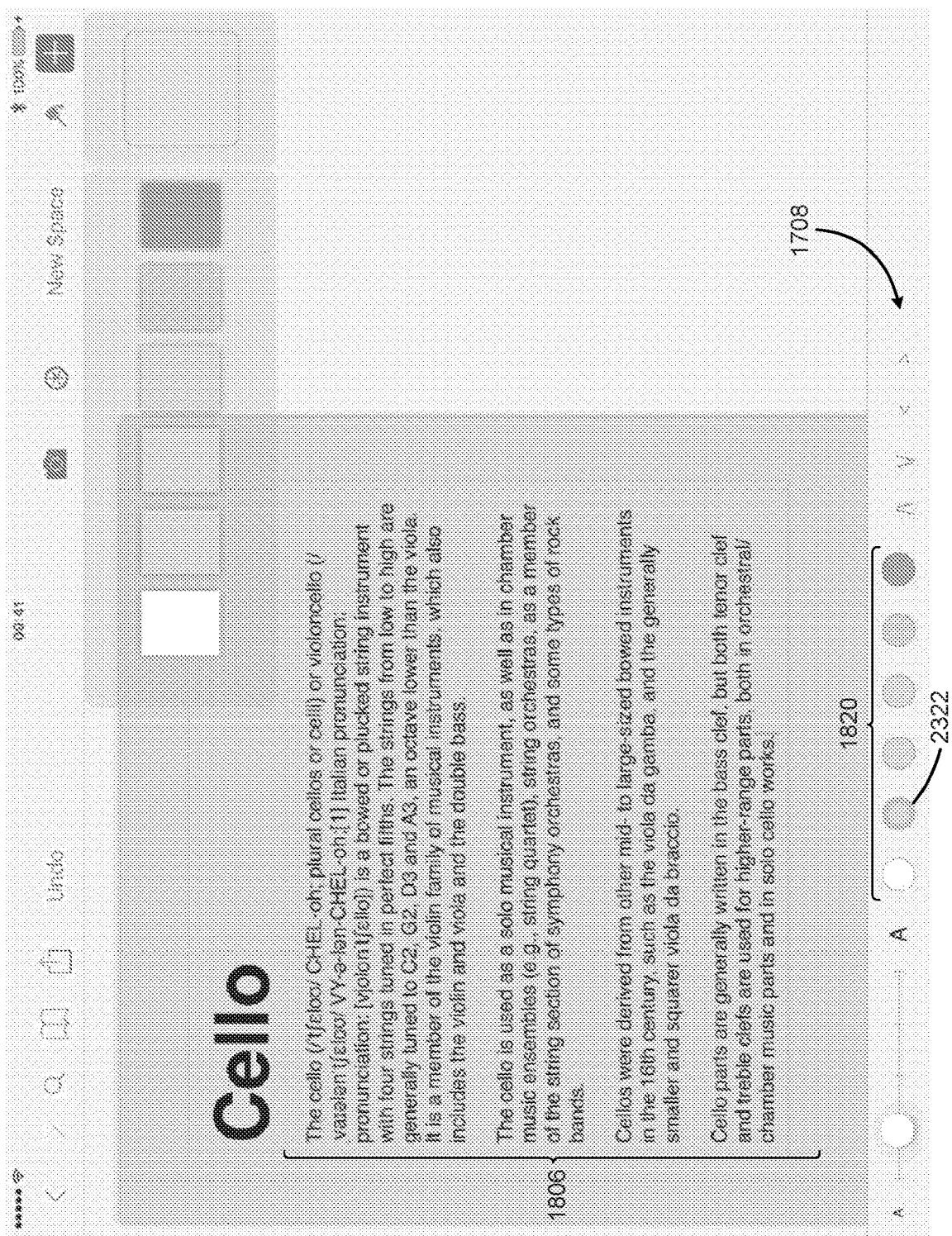

Following on once more from the single conventional-text containing "Cello" Zzote of FIG. 22, in FIG. 23 the user changes the color of the Zzote by pressing an alternative color button 2322 within the palette of color circles 1820. The user has pressed the second circle button 2322 in the typing toolbar 1708, which corresponds to blue in the original color version of FIG. 23. This second button 2322 is now shown highlighted with a ring around it. The background color of the entire Zzote has thus changed to blue.

Figure 24:
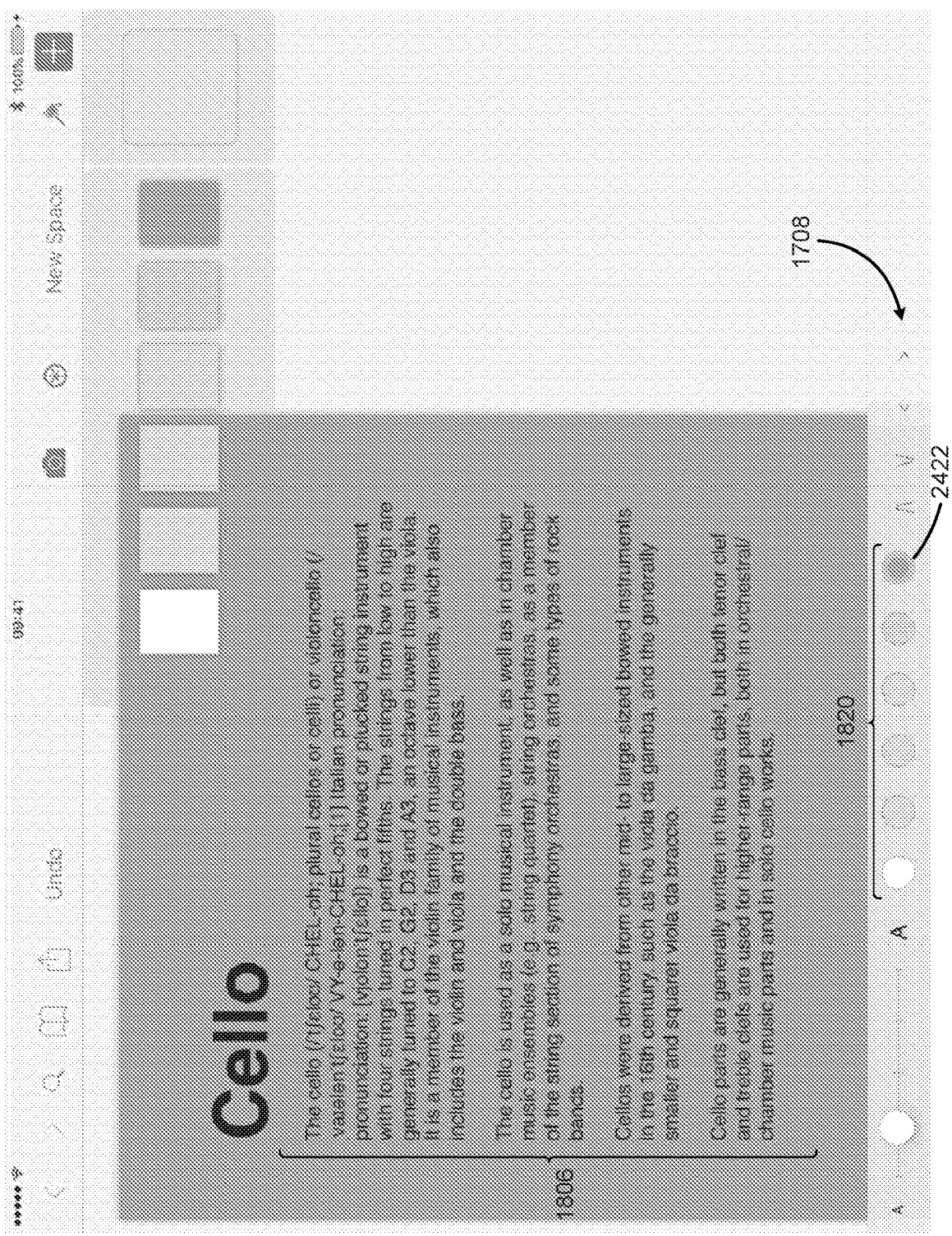

In FIG. 24, the user has pressed the rightmost color circle button 2422 in the typing toolbar 1708, which corresponds to the color red. The red color button 2422 is now shown highlighted with a ring around it. As shown in FIG. 24, the background color of the entire Zzote has thus changed to red.

Figure 25:
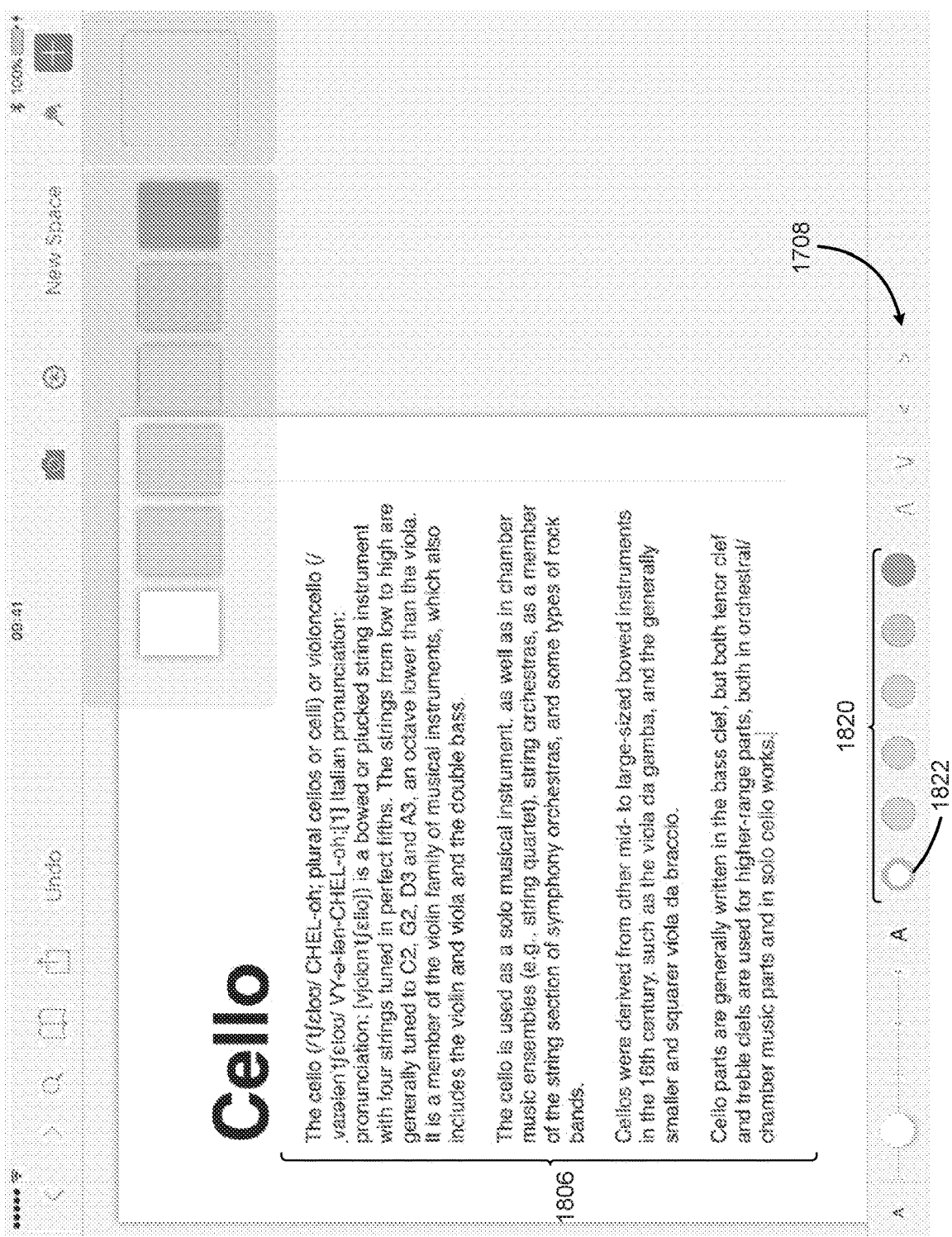

In FIG. 25, the user has pressed the leftmost circle button 1822 in the typing toolbar 1708, which corresponds to the original paper-white color. This button 1822 is now shown highlighted with a ring around it. Based on the selection, the background color of the entire Zzote has changed back to paper-white.

Figure 26:
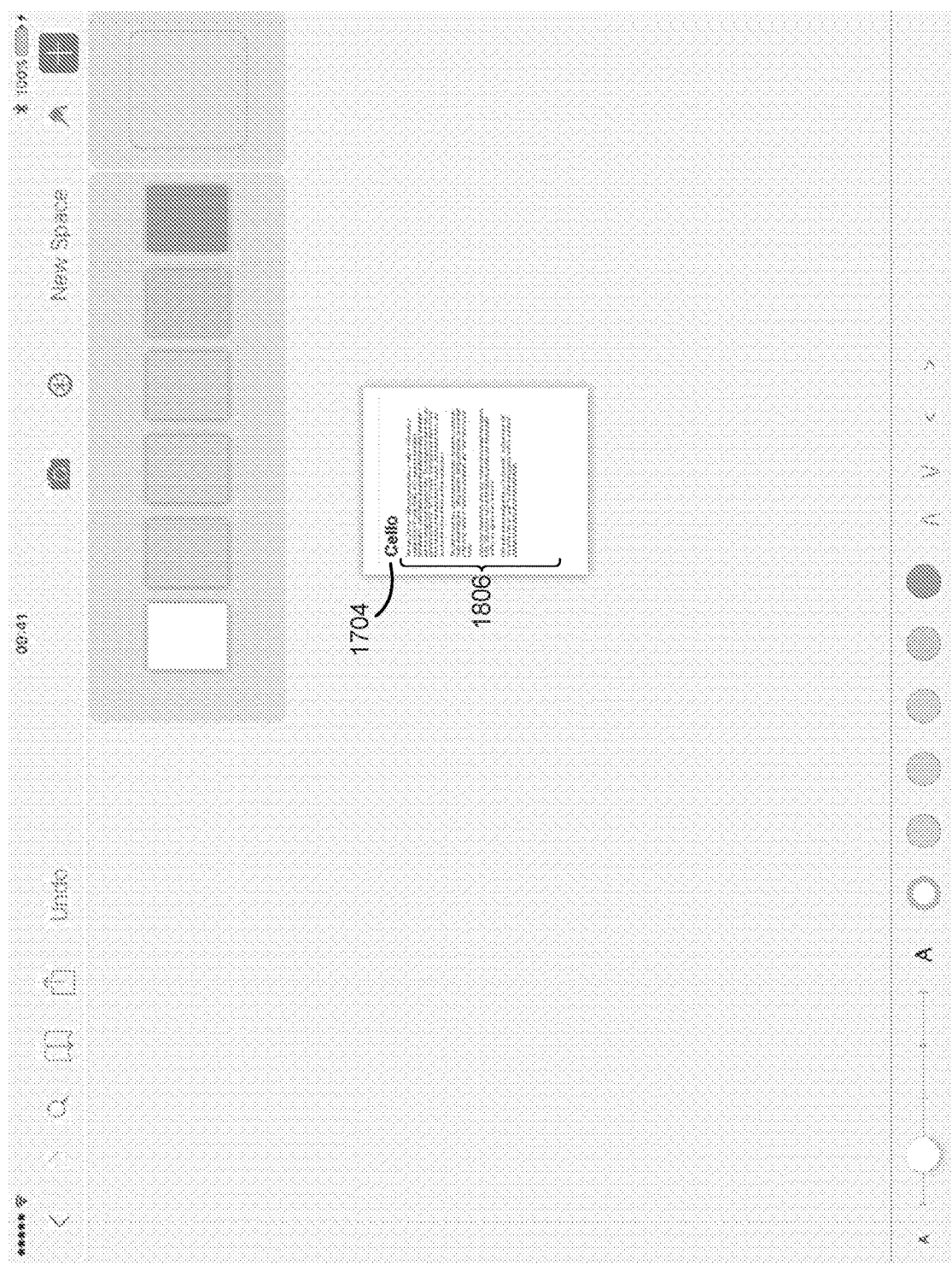
FIG. 26 illustrates the result of manually adjusting the viewport position and size in accordance with some implementations.

In addition to the automatic viewport adjustments based on user changes to font size within a Zzote, a user can manually adjust the viewport position and scale, as illustrated in FIG. 26. This is the same Zzote in FIG. 25, but displayed in a smaller scale. No actual Zzote dimension data (e.g., width or height) has changed. Note that the Heading 1704 is still readable at this small size, but the Detail text 1806 is no longer readable. Even though the Detail text is not readable, it is recognizable as written text, broken into four paragraphs.

The changes from FIG. 25 to FIG. 26 were achieved using pinches and pans to change the viewport position and scale of the entire canvas. The view of the Cello Zzote now appears much smaller and is displaced slightly. The user previously added this first Cello Zzote as described in FIGS. 11-25. In the case of the illustrated viewport adjustment from FIG. 25 to FIG. 26, the user simultaneously panned the horizontal and vertical position, and also resized the viewport as illustrated.

The manipulation of the viewport (either manually by the user or automatically in response to certain events) and the subsequent rendering of the visual representation of Zzote-Space at that position/scale is one important aspect of Zzote-Space. Techniques to manually manipulate the viewport include both single-finger and two-finger gestures as described below.

Lateral movements of one or more fingers on the screen causes the viewport to pan around in those directions. Unpinching two fingers causes the screen to zoom-in towards an extrapolated point at the centroid of the fingers' on-screen touch point. Pinching two fingers causes the screen to zoom-out away from an extrapolated point at the centroid of the fingers' on-screen touch point. Some implementations allow both pinching/unpinching and panning to occur simultaneously in many situations.

Some implementations translate finger gestures on a touch-screen into the variables of change (position and scale) for a theoretical viewport. Using these variables, the user interface updates the variables used by the Zzote-Space viewport, which is the viewing mechanism for Zzote-Space. With these variables in place, the rendering function has the information necessary to translate the database of Zzote locations into currently visible items on the computer display. If the computer display is updated at a reasonable interval (e.g., higher than 30 frames per second), the illusion of user-control of Zzote-space is effective.

Computer graphic rendering of the contents of the viewport: There are various possible implementations. In some implementations, computer graphic drawing routines proceed to render the objects determined beforehand to be visible at all onto the computer display in the viewport's visible region of Zzote-Space. If Zzotes are rendered onto the screen starting from largest (e.g., by width as the specific-size-metric) to smallest, then Zzotes will appear to be stacked upon each other as required.

There are many ways of implementing this rendering, as recognized by those skilled in the art of computer graphics programming.

In some implementations, the screen is drawn anew for every frame of the display. With appropriate computer hardware, this performs well. These implementations also have the advantage that each frame is precisely visually correct, and has not used any approximations from previous caching.

Other implementation variations utilize various caching techniques based on previous renderings of individual components to speed-up the rendering process. Some implementations utilize a Graphical Processing Unit (GPU) to store bitmaps of already rendered material, which can be rapidly re-scaled using inherent capabilities of the GPU hardware. Those skilled in the art of computer graphics programming understand whether or how to take advantage of a GPU and other processing and storage components of the particular computer hardware to which a specific implementation is targeted.

In some implementations, the result of viewport manipulation by the user and computer rendering of the visible region of Zzote-Space means that a view of Zzote-Space appears to respond to manual control by the user as intended. The viewport is manually controlled, and an appropriate display is produced.

Some implementations create an immersive, fluid illusion so that users feel like they are exploring some form of real space according to some form of alternative laws of physics. These alternative laws would be impossible to achieve outside of a computer-graphic device implementation. The user feels as though it has a reality to it, even though it would be impossible in reality.

The theoretically infinite (or vast) visible space (in size and unlimited/extensive ability to zoom into) provided by some implementations would be impossible to realize outside of a fast graphical computing device. The clustering, rearranging, and creating of portals of objects at any scale is also impossible outside of a computing device implementation.

In some implementations, the touching of the screen results in different responses depending on whether the touches have immediate velocity in some direction when the initial point of contact is first made. This is different from the user keeping their initial touches unmoving on the screen for a brief period of time before any movement (within a small margin of allowed accidental lateral movement).

If a touch has an immediate velocity, the user interface interprets the touch as a user intent to pan or change the scale of the viewport itself. In contrast, if the user's fingers remain still initially for a predetermined period of time t (within a small margin of allowed accidental lateral movement in that period of time), the user interface interprets the touch as an intent to perform another function such as picking up an existing object and moving or resizing it.

In some implementations, picking up an object is indicated by a shadow (or increased shadow) appearing around the object. This provides visual feedback to the user and provides the illusion that the object (or objects) is actually picked up and ready to be manipulated. In some implementations, when Zzotes and Zzote clusters are moved and/or resized, it is a form of being "selected," which is sometimes referred to as Zzotes being "Picked Up." The action of Zzotes being "Picked Up" is a way in which graphical information units can be selected according to user input. In some implementations, when Zzotes are "Picked Up," this is indicated by an increased shadow around specific Zzotes. In some implementations there can be more than one Zzote "Picked up" (i e, multiple graphical information units can be selected at the same time).

The period of time t for determining whether there is initial velocity varies by implementation, but is typically in the range of 0.01 to 0.2 seconds.

In some circumstances, a user may press and hold on the screen for a period of time that would qualify as picking up an object, but the user is not actually touching any object that can be picked up. In some implementations, such a touch is treated as an intent to adjust the viewport, with subsequent movement causing the viewport to pan and zoom.

In typical computer aided design (CAD) applications, touch behavior usually follows these rules: (i) if an object is already selected in some way, the lateral-velocity touch start moves the object itself without needing an initial period of being pressed and held; and (ii) if an object is not already selected, then a period of press and hold is required before any move is possible (otherwise the touches default to adjusting the viewport).

As indicated above, some implementations described herein do not apply the rules applied in typical CAD applications. In some implementations, this may relate to some of the unique aspects of a massively-zoomable viewport.

Often the selected object nearly fills up the entire visible viewport. In a zooming environment this can occur very often. It is not reasonable to require the user to mitigate for this in some way as might be appropriate in a non massively-zoomable viewport. In particular, consider the common case where the currently selected object is occupying a large area of the viewport due to the current viewport scale. If rule (i) were applied, a reasonable attempt by the user to pan the viewport could incorrectly result in the selected object itself being moved or altered.

Because of this, some implementations here typically require a "press and hold" on an object to pick it up for moving or resizing. This is required regardless of whether the object is already selected or not. This is actually beneficial for users. It is more common for a user to move and scale the viewport than to move and scale objects (Zzotes). Therefore, a requirement for a deliberate act of pressing and holding to initiate any move or resizing of a Zzote (whether already selected or not) is a useful feature. It is easy for the user to do, but requires deliberate intent. In analogy with a physical environment, it also feels natural to "pick up" an object before manipulating it.

There are some exceptions to the "press and hold" requirement. When a user grabs a new potential Zzotes from the Add bar, in some implementations it is always inferred that the user wants to pick it up and move it to the canvas. Therefore, there is no need to press and hold a potential Zzote. This saves time for a very common action.

When the user selects from a vertical scrolling list and wishes to immediately move sideways, the selection can proceed immediately without a press and hold. Examples of this include "grabbing" from lists such as a "Search List" or a "Bookmarks List." This also includes the Visual Clipboard, which in some implementations scrolls vertically when pushed vertically in either direction. The exception to the rule here similarly saves time for these very common actions.

In these exceptions, there is no alternative intent that the user could have meant, so the user interface provides these time-saving measures. This differs from touches to Zzotes on the main canvas, where it is always highly likely that the user intends to pan and/or zoom the viewport itself unless the user positively indicates otherwise by pressing and holding.

Some implementations vary (or omit) the "press and hold" requirement and other aspects of gesture responses.

Although the implementations described generally relate to direct user interaction with a computing environment, Zzote-Space can also be applied to other display and interaction environments, such as Virtual Reality and Augmented Reality.

There is no specific form of computer graphical display and user input device that a specific implementation requires. The main example implementations in this document refer to a touch-screen device.

Some examples of display devices include: (i) large and small screens; (ii) projected screens; (iii) screens in Virtual Reality type headsets and other displays; (iv) screens in Augmented Reality type headsets and other displays; (v) screens within contact-lenses; and (vi) any other technique for simulating images to the human brain.

Many forms of computer graphic display hardware are suitable. The primary requirement is that a computer graphic display can accurately render shapes. Some examples of input devices include: (i) touch and gestures on a touch-screen; (ii) keyboards; (iii) mice; (iv) input devices that can detect motion, acceleration, and/or alignment changes (e.g., gyroscopes and accelerometers); (v) use of Virtual Reality controllers, such as gloves; (vi) inferred gestures (e.g., mid-air hand gestures) without actually touching anything (for example by using computer inference as to the position of aspects of the human body); (vii) inferred intentions from eye movement; (viii) any other inferred intention from the human brain or body; and (ix) many other computer input devices. The requirement is that an input device can accurately infer intent of direction and/or action.

Some actions to be inferred include panning and zooming the viewport. In some implementations, a user pans and zooms the viewport using whatever series of detected inputs can achieve this. Inferred actions can also be used for picking up and positioning/resizing new and existing Zzotes. In some implementations, the ability to indicate the intent of start and end of a specific action enables editing (e.g., moving/resizing) and adding Zzotes. Implementations use various different input techniques to manipulate position and/or size of objects as is known in the art.

Implementations also provide for capturing new information, such as text, images, and sourced documents. Various means are available for capturing information. For example, speech recognition applications can capture the entry of text. Cameras, other image sensors, and drawing devices/applications are able to capture images for input into Zzotes.

In addition, there are various means for selecting source materials, such as speech recognition-based responses to "search" requests.

The preceding FIGS. 11-26 have so far largely illustrated the situation of adding, editing, and viewing a single Zzote, which is not the typical case. In general, there are multiple Zzotes, and there are various interactions between them.

Figure 27:
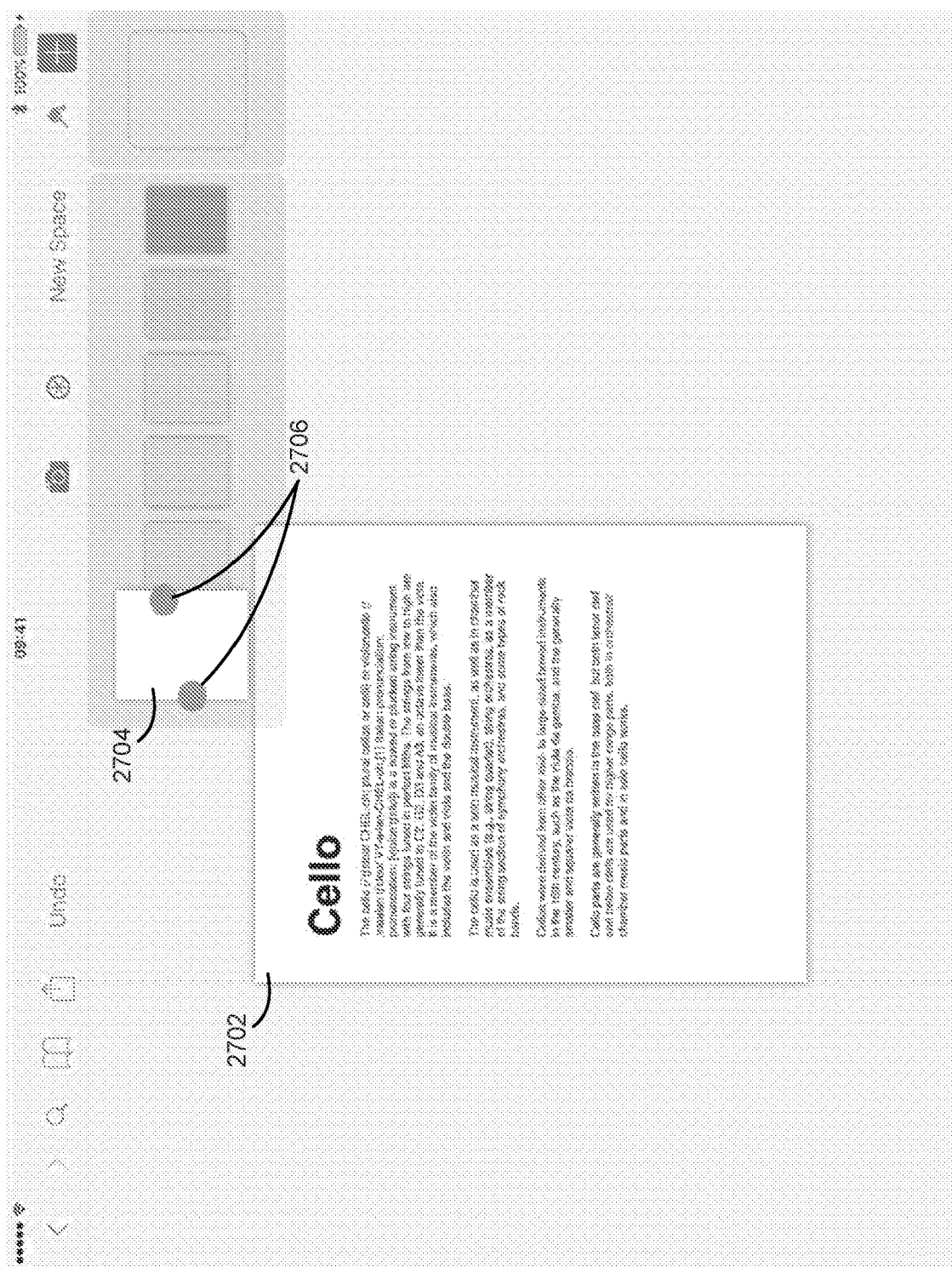
FIGS. 27-30 illustrate sizing and positioning a second graphical information unit to automatically cluster with a first graphical information unit in accordance with some implementations.

FIG. 27 illustrates adding a second Zzote, and begins to illustrate size-based Zzote clustering rules. FIG. 27 is a continuation from FIG. 26, after the viewport has been resized to view the first Zzote 2702 (Zzote "A") in greater detail by appearing larger on the display. The user grabs a second potential Zzote 2704 (Zzote "B") to place either directly on the canvas or placed overlapping and above or below the first Zzote 2702 (Zzote "A") to form a Zzote cluster.

The user picks up the second potential Zzote 2704 from the Add bar. In this example the user uses two fingers to pick it up as shown by the dots 2706 in FIG. 27.

Figure 28:
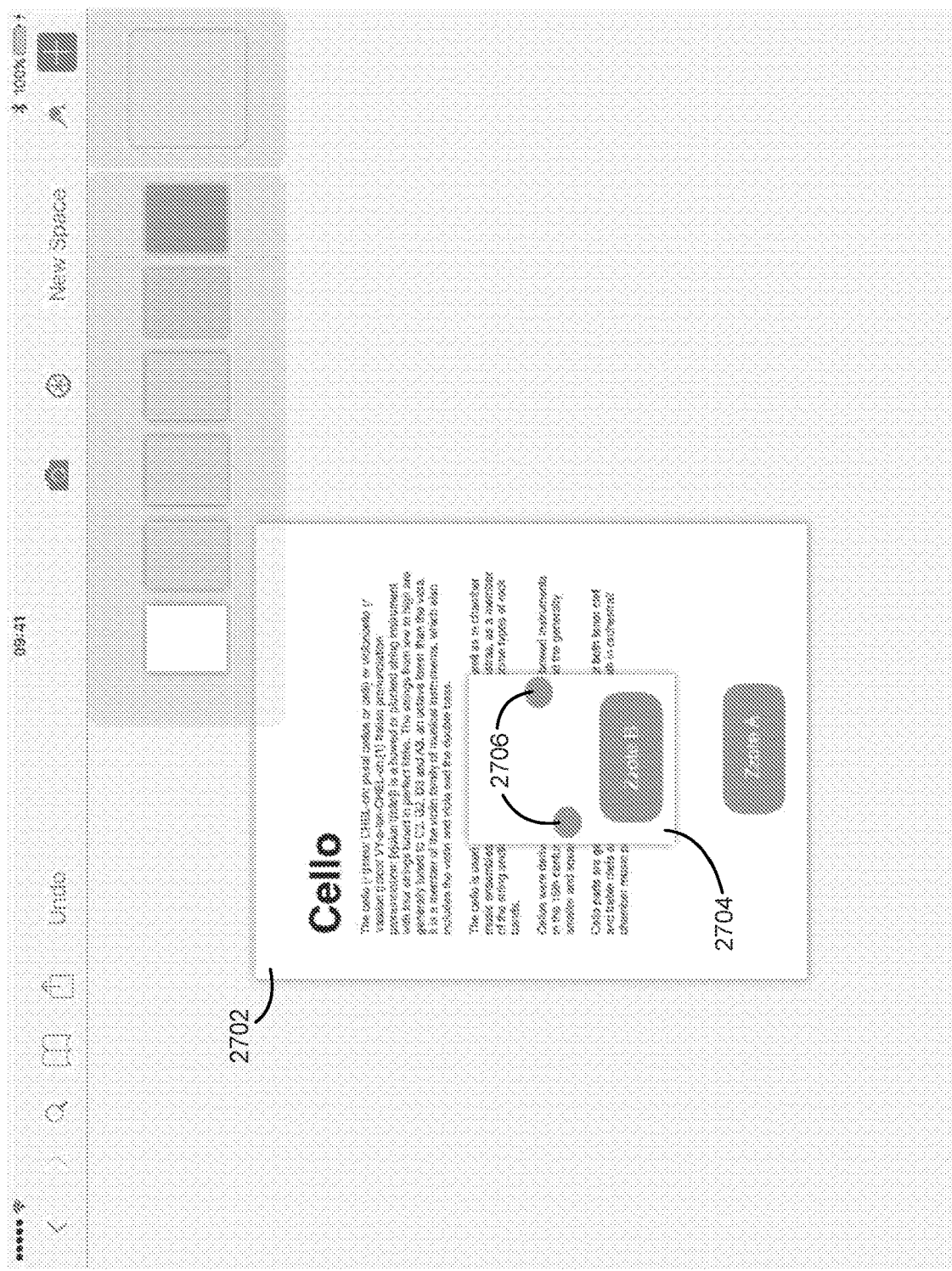

This second potential Zzote 2704 is alternatively referred to as potential Zzote "B" for simplicity. As illustrated in FIG. 27, the user is still touching the screen (the fingers have not been released). The user then drags the second Potential Zzote 2704 over the first Zzote 2702 (which is also referred to as Zzote "A" for simplicity), as illustrated in FIG. 28. The width of Zzote "B" is smaller, so it rises above Zzote "A." If the position and size of Zzote "B" were finalized here, Zzote "B" would effectively attach itself and belong to Zzote "A" (a child of Zzote "A"—typically referred to as a "sub-Zzote" of Zzote "A").

In FIG. 28, the second potential Zzote 2704 is being dragged and sized with two fingers as indicated by the two dots 2706. This is a continuation of the same action with the same second potential Zzote 2704 from FIG. 27. The user is still holding the fingers on the canvas, so the action is still in progress.

The second potential Zzote 2704 still has a smaller width than the first Zzote 2702, and the area of the second potential Zzote 2704 overlaps with the area of the first Zzote 2702. This is the user's decision, because the user is directly manipulating the second potential Zzote 2704. As illustrated in FIG. 28, the user interface has displayed the second potential Zzote 2704 above the first Zzote 2702 in accordance with the general principles of Zzotes. In some implementations, the following rules are hence observed.

In some implementations, these general principles encapsulate information by automatic raising and lowering internal shapes based on size, and can be summarized as:

Zzotes contain information. They are positioned and sized anywhere in Zzote-Space. Inferences about the relationships between Zzotes is inferred from their position and size relative to one another.

The next three rules below are applicable when the area of Zzote "B" intersects the area of Zzote "A" (i.e., they fully or partially overlap);

if the size of Zzote "B" is less than the size of Zzote "A," Zzote "A" is displayed below (behind) Zzote "B" on the computer graphic display. When the position/size is finalized (i.e., when this is intended to be the final location/size), then Zzote "B' behaves as though it "belongs" to Zzote "A." Hence, Zzote "A" is then a parent Zzote of its sub-Zzote Zzote "B" (which can be described as "a parentage determination rule");

if the size of Zzote "A" is less than the size of Zzote "B," Zzote "A" is displayed above (on top of) Zzote "B" on the computer graphic display. When the position/size is finalized (i.e., when this is intended to be the final location/size), then Zzote "A" behaves as though it "belongs" to Zzote "B." Hence, Zzote "B" is then a parent Zzote of its sub-Zzote Zzote "A" (which can be described as "a parentage determination rule"); and if the size of Zzote "A" is equal to the size of Zzote "B," then it is arbitrary which Zzote is the parent of the other (which can be described as "a parentage determination rule"). Some implementations take no action to avoid this outcome, but other implementations avoid this by ensuring that equality does not occur, and that the size of one of the Zzotes is altered by a very small amount (relative to its own size) so that the sizes are not identical.

In some implementation there are additional rules, which can be summarized as:

in information terms, a sub-Zzote is regarded as being a detail of the parent Zzote. (As any sub-Zzote can itself be a parent Zzote containing its own sub-Zzotes and so forth, all of a theoretically unlimited hierarchy of increasingly small descendants are also ultimately regarded as details of the original parent Zzote);

subsequent to the parentage determination, if a parent Zzote is moved and/or resized, all of its sub-Zzotes (and thus including all levels of descendants because they are in turn sub-Zzotes of the sub-Zzotes and so forth) are moved/resized with the parent while maintaining the same proportions relative to each other. The sub-Zzotes (including all levels of descendants) are effectively "attached" to the parent Zzote and their information content is effectively a detail of the parent's information content;

if Zzote B is a sub-Zzote of Zzote A, navigation of the contents of Zzote A will reveal an inner hierarchy containing Zzote B and any other such sub-Zzotes. (If sub-Zzotes such as Zzote B themselves have their own sub-Zzotes and onwards to further levels of descendants, then the hierarchy can be increasingly navigated through all such descendants of Zzote A);

if a parent Zzote is "linked to" by a Zzote-Link, then all of its sub-Zzotes are effectively "linked to" within it. That is, a Zzote-Link (in situ) "portal" which links to the parent Zzote will see all of the sub-Zzotes of the parent Zzote, the sub-Zzotes of those sub-Zzotes and so forth through the theoretically unlimited levels of increasingly small descendants. (In some implementations, a viewport is zoomed into as required to view/edit/add/delete to such levels of descendants within the Zzote-Link portal);

from the above rules it is possible for a given Zzote to have more than one parent Zzote in some implementations. (However, some alternative implementations prevent a Zzote from having more than one parent.) Indeed, (in multi-parent allowing implementations) many parents can all share the same Zzote as their sub-Zzote. In this case, navigating (hierarchically downward) from any of the parent Zzotes will indicate the same Zzote within its hierarchy. If any of the parent Zzotes is moved/resized, its sub-Zzotes (and their descendants) will move/resize with that parent Zzote. This may result in some of the sub-Zzotes (and/or further levels of descendants) no longer belonging to some of their former parent Zzotes depending on the specific movement and/or resizing that occurred. In addition, as a result of a move and/or resize, a given sub-Zzote (and/or further levels of descendant) may gain one or more new parent Zzotes. This results from the above rules that determine parentage;

any Zzote that is already a sub-Zzote of another Zzote of greater size than itself, can become a parent Zzote to other (overlapping) Zzotes of smaller size than itself in the same manner;

there is no theoretical limit to the allowed maximum or minimum size of a Zzote. Similarly, there is no theoretical limit to the maximum levels of the Zzote hierarchy (sub-Zzotes within sub-Zzotes and so forth). However, some implementations impose fixed limits on any of these aspects, while other implementations have very large maximums (and small minimums) or no limits; and there is no theoretical maximum or minimum level to the scale of a viewport within which a computing display can render the Zzote structures. Thereby in some implementations a Zzote of any given size may be viewed/edited by the user at an appropriate scale as required. However, some implementations impose fixed viewport scale limits, while other implementations have very large maximums (and small minimums) or no limits.

Some implementations have more specific variations to these general rules (the specific variations are used in the implementation described herein, but one or more are omitted in other implementations):

in some implementations, the "size" of a Zzote (as referred to in the above rules) is measured by the width of the Zzotes (this is used in the implementation described herein), but in other implementations, the size is measured as the area of the Zzotes, the height of the Zzotes, or an alternative attribute that measures size. How the "size" of a Zzote is measured in an implementation with regard to such relative size determination (e.g., by width of Zzote) is also referred to as the specific-size-metric;

in some implementations, Zzotes are allowed to have shapes that are not rectangular. However, if Zzotes are rectangular, then it follows from geometry that to check whether the area of a smaller Zzote intersects/overlaps the area of a larger Zzote, it is sufficient to check whether any of the smaller Zzote's vertices are within the area of the larger Zzote. (Those of ordinary skill in the art will be aware that although this is sufficient for most situations, this is an approximation and more geometrically rigorous techniques for testing for the intersection of two rectangles can be used instead); and suppose that a Zzote Y is initially determined from the above rules to have multiple parents based on position and size. If any of these initial determined parents is itself an ancestor (e.g., parent or grandparent) of any other of the initially determined parent of Zzote Y, then in some implementations they are not counted as also being a "parent" of Zzote Y. This prevents labelling an ancestor in multiple way, such as both a parent and a grandparent of Zzote Y (e.g., so labelled as a grandparent of Zzote Y only).

Some implementations have variations and/or omit one or more of all the above rules for general principles for encapsulating information by automatic raising and lowering internal shapes based on size.

In some implementations, the user interface does not require the following actions by the user as required in typical CAD applications that allow shapes to be added to a canvas:

Group and UnGroup

Move Back and Move Forward

In some implementations, these actions are effectively automatically performed by simply following the above rules. By removing these laborious tasks, clustering of information happen almost effortlessly for users. By the automatic appliance of the rules, it also ensures integrity and consistency of behavior of the clusters.

Psychology is important. For example, consider if the actions are not automatically performed by an implementation following the rules. Just because a user "could" manually use "Group" and "Move Forward," it does not mean that they would be inclined to do this when they have many other things to think about. If "Group" and "Move Forward" are left to the user's discretion, there is the likelihood that the user will not be consistent in the usage of such behavior all of the time. Users can easily forget, or not consciously understand the rules unless it is enforced within the application itself. Because of this, the resultant manually created clusters of information could not be trusted to follow any particular set of rules, and the subsequent reliance that the principles had been enforced (for example to navigate, move, and link to prior clusters) would not be valid. This illustrates why some implementations do follow the rules to effectively automate those actions.

As noted above in FIG. 28, the width of Zzote "B" is smaller, so it rises above Zzote "A." Zzote "B" would attach itself and belong to Zzote "A" if its position and size were finalized here. Because the second potential Zzote 2704 has a smaller width than the first Zzote 2702 and the two Zzotes overlap, this is the proper clustering behavior according to the rules. This clustering factors into the user's decision while positioning and sizing the second potential Zzote 2704. The decision typically relates to the currently perceived information relationship between the Zzotes.

The real-time display clearly indicates how Zzotes would be clustered if placement were finalized in any current situation. Because the fingers are still touching the display, the user may decide whether this is appropriate positioning. However, the user interface shows in real-time what the outcome would be if the user did finalize the placement here. The real-time display helps the user to decide where to finally place any Zzote (and implicitly any cluster of Zzotes).

Most implementations include this real-time display, but some implementations omit this feature.

Figure 29:
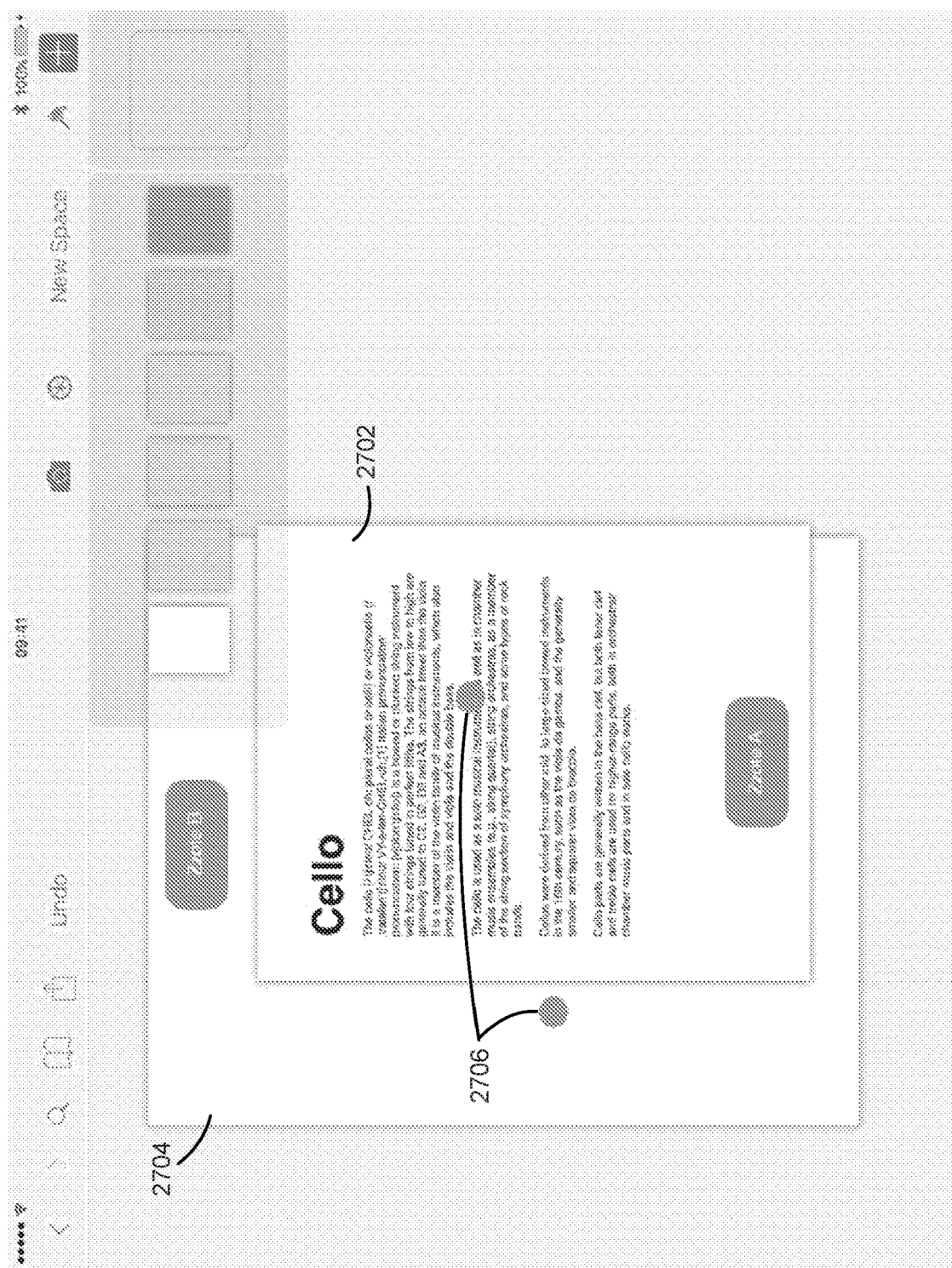

As illustrated in FIG. 29, the user now expands the size of the second potential Zzote 2704 (by unpinching at the two touch points 2706) so that it has a width that is greater than the width of the first Zzote 2702. Now, the first Zzote 2702 would be attached and belong to the second potential Zzote 2704 if positioning and sizing was finalized here.

This is still a continuation of the same gesture from the FIGS. 27 and 28. The second potential Zzote 2704 is being dragged and sized with two fingers as indicated by the two dots 2706. (In accordance with previously described principles, it can be seen that "sizing acceleration" (sometimes referred to as a multiplicative "magnification" factor) has successfully magnified the width of the second potential Zzote 2704 relative to the spacing between the fingers.) The fingers are still on the screen, so the action is still in progress.

Because Zzote "B" is now bigger than Zzote "A" and the two Zzotes still overlap, the user interface now displays Zzote "B" below Zzote "A." Within a single fluid variation of size (by pinching or unpinching the fingers in this case), the semantic meaning of Zzote "B" relative to Zzote "A" has been inverted. That is, if the configuration is finalized as shown in FIG. 29, the information of Zzote "A" would now belong to Zzote "B." This is the opposite of the situation in FIG. 28.

This is an important aspect of Zzote-Space. This novel simplification makes both initial and retrospective organizing of information into hierarchies far easier to achieve than was previously possible. Because reorganization occurs frequently, particular over time, this is a powerful advancement in user interface design.

It is a novel simplification that alternating between a Zzote being above (because it is smaller and hence "contained") or below (because it is larger and hence "containing") is all part of the same unified gesture.

By comparison, a user of a typical user interface would need to predetermine whether something was a folder or not, and predetermine the hierarchical relationship between folders.

But in the present disclosure, the entire decision about how information is encapsulated is totally fluid and flexible at representing the subtle changes of semantics in information contexts. The value of these features becomes even more clear when applied to real examples with actual information.

As seen in the transition from FIG. 28 to FIG. 29, the user interface has enabled the second potential Zzote 2704 to go "Backwards" without the user having to manually press a "Backwards" button.

Figure 30:
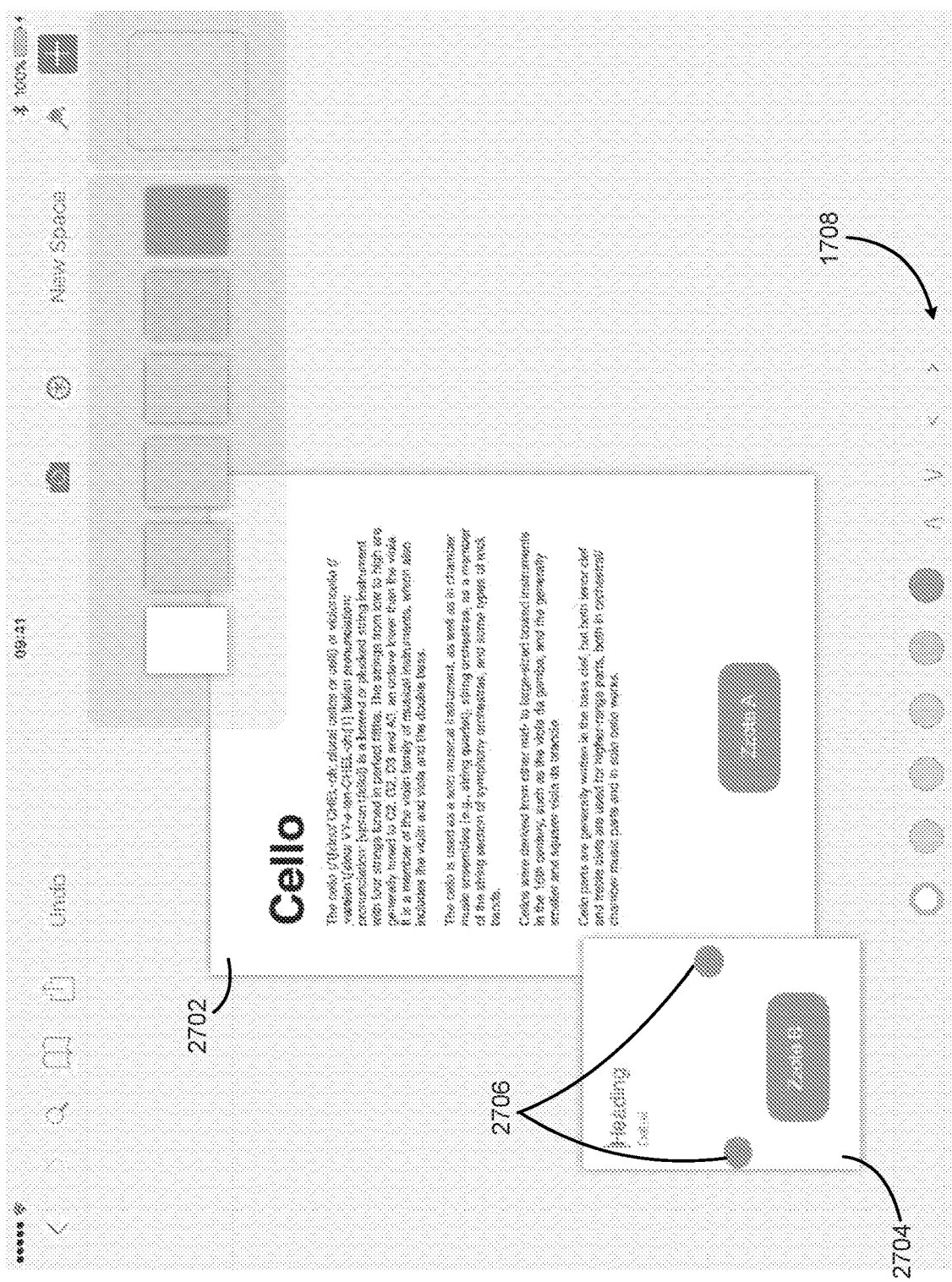

In FIG. 30 the user reduces the size of the second potential Zzote "B" 2704 and positions it over a margin of the first Zzote "A" 2702. It is partially overlapping, so it is still on top of the first Zzote 2702. The fingers are released, so Zzote "B" is now placed ("finalized") here (as a "Real" Zzote saved in Zzote-Space as opposed to just a "Potential" Zzote prior to this). Zzote "B" is now attached to Zzote "A." In information terms, Zzote "B" now belongs to Zzote "A" in a hierarchy.

This was still a continuation of the same gesture from the FIGS. 27-29. The second Zzote 2704 was thus dragged (moved and sized) with two fingers as indicated by the two dots 2706. FIG. 30 indicates the actual size and position that the user wished to be finalized.

FIG. 30 depicts the time after the two fingers have just been released from their positions shown. Subsequently, Zzote "B" is finalized and placed as shown.

The user interface then enters a typing mode, and is awaiting entry of a Heading for Zzote "B." The Typing bar 1708 is thus displayed at the bottom of the screen.

It is readily seen in FIG. 30 that the area of Zzote "B" overlaps the area of Zzote "A" and that Zzote "B" has a smaller width than Zzote "A." Therefore, according to the rules, Zzote "B" is stacked above and is "contained by" Zzote "A." Zzote "A" is a parent of Zzote "B" and Zzote "B" is a sub-Zzote (i.e., a child) of Zzote "A." If Zzote "A" is moved or resized, Zzote "B" will automatically move and resize with it while maintaining the same proportionate size and position to it.

The margin is a useful location to fully or partially place sub-Zzotes because it creates the parent/child relationship without obscuring information in the parent. In the case shown in FIG. 30, Zzote "B" is in the margin (in the conventional word-processing sense) of Zzote "A." In some implementations, Zzotes have margins as a useful location for other Zzotes to be placed there. In other implementations and as an option within other implementations, some Zzotes have no margins or the size (or absence) of margins from any number of edges is variable on a per-Zzote basis.

In FIG. 30, the use of margins means that Zzote "B" can be vertically alongside some text within Zzote "A" (it's final paragraph) without obscuring it. Note that Zzote "B" does not sit entirely within the margin of Zzote "A," but partly overlaps it. If Zzote "B" were smaller, it could sit entirely within the margin without overhanging the edge, but this is entirely at the discretion of the user.

Allowing a sub-Zzote to overhang the edge (of its parent Zzote) actually creates a more memorable and interesting shape, and is generally encouraged. Also, by overhanging the margin as in FIG. 30, the sub-Zzote can be larger without obscuring any detail of its parent Zzote.

The exact position of Zzote "B" can be deliberately alongside some specific aspect of the detail of the parent Zzote, such as a line or paragraph of text (or relevant part of an image) for example. Users can use purely subjective or arbitrary decisions when determining where to position and size Zzotes.

Alternatively, the new Zzote can be placed anywhere on the first Zzote when the positioning is not critical. A Zzote can be placed at any position and size when a user "feels" that it is aesthetically or semantically appropriate, even if the reasoning is not precise. In general, any human-directed decision is still of value to another mind looking at the shape.

For many Zzotes (e.g., Heading Only, Or Heading with minimal Detail, which are quite common in typical use), it is possible to place sub-Zzotes (such as Zzote "B" in this case) entirely within the area of its parent Zzote (Zzote "A" in this case), or with just a small amount of 'overhang' over the edges.

In other cases (e.g., when Zzote "A" is a document full of text, is a picture that should not be obscured at all, or it is desirable to place Zzote "B" in the margin alongside some vertical/horizontal position or specific aspect of the content of Zzote "A" without obscuring it), placing Zzote "B" in or overhanging from the margin is an excellent solution.

Such margin-placed Zzotes can themselves be used for stacking and containing additional Zzotes and Zzote-Links without limit. In these cases, their own margins can be used in a similar fashion (and so forth without theoretical limit).

In general, overhanging a sub-Zzote from the main shape of a parent Zzote creates more memorable, attractive, and real-world looking structures (though impossible to realize outside of a graphical computing device), which embody some information concept of the Zzote cluster.

This may initially appear to be logically irrelevant and trivial, but one important aspect of some implementations is to engage with the natural spatial and physical object engaging abilities of the human mind, which is naturally engaged and interested by irregular real-world objects with distinct and varied edge shapes. Interesting, irregular clusters prompt the human mind to make sense of what would otherwise be graphically featureless information (apart from the words themselves, which hopefully have meaning).

In this way, the user interface turns words into zooming graphical shapes, which is satisfying and productive for the human mind. This helps users with understanding, seeing, and forming patterns with information. It is a valuable aid for memorizing or at least creating a sense of familiarity with structures of information.

Were it not for the unlimited (or extensive) zooming capabilities of Zzote clusters on a graphical computing device, the ability for such graphical shapes to contain sufficient meaningful information would be greatly hindered. Were it not for the novel clustering abilities, the words of the information could not be easily rearranged to improve their semantic sense.

Figure 31:
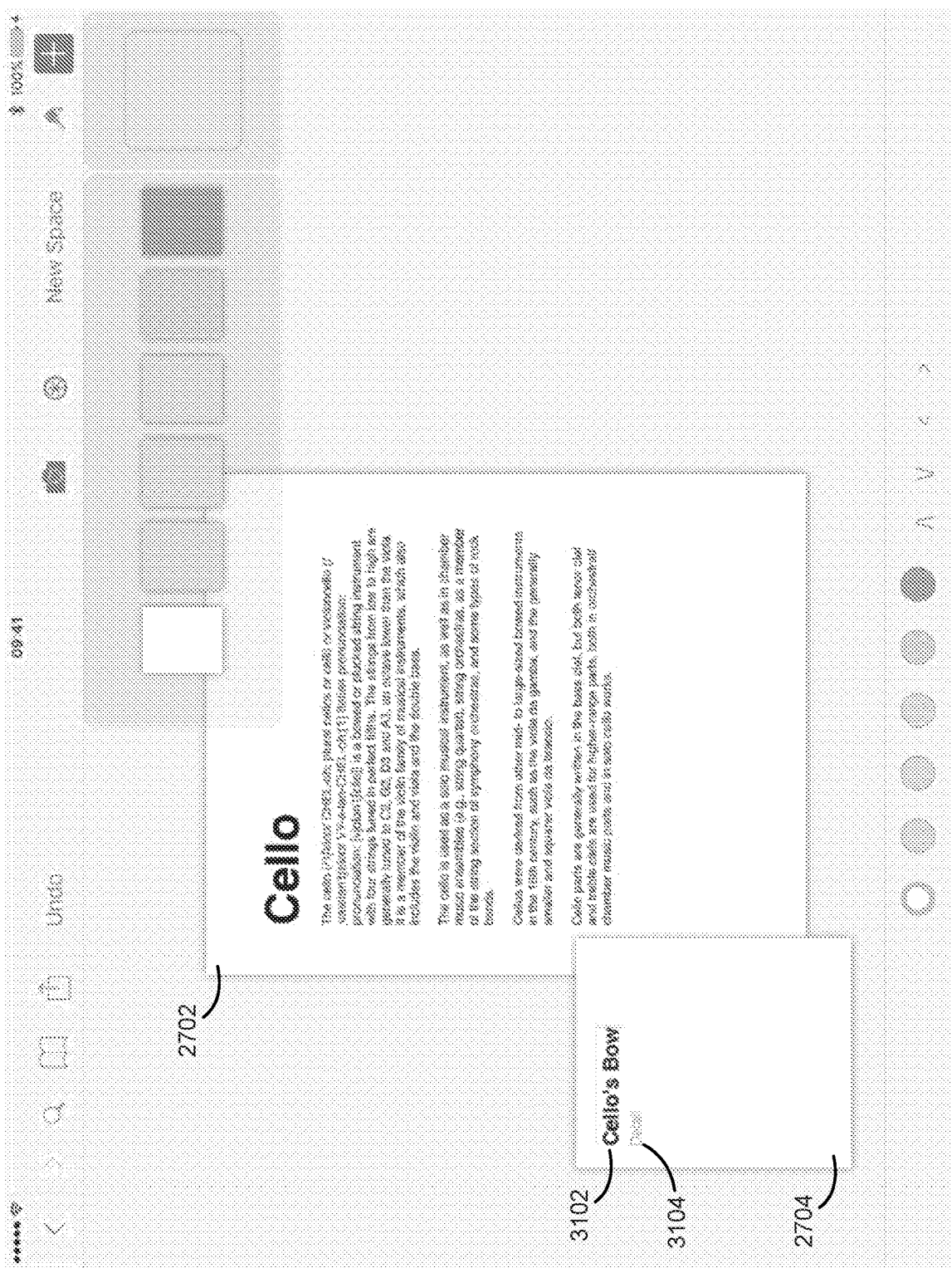
FIGS. 31 and 32 illustrate adding a heading and initial detail to a new second graphical information unit in accordance with some implementations.

In FIG. 31, the user enters Heading text 3102 for the new second Zzote 2704, which in its current size/position belongs to and is viewed as a sub-Zzote of the first Zzote 2702. Entering of Heading text is based on text entry principles described above. It is the same process as when the first Zzote 2702 was created.

Because the second Zzote 2704 is a sub-Zzote of the first Zzote 2702, it should provide detail (e.g., "Cello's Bow") for the parent Zzote 2702 ("Cello"). This subject is an appropriate sub-component of the more general subject of "Cello." After entering the text, the user presses return or taps on the Detail placeholder 3104 to begin entering Detail text.

Figure 32:
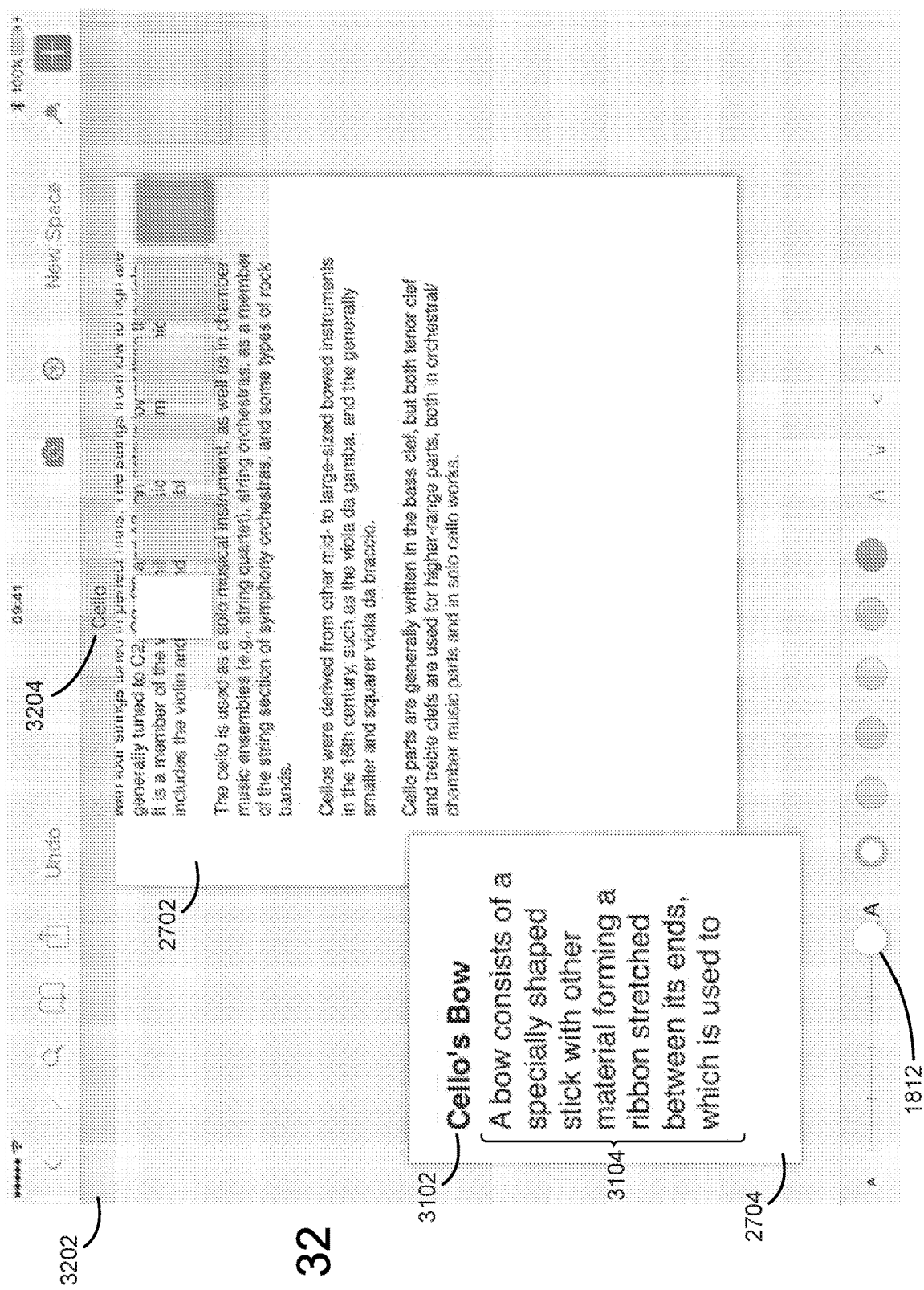

In FIG. 32, the user manually zooms and pans the viewport before typing. This was not required, but the user wanted to focus more attention on "Cello's Bow," prompting the zoom. In some implementations, a Path bar 3202 (described below) appears as a result of the zooming and panning. By default, the entered Detail text 3104 for this sub-Zzote initially has a large Detail font size. Note that the fluidity of being able to adjust the viewport at any time is common for Zzote-Space.

Also, if the user were to decide to add sub-Zzotes to this new Cello's Bow Zzote 2704, then its larger size makes such actions easier.

Because the entire hierarchy of the selected Zzote 2704 can no longer be fully seen (e.g., the Heading for its parent Zzote 2702 is not visible), the user interface displays the Path bar 3202. In some implementations, a Zzote in typing mode is always selected, even though the distinctive selected ring may not be shown in some implementations.

Within the viewport, the user is typing into the Cello's Bow Zzote 2704. The Cello's Bow Zzote 2704 is a sub-Zzote of the Cello Zzote 2702. However, due to the change in viewport (in this case mainly due to the zooming-in by the user), the Heading of the Cello Zzote 2702 is no longer visible. The last few paragraphs and most of the edges of the Cello Zzote 2702 are visible, but the Heading is above the top of the viewport and out of sight.

Some implementations address this by displaying the Path bar 3202 which shows where a selected Zzote is within its Zzote cluster, if applicable. Some implementations display this otherwise missing information (the full hierarchy, including parents, grandparents, and so forth) in the form of an on-screen caption in the Path bar 3202.

In the illustrated implementation, the Path bar 3202 is a horizontal bar at the top of the viewport. Within that bar 3202 is the word "Cello" 3204, which is the entire hierarchy for the selected Zzote 2704. Most implementations use the Heading text (or an abbreviation thereof) to show the lineage in the Path bar 3202. In some implementations (not shown in this figure), specific Zzotes represented within the path lineage may additionally include small "icon sized" thumbnails of the Zzote's content alongside any such Heading text. In some implementations, such thumbnails are only included if the specific Zzote in the lineage contains an image or sourced extract such as a document or webpage.

This information is similar to the path bar seen in some filing systems. The Path bar 3202 here, however, includes several novel features. FIG. 32 depicts one of the simplest possible examples of the Path bar 3202 in use.

Some implementations only display the Path bar information when it is necessary for the user (e.g., it cannot be inferred directly from the viewport itself). For example, if the user were to shrink the viewport momentarily so that the top of the Cello Zzote 2702 could be seen, some implementations automatically hide the Path bar 3202 because it is no longer necessary.

In FIG. 32, the user enters Detail text, but will soon run out of space if the user continues to enter further text at this font size. At the moment, the font size for the Detail text 3104 is still the default maximum size (the Font-Size slider 1812 is still aligned at the maximum rightward position, as shown).

Figure 33:
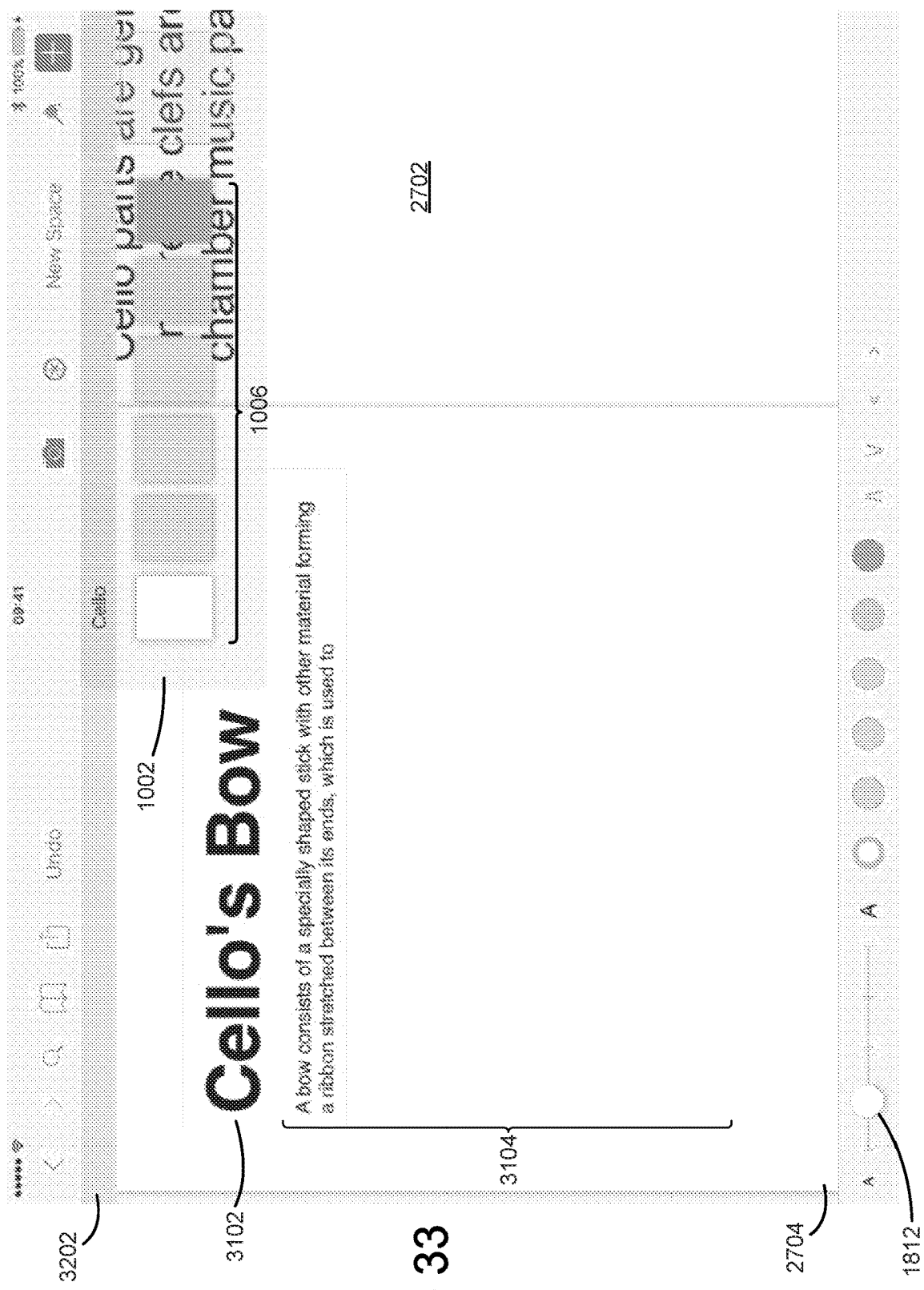
FIG. 33 illustrates adding increasingly detailed text to a new graphical information unit due to the zooming viewport.

To address this, the user reduces the font-size of Detail text to "fairly small," as illustrated in FIG. 33. Because of the smaller font size, the viewport automatically zooms in. This appears to turn this sub-Zzote 2704 into a full-size document.

The user has adjusted the Font size slider 1812 to the position one from the left (i.e., "fairly small" text). The figure shows the situation after the viewport has automatically adjusted itself (by zooming in and panning) to ensure the new font size is still readable.

As the slider 1812 was moved, the font size changed to the smaller sizes in real-time.

When the finger was released from the font size slider 1812 (or paused long enough, such as 0.1 seconds in some implementations), the user interface inferred that the viewport should now adjust itself so that the detail text becomes readable. Otherwise the text would be too small to read in the previous viewport configuration.

The viewport has used the same previously described "viewport re-adjustment algorithm" to display the Cello's Bow Zzote 2704 so that the now small Detail font size is readable. As seen in FIG. 33, the viewport scale and its position has been adjusted to fit the document on the screen as well as possible. The viewport has changed by the minimum possible amount in order to satisfy readability requirements. Some implementations display an animation for the user to visually show what has happened. Such an animation provides a fluid sense of the change in information context.

The Cello's Bow Zzote 2704 previously appeared to be a footnote to the Cello document Zzote 2702, but now takes the form of a document in its own right.

Note that the Path bar 3202 is even more important in FIG. 33 because the Cello Zzote 2702 cannot be clearly seen. Some of its Detail text can be seen in the large displayed font to the upper-right of the viewport (behind the Add bar 1002). If the Cello Zzote 2702 has a specific color, that color is what appears as a background behind the "Cello's Bow" Zzote 2704. (In FIG. 33, the specific color of Zzote 2702 is paper-white.)

FIG. 33 also shows the ability to add further graphical information units to a new graphical information unit in accordance with some implementations. From FIG. 33, it can be seen that at this moment, the user could easily add further sub-Zzotes to the Cello's Bow Zzote 2704. This would be using the same technique as previously described for adding Zzotes but would now be at a higher level of viewport zoom and a greater level of hierarchy. This represents the powerful (theoretically) near-unlimited capacity of Zzotes to contain ever more information. For example, In FIG. 33, the user could choose to "pick up" a new Potential Zzote from one of the Zzote pads 1006. (This would be equivalent to the sequence described in FIGS. 27-28.) In FIG. 33, such a new Potential Zzote could then be dragged and positioned/sized somewhere such as within the currently largely blank Detail text region 3104 on Zzote 2704 below the existing text. This process of adding new Zzotes can be repeated without theoretical limit both at the viewport scale of FIG. 33 and at ever zoomed-in scales to add possible new sub-Zzotes of sub-Zzotes and so forth.

Some implementations enable a user to create a new Zzote by designating its position and/or size prior to addition to the canvas. In order to populate Zzote-Space with Zzotes, the user simply creates new Zzotes. The essential information required for a new Zzote is its position and size (such as width and height). Some implementations enable a user to designate these variables. In some implementations, a new Zzote will assume a predefined default aspect ratio, in which case only position and width need be assigned.

The main implementations described in this document (one and two finger dragging) have many good qualities. However, some implementations provide additional and/or alternative techniques for creating new Zzotes. A key principle of Zzote-Space is that Zzotes automatically stack together with smaller overlapping Zzotes attached, which belong to the larger Zzotes with which they overlap in any way.

Another way of describing this is that once a new Zzote's position and size is finalized, it may automatically cause certain surrounding smaller overlapping Zzotes to "stick" to it as its sub-Zzotes. Regardless of how new Zzotes are added to the canvas, this automatic association with other Zzotes occurs.

Some implementations of the adding process can inadvertently encourage the user to simply add a new Zzote anywhere first, or simply choose one of its position or size first and then actually add it in such an incomplete form. Such an implementation may then assume that the user would use the ability to move and resize an existing Zzote, to then adjust the position or size more precisely.

However, because of the original "stickiness" of the first "incomplete yet finalized add," this could be problematic for the user. This is because, any subsequent moving and/or resizing of the new Zzote may unintentionally treat other smaller overlapping Zzotes as already clustered with the new Zzote based on that initial incorrect position and/or size. In such a situation, the user would have to work harder to disconnect the new Zzote before placing it where intended. Because of this, arbitrary initial placement of Zzotes is not recommended. Note that arbitrary initial placement is the means by which many typical computer design applications add shapes to a canvas (as is familiar in the art), and is not recommended for Zzote-Space.

Good implementations ensure that the user has had the full ability to determine both the position and size of the new Zzote before it is actually added into Zzote-Space. Only then does the potential Zzote become a new Zzote in Zzote-Space and automatically cause smaller Zzotes to possibly stick to it based on the automatic stacking principle.

Because of these considerations, one and two finger dragging is effective. Because a drag is one single flowing gesture, the user is able to be sure of the finalized position and size before committing ("finalizing") it to Zzote-Space (and thus before any sticking of other Zzotes to it occurs).

In some implementations, a user can indicate the wish to start adding (for example by pressing an "Add" button), indicating that a new Zzote will be added to Zzote-Space. Some implementations display a "ghost" outline on-screen of where the new Zzote will be potentially placed and sized (which may, for example, default to being a rectangle in the center of the screen around a quarter of the entire width of the viewport—with a height of the default aspect ratio). The user has the option to change the ghost position and size of the new Zzote in Zzote-Space by adjusting the position and scale of the viewport itself. As the position and scale of the viewport is altered, this has the opposite effect on the potential position and size that the ghost outline then represents in Zzote-Space. In some implementations, the user can directly alter the position and/or size of the ghost outline on-screen itself.

Eventually, the user indicates the wish to finalize the position of the new Zzote to be where the ghost outline appears to be. In some implementations, the user indicates this desire by pressing a button such as "Done." Some implementations allow a user to indicate this desire by a gesture, such as double-tapping the screen.

In some implementations, a "ghost" outline of a potential new Zzote is permanently shown on-screen, even when users are not explicitly intending to add anything. A single indication of intent by the user (such as pressing an "Add" button or double-tapping the ghost outline) finalizes a new add at any time.

This is a suitable method because the user has the opportunity before-hand to ensure that the viewport position and sizing ensured that the exact position and size of the new Zzote was correct before the user's single action of indicating intent (such as pressing the Add button or double-tapping the ghost outline). Some implementations also allow the user to reposition and/or resize the ghost outline itself at any time, whether the user is intending to create a new Zzote right away or not.

Alternative implementations use other ways of adding new Zzotes to the canvas. Other implementations use any of the other means to designate the intended location/size for rectangles (or other shapes) as is known in the art. For example, the user can draw a diagonal line from top-left corner to lower-right corner (or other diagonals) of the potential new rectangle shape for a new Zzote. Some implementations also enable users to "draw" an entire Zzote rectangle free-hand, then quantize the result to the best approximation of a neatly drawn rectangle from the user's sketch. Some implementations enable diagonal or full-rectangle drawing by the user after some previous indication of intent to enter an add-mode (e.g., by pressing an Add button).

Some implementations enable a user to perform a specific form of gesture at an area of the viewport to create or begin to create a new Zzote at the designated place. Implementations use a variety of such gestures, including: (i) a tap; (ii) a double-tap; (iii) a triple-tap; (iv) a long-press; (v) a double-tap with the second tap held for a longer period of time; (vi) a tap followed by a selection from a menu; (vii) two taps followed by a selection from a menu; (viii) a tap with a specific number of fingers; (ix) a tap with a specific number of fingers where the spacing of the fingers is used to denote the size (eg; for two fingers where each finger represents a corner of the new Zzote); (x) a long-press followed by a subsequent drag out gesture to denote more precise size. Other implementations use other forms of gesture as is familiar in the art. In some of the implementations where such gestures result in the display of a menu option (i.e., variations of (vi) and (vii)), the option to create a new Zzote at the designated place appears alongside an option to "Paste" from the clipboard.

Many implementations ensure that any such gestures do not conflict with other gestures for other functions. In some cases, it may be difficult to detect such a gesture without some confusion as to whether the user in fact wished to perform another action such as picking up or selecting an existing Zzote.

In some of the implementations that create new Zzotes based on one of these gestures, the gesture immediately creates a new Zzote centered around the gesture's location on screen.

To mitigate having a newly positioned/sized Zzote inadvertently causing other Zzotes to "stick" to it before the user has completed both the intended positioning and sizing, some implementations go into a special adding/adjusting mode. In this mode, the user has an opportunity to confirm both the exact position and size before proceeding (or cancelling).

Zzote-Space uses an internal coordinate system for Zzotes in order to designate the relative positions of the Zzotes. The internal coordinate system can be stored in a variety of ways. Some implementations represent the stored data (e.g., representing position, width, and height) in an absolute scale within Zzote-Space.

Other implementations represent the data stored (e.g., representing position, width, and height) for each Zzote in alternative numeric systems. Some such other implementations store the parameters for each Zzote relative to a Zzote's parent. Because of this, the scaling of these numbers does not get increasingly small for additional levels of sub-Zzote hierarchy. When such an implementation calculates the effective scale of a given Zzote, it can, for example, traverse the graph of Zzotes from the top of hierarchy downwards to gather the information required to display any given viewport at a given scale.

Other implementations automatically guess where a new Zzote should be placed with minimal prompting by the user. This is triggered by pressing a button to create a new Zzote. The user presses a specific area of the device (such as a button) to create a new Zzote along in a guessed location, in a specially requested direction, or automatically as a sub-Zzote at a pre-determined standard size ratio of a previously selected Zzote.

To aid the brain's spatial memory, some implementations encourage the creation of irregular patterns of new Zzotes, created at least in part by human decision.

Figure 34:
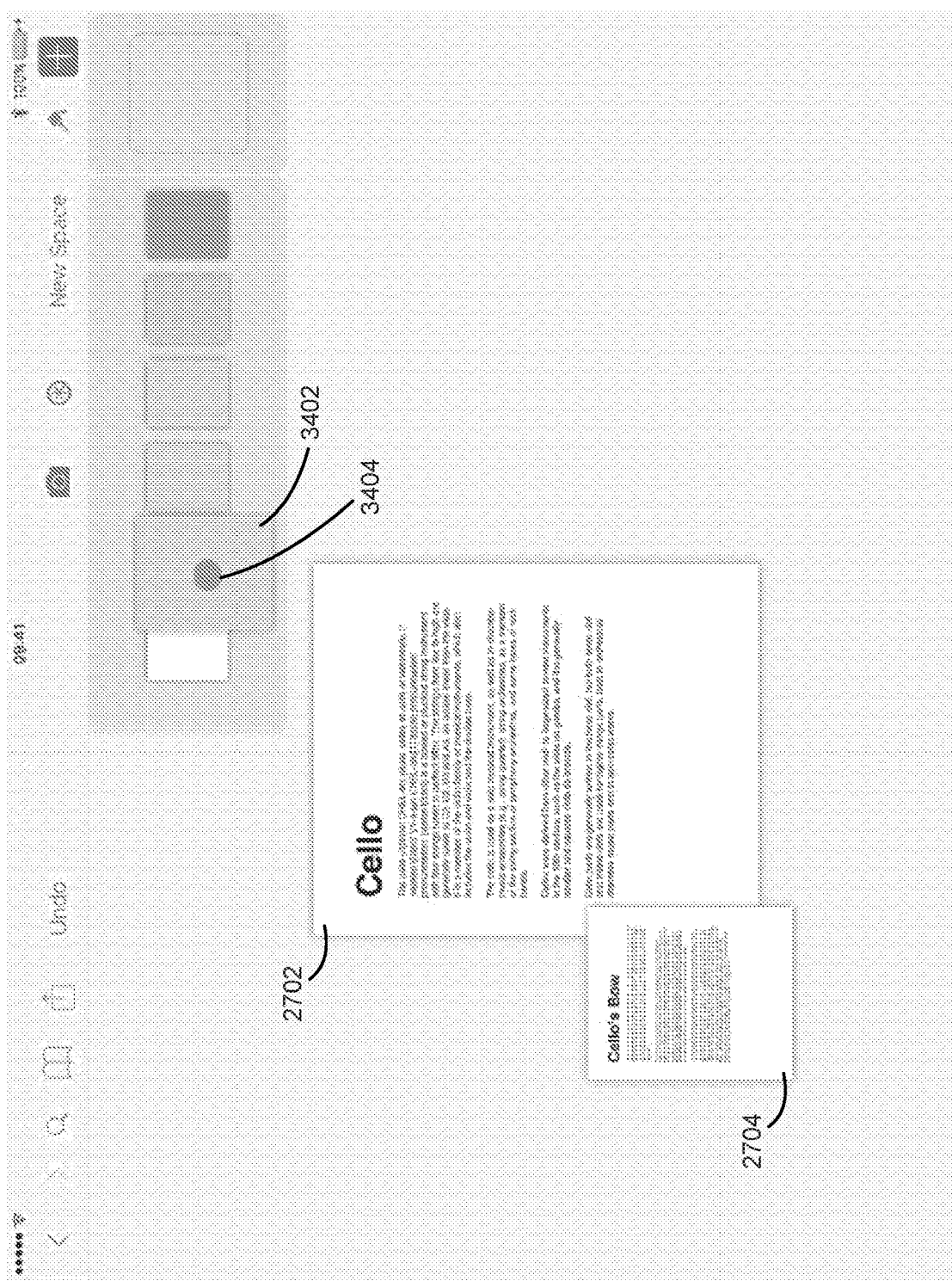
FIG. 34 illustrates the zooming-out and panning from the environment depicted in FIG. 33 to show an overview information context in accordance with some implementations.

From the situation in FIG. 33 as depicted, in this example the user actually chose not to add any new sub-Zzotes at this stage to the Cello's Bow Zzote 2704. FIG. 34 illustrates adding a third potential Zzote 3402, using a single-finger gesture and Auto-sizing. Note that prior to creating the third Zzote 3402, the user added some additional paragraphs of Detail text to Zzote 2704.

Then still prior to creating the third Zzote 3402, the user pinched and panned the viewport to show fuller context in FIG. 34. This is a choice by the user to see the fuller context of the Cello's Bow Zzote 2704. It also places the viewport in an appropriate context to add another sub-Zzote to the Cello Zzote 2702. The user begins by grabbing a new potential Zzote 3402 from the Add bar with one finger, as indicated by the single point of contact dot 3404. As the third potential Zzote 3402 is dragged from the Add bar, the new potential Zzote 3402 has enlarged automatically to a better starting size, and centered around the single finger.

Because the user has chosen to initially use one finger, the add process initially uses automatic sizing and potentially automatic zooming and panning of the viewport as well. (As will be illustrated in FIG. 35, if the position of the user's finger suggests this, the third potential Zzote 3402 will be designated as a sub-Zzote of the first Zzote 2702 and thus appropriately sized as a sibling of the second Zzote 2704. If placed there, both the second Zzote 2704 and the third potential Zzote 3402 will have a common parent, namely the first Zzote 2702.)

Figure 35:
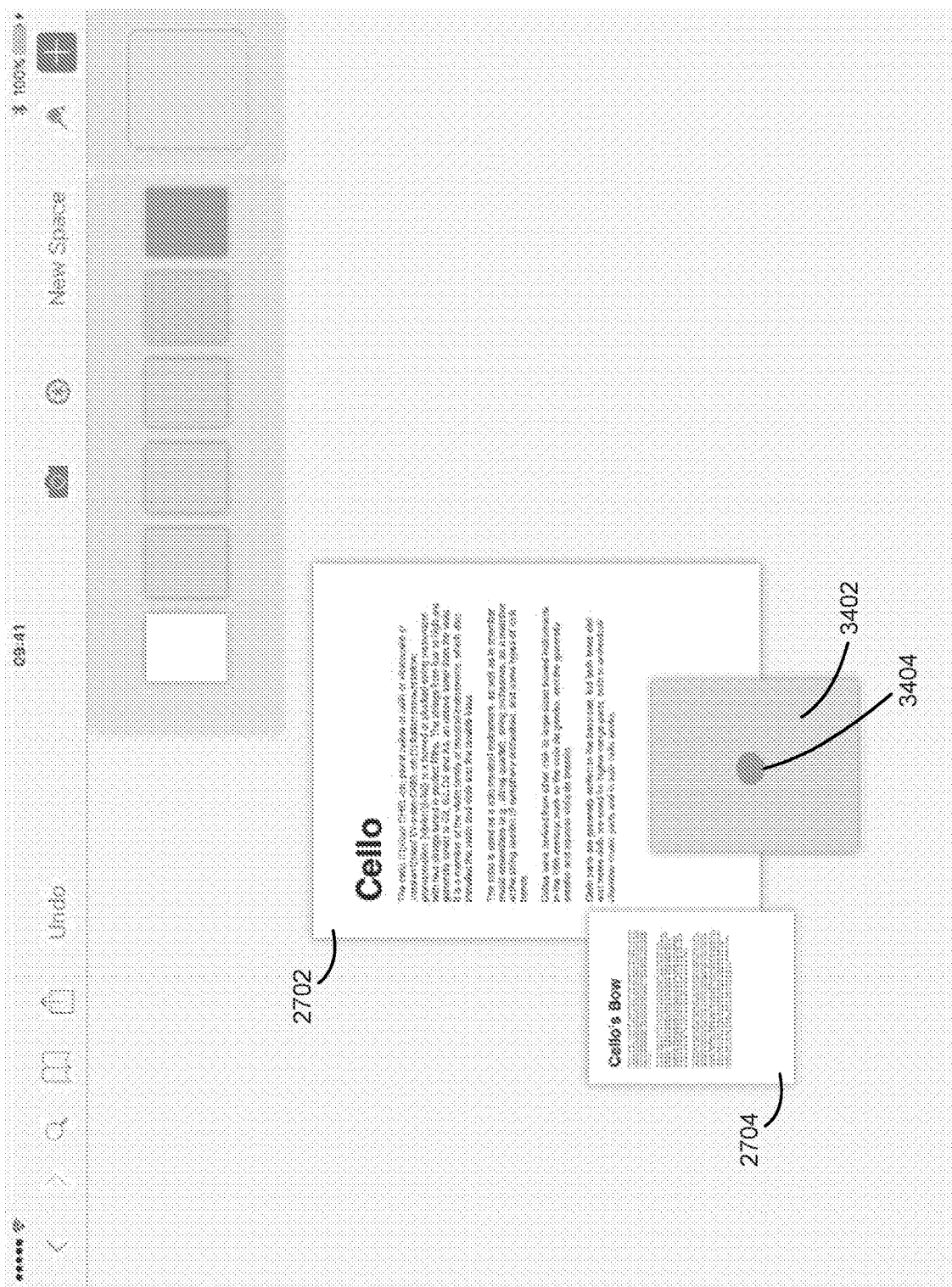
FIG. 35 illustrates positioning a new graphical information unit as a sibling of an existing graphical information unit using Auto-Sizing in accordance with some implementations.

The third potential Zzote 3402 is being dragged from the Add bar with one finger as shown in FIG. 34. The finger is not released yet, so the action is still in progress. In this example, the user wishes for this third Potential Zzote 3402 to be placed as a second sub-Zzote of the First Zzote 2702. As shown in FIG. 35, the user chooses the position, relying on auto-sizing to determine an appropriate size for this potential Zzote. FIG. 35 shows that the size of this new potential Zzote 3402 is the same as the existing Cello's Bow sub-Zzote 2704. The Auto-size function has determined that at the current position, the new Zzote 3402 would most likely be intended to be a sub-Zzote of the Cello Zzote 2702.

The auto-sizing routine determines a suggested size for new sub-Zzote 3402. If this were the first sub-Zzote of the Cello Zzote 2702, auto-sizing uses a default size (e.g., ¼ the width of the parent). In this case, the Cello Zzote 2702 already has an existing sub-Zzote, so its size is used in the determination. The implementation here uses the median size of any existing sub-Zzotes. In this case, there is only the one existing sub-Zzote of the Cello Zzote, so auto-size matches its size (the existing one and only sub-Zzote is by definition the median).

Figure 36:
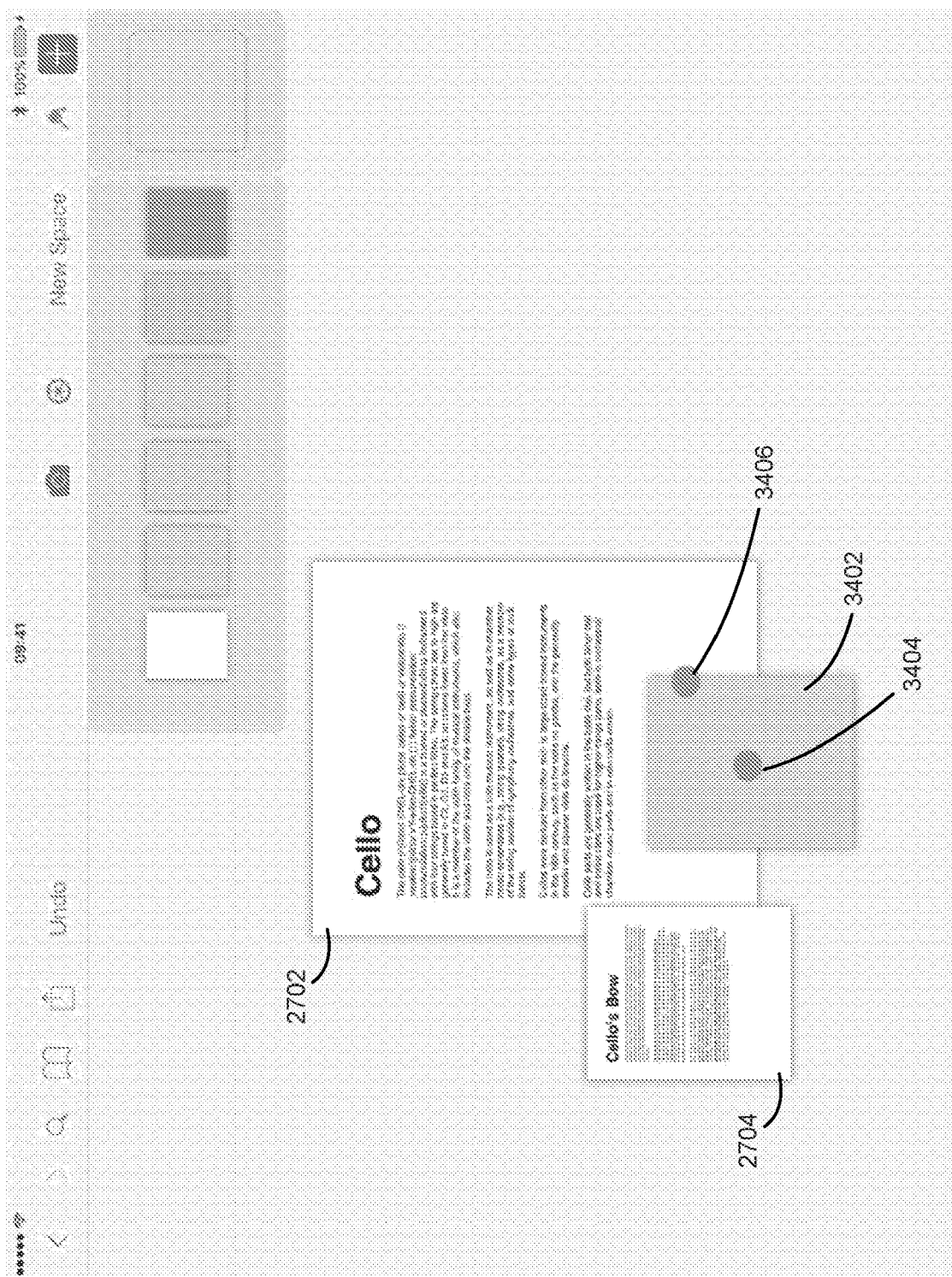
FIG. 36 illustrates switching from a one-finger gesture to a two-finger gesture in accordance with some implementations.

From the automatically-matched size, the user then chooses to use a second finger to manually increase the size of the third potential Zzote 3402 slightly. This is illustrated in FIG. 36. The resizing may be because the user considers the subject matter of the new Zzote to be more important or the user may make the decision purely for aesthetic reasons.

The transition from FIG. 35 to FIG. 36 illustrates a novel use of switching over to two-finger control while in the middle of a gesture. By using two fingers, the user now has manual control of sizing in addition to position. As shown in FIG. 36, the first finger remains in contact at the first touch point 3404, and the user places a second finger down on the display at a second touch point 3406. Some implementations require that the second finger needs to touch or nearly touch the potential Zzote 3402, as shown in FIG. 36. However, some implementations allow the second finger to be placed anywhere on the display.

Also, some other implementations require that the placing of the second finger on the display occurs as part of a motion so that the second finger touches the display while already moving in some direction (e.g., outward to increase the size or inward to decrease the size.) This is a relatively natural process for the user because the reason for the second finger is largely to alter the size now (though possibly simultaneously to any repositioning). However, in some implementations (such as the implementation depicted in FIGS. 35-36), there is no such requirement for the second finger to be already moving when first touching the display.

In some implementations, when the second finger is placed on the display, the position and size of the Zzote initially does not change in any way. (However, if the second finger started out immediately moving, then rapidly the Zzote's size and position will start to alter from this straight-away.) Subsequently if the two fingers are moved further apart, the Zzote grows in size, and if the two fingers are moved closer together, the Zzote will decrease in size. Once the user transitions to a two finger gesture, the routine for sizing and simultaneously positioning the Zzote is the same as the previously described two-finger drag and sizing implementation.

Figure 37:
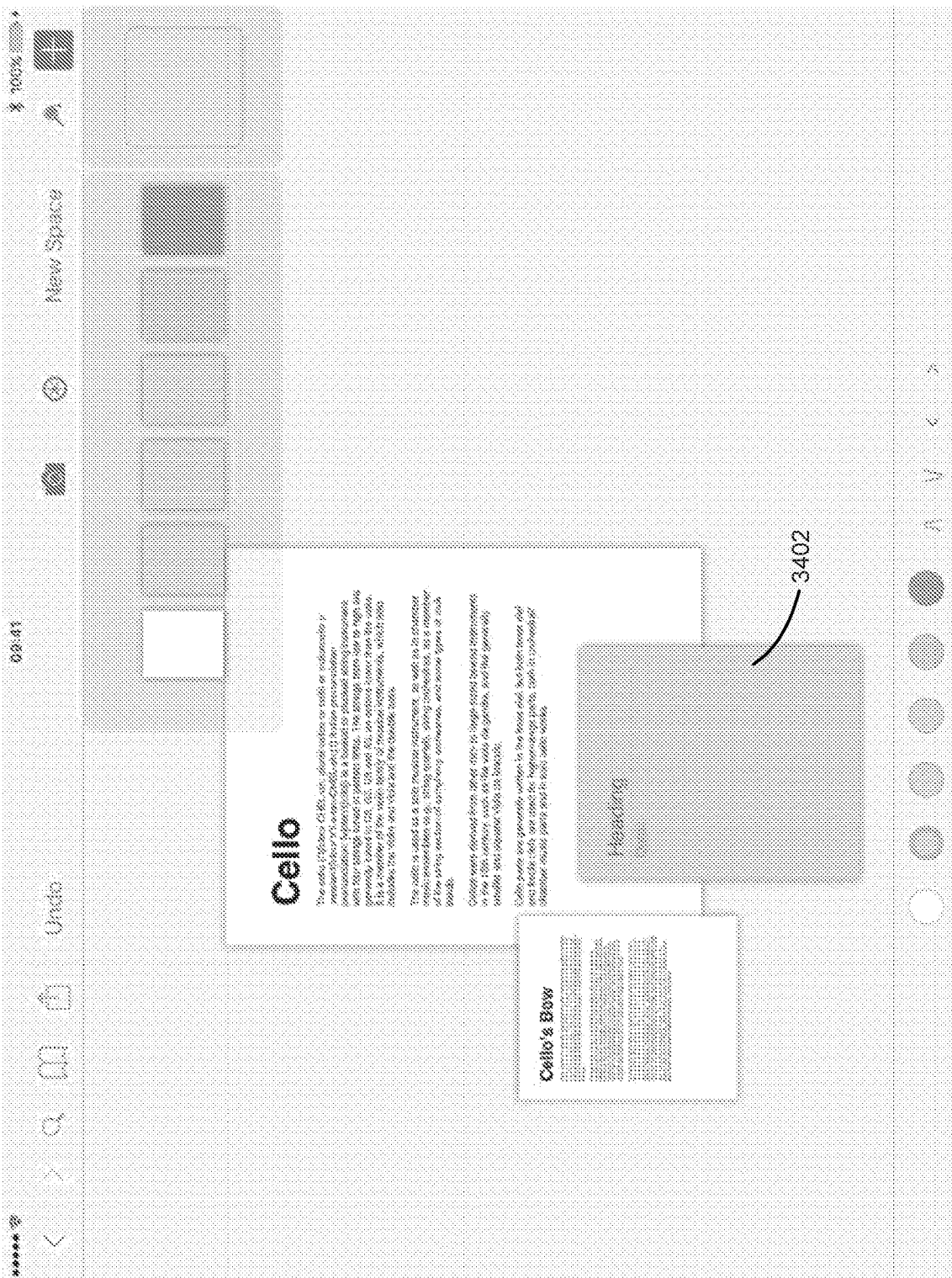
FIG. 37 illustrates how further text or information is ready to be added to a new graphical information unit that has been precisely positioned and sized as a result of switching from a one-finger to a two-finger gesture in accordance with some implementations.

In FIG. 37, the fingers have now been released to place and size the Zzote 3402. The figure depicts the situation after the viewport has then automatically zoomed and panned slightly so that the subsequent text entry is at a readable size. Irrespective of this slight change in scale and position of the entire viewport, it can be seen in FIG. 37 that (relative to the size and positions of the other two Zzotes in the figure) the new Zzote 3402 is now larger and positioned more upward and leftward than it had been in FIG. 36. This is because the two fingers had been successfully moved outward to increase the size of Zzote 3402 while simultaneously repositioning their centroid as required. Finally, in FIG. 37, it can now be seen that Zzote 3402 has entered a typing mode as previously described for new Zzotes. The user is hence able to continue adding new information as required.

FIGS. 38A-38H illustrate further manipulation of information structures using unique features.

Figure 38A:
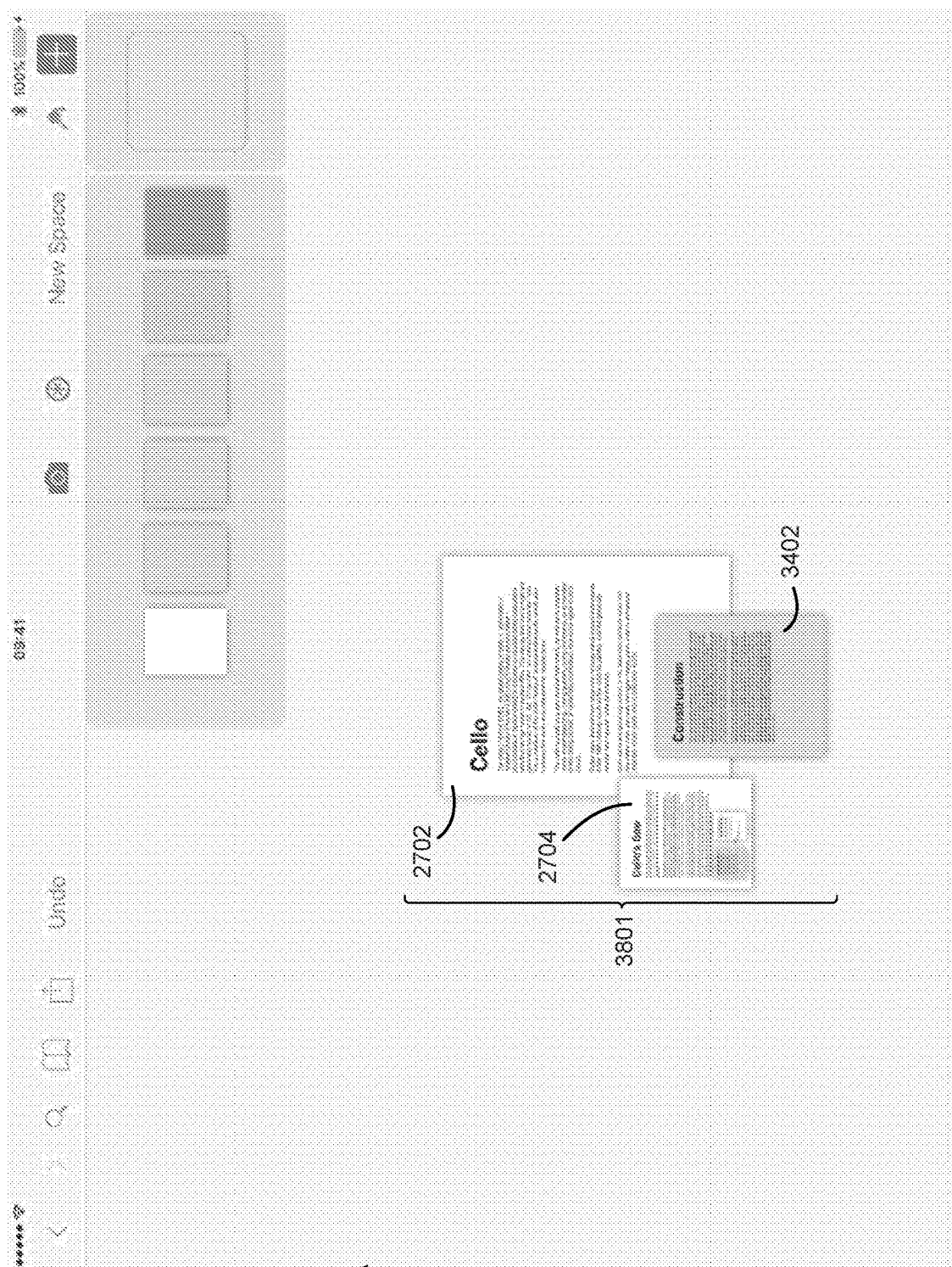
FIG. 38A illustrates a more complex cluster of information after the environment in FIG. 37 has been extended in accordance with some implementations. At the depicted viewport scale, the entire cluster can be viewed as a single unit of information.

FIG. 38A shows the situation after the user has added some additional descendant Zzotes to the Cello Zzote 2702 using previously described principles. (These include some additional descendant Zzotes to the Cello's Bow Zzote 2704.) This has all therefore added increasingly detailed Cello sub-information. Then the user has zoomed out the viewport to review the entire Zzote Cluster 3801 at a scale where the entire structure seems like a single unit of information. In fact, following the prior discussed principles, all of the shown sub-Zzotes (and all of their sub-Zzotes and so forth) of the Cello Zzote 2702 are component parts of the Cello Zzote 2702 (i.e., part of the Cello cluster 3801). At the viewport scale in FIG. 38A, the text of the Heading "Cello" for the first Zzote 2702 can be easily read. Though much of the text of the Cello Zzote structure cannot be read, the first level sub-Headings (ie; the Heading text of the sub-Zzotes of the "Cello" Zzote 2702) are still readable. They are the "Cello's Bow" Heading of Zzote 2704 and the "Construction" Heading of Zzote 3402.

Also, the overall structure is still recognizable from the early figures when it was viewed at a larger scale and did not contain all of the new text and descendant Zzotes. Even at this smaller viewed size, the novel representation is effectively prompting the user's mind to recall a sense of the information it contains. A simple unpinch gesture can easily zoom-in to see details that are needed.

More specifically, FIGS. 38A-38H illustrate a novel process of placing larger Zzotes beneath existing Zzotes, thereby enclosing them within a larger semantic structure. One result of this is eliminating the need for folders.

Figure 38B:
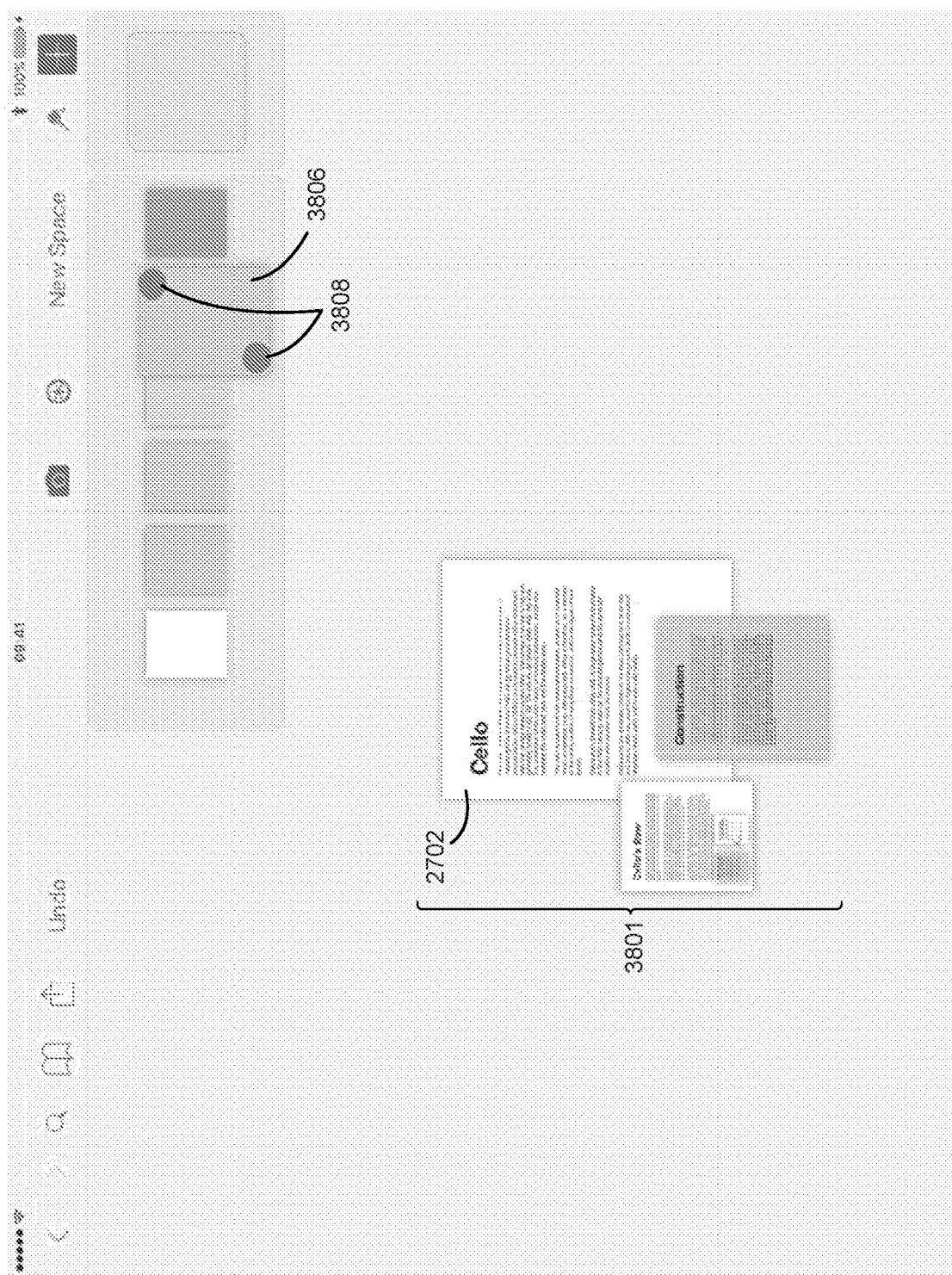
FIGS. 38B-38H illustrate adding a new graphical information unit to the canvas that becomes a parent of the graphical information units already on the canvas, in accordance with some implementations.
Figure 38C:
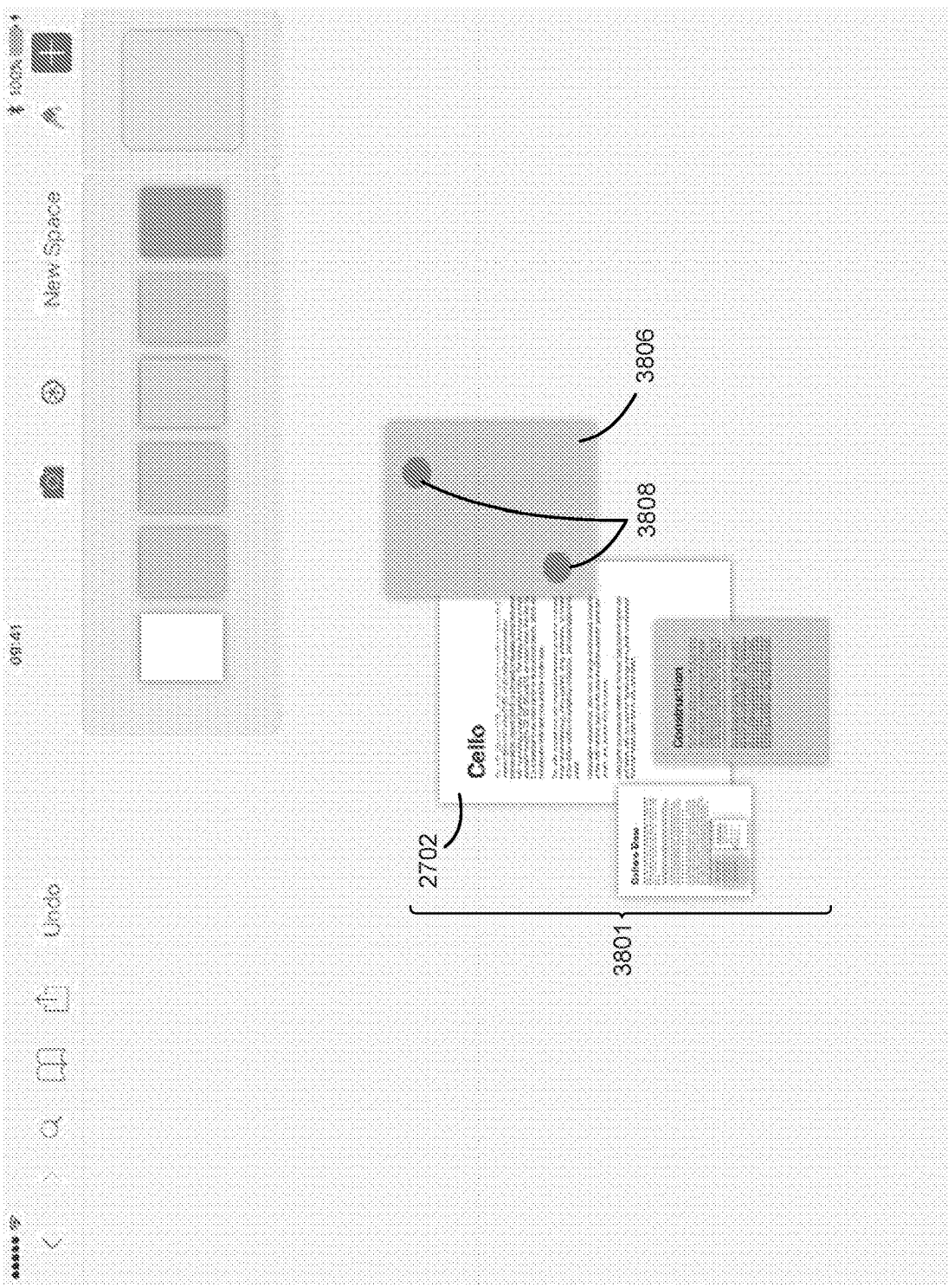

In FIG. 38B, the user grabs new potential Zzote 3806 from the Add bar with two fingers, as indicated by the dots 3808. FIG. 38C shows that the user continues to drag new potential Zzote 3806 using two fingers. In FIG. 38C, the new potential Zzote 3806 is both in a different location (and now over the canvas) and has a larger size, according to the movement of the two fingers. At this point, it appears that the potential Zzote 3806 is about to be added to the Cello Zzote 2702 as another sub-Zzote of Cello.

Figure 38D:
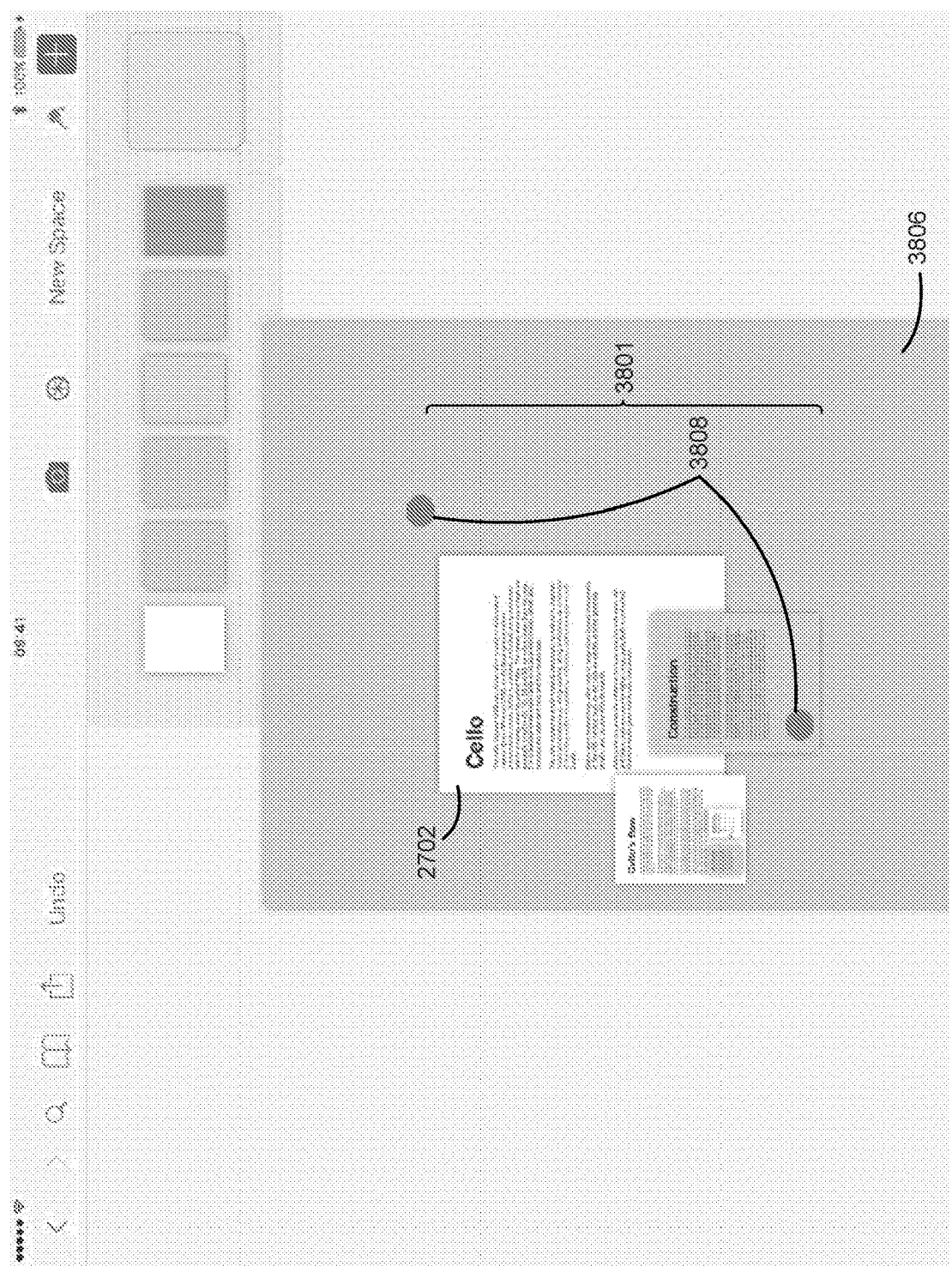

In FIG. 38D, however, the user proceeds with the same continuous gesture to now enlarge the potential Zzote 3806 by unpinching both fingers, as shown by the touch points 3808. As noted previously, some implementations use "sizing acceleration" (sometimes referred to as a multiplicative "magnification" factor), so the increase in size can be achieved with a smaller amount of finger movement. The width of potential Zzote 3806 is subsequently larger than the other Zzotes in the viewport, so the new potential Zzote 3806 goes behind the other Zzotes that are in the cluster 3801.

What has occurred in the figure is based on the same rules described earlier. In particular, larger Zzotes automatically go behind smaller overlapping Zzotes. In this case, the user is deliberately about to place the other visible Zzotes in the viewport of FIG. 38D inside a larger (more conceptually general) Zzote.

Figure 38E:
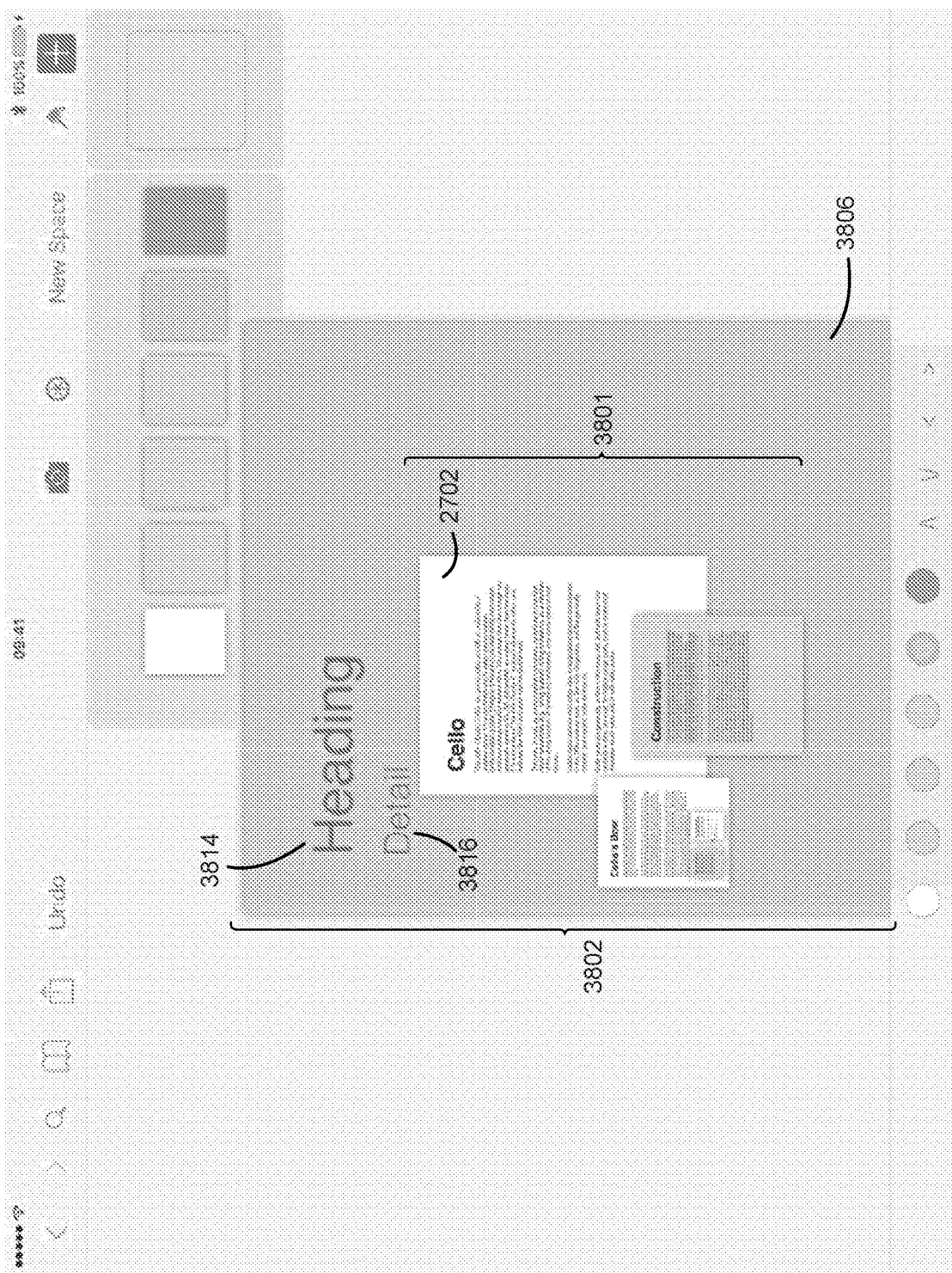

As shown in FIG. 38E, the fingers are released to add (and hence "finalize") the new Zzote 3806 at this position and size. (Hence, Zzote 3806 is now a new finalized Zzote saved to the canvas and no longer just a "potential" Zzote.) The new Zzote 3806 is behind the existing Zzotes in the cluster 3801. The new Zzote 3806 now forms a new cluster 3802, which contains the existing cluster 3801. The user interface now displays text prompts 3814 and 3816 to prompt the user for Heading and Detail text for this new Zzote 3806.

Figure 38F:
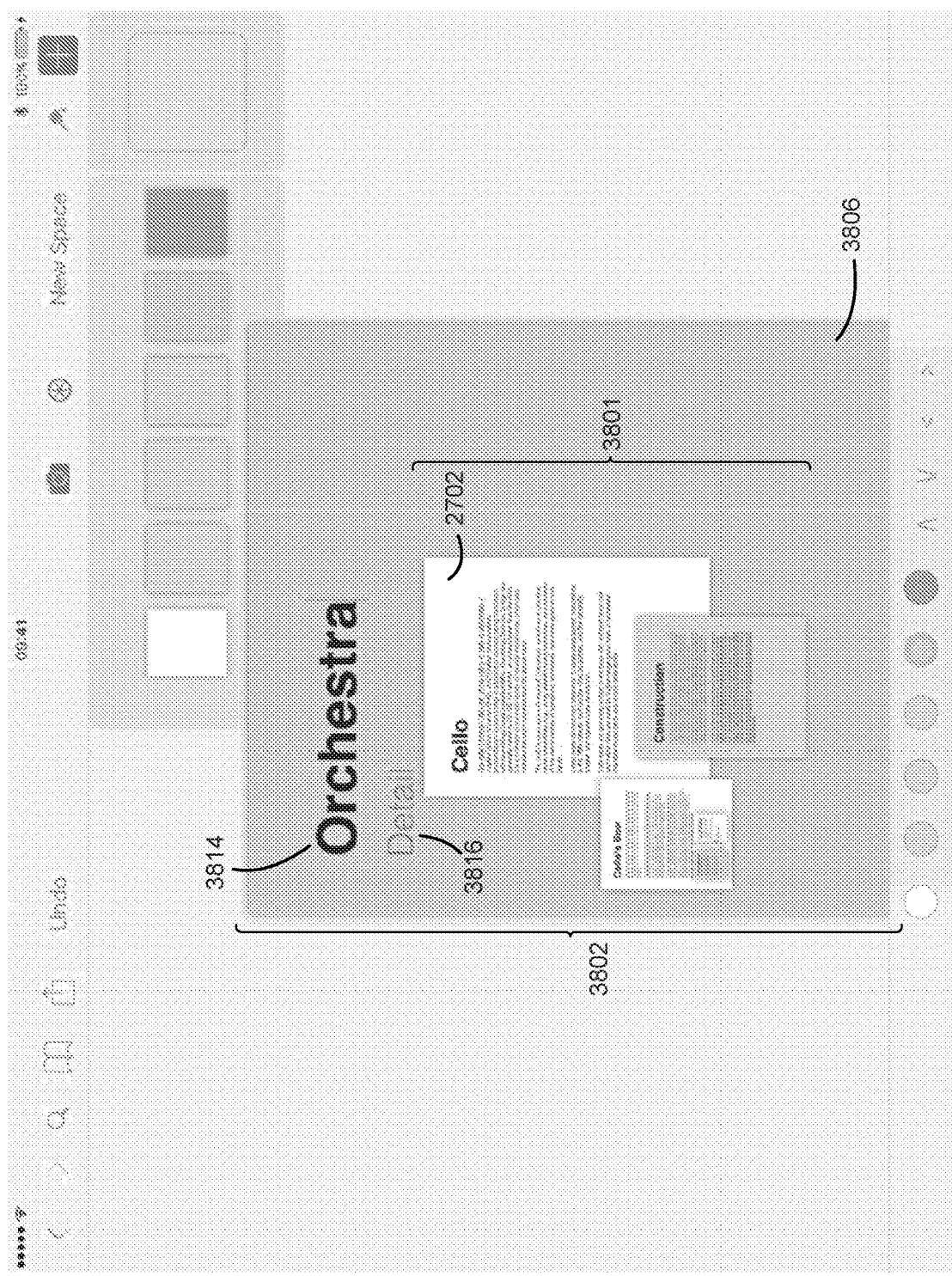
Figure 38G:
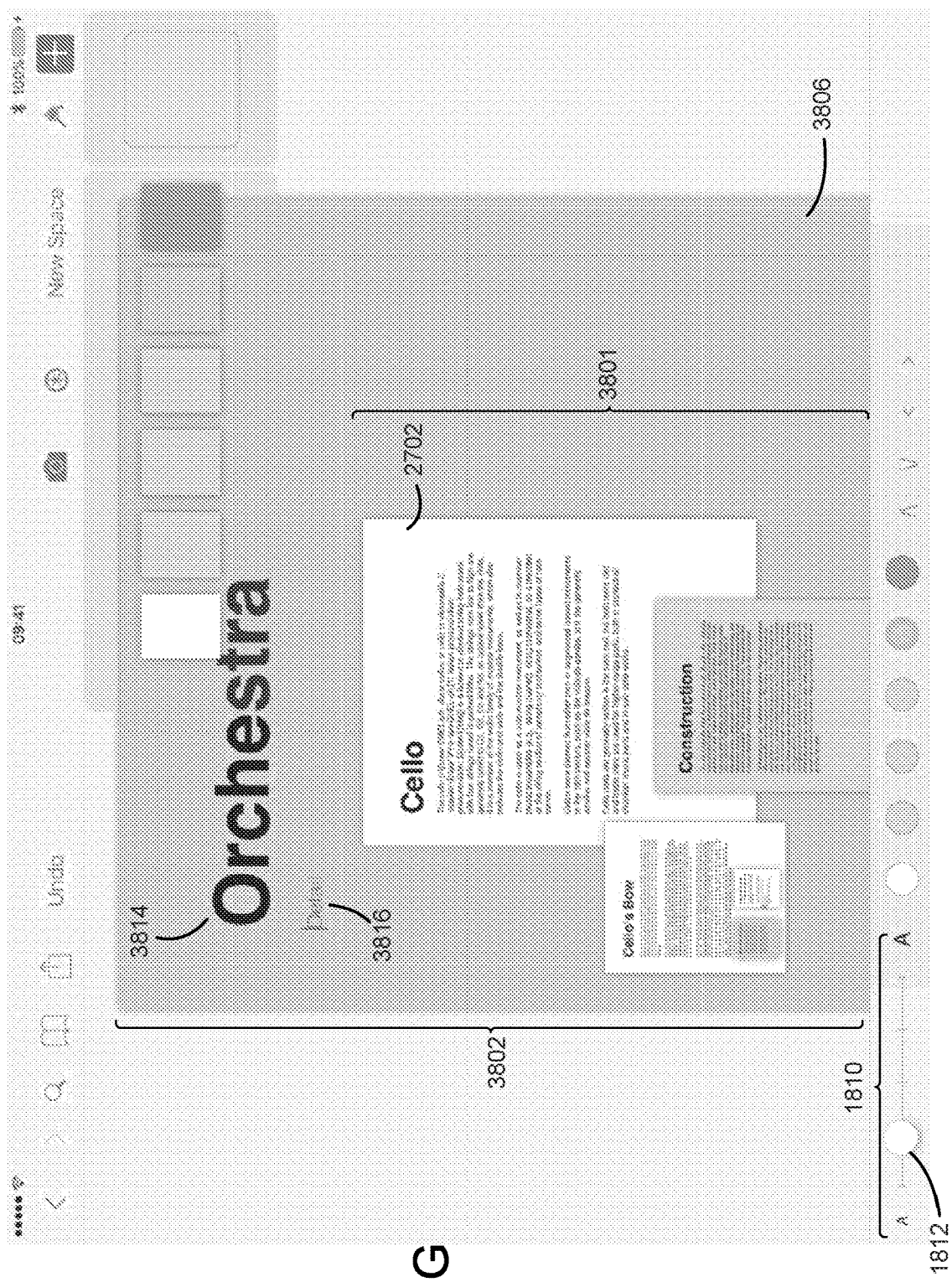

In FIG. 38F, the user has entered the Heading of "Orchestra" 3814 for the new Zzote 3806. When the user presses Return (or taps directly on the Detail placeholder 3816), the user interface prompts the user to enter any Detail text 3816 if appropriate. This is illustrated in FIG. 38G.

In preparing to enter Detail text for the new Orchestra Zzote 3806, the user drags the font size slider 1812 in the font sizing control 1810 so that the subsequent text will be sufficiently small in size. Because the Orchestra Zzote 3806 already contains sub-Zzotes, the user does not want the Detail text to take up too much space. As a result of the user reducing the Detail font size, the viewport has zoomed slightly from FIG. 38F so that the subsequent Detail text 3816 and the currently shown Detail placeholder 3816 are still at a readable scale.

Figure 38H:
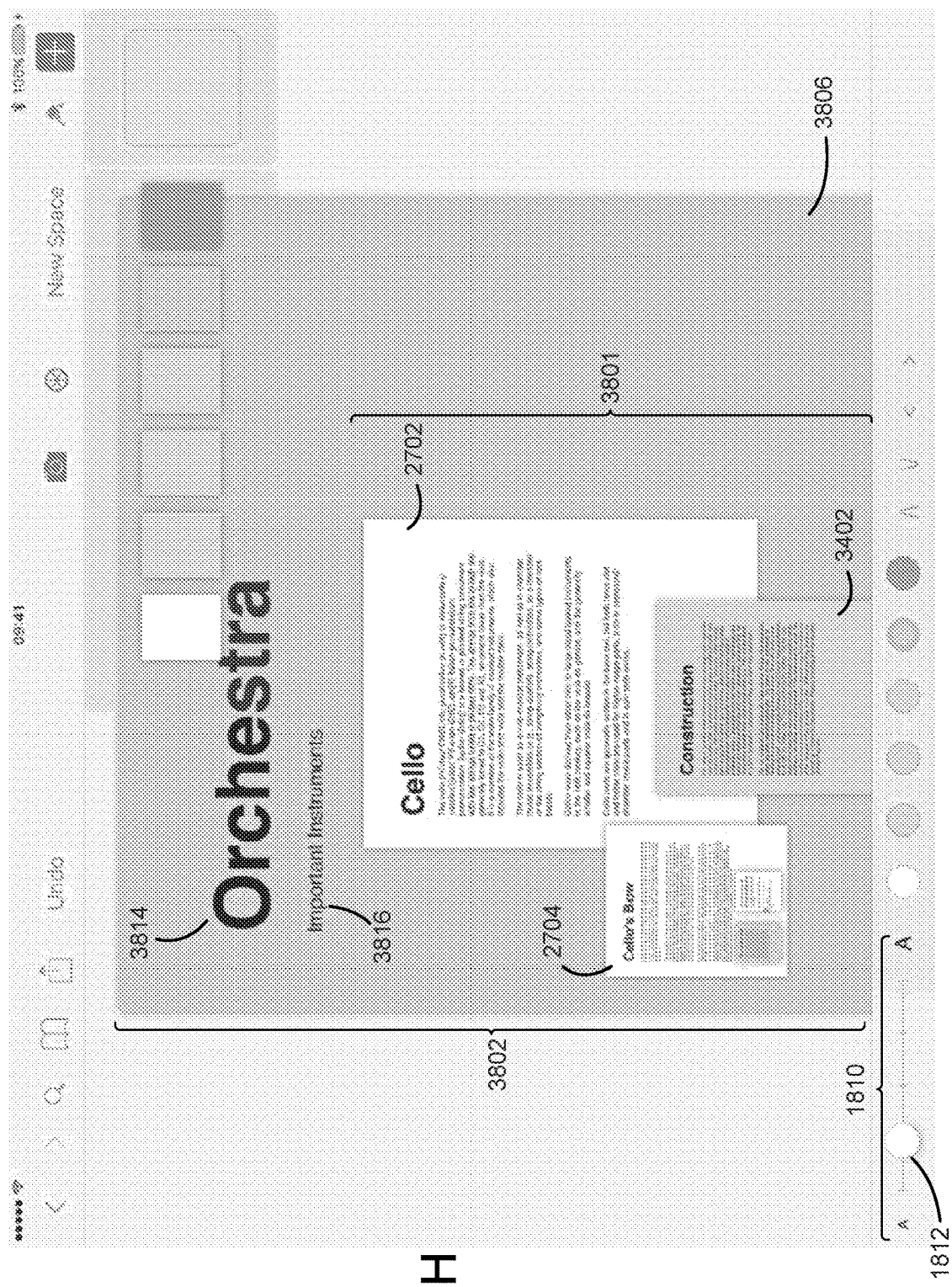

As shown in FIG. 38H, the user enters the Detail text "Important Instruments" 3816. The new Zzote 3806 has information itself, and contains other Zzotes. This Zzote 3806 was intuitively created at a time after the Zzotes it contains, illustrating some of the advantages of Zzotes over the conventional concept of "folders."

Using conventional computer metaphors, the user's actions in FIGS. 38A-38H are a little like placing everything in a new folder or directory. However, the ability to place an existing item in a new Zzote is simpler and more intuitive to achieve than with using conventional folders. Indeed, because a Zzote can function as a container for other Zzotes or store detailed information itself (or both), the disclosed implementations here obviate the need for separate "folders" that behave differently from files.

Furthermore, it is highly beneficial that a Zzote behaving effectively as a "folder" has occurred. This was simply by finalizing the location/size of a Zzote as larger than existing smaller overlapping Zzotes (with the larger Zzote having automatically been displayed behind the smaller overlapping Zzotes). This is an easier and more intuitive means of grouping items than previous techniques.

To summarize, all Zzotes have inherent "folder" characteristics as well as "document" characteristics. In some implementations, within Zzote-Space there are no Zzotes that are designated as folder or directory entities. A user can utilize the folder characteristics of any Zzote. In this way, Zzote-Space provides a novel simplification of the overall user interface, both from the point of view of the user and from the point of view of the computing device.

As shown in FIG. 38H, the Orchestra Zzote 3806 (which is being used like a folder) has some descriptive text 3816 built into it. The user chooses whether or not to enter any Detail text 3816. If the user wants to create Zzotes that act more like conventional folders, the user may omit the Detail text 3816 and limit the Heading text 3814 to only a few words.

Note that other Zzotes in the cluster 3802 are exhibiting folder behavior as well by virtue of containing sub-Zzotes. For example, the Cello Zzote 2702 is both a document and is a "folder" (effectively the cluster 3801) containing the Cello's Bow Zzote 2704 and the Construction Zzote 3402. As seen in FIG. 38H, the Cello's Bow Zzote 2704 itself contains two sub-Zzotes just below the third paragraph of its own (visibly tiny) detail text. Also, though very small at this scale, it can just be seen that one of these sub-Zzotes of Cello's Bow has its own sub-Zzote. In principle there can be many further levels of descendants of Cello's Bow that cannot be seen at this scale. Even if a given Zzote (such as the Construction Zzote 3402), does not yet (or may never) have any sub-Zzotes, the functionality is always available. In the evolution of a Zzote-Space over time (which may be a very long period of time), the folder functionality may be needed later.

By simply resizing and positioning any of the other Zzotes at any time, a user can easily and visually change "what contains what."

As illustrated in FIGS. 38A-38H, by FIG. 38E the new Zzote 3806 was the largest finalized Zzote, so it became the Zzote whose newly determined descendants (i.e., cluster 3801) and itself then constituted the new cluster 3802, which hence contained the pre-existing cluster 3801. By contrast, if the new Zzote were very small, it would automatically become a sub-Zzote of any other larger Zzote it overlaps with. In addition to these extremes, a new Zzote may have an intermediate size, which then becomes a sub-Zzote to zero or more larger overlapping Zzotes but also a parent of zero or more smaller overlapping Zzotes. (In some implementations, in accordance with previously described (specific) rules, Zzotes may not be deduced as for example both a grandparent and parent of the same other Zzote if the overlapping geometry suggested this, but simply a grandparent to it in that example.)

For example, consider an existing parent Zzote with one or more existing sub-Zzotes. It is easy to place a new Zzote beneath the existing sub-Zzotes by making it at least a little bit larger and placed so that it is overlapping. The new Zzote is beneath (and hence "contains") the sub-Zzotes because it is larger. However, as long as the new Zzote is smaller than and overlapping the existing parent Zzote, the new Zzote is above ("contained by") the existing parent Zzote. This immediately places the existing parent's sub-Zzotes in a new sub-group within the new Zzote, which is now their parent instead. Also, this means that the initial parent Zzote is now their grandparent Zzote.

In this scenario, the new Zzote is a sub-Zzote of the initial parent Zzote, and it is now the new parent Zzote that (directly) contains the sub-Zzotes. (Although the initial parent currently still does "contain" its former sub-Zzotes because it "contains" their new parent.) This is a rapid way of sub-grouping specific Zzotes.

Once the new Zzote contains the sub-Zzotes, the user can then pick up and move or resize the new Zzote, which applies to all of the sub-Zzotes it contains. This subgroup can be moved or resized within the same initial parent, or moved outside of the initial parent. This process can refine the positioning of sub-clusters.

By allowing new or existing Zzotes to be placed behind other smaller overlapping Zzotes (which happens automatically as their widths become greater than existing Zzotes), Zzote-Space makes the process of enclosing existing items (Zzotes) within a new "folder" (another Zzote) a simpler, more consistent, and intuitive process than previous techniques using conventional folders. Because this process is highly visual and based on consistent principles, it makes immediate visual sense to users.

In the example of FIGS. 38A-38H, the end-result was that the new Zzote 3806 has one direct descendent, which is the Cello Zzote 2702. However, the new Zzote 3806 could have contained more direct descendants. For example, suppose there had been another "Violin" Zzote immediately next to Cello. If the Violin Zzote had a size smaller than the new Orchestra Zzote 3806 (and overlapped the new Orchestra Zzote 3806), then the Violin Zzote would have been enclosed (in information terms) within the new Zzote 3806 within the same process.

Unlike the tree structure of conventional filing-systems (e.g., those depicting folders), Zzotes can be multi-parented. The potential for a multi-parent scenario follows from the geometry of Zzotes. For example, a small Zzote can be placed so that it overlaps more than one larger Zzote. The Zzote is thus a sub-Zzote of all these larger Zzotes and belongs as a sub-Zzote to all of them simultaneously. Visually, this situation makes intuitive sense. (In folder terms a multi-parent architecture would entail having a file simultaneously in more than one folder. In many filing systems this is not possible.)

Even with multi-parentage, it is sometimes useful to designate a "primary" parent when navigating backwards or simplifying to show a single route in the navigation path. In some implementations, the main Zzote-Space viewport always has a multi-parented architecture. Also, in accordance with the multi-parent architecture, when a user moves and/or resizes any specific parent within a multi-parent system, the sub-Zzotes move and scale with that specific parent, regardless of other parents for a number of the sub-Zzotes. Under some circumstances, this may mean that at the end of the move and/or resize of a specific parent Zzote, a number of sub-Zzotes of the specific parent may then no longer be sub-Zzotes of other Zzotes that had also been their parent at the beginning of the action. Likewise, a number (and possibly a number of the same) sub-Zzotes of the specific parent may become sub-Zzotes of different Zzotes at the end of the action while still being sub-Zzotes of the specific parent. (There are similar possible consequences for greater levels of descendants also.)

The designation of a "primary" parent is useful for example when a "path" is being presented to the user in a complementary representation outside of the main representation of Zzote-Space (which in some implementations always allows multiple parents).

In some implementations, the "primary" parent is defined as the parent with the greatest overlap with a given sub-Zzote. In some implementations, the "primary" parent is selected arbitrarily or according to other criteria.

To reiterate, in some implementations Zzote-Space itself utilizes a multi-parent architecture at all times, both in how Zzote-Space is displayed and in the internal data storage of Zzotes in Zzote-Space. A path bar, for example, is a quick guide to users as to roughly "where they are," so the omission of the full multi-parented information is not critical. In fact, the display of a single primary path may help simplify the information for the user.

Other implementations depict the full multi-parent architecture, or display aspects of the full multi-parent architecture as needed. For example, all parents are shown in these path-display and navigation situations. For example, multiple back-arrow options can be presented in navigable lists. Path bars can show multiple routes in multiple-possible hierarchies. The disadvantage to this is increased complexity presented to the user and a non-standard interface.

Situations where the complementary information representation of a simplified tree structure is utilized from the user's point of view include: (i) the Path bar; (ii) navigating the Search list; and (iii) navigating text entry with special navigation arrows to go between siblings and up or down levels.

A Path bar implementation is described above (and elsewhere herein). Only the primary parent is shown within the path. Alternatively, when there is more than one parent Zzote, a path can be split into multiple routes in multiple possible hierarchies, or indicate that multiple options exist. The user can then select which parents' path back to follow.

A user can navigate a hierarchical User Interface contents-list of Zzotes and their descendants (e.g., a Search/Contents list) with drill-in arrows and Back button within the list. When drilling in to Zzotes, the multi-parent architecture is always respected. Drilling-in from any of a Zzote's multiple parents may navigate to the same shared sub-Zzote. However, in some implementations, the Back arrow within the list will take the list back to the "primary" parent. This simplifies the interface. In other implementations, a Back arrow can be split or indicate multiple options, providing the ability for the user to select which parent's path back to follow.

A user can also navigate text entry with special navigation arrows (e.g., the navigation buttons 1830 as illustrated in FIG. 18) to go between siblings and up or down levels. When going up a level, this is to the "primary" parent. Other implementations prompt for which parent to go "up" to when there are multiple parents.

In many scenarios, in most cases, a Zzote only has one parent. This is the most common situation under normal circumstances. Because of this, the navigation simplifications and the use of a "primary" parent do not substantially limit the functionality.

Other implementations enforce a one-parent-per-Zzote architecture or do so if required to. Because most hierarchical filing systems are only one-parent-per-node based (e.g., a tree) such other implementations can enforce this if required. To enforce a one-parent-per-Zzote architecture, some implementations prevent users from placing a Zzote such that it is a sub-Zzote of more than one parent Zzote. For example, a placed Zzote can be "nudged" automatically by the User Interface of an implementation so that it does not overlap in such a way that it has more than one parent. Alternatively, the cluster that a Zzote is being added to can be "nudged" automatically by the User Interface of an implementation so as to prevent there being more than one parent per Zzote.

An alternative implementation enforces a one-parent-per-Zzote architecture by requiring all sub-Zzotes to be within the outer shape of a parent Zzote only. Therefore, a multi-parent scenario cannot occur. Such implementations forego many (but not all) benefits described with respect to Zzote-Space.

When an implementation enforces a single parent architecture at the system level (i.e., not just an option or user preference), the internal architecture of the Zzote database may be structured to allow a maximum of one parent per Zzote.

The use of Zzote-Links (described in FIGS. 42A-48) means that complex many-to-many relationships can be depicted without using the multi-parent architecture. In some ways, Zzote-Links (and Zzote-Link annotations) are more versatile than reliance on the multi-parent architecture because they are not dependent on the exact placing of a given Zzote.

In a multi-parent architecture, there are some inherent geometric restrictions concerning how many parents can be positioned to share the same sub-Zzote. The use of Zzote-Links (and Zzote-Link Annotations) is not limited by such constraints.

In general, some implementations provide both a multi-parent architecture and support the use of Zzote-Links and Zzote-Link annotations. However, alternative implementation omit some or all of these features.

Moving, Resizing and Reorganizing Graphical Information Units

FIGS. 39A-39J illustrate moving, resizing, and reorganizing graphical information units according to some implementations.

Figure 39A:
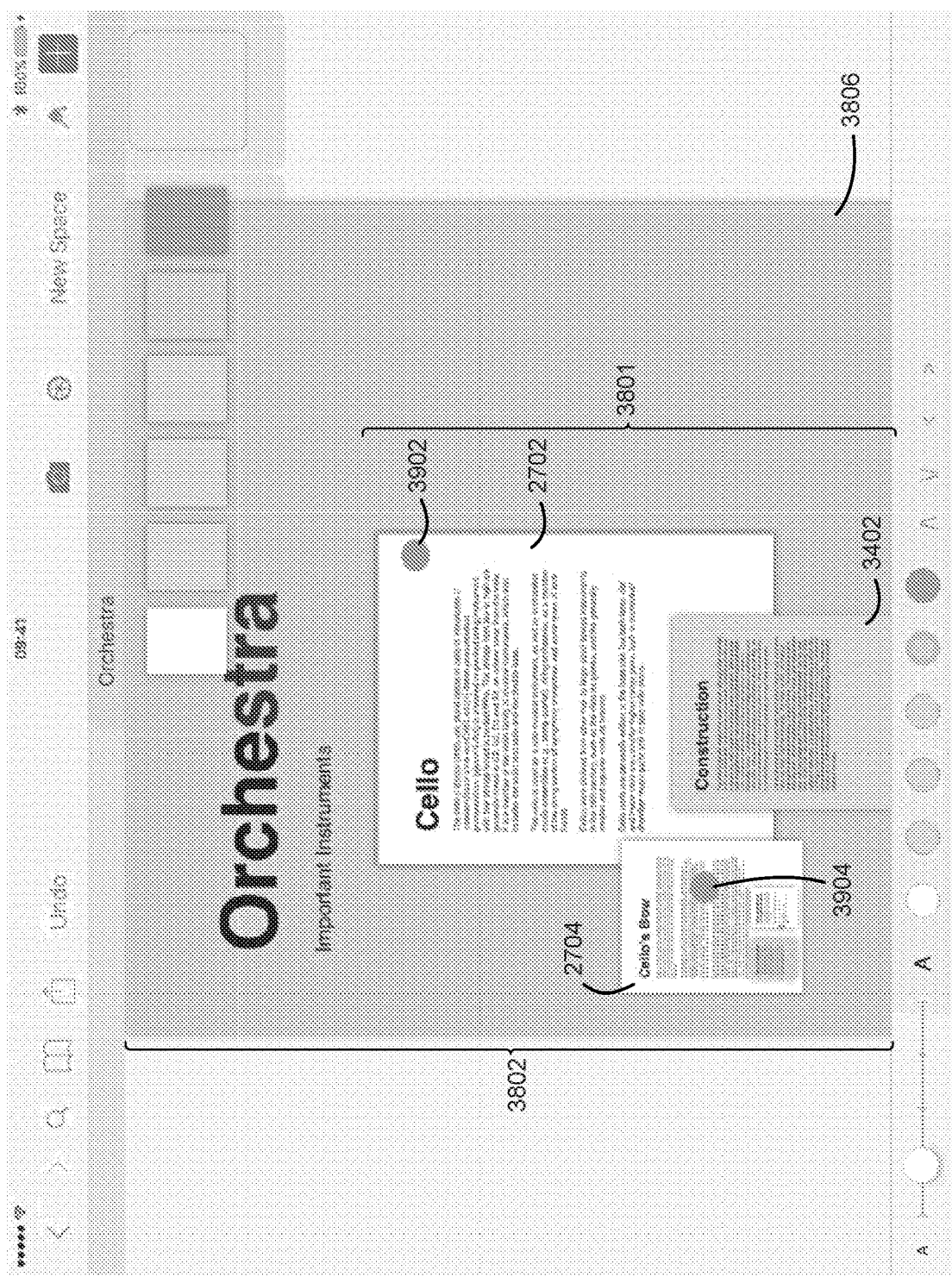
FIGS. 39A-39J illustrate moving, resizing, and reorganizing graphical information units according to some implementations.

FIG. 39A depicts an existing Zzote cluster 3802, which the user is about to alter. In this case the user wants to move and resize the Cello Zzote 2702 (and therefore the entire cluster 3801, which is Zzote 2702 including all of its sub-Zzotes and their descendants). The user presses and holds with two fingers as depicted by the two dots 3902 and 3904. After a very brief period of time (e.g., 0.05 seconds) with the user's fingers in the same locations (e.g., within a small margin of error, such as <1 mm of allowed movement per finger), some implementations proceed then to "pick up" such a Zzote. In the figure, the Cello Zzote 2702 is hence "picked up" as a result of such of such initial user input. Some implementations indicate this with an increased shadow as seen around the "picked up" Zzote 2702 in the figure.

Note that one finger (at the dot 3902) is within the Cello Zzote 2702, but the other finger (at the dot 3904) is actually within the Cello's Bow Zzote 2704 (outside the region of the Cello Zzote 2702). The user interface infers that the entire Cello Zzote cluster 3801 is to be picked up, which includes the Cello's Bow Zzote 2704 because it is a descendant of the Cello Zzote 2702. If both fingers had been within the Cello Zzote 2702, the result would be the same. (However, if one finger had been on the Cello's Bow Zzote 2704 and the other finger on the Construction Zzote 3402, the user interface would infer a different action, as described later. Such a scenario would fall into the category of both fingers being pressed on descendent Zzotes of a common ancestor, which is not itself being pressed.)

As a result of the user's press and hold, the display has visually indicated that the Cello Zzote 2702 has been picked up. In this implementation, the user interface uses an increased shadow around the Cello Zzote to indicate being picked up (as seen by comparing FIG. 39A to FIG. 38H).

At this point, the Cello Zzote 2702 and all its descendants (its sub-Zzotes and their sub-Zzotes, and so forth) are under the direct control of the user to be moved and resized as desired. The Zzotes under control are thus all of the Zzotes in the Cello cluster 3801, which is everything that belongs to the Cello Zzote 2702, including the Cello Zzote 2702 itself.

Note that this example uses a two-finger gesture. In contrast, consider the case where the user presses and holds only a single finger on the Cello Zzote 2702. The user interface would indicate that it is ready to be moved (e.g., showing an increased shadow around it). The user could then move it, but in some implementations any sizing would be based on auto-sizing (as previously described). Also note that, regardless of whether a user starts with a one finger gesture or a two finger gesture, the user can alternate between one and two fingers at any time, even in the middle of a gesture. Switching between one and two finger gestures was described above in the context of adding a new potential Zzote.

Figure 39B:
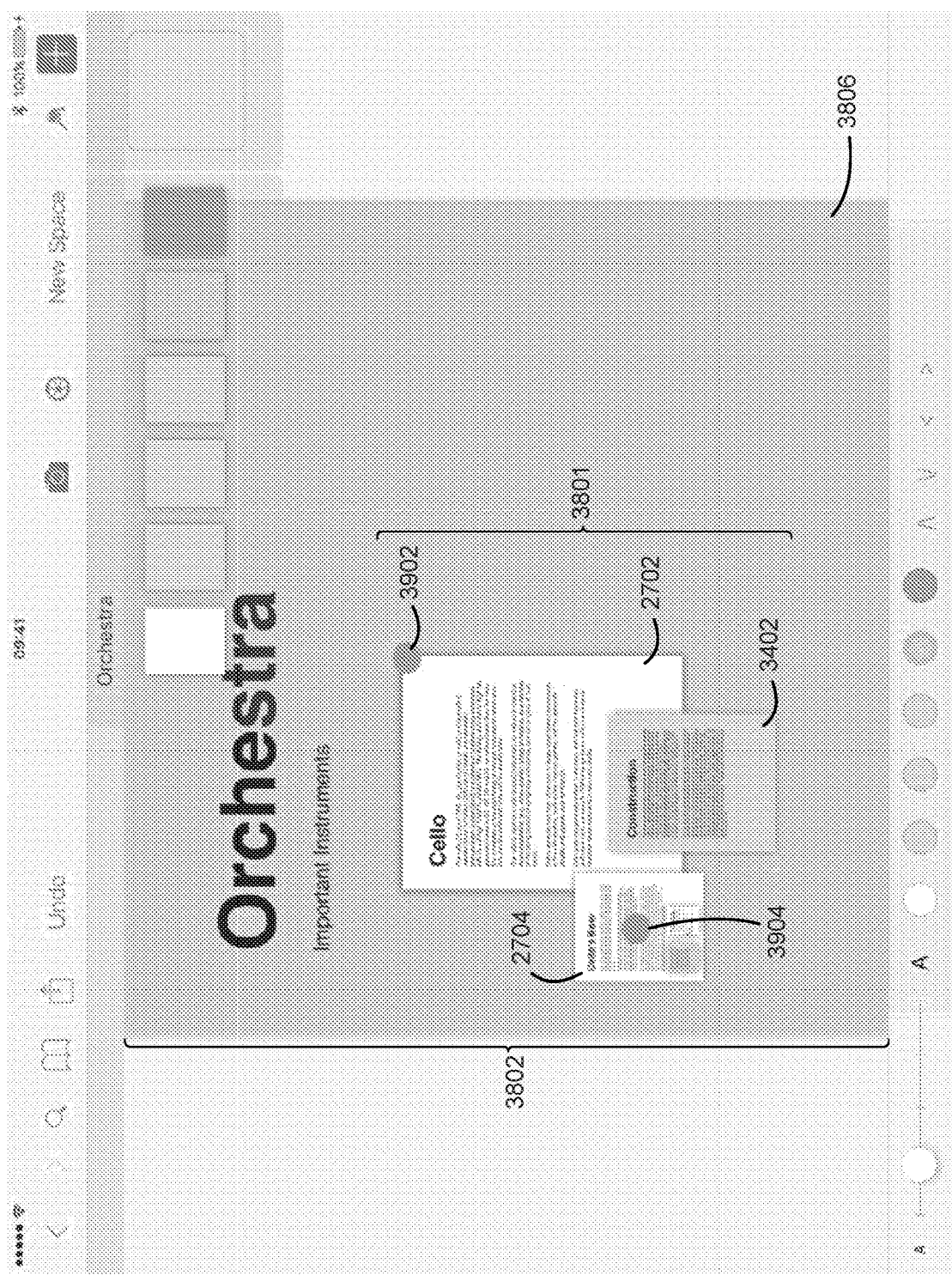

Returning to the actual two-finger gesture as started in FIG. 39A, FIG. 39B shows that the user keeps the two fingers 3902 and 3904 held on-screen. The user pinches the fingers slightly and moves slightly upwards and to the left. This moves the Cello Zzote 2702 structure (cluster) 3801 and reduces its size. The user's fingers have been kept on-screen, but have now moved to the altered positions shown by the dots 3902 and 3904 in FIG. 39B.

Many implementations use "sizing acceleration" (sometimes referred to as a multiplicative "magnification" factor) with regard to finger spacing. Because of this, the position of the fingers relative to the moving Zzote cluster 3801 is slightly altered. Also note that the Cello Zzote 3902 is being moved at the same time that its size is being reduced. All of the descendants of the Cello Zzote 2702 are in the Cello Zzote cluster 3801, so they are moved and resized to maintain the same proportions at all times relative to the parent Cello Zzote 2702.

Figure 39C:
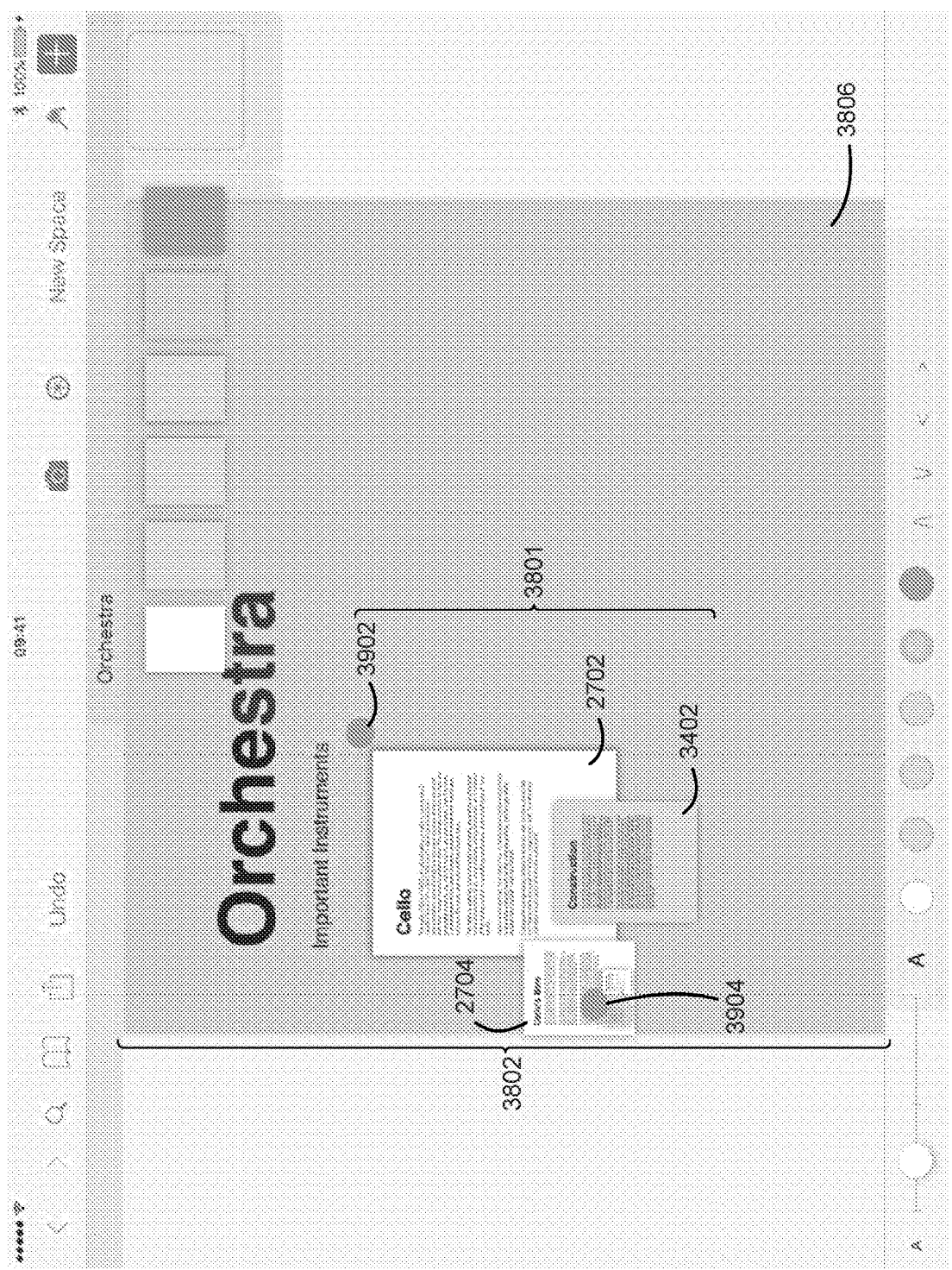

In FIG. 39C the user continues to use two fingers to move and shrink the Cello Zzote structure 3801 to a final desired arrangement. When the fingers are released to finalize the arrangement, space has been made available for new additions to Orchestra Zzote 3806 if desired.

Comparing FIG. 39C to FIG. 39B, the sizing acceleration is visible with regard to finger spacing. That is, the position of the fingers relative to the moving Zzote cluster is slightly altered. In FIG. 39C, the top right finger touch position 3902 is no longer actually touching the Zzote structure 3801. Nevertheless, the same Zzote structure 3801 continues to be manipulated according to the finger movements. In fact, the sizing acceleration has helped the user to see the structure as it gets smaller because it is not hidden by fingers on the screen. The sizing acceleration behavior here is the same as described above with respect to potential Zzotes.

Immediately after the scenario depicted in FIG. 39C, the user releases both fingers to finalize the new structure. When this occurs, there is an ending to the indication that the cluster has been picked up. In this implementation, the increased shadow seen in FIG. 39C will then no longer be displayed around the Cello Zzote 2702.

As illustrated by FIG. 39A-39C, the Cello Zzote structure 3801 has been moved and shrunk within the Orchestra Zzote 3806, potentially making space for new additions to the Orchestra Zzote 3806. This has also thereby also illustrated user selection (for moving/resizing) of a cluster with user input that utilizes a two finger gesture. The graphical information unit (Cello Zzote 2702) was selected ("Picked up") with all its descendants inferred as being the cluster. The same gesture proceeded to move and resize the selected graphical information unit (Cello Zzote 2702) with this occurring concurrently and proportionally to all its descendants (Cello Zzote 2702 and its descendants thereby comprise being the cluster) according to the hierarchical relationships as deduced prior to the user input. Changes in finger separation resized the cluster (including its components proportionately), and a multiplicative "magnification" factor was used. Throughout the gesture (user input), all the adjusted (i.e., the cluster) and non-adjusted graphical information units on the canvas were always displayed with smaller graphical information units displayed in front of overlapping larger graphical information units according to relative size determination using the specific-size-metric (of width).

The ability to shrink down Zzotes to make space for new additions is a useful feature in some implementations and takes advantage of the theoretically infinite zooming of Zzote-Space. The ability to both move and shrink at the same time ensured that the Cello Zzote 2702 (and therefore the entire Zzote cluster 3801) was shrunk while simultaneously moving to the top left. This is an intuitive and natural action, which would have been complex in the absence of the combined two-finger (move and resize) gesture. For example, alternative techniques might involve shrinking into the center of the Orchestra Zzote 3806, creating wasted space in the top left from the user's perspective.

With some spatial arrangements, a user may want to shrink items into the top right or other locations. With two-finger gestures, users can easily choose and adapt depending on the specific spatial situations (both the current configuration and the desired configuration).

In the situation where a user expands existing Zzotes at the same time as moving them, the same benefits apply.

FIGS. 39D-39J illustrate the ease and speed with which a user can rearrange a Zzote hierarchy. The techniques illustrate both visual transparency of meaning and action simplicity superior to previous known techniques. Information can be rapidly restructured whenever new knowledge comes to light or whenever a user contemplates a new way of looking at the same data.

Figure 39D:
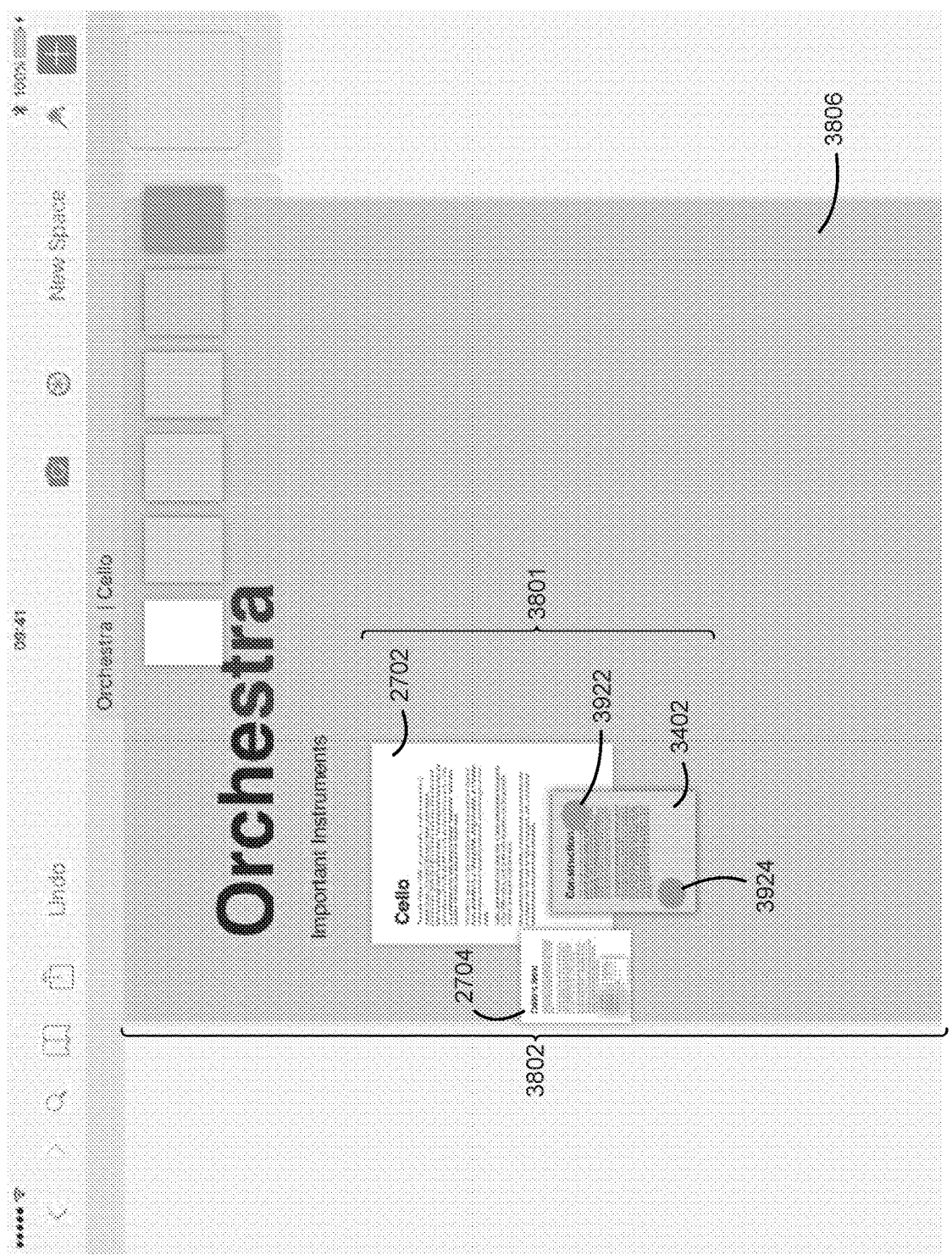

FIG. 39D begins an example of such a rearrangement being attempted by the user starting from the existing arrangement of Zzotes seen there.

Analyzing the existing meaning of FIG. 39D, within the Orchestra Zzote 3806 there is currently only one instrument shown. It is the Cello Zzote 2702, which contains information about its sub-Zzotes Construction 3402 and Cello's Bow 2704. The user who devised this was thinking of the orchestra subject in terms of the instruments used within an orchestra.

The user (or a different user) might want to break down the analysis according to the alternative concept of "Construction." In this alternative way of looking at the information, the user may choose to organize the information in terms of how instruments within an orchestra are actually made. For example, this might be an appropriate perspective for an instrument manufacturer when considering the subject of "Orchestra."

Because of this new way of looking at the information, the user wishes to arrange the known contents of the Orchestra Zzote 3806 within the now more important subject of the Construction Zzote 3402. Within the Construction Zzote 3402, the user intends to show the two known examples of constructed objects: information in the Cello Zzote 2702 and information in the Cello's Bow Zzote 2704.

Therefore, in FIG. 39D, the user starts this rearrangement process by pressing and holding two fingers on the Construction Zzote 3402 as indicated by the dots 3922 and 3924. The Construction Zzote 3402 is now "picked up" as indicated by an increased shadow around it in the illustrated implementation. The user now wishes to make the Construction Zzote 3402 larger and higher in the hierarchy in order to represent its new importance.

Figure 39E:
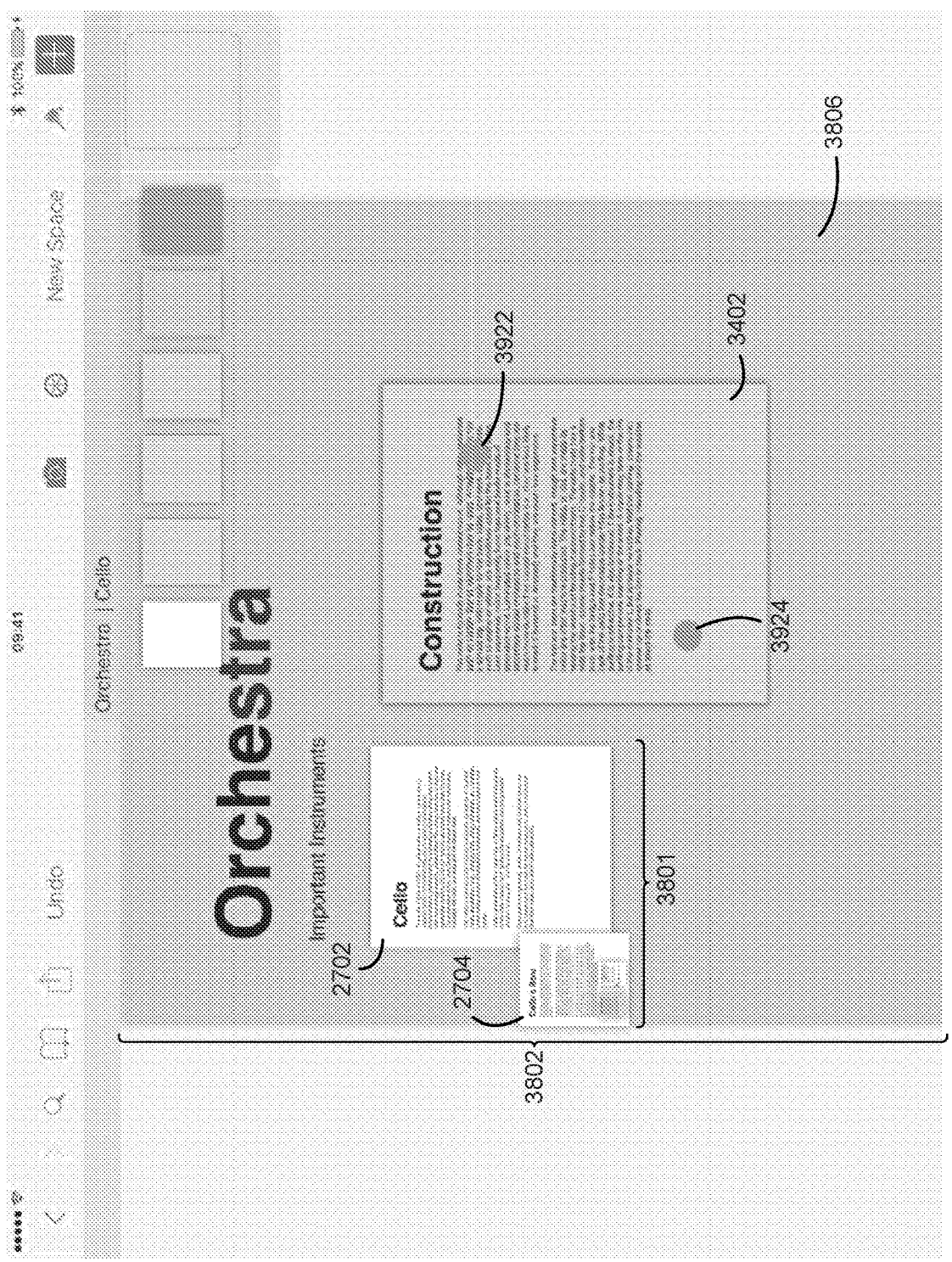

In FIG. 39E, in a continuation of the same gesture, the user increases the size of the Construction Zzote 3402 by unpinching and moving it to the right of the Cello Zzote 2702. The user has used the previously described dragging technique to move and resize the Construction Zzote 3402 from its size and location in FIG. 39D. As previously described, sizing acceleration (use of a multiplicative "magnification" factor) can be seen because the size of Construction Zzote 3402 has increased faster than the distance between the fingers at the positions depicted by the dots 3922 and 3924.

In FIG. 39E, the user's fingers are still touching the screen, so the Construction Zzote 3402 still has an increased shadow. Immediately after the situation depicted in FIG. 39E, the fingers are released to finalize the position and size of the Construction Zzote.

As a result of this simple action by the user, the Construction Zzote 3402 is no longer part of the Cello cluster 3801. It now appears as a sibling of the Cello Zzote 2702. In fact, the Construction Zzote 3402 is now larger than the Cello Zzote 2702. In FIG. 39E, the Construction Zzote 3402 now appears to be more important than the Cello Zzote 2702. This is just the beginning of the rearrangement.

Figure 39F:
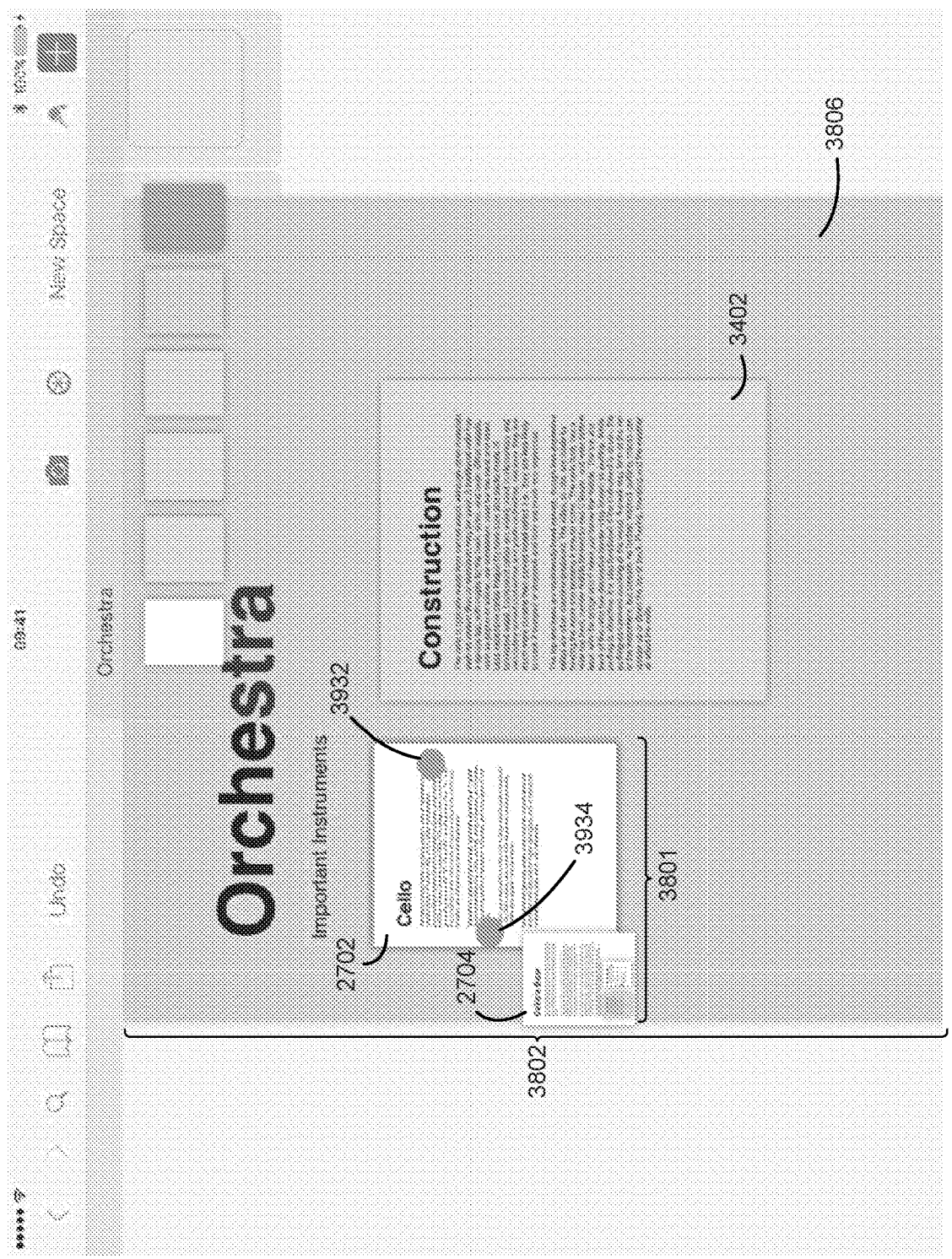

In FIG. 39F, the user presses and holds with two fingers on the Cello Zzote 2702 at the touch points indicated by the dots 3932 and 3934 to "pick up" the Cello Zzote 2702. After a brief period of time (e.g., 0.05 seconds) with the user's fingers in the same locations (within a margin of error, such as <1.0 mm of allowed movement for each finger), the user interface picks up the Cello Zzote 2702, as indicated by the increased shadow in the illustrated implementation.

Figure 39G:
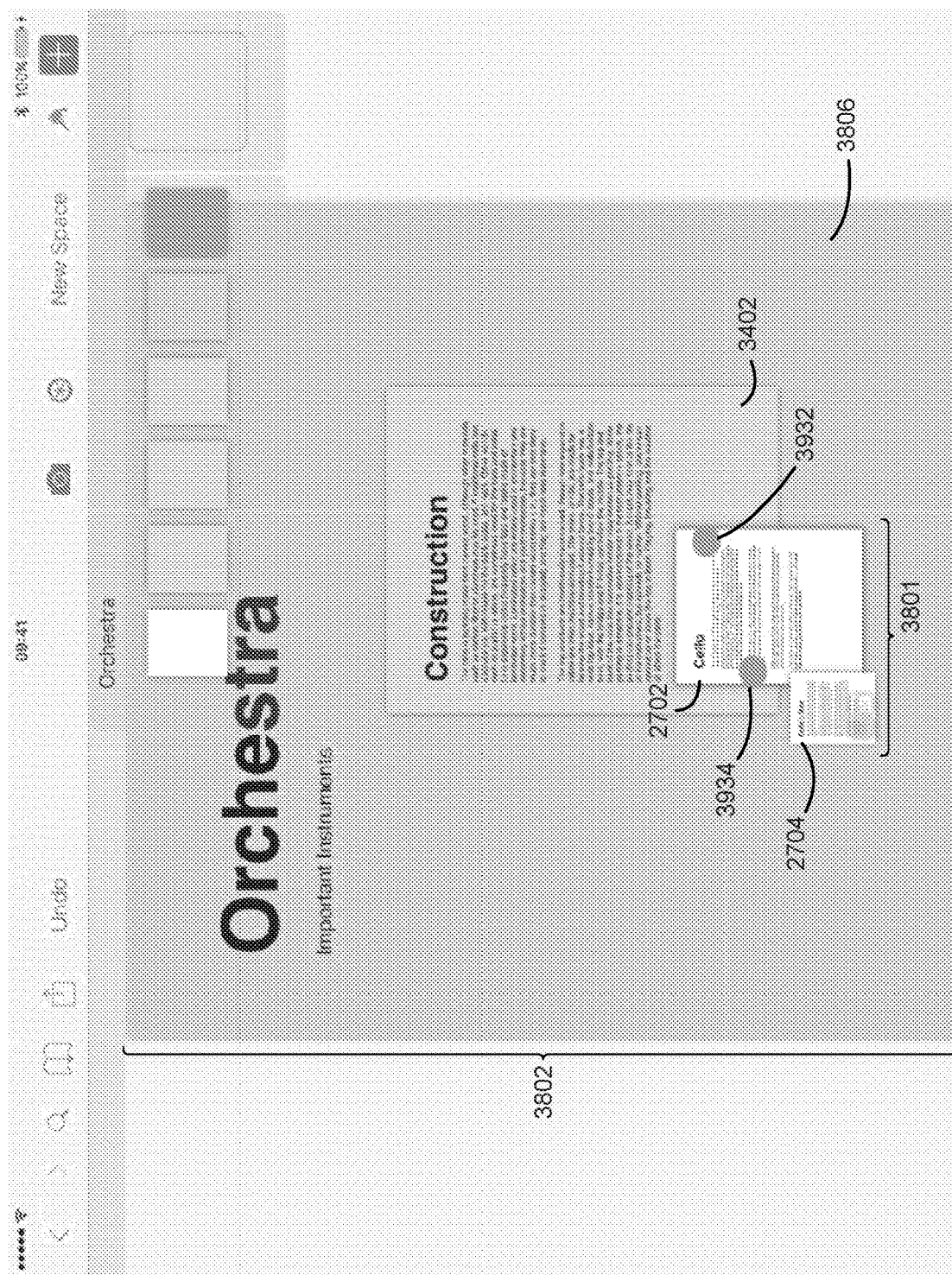

In FIG. 39G, in a continuation of the same gesture, the user drags the Cello Zzote 2702 (and thus its cluster 3801) over the Construction Zzote 3402 by simultaneously moving it and reducing its size so that it physically sits above (smaller) and overlapping the Construction Zzote 3402. As seen in FIG. 39G, all of the descendants of the Cello Zzote 2702 are moved and scaled with it. In other words, the entire Zzote cluster 3801 moves and scales with the movement and scaling of the Cello Zzote 2702. Based on the prior described principles, this is standard behavior in Zzote-Space: moving and sizing any Zzote inherently implies moving and sizing its entire Zzote cluster.

In FIG. 39G, the fingers are not yet released. Immediately after the situation shown in FIG. 39G, the user then releases their fingers 3932 and 3934 to finalize this new position and size for the Cello Zzote 2702 and its cluster 3801. This means that Cello Zzote 2702 (and hence also its cluster 3801) is now hierarchically within the Construction Zzote 3402.

The hierarchy has thus been inverted in two simple and intuitive visual steps from the situation in FIG. 39D. The manner in which the user has controlled Zzote-Space is based on the principles described previously.

This example from FIGS. 39F-39G has thereby also illustrated some aspects of adjustment to size and position of a graphical information unit according to user input. (In this example the user input was a two finger gesture.) The user adjusted the size and position of the selected ("Picked Up") graphical information unit (the "Cello" Zzote 2702). This applied concurrently and proportionally to all of its descendants according to the hierarchical relationships as deduced prior to the user input (two finger gesture), which started in FIG. 39F.

This deduction of hierarchical relationships follows the previously described parentage determination rules. Prior to the user input, the descendants of the "Cello" Zzote 2704 were deduced to be the "Cello's Bow" Zzote 2704 and further levels of descendants such as the child units of the "Cello's Bow" Zzote 2704 (and any further levels of descendants even if too small to be seen at the current viewport scale in the figure). For example, the Zzote 2702 is larger than the partially overlapping Zzote 2704 according to the specific-size-metric of width, so the Zzote 2702 was deduced as a parent of the Zzote 2704. It can be seen in FIGS. 39F and 39G that the "Cello" Zzote 2704 and its deduced descendants therefore comprise the cluster 3801.

During the user input (two finger gesture in this example) that occurs between FIGS. 39F and 39G, there is a resultant move and resize of the selected graphical information unit (the Cello Zzote 2702), which occurs concurrently and proportionally to all of these descendants. This can be seen in the proportional change of position and scale of all the components of the cluster 3801 from FIG. 39F to 39G.

Also, it can be seen that during this user input occurring between FIGS. 39F and 39G, all of the adjusted graphical information units (i.e., the graphical units in the cluster 3801, which comprise the selected graphical information unit 2704 and its prior-to-user-input deduced descendants), and non-adjusted graphical information units on the canvas (such as the "Construction" Zzote 3402) were always displayed with smaller graphical information units displayed in front of overlapping larger graphical information units according to relative size determination using the specific-size-metric (of width in this implementation).

At the same time, FIGS. 39F-39G also illustrate aspects of user selection of a cluster and its subsequent moving and resizing using a user gesture that uses two of the user's fingers. The cluster 3801 comprises the selected "Picked up" graphical information unit Zzote 2702 and its descendants as deduced prior to this user input. As seen in FIGS. 39F and 39G, the cluster 3801 therefore includes graphical information units 2702 and 2704 and some other smaller graphical information units. When the fingers moved in the same direction, the cluster moved in that same direction as seen in the lateral movement of the finger points 3932/3934 and the cluster 3801 between FIGS. 39F and 39G. It can also be seen between FIGS. 39F and 39G that changes in finger separation (reduction in this example) resized (shrinking in this example) the cluster 3801 (including all its components proportionately) in proportion to the finger separation change.

As previously described, throughout the user input (two finger gesture) that was adjusting the cluster, all of the adjusted graphical information units comprising the cluster 3801 and non-adjusted graphical information units on the canvas (such as the "Construction" Zzote 3402) are always displayed with smaller graphical information units displayed in front of overlapping larger graphical information units according to relative size determination using the specific-size-metric (of width).

It is useful to review the hierarchy inversion in the simple steps going from FIG. 39D to when the fingers were released after FIG. 39G. Originally, the Cello Zzote 2702 was the large-scale container, with the Construction Zzote 3402 as a small component (sub-Zzote) of that. Now, the Construction Zzote 3402 is the large-scale "container", with the Cello Zzote 2702 a smaller component (sub-Zzote) of the Construction Zzote. The semantic meaning as visually represented in FIG. 39G is thus quite different. This could not have been achieved in such a simple and intuitive manner without the use of Zzote-Space.

Figure 39H:
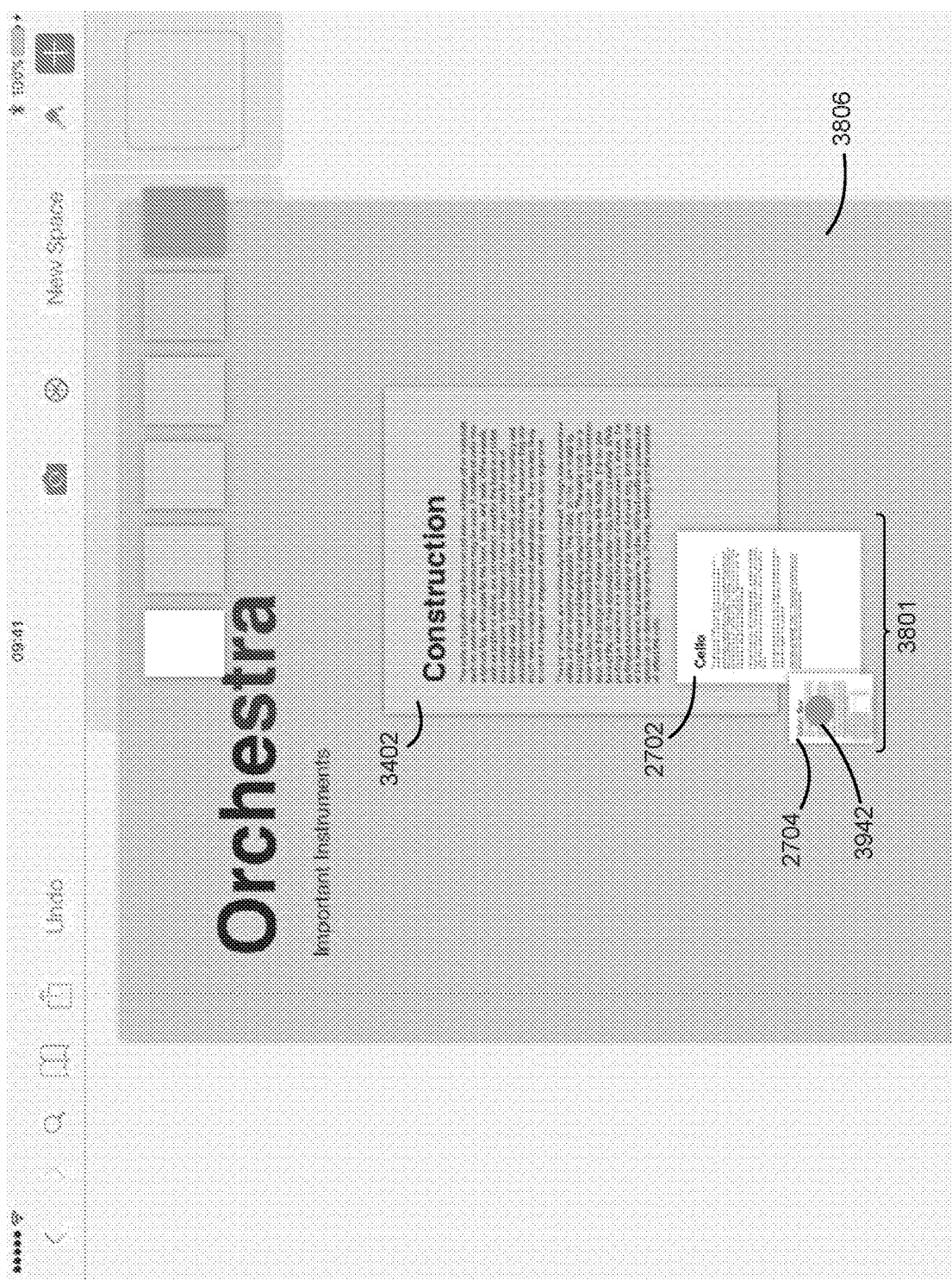

In FIG. 39H, the user presses and holds on the Cello's Bow Zzote 2704 (from within the Cello Zzote 2702) with one finger at the location indicated by the dot 3942. The user interface picks up the Cello's Bow Zzote 2704 as indicated by an increased shadow around the Cello's Bow Zzote 2704.

In FIG. 39H, the Heading of the Cello's Bow Zzote 2704 is too small to clearly read. The user, however, remembers the subject from earlier. The distinctive shape and color of Zzote 2704 including its descendants (visible in FIG. 39H) reinforce that memory. (Additionally, the user could previously have easily zoomed-in and zoomed-out to verify if necessary.)

In FIG. 39H, the user uses single-finger control, which includes automatic sizing of the Zzote 2704 as well as automatic panning and zooming of the viewport when appropriate.

In this case, if the user continues to move this Zzote 2704 so that it still remains a sub-Zzote of any existing parent Zzotes from its starting position (in this case, a sub-Zzote of the Cello Zzote 2702), then the Zzote 2704 will move without activating either auto-sizing or automatic panning and zooming of the viewport. However, once it is determined that moving the Zzote 2704 would cause it to have a different parent (or change to or from having no parentage), auto-sizing and/or automatic panning and zooming of the viewport may occur.

Figure 39I:
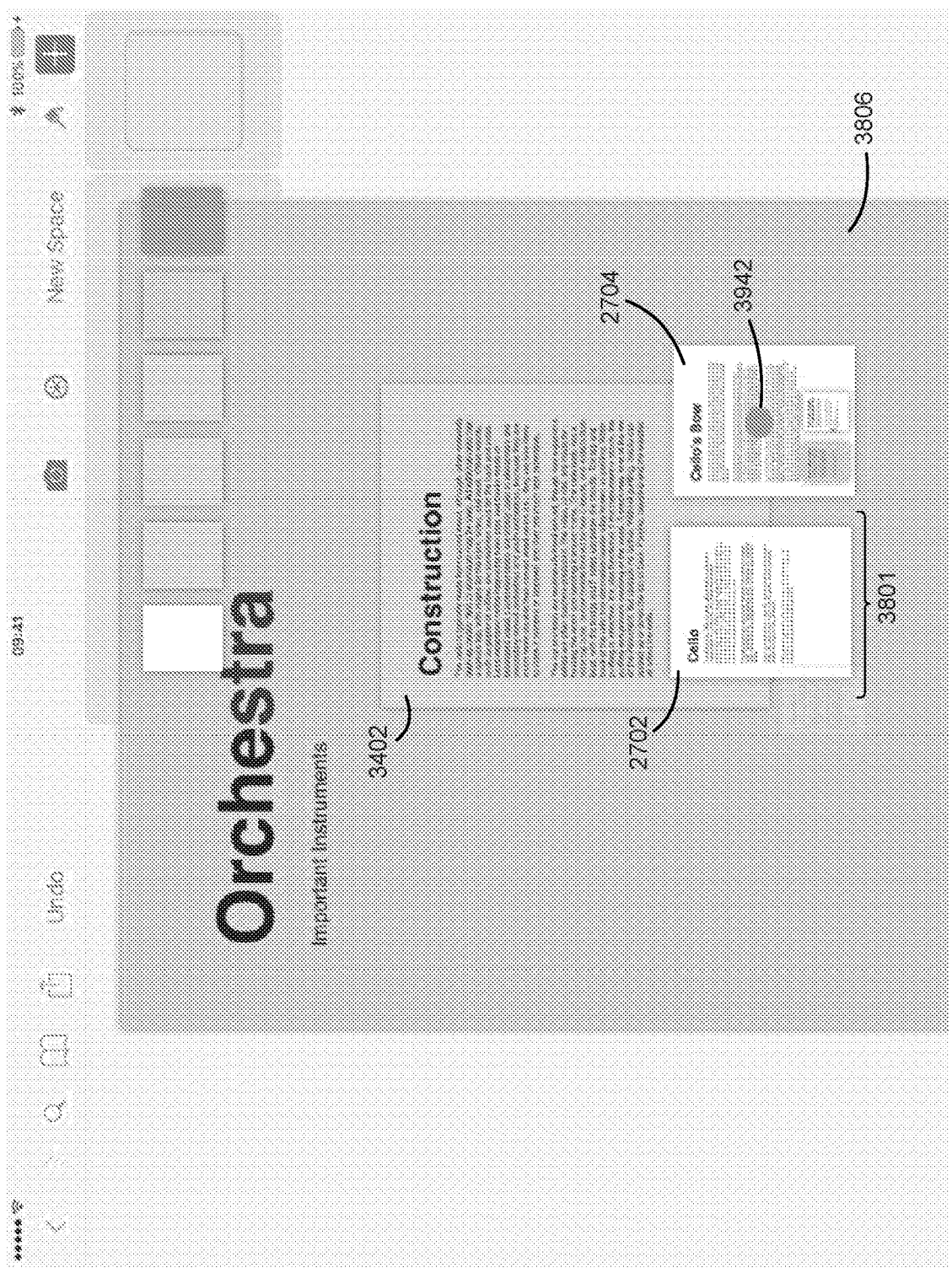

As shown in FIG. 39I, in a continuation of the same gesture, the user drags the Cello's Bow Zzote 2704 out of and to the right of the Cello Zzote 2702. The Cello's Bow Zzote 2704 goes from being a sub-Zzote of the Cello Zzote 2702 to a probable sibling. The finger has moved to the position of the dot 3942 in FIG. 39I. The Cello's Bow Zzote 2704 moved according to the movement of the one finger.

At the shown position, the user interface determined that the Cello's Bow Zzote 2704 should be a sub-Zzote of the Construction Zzote 3402. Therefore, Auto-size has adjusted the size of the Cello's Bow Zzote 2704. Some implementations automatically resize according to the median size of the existing sub-Zzotes of the Construction Zzote 3402. In this case, there is only one sub-Zzote (the Cello Zzote 2702), so Auto-size makes the Cello's Bow Zzote 2704 the same size as the Cello Zzote 2702.

The user could choose to manually switch over to two-finger operation for precise size control if a different size were desired. In this example however, the user does not.

Figure 39J:
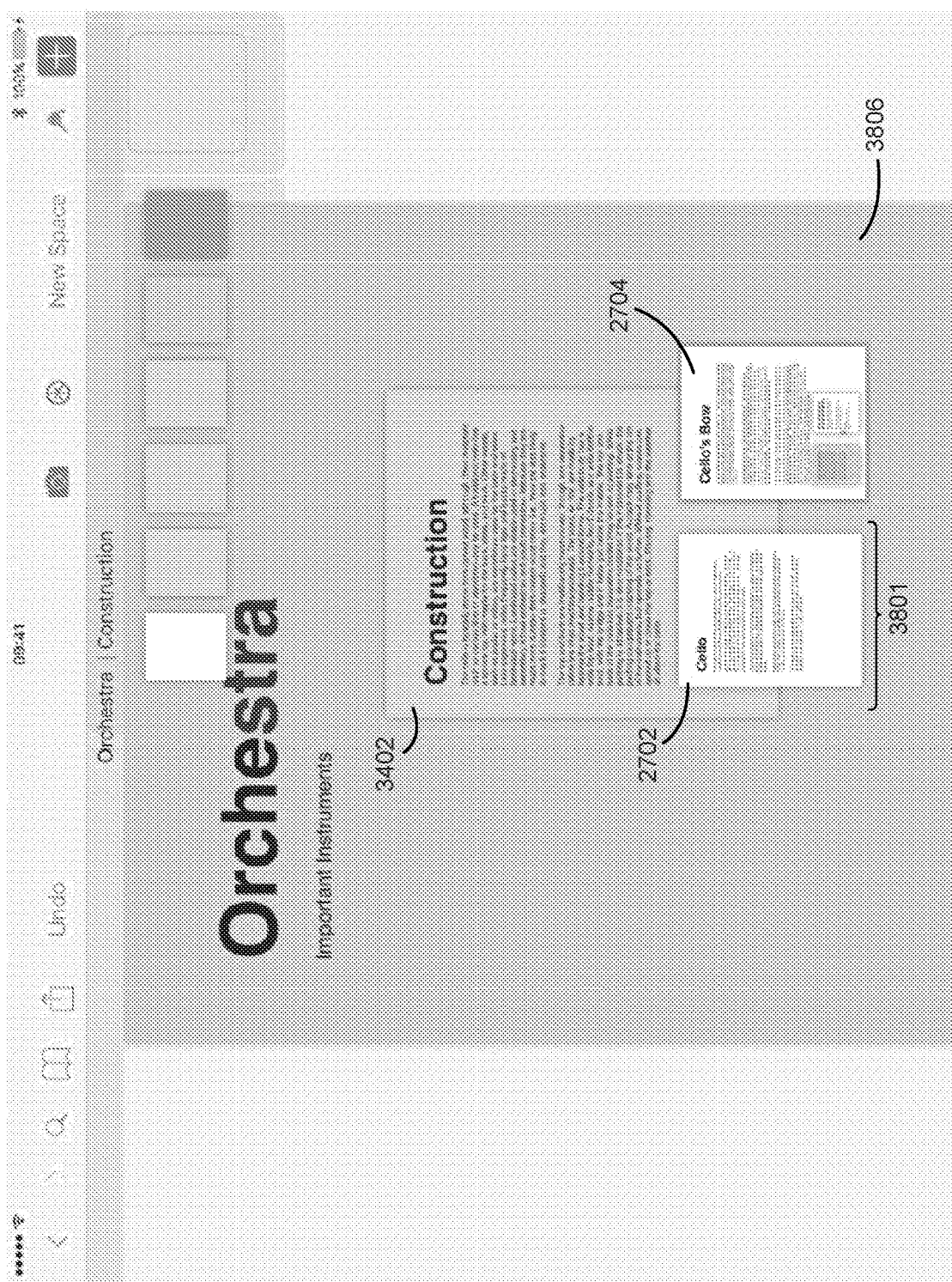

The user releases the finger (or both fingers if it was switched to a two-finger gesture) to finalize the new position as illustrated in FIG. 39J There is a completely new hierarchy, and the user was able to achieve this both easily and rapidly.

FIGS. 40A-40F illustrate resizing and repositioning collections of clusters of graphical information units, in accordance with some implementations.

Figure 40A:
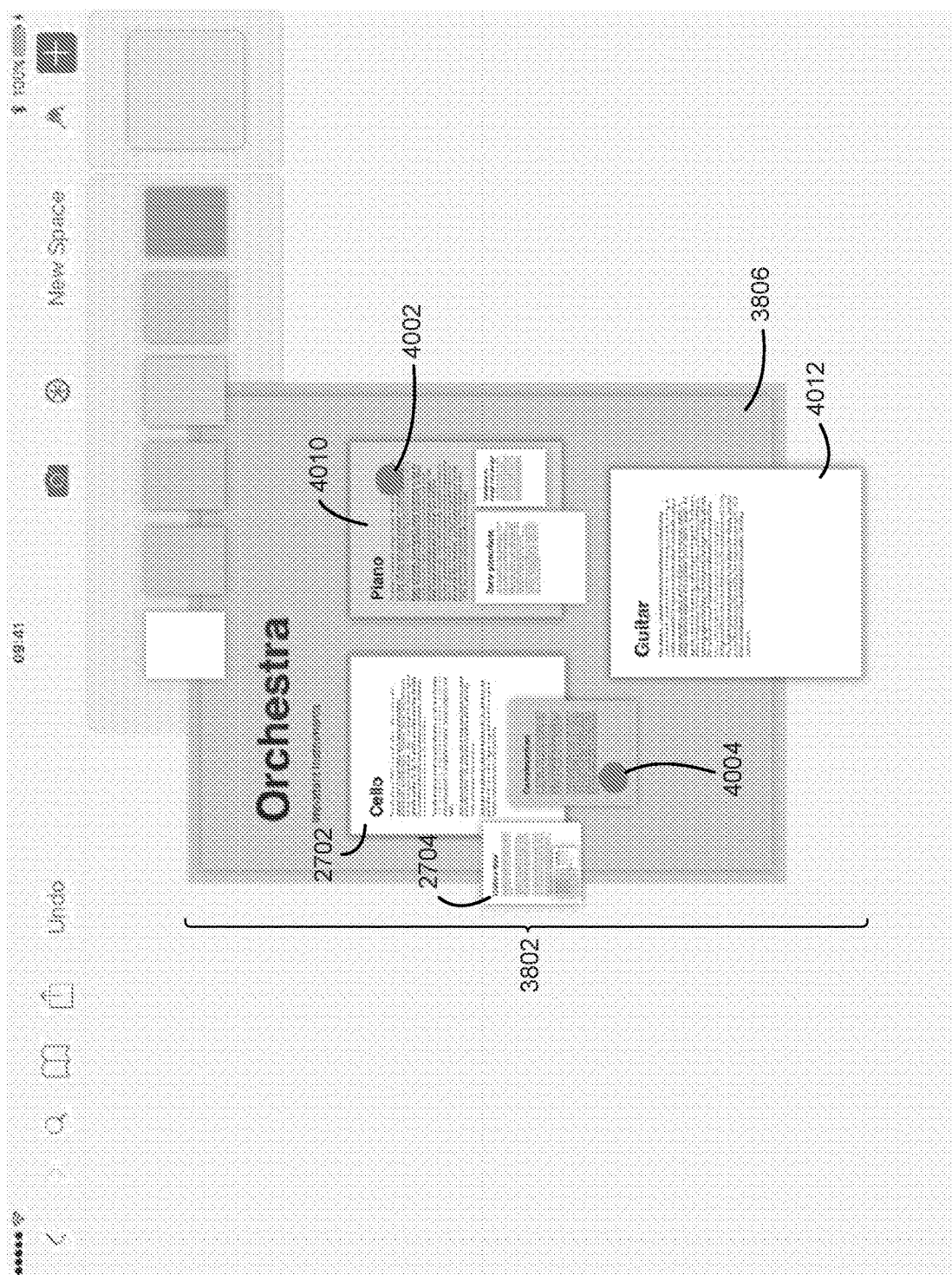
FIGS. 40A-40F illustrate resizing and repositioning collections of clusters of graphical information units, in accordance with some implementations.

FIG. 40A shows the entire contents of an Orchestra Zzote 3806. The user uses two fingers to pick up all of the descendants of the Orchestra Zzote 3806. The user's two fingers touch on any two of the descendants of Orchestra Zzote 3806, as illustrated by the dots 4002 and 4004. Note that neither of the user's fingers is directly on the Orchestra Zzote 3806 itself; if either finger touched the Orchestra Zzote 3806, the operation would pick up the entire Orchestra cluster 3802, which is not the goal here. In some implementations, the user interface indicates the selection of the descendants by increasing the shadow on the sub-Zzotes of the Orchestra Zzote 3806.

In alternative implementations, only the descendants of the common ancestor (the Orchestra Zzote 3806) that at least partially overlap an axis-aligned rectangle formed between the finger points 4002 and 4004 (but not the ancestor itself) are picked up. (In such alternative implementations, for any given descendent Zzote that qualifies by at least partially overlapping such a rectangle, all of its own descendants will then also be included even if any of those do not overlap the rectangle. They are included because they are in effect components of the given qualifying Zzote.) This alternative implementation is not depicted in FIG. 40A although in this precise example the result may happen to be the same depending on whether the precise vertical location of finger point 4004 is interpreted as thereby enclosing Zzote 4012 in such a rectangle.

In such alternative implementations, the user can rescale all of the contents of a parent Zzote within a selected rectangular region, and position them along with shrinking or expanding them. If the parent Zzote is "full," space can be "created" by "shrinking" a subset of Zzotes. In addition, these Zzotes can be moved to a completely different Zzote or moved outside of any existing Zzote.

As a diverging example of this alternative, suppose that in FIG. 40A one finger were placed on the Cello's Bow Zzote 2704 and another finger on the Piano Zzote 4010. In this case the rectangle marked out would not include the Guitar Zzote 4012, so only the Cello Zzote 2702, the Piano Zzote 4010, and their sub-Zzotes (including all of their own descendants) would be picked up.

Some implementations provide this alternative as an option under certain circumstances. For example, a user may have access to a specific menu option to toggle between the default option (all descendants) and the alternative option (all descendants within the rectangle) for two finger gestures. Other implementations set the alternative behavior (all descendants within the rectangle) as the default for two-finger gestures when the ancestor Zzote (here, the Orchestra Zzote 3806) is not being pressed. (FIGS. 40A-40F illustrate the use of an "all descendants" option and not the "all descendants within the rectangle" option.)

Figure 40B:
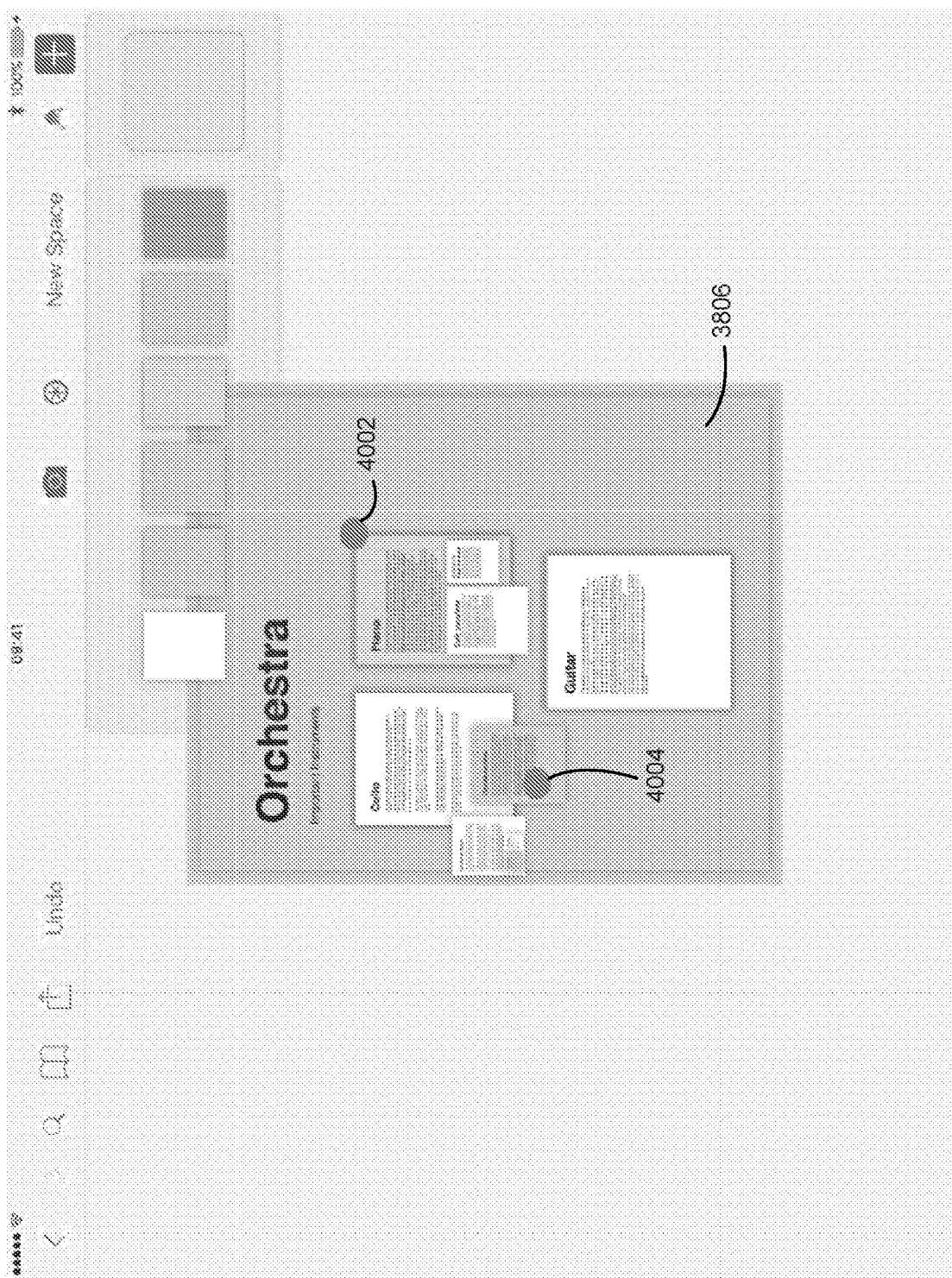

In FIG. 40B the user has pinched while at the same time moving the centroid of the two fingers (4002 and 4004) precisely as required, thereby simultaneously shrinking and precisely repositioning all of the descendants of the Orchestra Zzote 3806. The fingers remain in contact. As seen in FIG. 40B, all of the descendants of the Orchestra Zzote 3806 are moving and sizing simultaneously, maintaining the same proportions relative to each other.

As noted previously, the ability to simultaneously move and resize has various advantages. If the user had only been able to shrink the descendants of the Orchestra Zzote 3806 (e.g, with some form of a slider), then the user would have no control over where they shrunk into. For example, they might shrink toward the center of the Orchestra Zzote 3806, which is likely not what the user wants.

Here, with moving and resizing together, the user can move at the same time as resizing. As the shrinking occurs, the Zzotes are moved to the top left as desired in this instance.

Figure 40C:
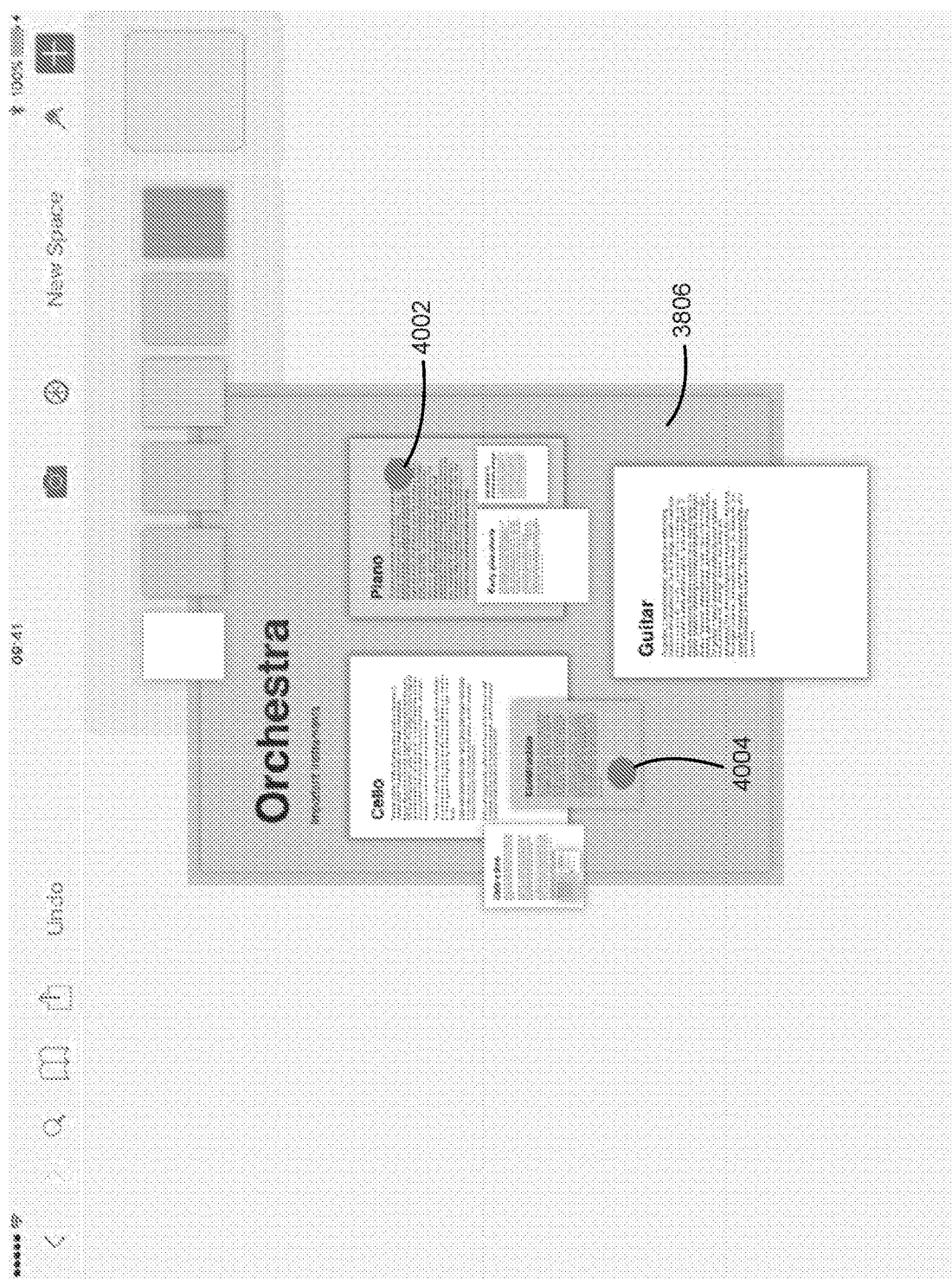

In FIG. 40C, the user temporarily reverses the action by unpinching the fingers alongside a lateral movement of the fingers' centroid as required. The descendants are all back to approximately where they started. However, the gesture is still active because the user has not released the fingers.

That the finger gestures are so easily and intuitively reversible provides an important advantage, encouraging users to experiment more freely. Such immediate and tactile reversibility is a useful feature.

Another benefit of the features is that users can "think" with their fingers on the screen and try things out rather than have to pre-imagine the consequences of their actions. In this case, the user may be investigating various arrangements.

Figure 40D:
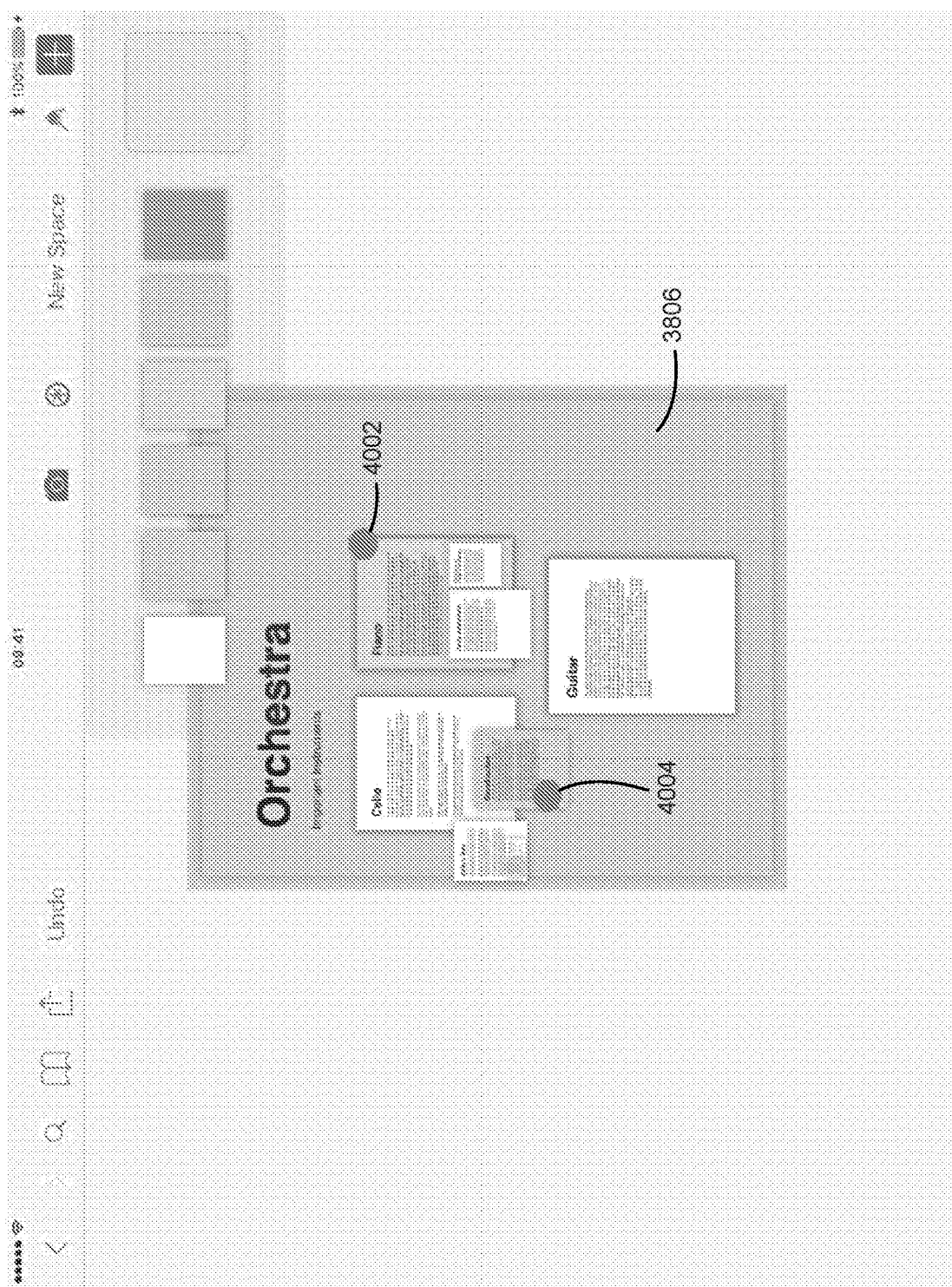

In FIG. 40D, the user chooses to reverse course again, and continues with the original shrinking and moving action. Such direct manipulation as offered by some implementations is often preferable to an "Undo" feature, although many implementations also provide an "Undo" feature. It is more natural for humans to manually go back and forwards in the way illustrated in FIGS. 40A-40D. This generally works even when users cannot guarantee going back to exactly the same starting position. Often, the exact position is not crucial as long as it creates the same overall pattern, which often has some slight randomness.

Figure 40E:
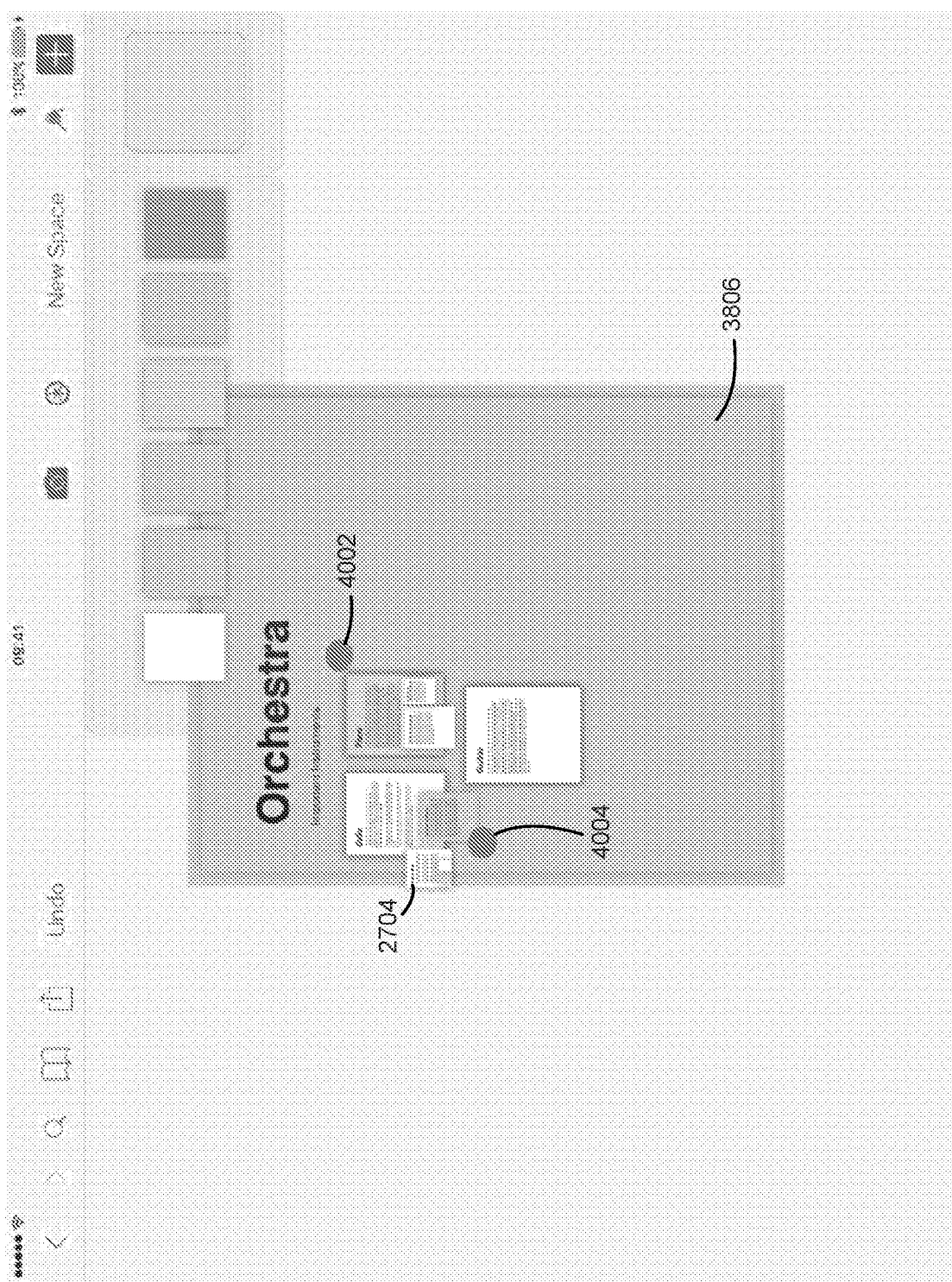

In FIG. 40E the user continues to pinch and move the two fingers, thereby shrinking and repositioning all of the descendants of the Orchestra Zzote 3806 once more. The fingers are still not released.

As seen in FIG. 40E, all of the descendants of the Orchestra Zzote 3806 are moving and sizing simultaneously while maintaining the same proportions relative to each other.

As shown in FIG. 40E, the top left position of the three moved Zzote clusters has been finely tuned by the user, making maximum space available for new Zzotes. The current arrangement may also be due to aesthetic considerations.

Figure 40F:
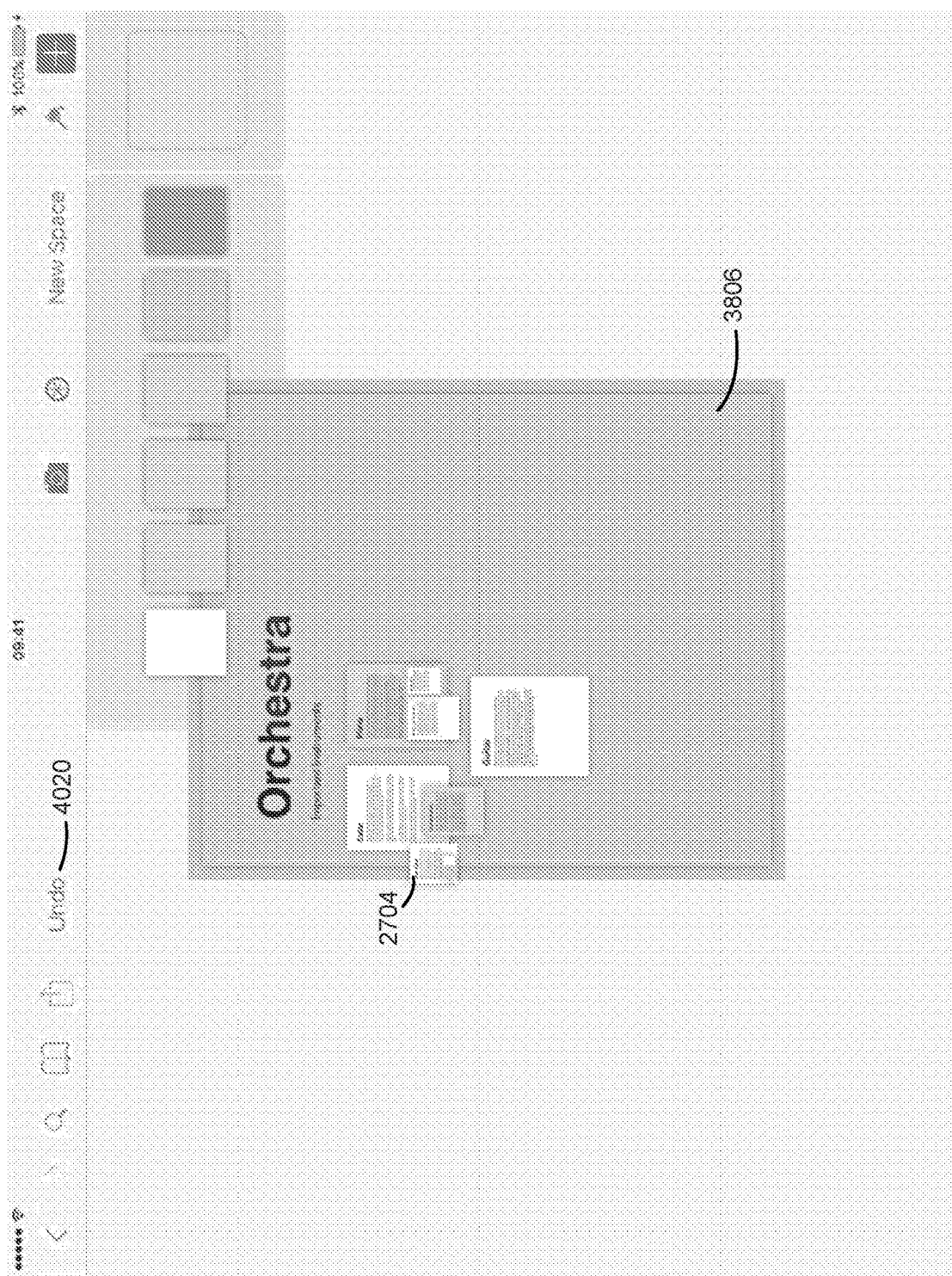

The fact that the Cello's Bow Zzote 2704 overhangs the Orchestra Zzote 3806 slightly may be quite deliberate by the user. It has left more space for new instruments and makes the overall cluster shape more memorable. The fingers are then released to finalize the positions, as shown in FIG. 40F. More space is now available for additional instrument Zzotes within the Orchestra Zzote 3806.

The entire process from FIG. 40A to 40F was very quick and intuitive. The user could press the Undo button 4020 (see FIG. 40F) if not happy with the result at any stage. Alternatively, at any time the user could easily reverse the process manually, creating a layout that is close enough to the starting layout.

One advantage of the ability to easily shrink or expand contents at any time is that users have a sense of confidence that it is always possible to add more details at any time and at any location/detail-level within a subject.

Because the shrinking process can be repeated as often as necessary and there is no (theoretical) limit to zooming, the same Orchestra Zzote 3806 could contain hundreds of sub-Zzotes, each having a comparatively small size from the perspective of viewing the entire Orchestra Zzote 3806. In such a case, there are likely to be one or more intermediate levels of grouping, such as grouping into woodwinds, string instruments, brass, and percussion.

Because of the novel grouping abilities in the present disclosure, the decision to sub-group can be easily carried out later when it emerges that lots of instruments may be required.

Storing Clusters of Graphical Information Units to a Visual Cluster Clipboard

FIGS. 41A-41F illustrate storing a cluster of graphical information units to the visual cluster clipboard (also sometimes referred to as the "Visual clipboard") according to some implementations.

Figure 41A:
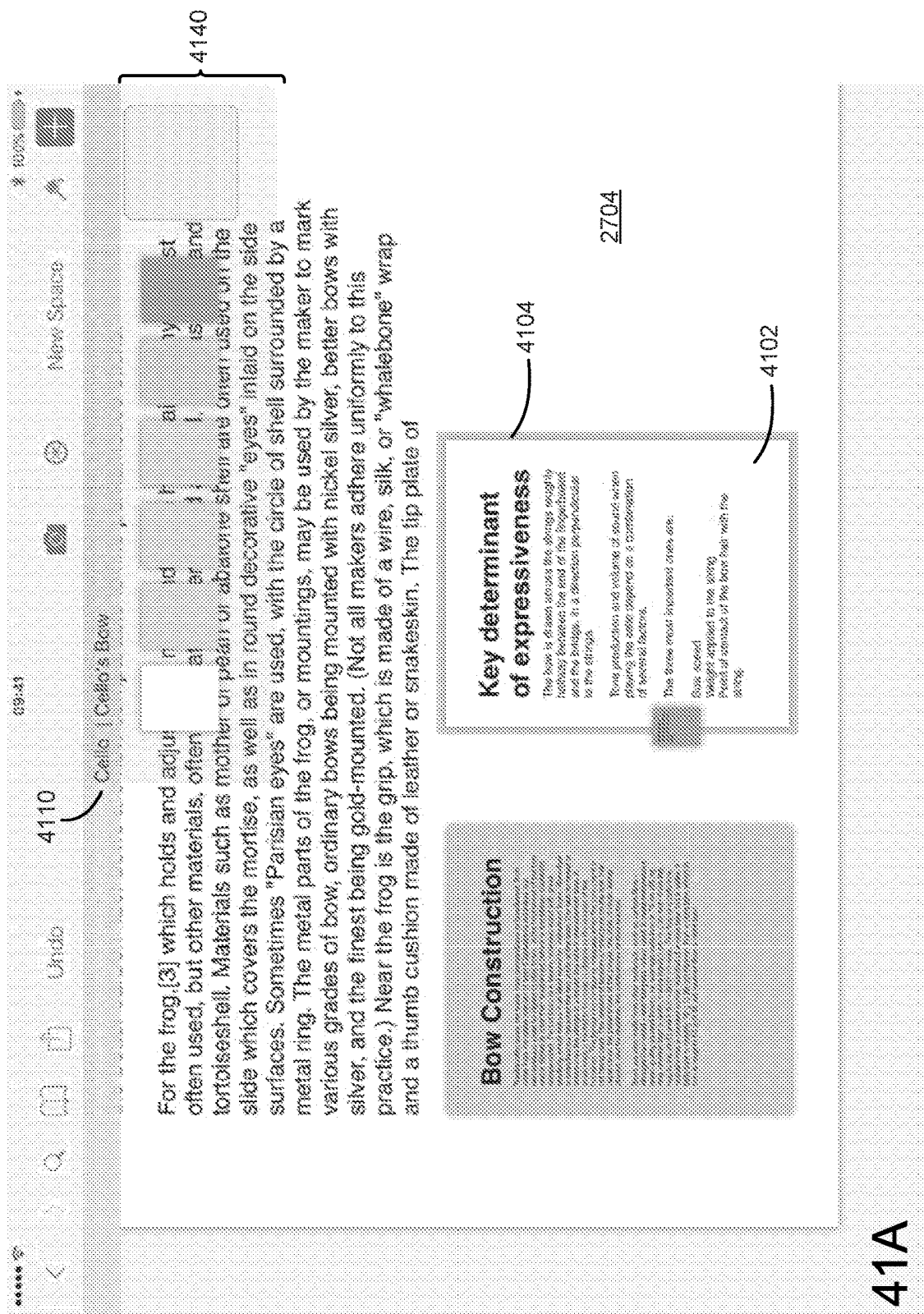

In FIG. 41A, a user finds a relevant Zzote 4102 with the Heading "Key determinant of expressiveness" and selects it. The parent of Zzote 4102 is the "Cello's Bow" Zzote 2704. The parent of the "Cello's Bow" Zzote is the "Cello" Zzote 2702 which is not currently directly visible in the viewport in this figure. (In the current example, the positioning and ancestry of Zzote 2702 and its cluster has now been returned to its arrangement as depicted in FIG. 38A.) Note that this parentage of the selected Zzote 4102 can be inferred from the path "Cello|Cello's Bow" 4110 shown in the Path bar. (The user has the complementary option to briefly zoom-out and then zoom-in the viewport with a single reversible gesture to confirm this greater information-context in Zzote- Space itself). In FIG. 41A, the Zzote "Key determinant of expressiveness" 4102 is selected. In this implementation, selection is indicated by the ring 4104 around it.

Figure 41B:
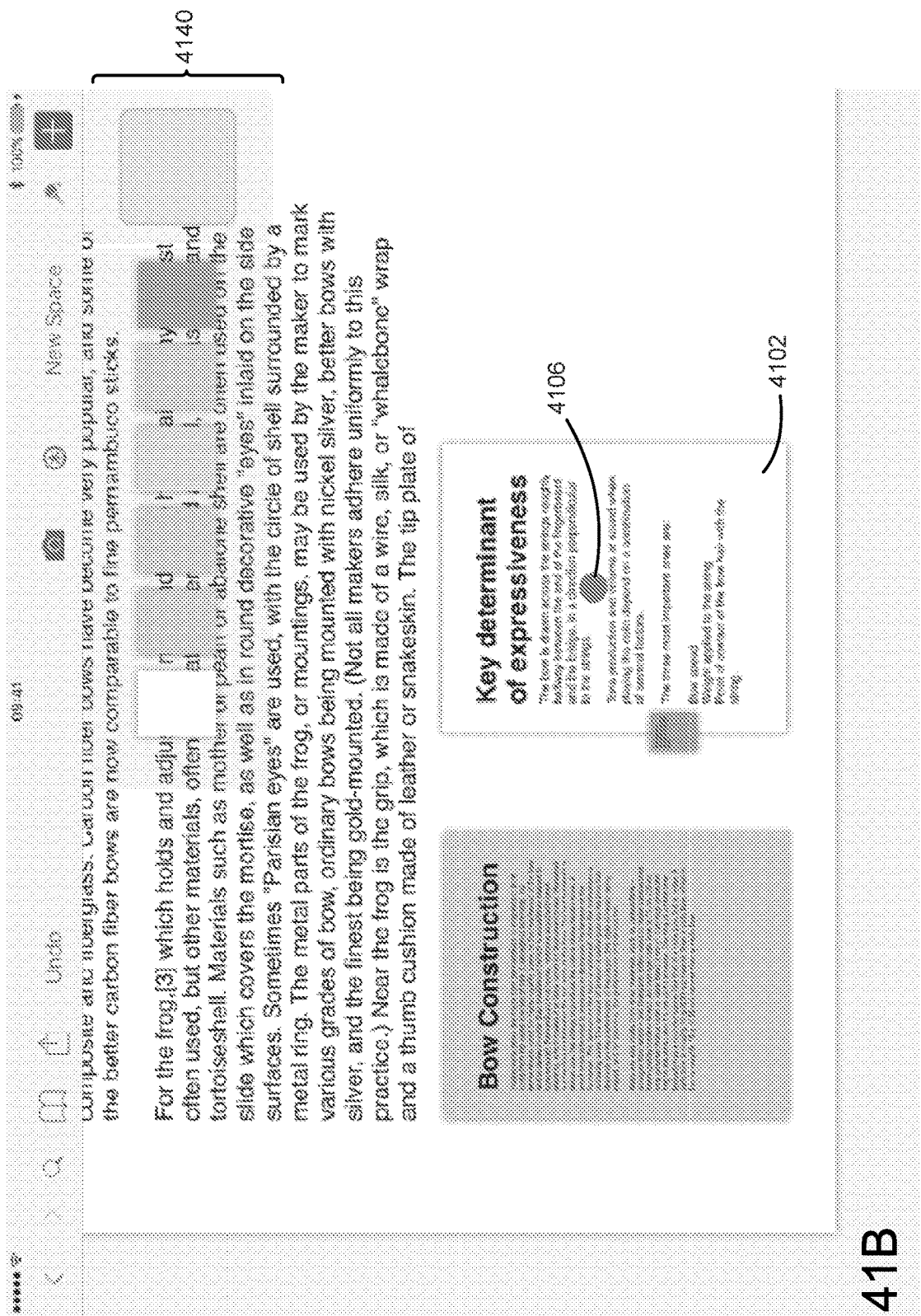

Note that actually selecting the Zzote 4102 (e.g., in some implementations to cause a distinctive "selection" ring 4104 to appear around the Zzote without/before actually "picking it up") was not necessary; the user could have proceeded directly to picking up the Zzote 4102 (which is also a form of "selecting" a graphical information unit according to user input), as illustrated in FIG. 41B without selecting the Zzote 4102 first. However, the selection does emphasize which Zzote the user is interested in. It also provides the user with clarification of the exact location of the Zzote as shown by the path 4110 in the Path bar. (As previously described, the action of Zzotes being "Picked Up" is another form of selection of graphical information units according to user input.)

As shown in FIG. 41B, the user presses and holds with one finger on the "Key determinant of expressiveness" Zzote 4102, as indicated by the dot 4106. The user wants to create a Zzote-Link to this Zzote because it contains information that the user believes is relevant for another task—gathering information for a possible television show. A Zzote-Link is an active in situ portal to another Zzote, as described in FIGS. 42A-48 below. A Zzote-Link can also be described as a "link graphical information unit" containing "shared graphical information units."

Figure 41C:
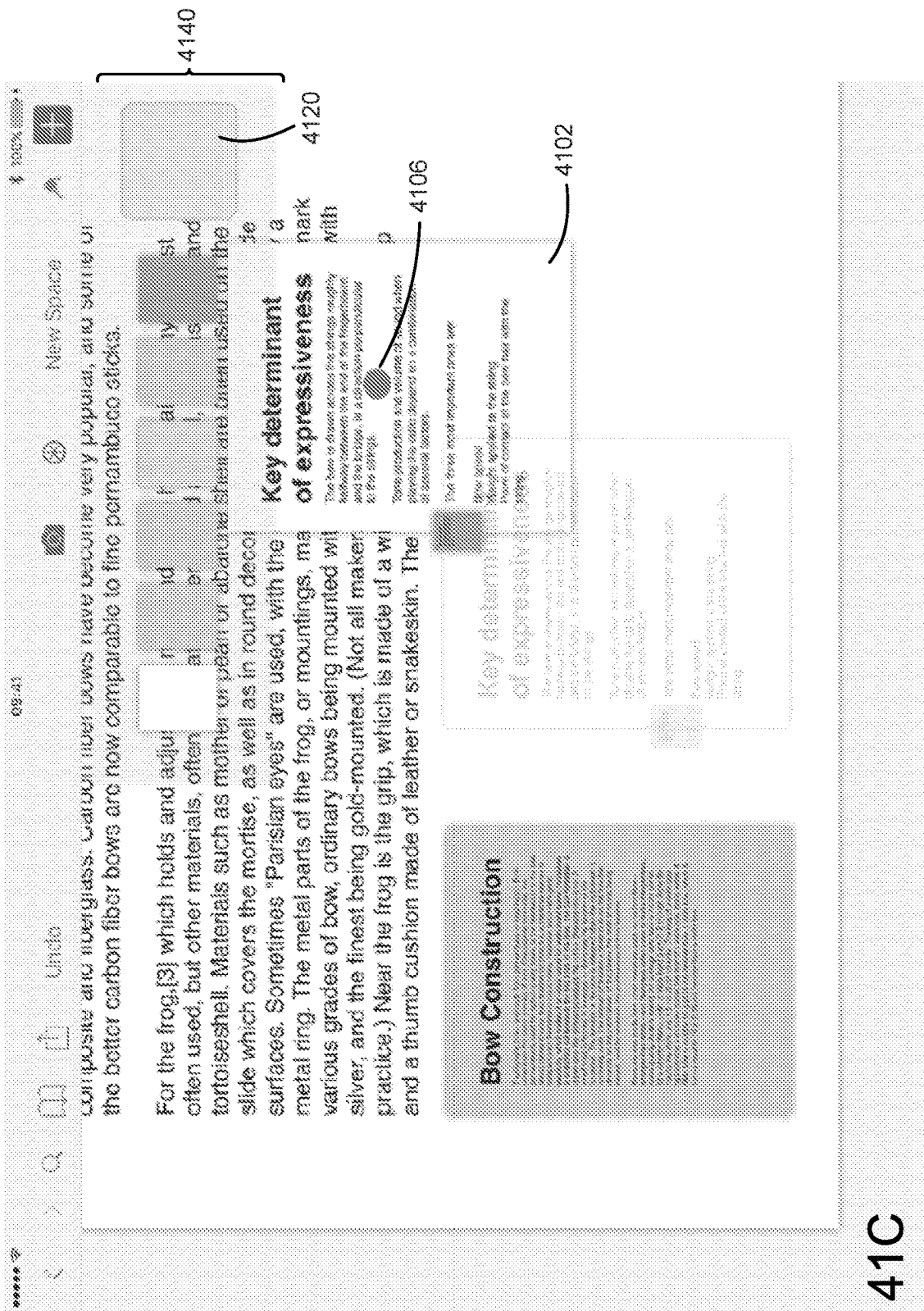
Figure 41D:
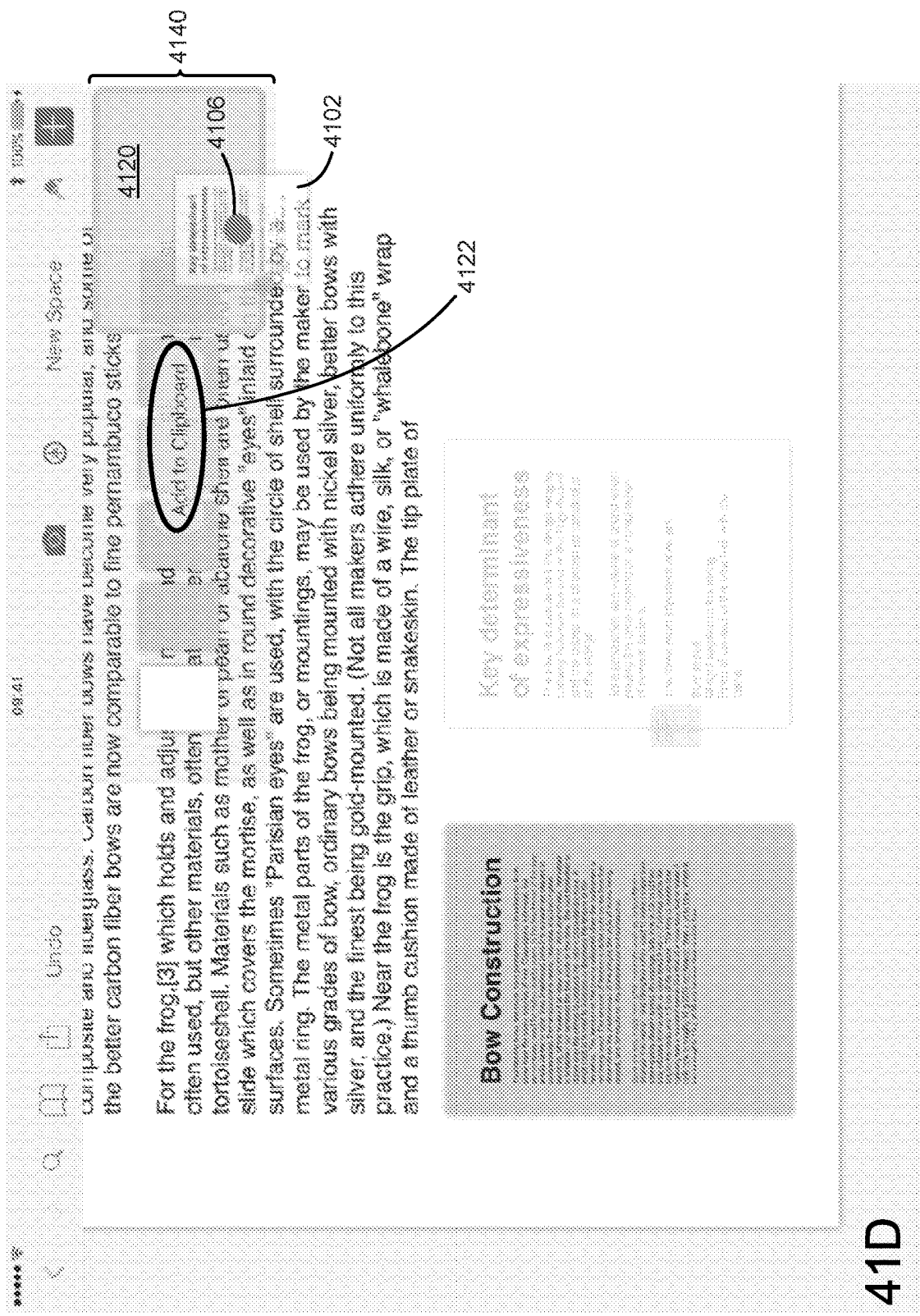

In FIG. 41B the Key determinant of expressiveness Zzote 4102 has been picked up ("grabbed"), as indicated, in some implementations, by an increased shadow around the Zzote. FIGS. 41C and 41D illustrate moving the Zzote 4102 upwards and rightwards towards the Visual clipboard 4140 on the Add bar.

In FIG. 41D, when the Zzote 4102 being dragged is over the Add bar region, the user interface suggests to the user that releasing the finger(s) here will add it to the Visual clipboard 4140. In some implementations, as depicted in FIG. 41D, the dragged item 4102 itself may also transitionally shrink its size within the UI at this point, though this does not indicate any change of size within Zzote-Space.)

In this case, the text prompt "Add to Clipboard" 4122 appears and the accepting region 4120 of the Clipboard 4140 enlarges to suggest that the Visual clipboard 4140 is able to accept the dragged item 4102 now.

Figure 41E:
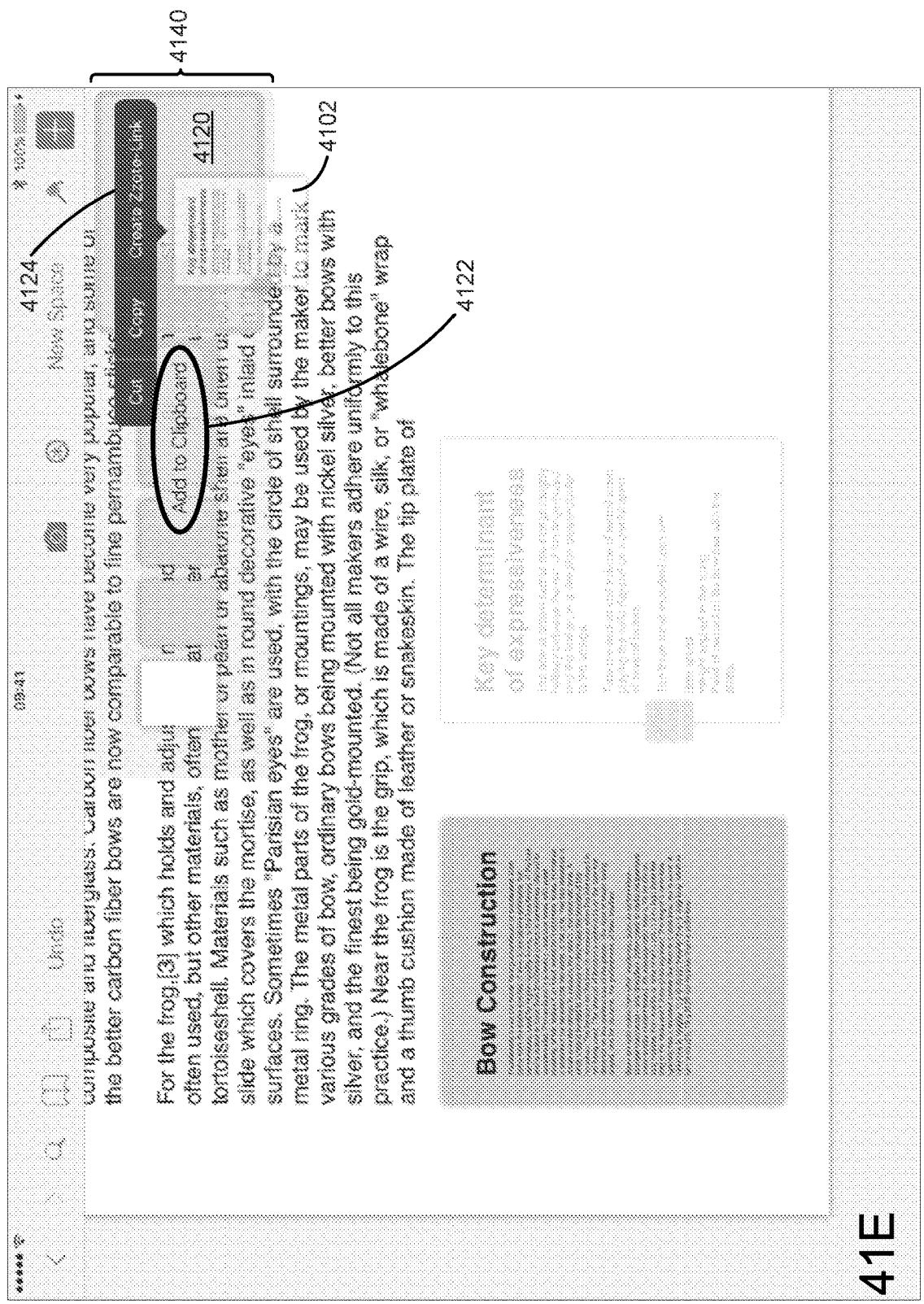

When the finger(s) are released, the user interface prompts the user for how the Zzote 4102 should be added to the clipboard 4140, as illustrated in FIG. 41E. As shown in FIG. 41E, these options 4124 are "Cut," "Copy," and "Create Zzote-Link."

The "Cut" option deletes the Zzote from the location where the user originally picked it up. A copy of the Zzote is placed on the clipboard 4140 as a potential Zzote. The user can then drag this item (or in some implementations, more precisely a newly created representation such as 4130' In FIG. 42B below) out as many times as desired to zero or more places in Zzote-Space. Note that when a Zzote is dragged to the visual clipboard 4140, its entire Zzote cluster goes with it.

The "Copy" option leaves the original Zzote intact at its original location. A copy of it is placed on the clipboard 4140 as a potential Zzote. The user can then drag this Zzote (cluster) out as many times as desired to zero or more places in Zzote-Space. The only difference between Cut and Copy is that Cut removes the original Zzote from its original location, whereas a Copy operation leaves the original Zzote as it was.

The "Create Zzote-Link" option behaves partially like a "Copy" operation because the original Zzote is left unaffected. (However, it may later become a "Source" if a Zzote link is used later). A potential Zzote-Link to this source Zzote is placed on the clipboard. The user can then drag this item out as many times as desired to zero or more places in Zzote-Space. When a Zzote-Link is created, it is a link to the entire cluster formed by the original Zzote. (In this example it can be seen that the original Zzote 4102 also includes its cluster which in this case is Zzote itself 4102 and its small sub-Zzote extending outwards from its left margin. Therefore, it is this cluster of graphical information units which will be shared within any subsequently created link graphical information units/Zzote-Links.) This is analogous to the process for a "Copy" operation, where the entire original cluster formed by the original Zzote is duplicated to the clipboard. (It is also analogous to the process used for a "Cut" operation where the entire original cluster formed by the original Zzote is duplicated to the clipboard then deleted from its original location.)

In addition to these three option, there is an implicit option to do none of the above. In some implementations, "None of the Above" is selected by tapping anything other than one of the three options in the options 4124. In that case, the dragged Zzote (cluster) returns to its original location, and nothing will have occurred.

In this instance, the user selects "Create Zzote-Link." The original Zzote is not affected. However, if the resultant potential Zzote-Link is later dragged out from the Visual Clipboard 4140 onto the canvas to become a real Zzote-Link in Zzote-Space, the original source Zzote will visually indicate that it is a source and enable quick access to information about its associated Zzote-links and jumping to its Zzote-Links. This is described below.

In other implementations (not illustrated here), the user interface asks the question (Cut, Copy, or Create Zzote-Link) when an item is dragged out of the Clipboard, giving the user the ability to decide later rather than at the time the Zzote is dragged to the clipboard 4140 (as was shown in the illustrated implementation).

Figure 41F:
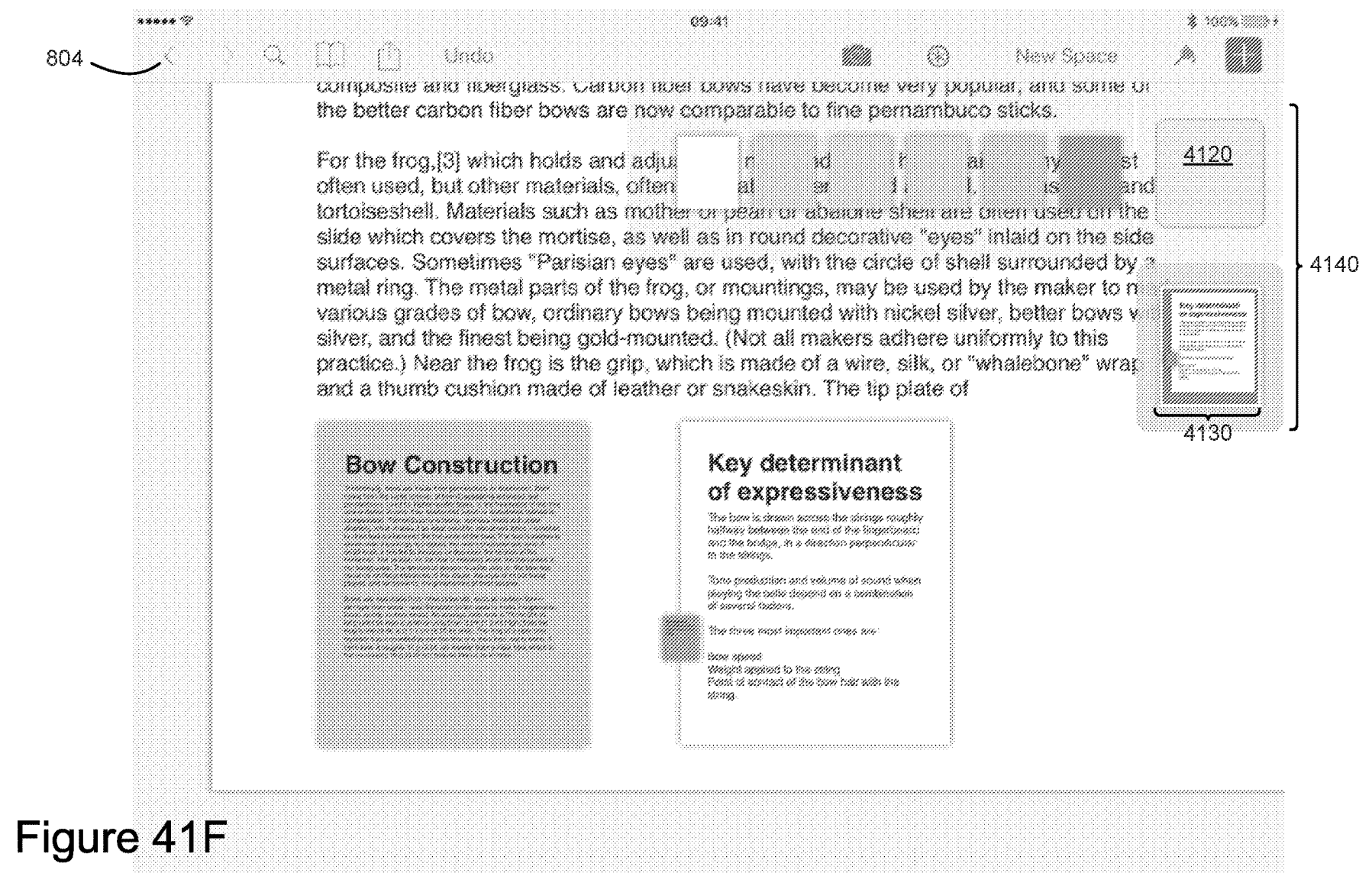

In the Visual Clipboard 4140 new items are added from the top. In FIG. 41F, the new item 4130 (the created potential Zzote-link) appears in a list, which grows downwards from the Add bar and below the Drag to Region 4120 of the Visual clipboard. In FIG. 41F the visual clipboard now has one item. This item (and any others) represent the contents of the Visual Clipboard. The user can drag them out from here in the same manner as dragging out new potential Zzotes from the Add bar.

In some implementations, the Visual Clipboard can contain many items. As they are added, they go to the top of the visual thumbnail list. If the user were to drag another item to the Visual clipboard, it would display at the top of this thumbnail list, with the existing item pushed down to be second in the list. In some implementations, the user can scroll the list if the length becomes greater than the height that can fit in the display.

In some implementations, the visual clipboard can store many items at the same time. Note that this differs from many user interface "clipboards" in use prior to the present disclosure. A typical clipboard typically can contain only one item at a time.

In some implementations, a user can remove items from the clipboard by swiping left or right across the item. This removes the item from the visual clipboard. In some implementations, there is an animation of the item disappearing off-screen. In some implementation, remaining items on the Visual Clipboard then shift upwards to close the gap, and the structure of the Visual Clipboard itself gets smaller if appropriate. In some implementations, these aspects are animated.

In some implementations, for items in the visual clipboard, a user can "Unpinch to Preview." Specifically, a user's fingers are placed around an item and unpinched. The user interface displays an increasingly detailed representation of the item that "grows" out of the original thumbnail. The user can keep unpinching to see more detail. In some implementations, the action is "accelerated"/magnified (by "sizing acceleration" also known as a multiplicative "magnification" factor) to rapidly fill the display, without the fingers having to stretch very far. When the user releases the fingers with the centroid not over the actual canvas (e.g., near where the unpinch started), the item collapses back to its original location on the Visual clipboard with no action actually taken.

Other implementations allow a user to add new items anywhere within the existing Visual clipboard list. For some users this creates too much complexity, so some implementations deliberately do not allow such an option at all.

With "add to the top" behavior, the order of the Visual clipboard list is based on time. The user's own sense of when things happened can be helpful.

In some implementations, it is intended that the user should not think of the spatial arrangement of items on the Visual clipboard as anything other than a time-based order. The user should do spatial arranging within Zzote-Space itself, whereas the Visual clipboard is a useful place for temporary storage.

Because the Visual Clipboard is a list that can be scrolled, the user can choose to deal with items in a first-in first-out (FIFO) manner by working from the visually lowest item (oldest) on the list upwards. Alternatively, users can choose to deal with items in a last-in first-out (LIFO) manner by working from the visually top item (newest) downwards. In some implementations, the user may choose to remove items from the clipboard (as described above) when they no longer need to keep the items there.

In some implementations, the Visual Clipboard also functions as an "In Box" for externally arriving items. For example, if another user or application has just shared a new Zzote-Link with the current user, in some implementations it is added-to the current user's clipboard.

A potential Zzote that is not a Zzote-Link can be on the Visual clipboard as a result of the user performing Cut or Copy operations with an existing Zzote. This can be performed by dragging a Zzote to the Visual Clipboard and selecting one of these menu options, as described in FIGS. 41A-41E. In addition, in some implementations a potential Zzote on the clipboard can be the result of the user selecting "Cut", "Copy", (or "Create Zzote-Link" to create a potential Zzote-Link on the clipboard instead) from a contextual menu option that appears. In some implementations, the user interface provides such a contextual menu option when the user taps on a Zzote that is already selected.

Note that in some implementations a potential Zzote on the Visual clipboard (which can also be described as a "cluster icon" on a toolbar) is an entire potential Zzote cluster, which includes all of its descendants. Potential Zzotes appear on the Visual clipboard list as thumbnails of how they will appear in Zzote-Space if dragged out. (For Zzote-Links, in some implementations the Potential Zzote-Link thumbnail does not include a Zzote-Link dot or its caption. Such features of actual Zzote-Links are described below.) For example, the item 4130 on the visual clipboard in FIG. 41F represents how the Zzote-Link will appear in Zzote-Space if used.

Note that in some implementations an actual Zzote-Link includes a Zzote-Link frame (sometimes referred to as a Zzote-Link border) and a Zzote-Link background. These features are present in the representation 4130 of the Potential Zzote-Link on the Visual Clipboard in FIG. 41F. (Such features of Zzote-Links are described in more detail below.) Within the Potential Zzote-Link 4130, inside the Zzote-Link frame and within the Zzote-Link background is a representation of the source Zzote 4102 itself (and its cluster).

In some implementations, there is a marker that appears as a dot just above and to the left of the top left corner of an actual Zzote-Link. This feature of Zzote-Links is described in more detail below in the context of visualizing Zzote-Links in Zzote-Space. The dot is referred to as a Zzote-Link dot. There is also a caption to its right. In Zzote-Space, the Zzote-Link dot can be tapped to call up information (and links) about the source and other Zzote-Links to the same source.

As illustrated in FIG. 41F, on the Visual clipboard, the Zzote-Link dot and caption do not appear in a potential Zzote-Link 4130 (e.g., as represented on the Visual clipboard). The Zzote-Link dot and caption do appear when the potential Zzote-Link becomes a real Zzote-Link in Zzote-Space later.

Figure 42A:
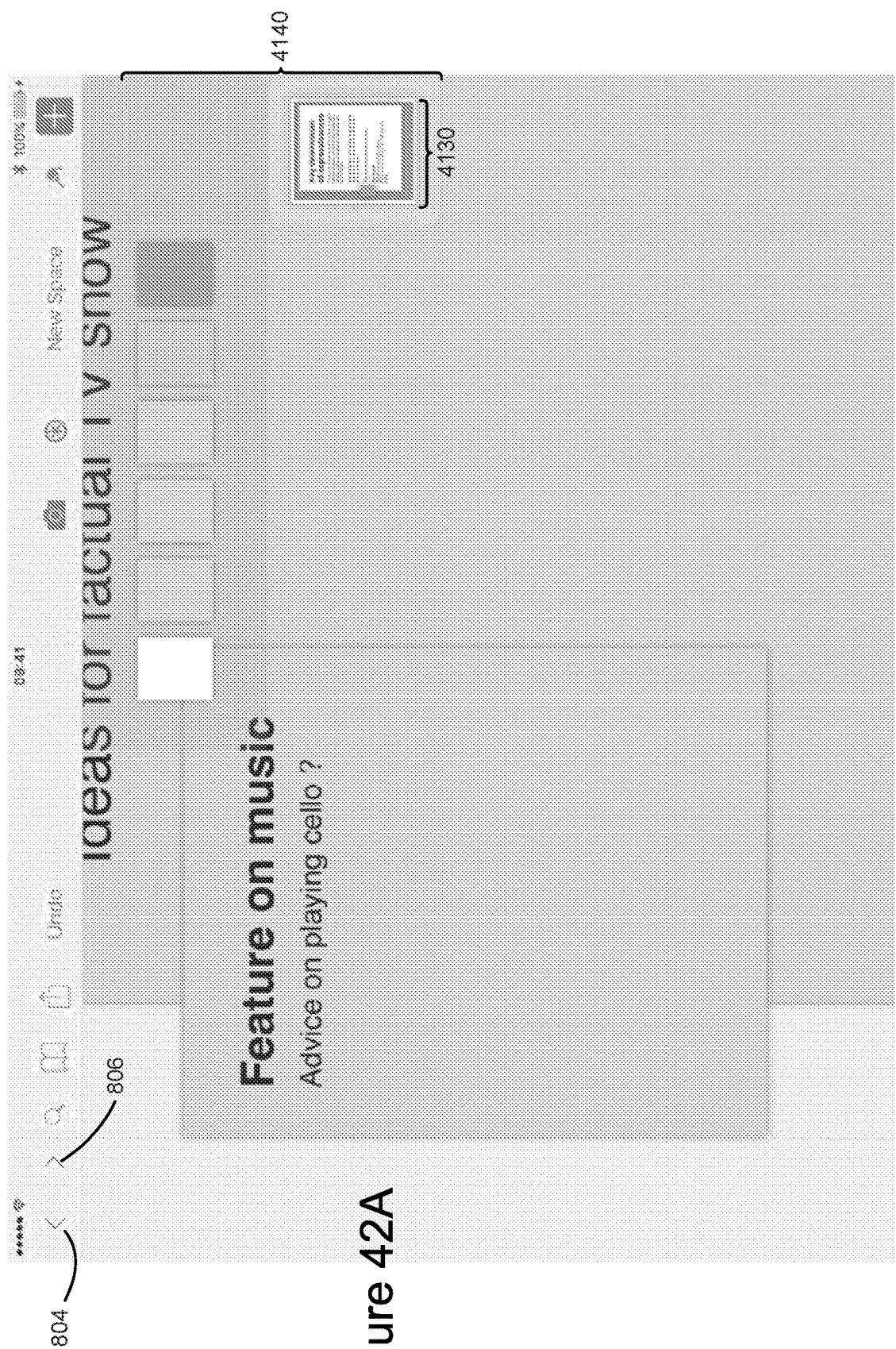
FIGS. 42A-42E illustrate creating link graphical information units to share clusters of graphical information units without making copies of the content, in accordance with some implementations.

Creating Link Graphical Information Units to Share Clusters of Graphical Information Units within In Situ Link Portals Consider an example where the user (just prior to the scenario described for FIG. 41A) had been working on a "Television Show" Zzote (about proposed content for a new show). Within that Zzote is an in-progress "Feature on music" Zzote about a proposed segment of the show. The user now wants to return to that "Feature on music" Zzote to place within it the newly acquired link (about "Key determinant of expressiveness" with regard to "Cello's Bow") from FIGS. 41A-41F. So in this example, from the situation in FIG. 41F the user can quickly get there by tapping the Back button 804. This reorients the viewport to what is shown in FIG. 42A. Note that multiple taps may be necessary as the viewport is "unwound" back, step by step.

The user presses the Back button 804 in the main toolbar some number of times depending on the exact activity of the user in the preceding steps. It will be apparent to the user that the viewport seems to be going back in time (without undoing their actions) to their earlier positions and scales in Zzote-Space. Typically, the user would only need to press the Back button a few times (e.g., three or less).

Viewport states are recorded at a number of specific appropriate times in some implementations. Depending on the frequency of the viewport state recording, the number of presses of the Back button varies.

As shown in FIG. 42A, the user has now returned to the prior location in the viewport where the new Zzote-Link (link graphical information unit) is intended to be placed. Note that the Forward button 806 is now enabled in the main toolbar. It is no longer greyed out because the user just pressed the Back button 804 one or more times. (If they wished to, the user could choose to move 'Forward' to reverse any pressing of Back'.)

The Visual clipboard 4140 now contains the required potential Zzote-Link 4130. Note that the Visual clipboard 4140 has not changed while navigating to a different location in Zzote-Space. The Visual clipboard 4140 still contains the required Potential Zzote-Link 4130.

Figure 42B:
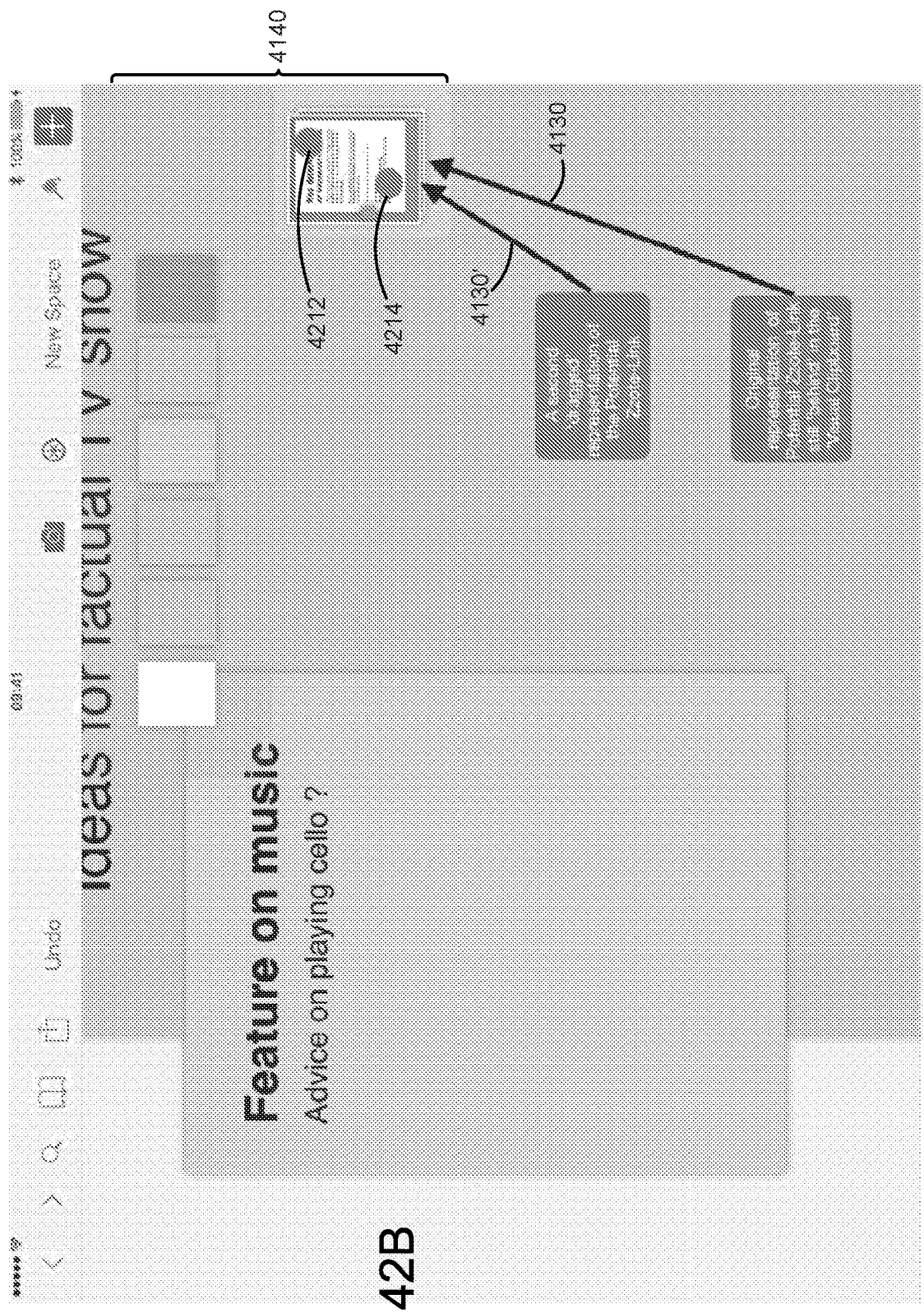

In some implementations, all Potential Zzote-Links are by definition also a form of Potential Zzote (but with the added internal representation of a "source"). In FIG. 42B, the user begins to drag from the potential Zzote 4130 (which can also be described as a "cluster icon") from the Visual clipboard 4140 (which can also be described as a toolbar) with two fingers 4212 and 4214. (Alternatively, the user could choose to use just one finger for the drag, in which case in some implementations the action would use Auto-Sizing and possible Auto-scaling and panning of the viewport if required.) The user has dragged the fingers very slightly to the left and upwards. The start of the gesture had the centroid of the two fingers over the item 4130 on the Visual clipboard 4140. (For a one-finger gesture, the one finger itself must start somewhere on the potential Zzote 4130.)

As shown in FIG. 42B, within the Visual clipboard 4140 there is a newly created second dragged representation 4130' of the potential Zzote-Link just above the existing one 4130. The second dragged representation 4130' of the potential Zzote-Link is slightly above and to the left from the original representation 4130, which remains beneath it in the Visual clipboard 4140 at its original location and size. The user interface has thereby created a cluster of potential graphical information units 4130' from the "cluster icon" 4130 on the toolbar/visual-clipboard 4140. In this specific example the "clusters" are single potential Zzote-Links though the Zzote-Links 4130/4130' contain within themselves a representation of a shared cluster of Zzotes.

As indicated in FIG. 42B, both representations (the original "cluster icon" 4130 and the newly created dragged 4130') are very nearly in the same position, because the user has just started the process of dragging the item. Dragging from the Visual clipboard 4140 uses the same process as dragging a new potential Zzote from the Add bar. In the same way, a user can use one or two fingers, and can alternate between one and two fingers during the middle of a gesture. In some implementations, as long as the user drags out in a horizontal direction (at least partially), there is no need for a "press and hold" to pick up the item.

The item 4130' (a cluster of potential graphical information units, which in this specific example is a potential Zzote-Link containing a representation of a shared cluster of Zzotes) dragged from the Visual clipboard 4140 depicts an accurate and increasingly detailed rendering of its contents when its size is increased during the drag operation. The main difference in this case is that the dragged item is a detailed representation of existing information rather than just a blank new potential Zzote.

Some implementations render the item using a technique similar to rendering an entire viewport. It is effectively its own self-contained viewport containing just the one potential Zzote (and its cluster, which includes any sub-Zzotes, all descendants, any other descendant Zzote-Links it contains). In the specific example of 4130', this dragged item is a potential Zzote-Link containing a representation of a shared cluster of Zzotes.

If the user increases the size of the dragged item, the user interface accurately renders more detail. In some cases, new previously unseen detailed contents may then pass a threshold to be rendered in a manner similar to how the main viewport chooses a threshold at which to render items in its view. For example, in some implementations, a viewport stops rendering any items that would have a width of less than one pixel.

Although a dragged Zzote cluster behaves in some ways like a self-contained viewport, the user interface renders the content in conjunction with other viewports of the main canvas. Specifically, the Zzotes of this self-contained viewport overlay or underlay existing Zzotes in the viewports of the main canvas, following the rules of displaying larger Zzotes beneath smaller overlapping Zzotes, regardless of whether the Zzotes are from the self-contained viewport or any viewport of the main canvas. In some implementations, when not positioned over another viewport, such a self-contained viewport renders above other on-screen graphics.

The self-contained viewport of a dragged item has no discernible border other than the shapes of the Zzotes themselves. In FIG. 42B, the dragged item 4130' is a potential Zzote-Link, which has a clearly defined Zzote-Link frame. (A Zzote-Link frame looks like a border and is alternatively referred to as a Zzote-Link border.) In other cases, such as a dragged Zzote cluster that is not just a single Zzote-Link, the shape of the dragged object (and hence the shape of the self-contained viewport) can be quite irregular without an overall rectangular border.

Some implementations perform interleaving of Zzotes from the canvas (a viewport) and the dragged Zzote cluster (which can be considered as its own self-contained viewport) using hardware-accelerated capabilities of computer hardware such as graphical layers. Some implementations achieve the required effect by simply comparing the on-screen widths (the specific-size-metric) of all overlapping Zzotes from all viewports in order to determine the overall rendering order (smaller Zzotes above larger overlapping Zzotes) of the entire display.

Unpinch to preview of items from the Visual clipboard 4140 behaves the same way as potential Zzotes from the Add bar, as described above. Unpinch to preview is very useful for users. For example, the user can simply grab an item on the Visual clipboard 4140 with two fingers. The user can then unpinch the fingers. This prompts display of a detailed rendering of the item's contents. The more the user needs to know, the more the user can unpinch the fingers to reveal greater detail at a larger size. In some implementations, "sizing acceleration" (as described above) helps to make the "unpinch to preview" feature particular convenient for the user to reversibly see a temporarily large preview with minimal finger movement. If the user releases the fingers without moving the finger centroid to the main canvas, the previewed item collapses back to its original location.

This effective novel new way of previewing information is also used when inspecting items in lists elsewhere in some implementations.

Some implementations use the same self-contained intersecting viewport functionality for the more basic dragging of a new potential Zzote from the Add bar. In some implementations, the basic add of a new blank potential Zzote is thus a simple use of the same functions but using a synthesized featureless Zzote (of a specific color) as the one-Zzote content of the Drag to add. Likewise, some implementations apply the self-contained intersecting viewport functionality for other features as well, including: (i) Dragging from search; (ii) Dragging from bookmarks; (iii) Moving and resizing existing Zzotes; (iv) Created-on-the-fly potential Zzotes for transforming from images onto the canvas; and (v) Created-on-the-fly potential Zzotes for transforming from external sources (such as parts of web pages and external documents) onto the canvas. In some implementations, all of these situations share the novel capabilities of "Unpinch to preview."

Note that in some implementations, a basic "Drag to add" operation also effectively uses "Unpinch to preview," but what is previewed is typically just a featureless (blank) potential Zzote of a specific color.

Even when a user starts an action with just one finger, the user can always use a second finger at any time. Among other benefits, the user can invoke "Unpinch to preview" at any time by putting down another finger and unpinching.

Figure 42C:
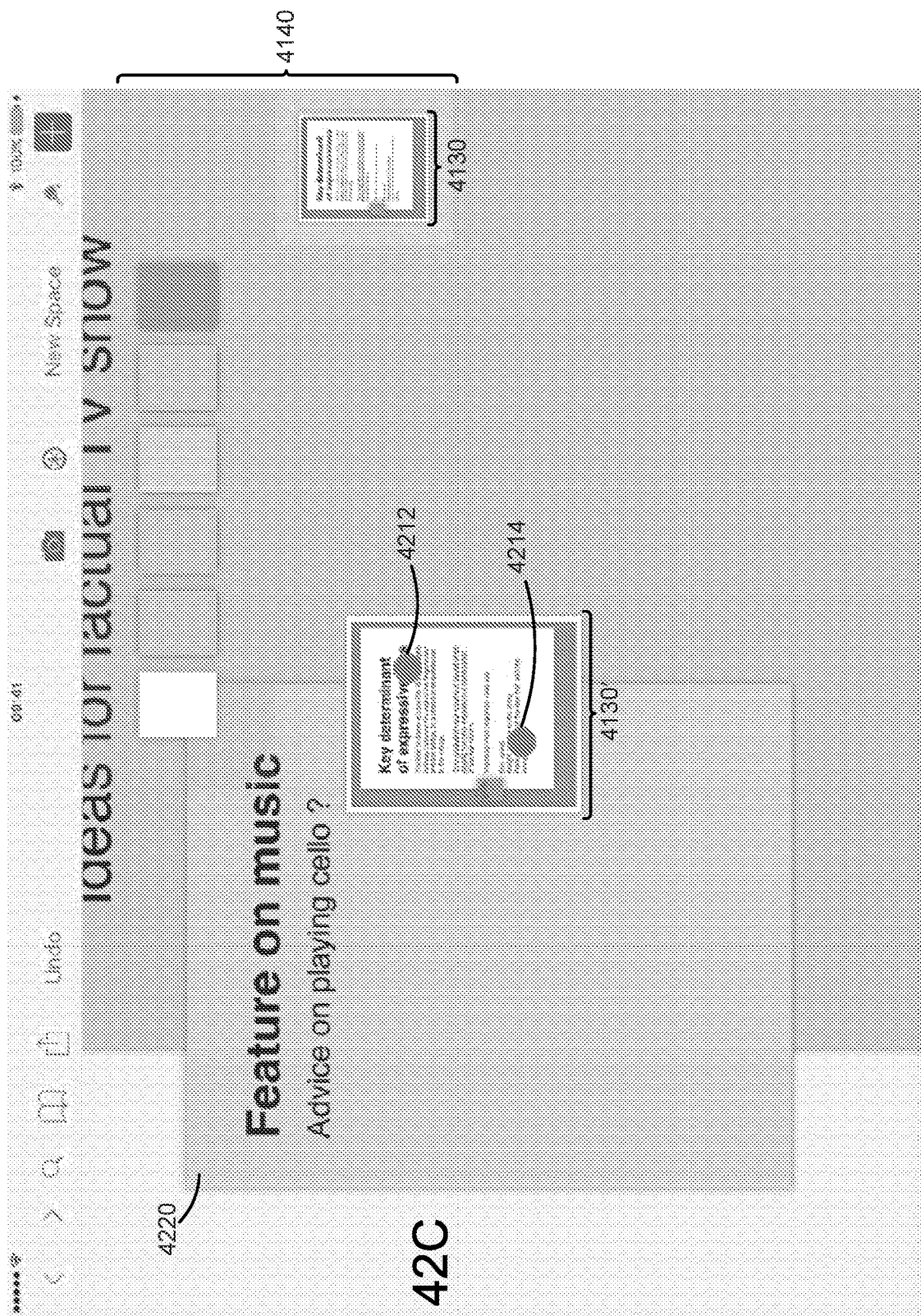

In FIG. 42C, the user has now dragged the potential Zzote-Link 4130' from the Visual clipboard 4140 leftwards to a position at the edge of the "Feature on music" Zzote 4220. The fingers 4212 and 4214 are not yet released. It can be seen that the potential graphical information units in the cluster (i.e., potential Zzote-Link 4130' containing a representation of a shared cluster of Zzotes) are currently over the canvas under user-input control and hence are displayed along with the plurality of graphical information units on the canvas. Potential Zzote-Link 4130' and its contents are smaller by width than the canvas Zzotes it currently overlaps with. Therefore, Zzote-Link 4130' and its contents are rendered in front of ("above") the overlapping canvas Zzotes in accordance with the viewport rendering rules. This can be seen in FIG. 42C.

Greater detail of the new Zzote-Link 4130' is visible. As shown in FIG. 42C, the rendering of this dragged Zzote-Link 4130' is not just a scaled up bitmap of the source Zzote. It is rendered in optimum detail as previously explained. Also note that the Visual clipboard 4140 still retains the original item 4130, which can be used again if desired. A user can drag the same item out to multiple places. This can be particularly useful for Zzote-Links, because for a single 'source' there can often be several 'Zzote-Links' placed in different locations but containing the same live information. (In some implementations, the user perceives that they are dragging the same item out to multiple places, but as in the previous example the "cluster icon" 4130 remains on the visual clipboard (which can also be described as a toolbar) throughout and a new "cluster of potential graphical information units" akin to 4130' is created anew as each new drag is initiated. Each newly placed item/cluster on the canvas is an independent copy of the cluster represented by the cluster icon 4130. However, the internal source data is shared and not duplicated in the case of Zzote-Links such as 4130'.)

When the user wants to remove an item from the Visual clipboard 4140, the user can swipe left or right across the item in the Visual clipboard 4140 to remove it. Some implementations provide additional or different actions to remove items from the clipboard.

Other implementations (not illustrated here) provide a "use once" feature, and the Zzote cluster is automatically removed as soon as it is used.

Figure 42D:
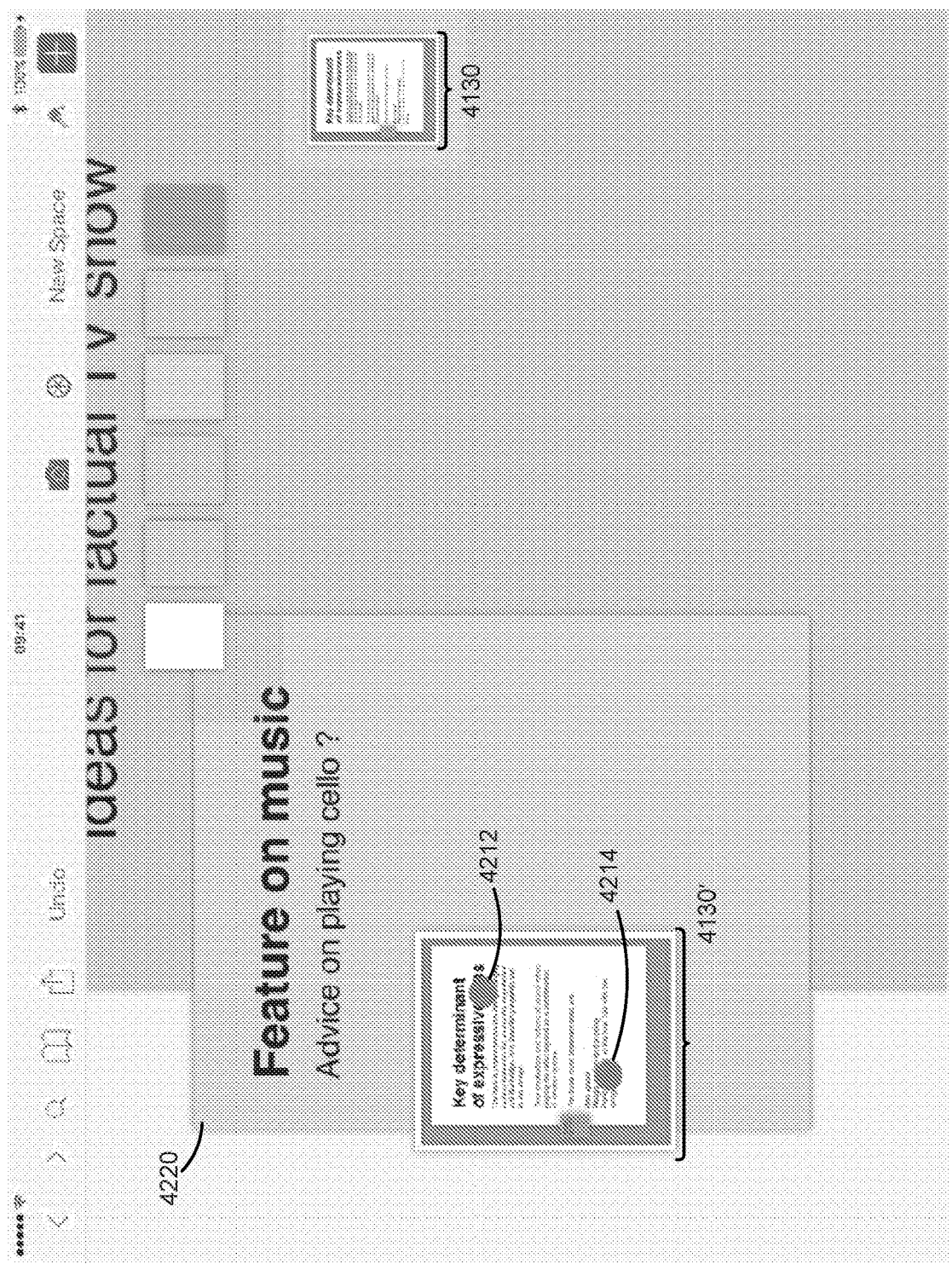
Figure 42E:
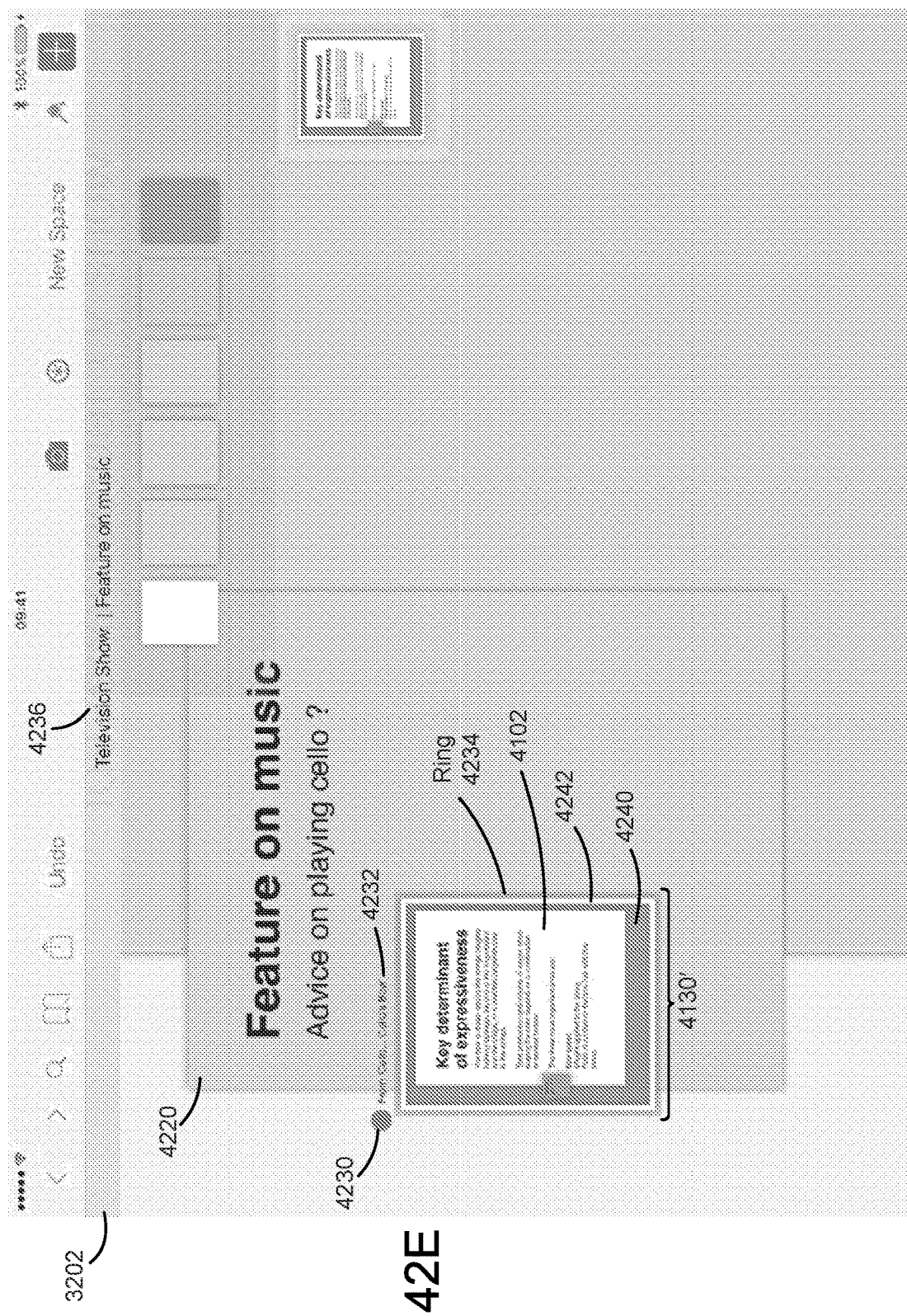

In FIG. 42D, the user has moved the potential Zzote-Link 4130' further left in a continuation of the same gesture. The user is about to release the fingers 4212 and 4214 to place potential Zzote-Link 4130' onto the canvas as its current position and size. In FIG. 42E, the user has released the fingers causing the potential Zzote-Link 4130' to become saved to the canvas as the actual new Zzote-Link 4130' created (and "finalized") at this position and size in Zzote-Space. All of the potential units of any such dragged cluster equivalent to 4130' (of one or more components) of potential graphical information units are likewise saved to the canvas upon completion of such a user gesture over the canvas. In the specific case of 4130', it can be seen that the single Zzote-Link potential graphical information unit in this cluster contains a representation of a shared cluster of Zzotes. The Zzote-Link 4130' has been placed within "Feature on music" Zzote 4220 (which is a sub-Zzote of a "Television Show" Zzote) at the exact position and size selected by the user.

In FIG. 42E, after the finger(s) are released, by default the newly created Zzote-Link 4130' is selected. This is indicated by the distinctive "selected ring" 4234 around it. It should also be noted that now that the Zzote-Link (link graphical information unit) 4130' has been finalized here, it has become a real Zzote-Link in Zzote-Space and no longer a potential Zzote-Link.

The source for the "Key determinant of expressiveness" Zzote-Link 4130' is the corresponding Zzote 4102 (as depicted at a large scale in FIG. 41A), which is a sub-Zzote of the Cello's Bow Zzote 2704 (FIG. 41A) which is itself a sub-Zzote of the Cello Zzote 2702. (In this example, the Cello Zzote 2702 was placed directly in Zzote-Space without any parents, as depicted in FIG. 38A.) Zzote 2704 in FIG. 41A is a zoomed-in view of the same Zzote 2704, which is a sub-Zzote of Zzote 2702, as depicted in FIG. 38A.) FIG. 41A shows these Zzotes at their source (at a viewport scale where the Cello Zzote 2702 is inferred from the path 4110). In FIG. 42E, the source is indicated in the user interface by the caption 4232 just above the new Zzote-Link 4130'. The caption 4232 specifies "From 'Cello . . . Cello's Bow'," which is consistent with the alternative notation ("Cello|Cello's Bow") used in this same Source's path 4110 from FIG. 41A.

The Path bar 3202 in FIG. 42E specifies the current path 4236, which indicates the location of the selected Zzote. In this case, the selected Zzote is the Zzote-Link 4130' itself, which is located within "Television Shows Feature on music," as specified by the current path 4236. (If within a Zzote-Link the user were to select a Zzote descendant of the Zzote-Link's "source" Zzote, implementations vary in how this is presented as a path. In some implementations, the path follows the apparent hierarchy of Zzotes as present within the specific Zzote-Link. Therefore any ancestors of the "source" may not be present in such a path, just as they are not visible in the Zzote-Space viewer in some implementations' depiction of Zzote-Links. Such a path hence typically differs from when the same descendant Zzote is selected at the "source" or within another Zzote-Link to the same "source". Specific symbols may be used within the path to denote that a node of the path is the first within a new level of Zzote-Link. Such path depictions within a Zzote-Link can be described as "Zzote-Link aware.")

Some implementations include a dot 4230 above and to the left of the top left corner of the Zzote-Link 4130'. The abbreviated path description 4232 is displayed to the right of this dot (e.g., 'Cello . . . Cello's Bow'). This relates to the location of the Zzote-Link's source (i.e., where the source is "From").

The source of the Zzote-Link is the "Key determinant of expressiveness" Zzote 4102. This Zzote can be seen within the Zzote-Link 4130' along with its (overhanging) small sub-Zzote.

The Zzote-Link 4130' includes a background 4240 surrounding the source. This is referred to as the Zzote-Link background. In some implementations, the Zzote-Link background 4240 is a dark grey color as shown in FIG. 42E.

The Zzote-Link 4130' also has a thin outer-frame 4242. This is referred to as the Zzote-Link frame. (It may be alternatively referred to as the Zzote-Link border.) In this example the frame 4242 has a paper-white color.

The user can zoom into the Zzote-Link 4130' in the usual way if desired to read its content more clearly, or for any other reason. Although a Zzote-Link points to its source (and there is only one copy of the content), in some implementations a user can make changes to the information from within the Zzote-Link. Any changes made here by the user are reflected live in the source. In some implementations, this view of the source Zzote is fully editable (it is not read-only).

In some implementations, Zzote-Links have some very useful properties: (i) Zzote-Links can contain other Zzote-Links without (theoretical) limit; and (ii) Zzote-Links can loop-back on themselves recursively, even if it creates a theoretically infinite recursion In the example of FIGS. 42A-42E, the user has placed some highly relevant content within the "Feature on music" Zzote 4220 by "sharing" from valuable information stored elsewhere in Zzote-Space. This is provided by the live Zzote-Link (link graphical information unit) 4130'. The newly created link graphical information unit 4130' has thereby shared a source cluster of graphic information units (i.e., the single linked-to "source" Zzote 4102 itself and its sub-Zzote). And because it is a live link instead of a copy, the information does not become obsolete as the user makes changes to the source. Furthermore, in some implementations the user can update the source at the source location or from any Zzote-Link that points to the source location.

A possibly relevant aspect of "Cello playing" is now suggested for the "Feature on Music" Zzote 4220, which is within the "Television Show" Zzote.

Figure 43A:
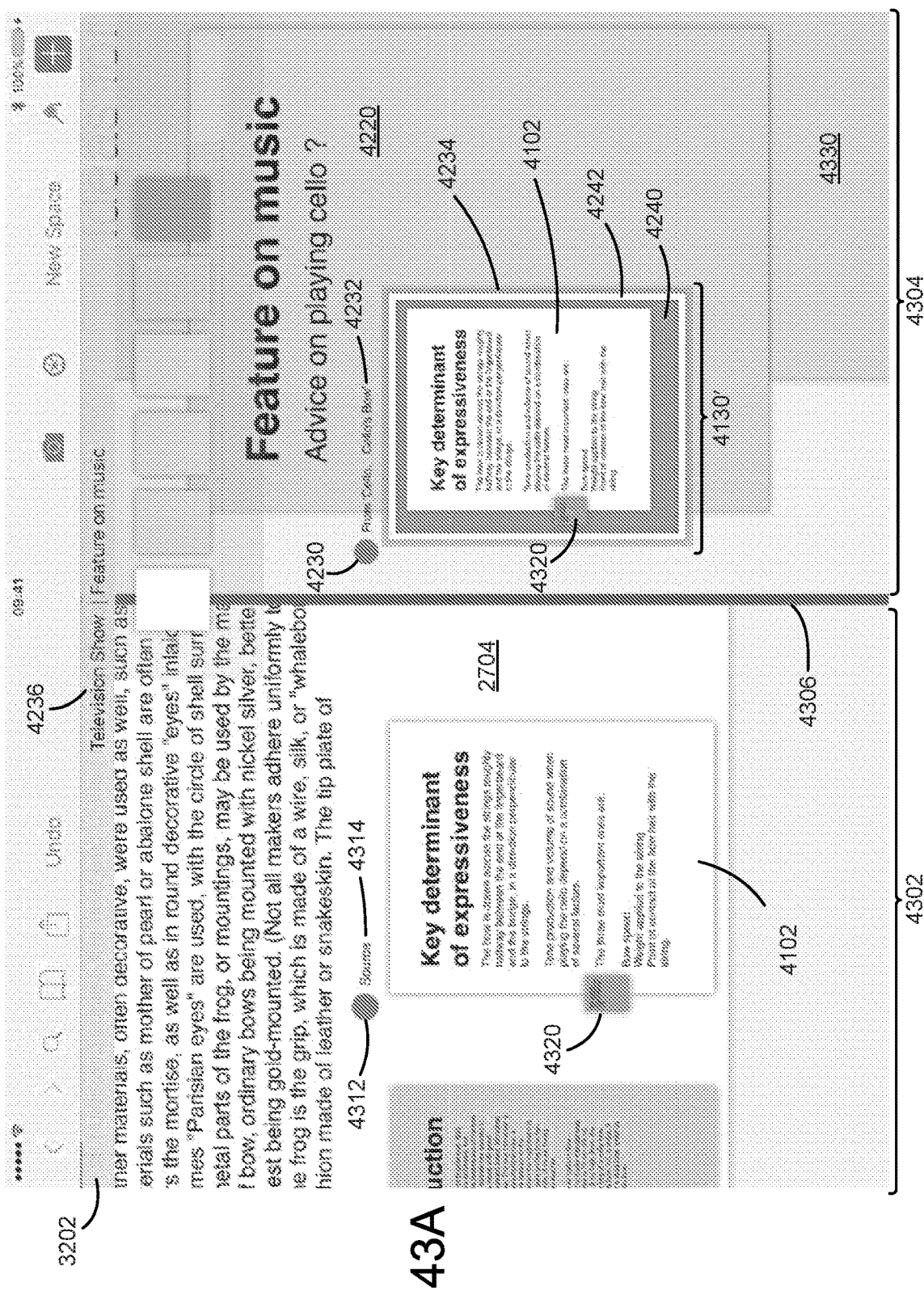
FIG. 43A illustrates a split-screen of two distinct viewports into the same information space, depicting a shared graphical information unit (cluster) existing in two distinct locations, in accordance with some implementations.
Figure 43B:
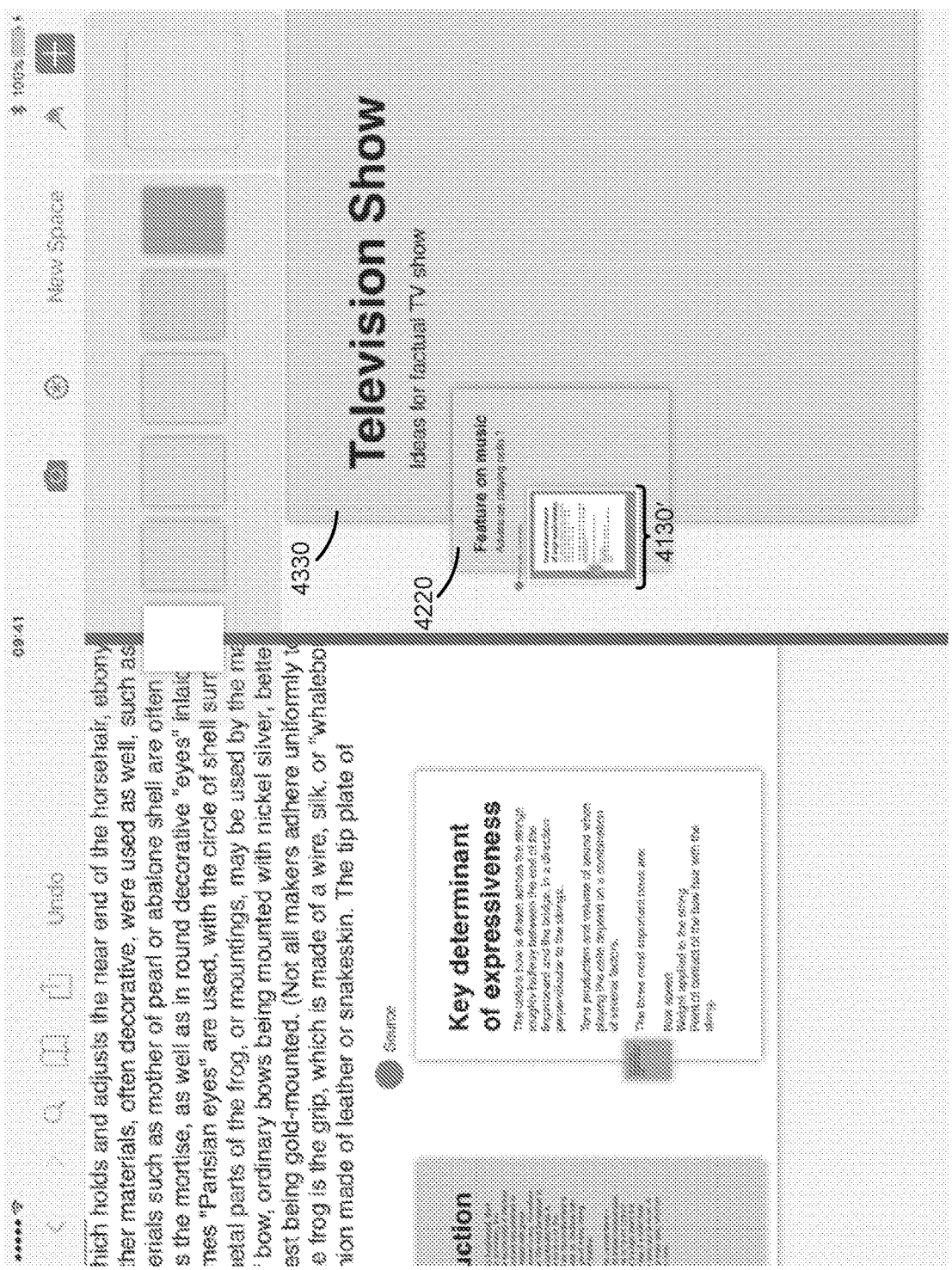
FIG. 43B illustrates the same situation, but with the right-side viewport zoomed-out for greater information context.

In some implementations, it is possible to simultaneously display more than one viewport of the same Zzote-Space. Each viewport is independently positioned and scaled (e.g., panned and zoomed) to concurrently depict alternative views/scale of the same information space/"Zzote-Space". FIG. 43A illustrates a split-screen of two distinct viewports into the same information space, depicting a shared graphical information unit (Zzote 4102 including its descendants) existing in two distinct locations. FIG. 43B illustrates the same situation, but with the right-side viewport zoomed-out for greater information context.

As illustrated in FIG. 43A, the user interface simultaneously displays both the source Zzote 4102 (on the left side 4302) and new Zzote-Link 4130' (on the right side 4304). Significantly, the Zzote-Link 4130' is seen to contain the same Zzote 4102 and it's sub-Zzote 4320 (i.e., a cluster) as shown at the source on the left side 4302.

In some implementations, a user can end the split-screen display by swiping the vertical divider-line 4306 to the left, or swiping across from just beyond the right edge of the screen in a direction to the left. The result is a single viewport of the right side 4304 of the screen, but shown full-screen. Some implementations also allow the converse of swiping the divider-line 4306 to the right, or swiping across from just beyond the left edge of the screen in a direction to the right. In that case, the result is instead a single viewport of the left side 4302 of the screen, but shown full-screen. Some implementations have alternative or complementary ways of manipulating a split-screen.

For purposes of illustration, the split-screen is kept active here in order to show in real-time how modifications to the contents of the Zzote-Link 4130' is visually updated in multiple places.

As shown in FIG. 43A, the user interface displays a Zzote-Link dot 4312 and the caption "Source" 4314 on the left side of the split-screen as a caption for the "Key determinant of expressiveness" Zzote 4102 (within the left side 4302). The Zzote-Link dot 4312 is just above and to the left of the Zzote 4102 (within the left side 4302). The caption 4314 is to the right of the Zzote-Link dot 4312.

The right side 4304 of the split-screen shows the Zzote-Link 4130' to the same source Zzote 4102 as depicted within the left side 4302. The Zzote-Link also has a Zzote-Link dot 4230 and its own caption 4232. The Zzote-Link dot 4230 appears just above and to the left of the Zzote-Link 4130'. It has a caption 4232 to the right of the Zzote-Link dot 4230, which provides an abbreviated description of the location of the source (Zzote 4102) of the Zzote-Link 4130'.

The source location of the new Zzote-Links 4130' is described in this caption 4232 as (from) 'Cello . . . Cello's Bow.'

The new Zzote-Link 4130' is selected on the right side of the split-screen. This is indicated by the distinctive ring 4234 around it. The Path bar 3202 in FIG. 43A contains the path 4236 for this Zzote-Link.

With the new Zzote-Link 4130' selected, the Zzote-Link 4130' has a completely different path than the source Zzote 4102. The path 4236 of the Zzote-Link 4130' is "Television Show|Feature on music."

Internally, some implementations store a Zzote-Link in a database with its own position and size. In some implementations, the vital inner "content" of a Zzote-Link is a view of the (thereby shared) single "source" linked-to Zzote (and its cluster) that the Zzote-Link points to. However, despite containing this shared source, a Zzote-Link itself is a Zzote in its own right and has an independent location/size in Zzote-Space. (In fact the Zzote-Link border/frame 4242 is just the conventional-Zzote part of the Zzote-Link.)

In some implementations, unlike a read-only view, a user can fully modify the contents of the Zzote-Link in situ. The Zzote-Link provides a "portal" into the region of Zzote-Space of its source. The user can zoom into this portal without limit.

The new Zzote-Link 4130' has a thin Zzote-Link frame 4242 around it as shown in FIG. 43A. (In FIG. 43A the Zzote-Link is selected, so it has an additional ring/border 4234 around it.)

If the user changes the color of the Zzote-Link 4130' itself, it is the color of this Zzote-Link frame 4242 (also referred to as the Zzote-Link border) which changes. In FIG. 43A, the color is paper-white, which is the default for a new Zzote-Link frame. The Zzote-Link frame 4242 can be considered the "backing" of the Zzote-Link 4130' itself. The phrase "backing" is sometimes used to refer to the "background" of the basic Zzote-aspect of a Zzote-Link. This is actually the Zzote background with a color reflecting the individual background color of the Zzote-Link itself. However, the phrase "backing" may be used to help distinguish this from the "Zzote-Link background" which is something entirely different and described previously and in more detail below.

Within the Zzote-Link frame 4242, the linked-to starting point (the representation of the source) is inset from all sides. Within the gap between the Zzote-Link frame 4242 and the source content, the user interface displays a colored background (e.g., dark grey). This region is called the Zzote-Link background 4240. The background 4240 helps to visually distinguish a Zzote-Link from a conventional Zzote.

The Zzote-Link 4130' starts from the (source) "Key determinant of expressiveness" Zzote 4102. Nothing above this level in the source's hierarchy is shown at the place where the Zzote-Link is located (as shown on the right side of the split-screen in FIG. 43A). Therefore, neither the Cello's Bow Zzote 2704 (the parent of Zzote 4102) nor the Cello Zzote 2702 (the parent of Zzote 2704 as depicted in FIG. 38A) are shown on the right side of the split screen in FIG. 43A.

The Zzote-Link (link graphical information unit) is a form of portal into the information from "Key determinant of expressiveness" Zzote 4102 inwards only. In some implementations, a Zzote-Link is a "live," editable, zoomable view of and view into a single linked-to "source" shared graphical information unit (Zzote) and includes all the (thereby also) shared graphical information sub-units (sub-Zzotes) that "belong to it" (including the possibility of theoretically unlimited numbers of increasingly small shared sub-sub-units and further levels of smaller shared descendants within the hierarchy). In some implementations, any of the higher-level information is completely hidden from a user viewing and editing from within the Zzote-Link. This is beneficial by revealing only the specific information within. This also provides security benefits in some instances.

On the other hand, alternative implementations provide extra graphical information within the Zzote-Link background 4240 either at all times or only when Zzotes are being added/modified. In such alternative implementations this may take the form of a dimmed-out view of parts of the source's hierarchical ancestors and Zzotes nearby to those ancestors. This is not the case in the figures shown.

When the source (the linked-to Zzote) of a Zzote-Link has no sub-Zzotes (or further descendants) extending outside of its rectangle, the depiction within the Zzote-Link is simple. If this were the case, the source Zzote would appear entirely symmetrically centered within the Zzote-Link frame (such as the frame 4242) and the Zzote-Link background (such as the background 4240).

In FIG. 43A, however, the source Zzote 4102 has a sub-Zzote 4320 in the lower left, which overhangs out to the left side. In order for the representation of the Zzote-Link 4130' to allow for this, without "spilling" out into the Zzote-Link's own environment, the user interface draws the Zzote-Link 4130' so that the entire cluster of the source Zzote 4102 (the Zzote 4102 and all of its descendants) fits inside the frame 4242. In this way, the content of the source Zzote is ensured to be placed within the Zzote-Link frame 4242 with an adequate amount of Zzote-Link background 4240 still around it.

In FIG. 43A, the sourced Zzote 4102 within the Zzote-Link frame 4242 is inset further from the left than from the right to accommodate the sub-Zzote 4320.

The background space 4240 (referred to as Zzote-Link background) in a Zzote-Link 4130' also allows for future editing of the source Zzote 4102. For example, a Zzote-Link could be created based on a source Zzote with no sub-Zzotes or descendants overhanging its edges. Because such a source has no sub-Zzotes, a Zzote-Link sourced from it could be placed within a tightly arranged structure of other Zzotes within the environment where the Zzote-Link is placed. However, if a user later modified the source Zzote by adding greatly overhanging sub-Zzotes (or further levels of descendant), it could have unintended consequences for the user. These depictions of the source's sub-Zzotes may appear to spread-out into the Zzote-Link's environment and randomly be over or under completely unrelated nearby Zzotes adjacent to that Zzote-Link. The user could be completely unaware that this has occurred because the user was not looking at this Zzote-Link at the time the user created the additional sub-Zzotes for the source Zzote. To prevent such a scenario from occurring is a reason why some implementations use the illustrated technique of fitting the entirety of the source and its descendants within the Zzote-Link background. This is sometimes referred to as "Descendant aware positioning of the source."

Before some implementations render the contents of a Zzote-Link, they perform an initial first-pass of the content in order to work out what is the full extent (size) of the contents (i.e., the source and it's descendants), and then use this knowledge of the total required size to ensure that the inner source content is rendering at a scale such that it fits within the Zzote-Link frame and an adequate amount of Zzote-Link background. In other implementations, this extent can be pre-calculated (and cached) at various earlier times by implementations in order to save time during time-sensitive rendering. But, some implementations do not utilize this caching functionality.

In FIG. 43B, the user pans and zooms out the viewport on the right side of the split-screen to show the new Zzote-Link 4130' in greater context.

The Zzote-Link 4130' exists within the hierarchy of the Television Show Zzote 4330, which contains the "Feature on music" Zzote 4220, which contains the Zzote-Link 4130'.

Figure 44A:
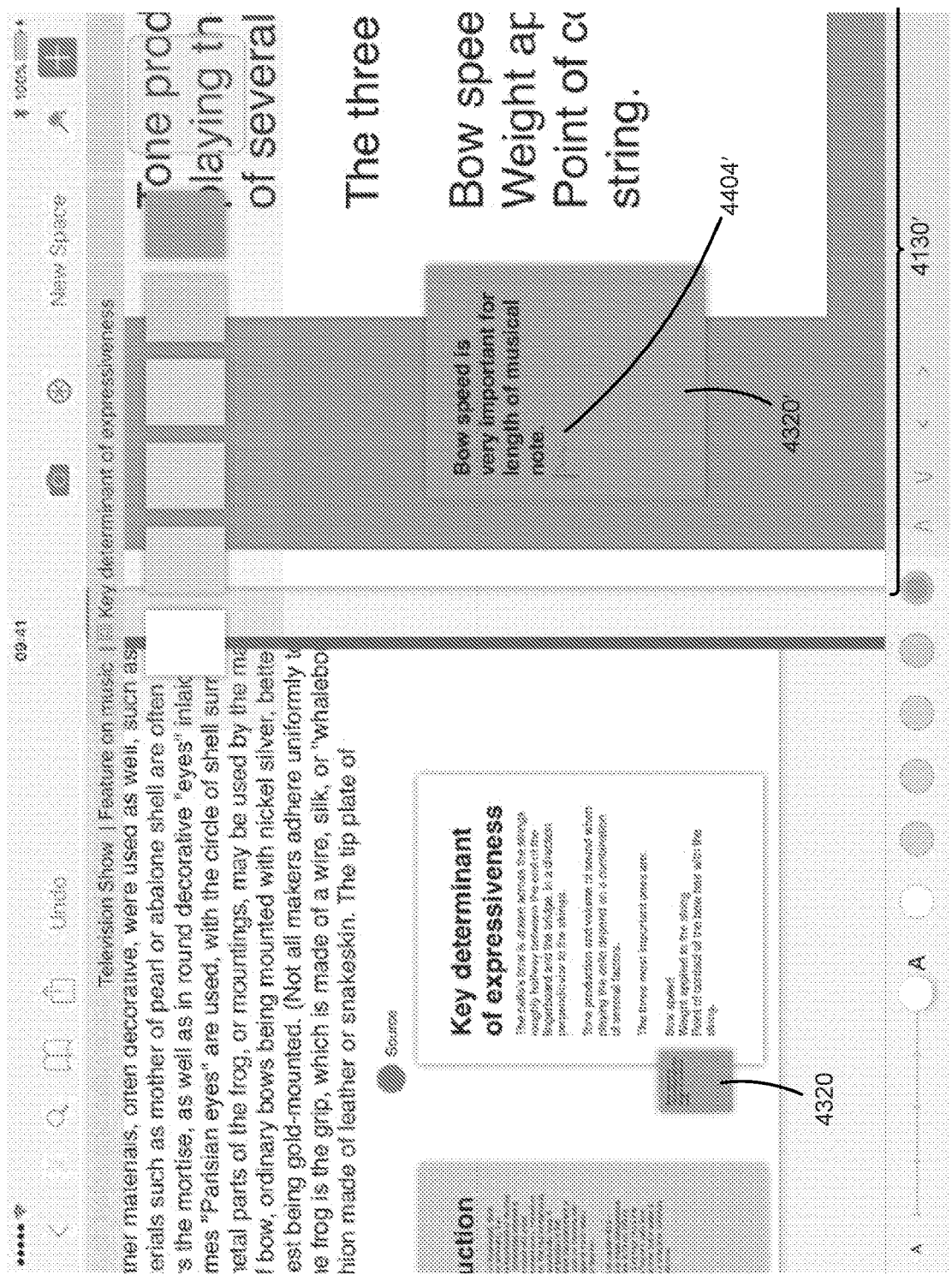
FIGS. 44A and 44B illustrate editing the text content of a child graphical information unit of a shared graphical information unit within a link graphical information unit, in accordance with some implementations.
Figure 44B:
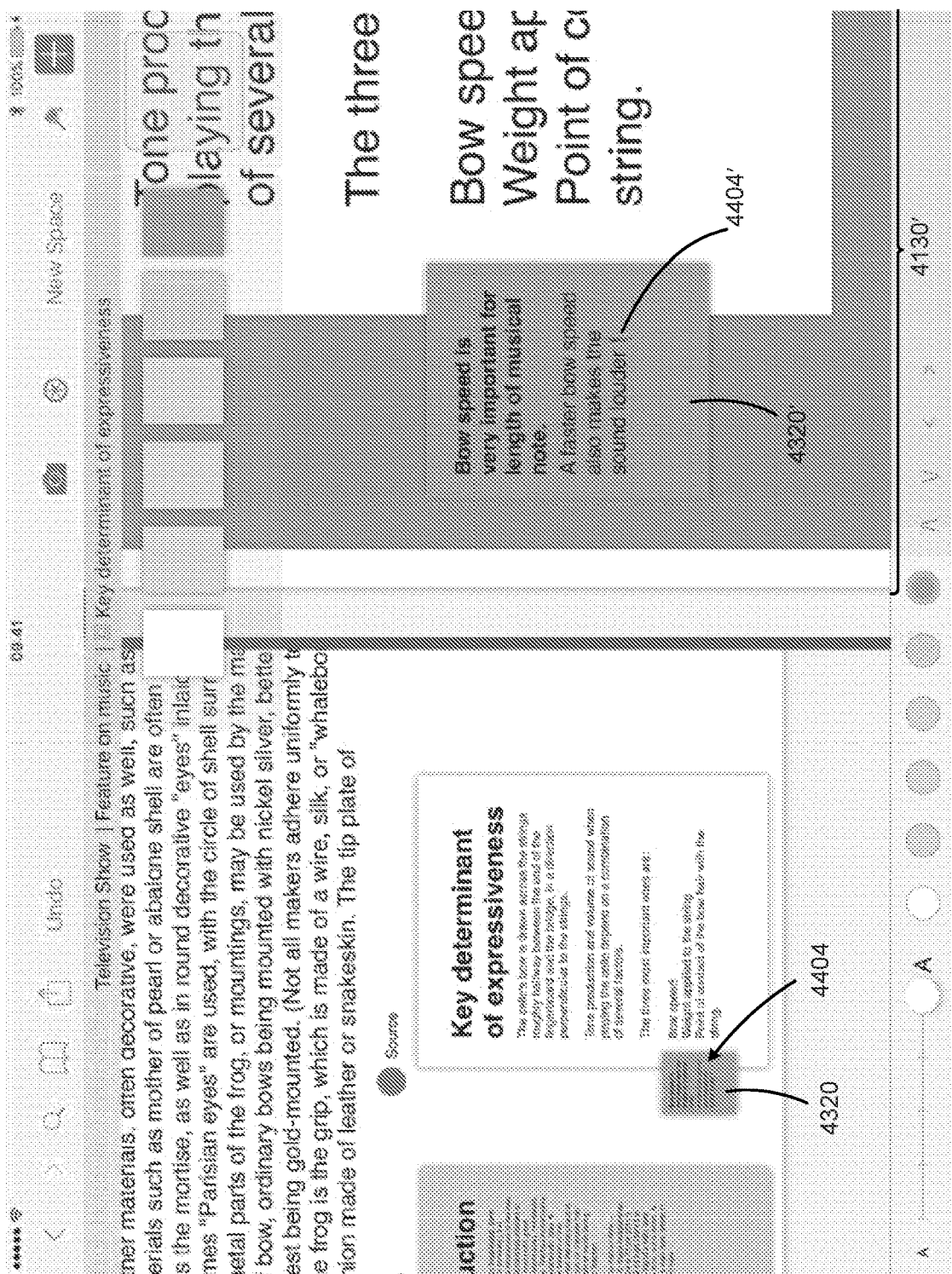

FIGS. 44A and 44B illustrate editing the text content of a child graphical information unit (sub-Zzote) of a shared graphical information unit within a link graphical information unit (Zzote-Link), in accordance with some implementations. The right side of FIG. 44A depicts the situation after the user has zoomed the right viewport into the Zzote-Link 4130' from the situation in FIG. 43B. (Prior to this the user had slightly resized and repositioned the Zzote 4320 at its source using previously described techniques.)

As shown in FIG. 44A, the behavior for editing a Zzote is the same whether the Zzote is (represented) inside a Zzote-Link or not. A representation of a shared Zzote inside a Zzote-Link can alternatively be described as a virtual representation of a source graphical information unit. A child graphical information unit of a shared graphical information unit is thereby also shared. The user taps on the sub-Zzote 4320' within the Zzote-Link 4130'. The sub-Zzote 4320' (right side of split-screen) corresponds to the sub-Zzote 4320 in the source (left side of split-screen). They are in fact the exact same (shared) Zzote, but rendered in differing overall contexts. The user is now ready to type Detail text 4404' into sub-Zzotes 4320' within the Zzote-Link 4130'.

In FIG. 44B the user enters some new Detail text 4404' into the Zzote 4320' within the same Zzote-Link 4130'. The source view is updated at the same time, as indicated by the Detail text 4404 in the sub-Zzote 4320 in the source. It is hence seen that the user is able to easily view and edit shared Zzotes while effectively being within an in situ link "portal" (such as Zzote-Link 4130' on the right side of the split-screen in the figure). Thereby upon selection of a first virtual (shared) graphical information unit inside a first link graphical information unit, user input adjustment to the first virtual graphical information unit concurrently adjusts the corresponding source graphical information unit and each linked representation of the first graphical information unit, including the first virtual graphical information unit. (Because any other link graphical information units to the same source are based on the same "source" data, they will also be visually updated at the same time.)

In FIG. 44B, the user is typing within the Zzote-Link depiction on the right side of the split-screen. The left side of the split-screen (showing the source of this Zzote-Link) is updated at the same time. There is only one copy of the information, so both the source sub-Zzote 4320 and the sub-Zzote 4320' in the Zzote-Link are updated based on the same data.

Similarly, in some implementations the text of the Heading and any other attribute of the Zzote (such as color or font size) can be modified from within a Zzote-Link. In all cases, the source, as seen in the left side of the split-screen here, updates at the same time. The Split-Screen in FIGS. 44A and 44B is used primarily for illustrative purposes. In many situations a user does not need to be viewing multiple instances of the same 'source' content simultaneously. A benefit of the present disclosure is that common 'source' information is updated correctly without having to 'jump' away from wherever the specific shared instance happens to be located. However, as seen in FIGS. 44A and 44B, some implementations graphically depict such changes to multiple instances of shared graphical information units correctly in real or near-real-time if they are within any visible viewports simultaneously.

Conversely, if user input changes anything about the source Zzote or its sub-Zzotes (e.g., additions, deletions, or edits), as seen on the left side of the split-screen, the viewport depicting the Zzote-Link (link graphical information unit), as seen on the right side of the split-screen, updates concurrently (or nearly concurrently). Thereby upon selection of a first (shared) graphical information unit, user input adjustment to the first graphical information unit concurrently visually adjusts each linked representation of the first graphical information unit.

As noted before, the data only resides in the source location (depicted here on the left). The two views must logically remain in sync, and it is not possible for a Zzote-Link's depiction of its source to vary from this.

(When there is a compelling reason for the source and link to diverge, some implementations use Zzote-Link annotations. These are local-only annotations to a common shared graphical information unit and are described in more detail below.)

In other implementations, there may be a short delay before the update to concurrent views of the same information occurs. For example, the update of the source depicting viewport may only occur once the user has completed typing into a specific Zzote in the viewport depicting the Zzote-Link. This behavior can be implemented to conserve computing resources (e.g., rather than synchronizing after every keystroke). Delayed synchronizing can prevent a slowed down user experience that results from pure real-time updates. When typing, it is particularly important that the computer is responsive to the user's input.

In another related example, the two sides of the split-screen could represent two separate devices connected via a network. In this example, both devices are sharing the same Zzote-Space data. In such a situation, to conserve network traffic and improve performance, some implementations have a similar short delay between the graphical updates to each view. In a networked environment with shared Zzote-Space, some implementations use concurrency locks, similar to those used in databases. In some implementations, a lock is created immediately before editing starts. Some implementations provide performance improvement for a networked system by waiting (for example) until typing has finished in a given Zzote before updating the networked database or remote representation of the same Zzote.

In some implementations, even if absolute real-time updating does not occur, the updates are in substantially real-time.

FIGS. 45A-45D illustrate adding a new child graphical information unit (sometimes referred to as a sub-Zzote) to a shared graphical information unit within a link graphical information unit (sometimes referred to as within a Zzote-Link), in accordance with some implementations.

Figure 45A:
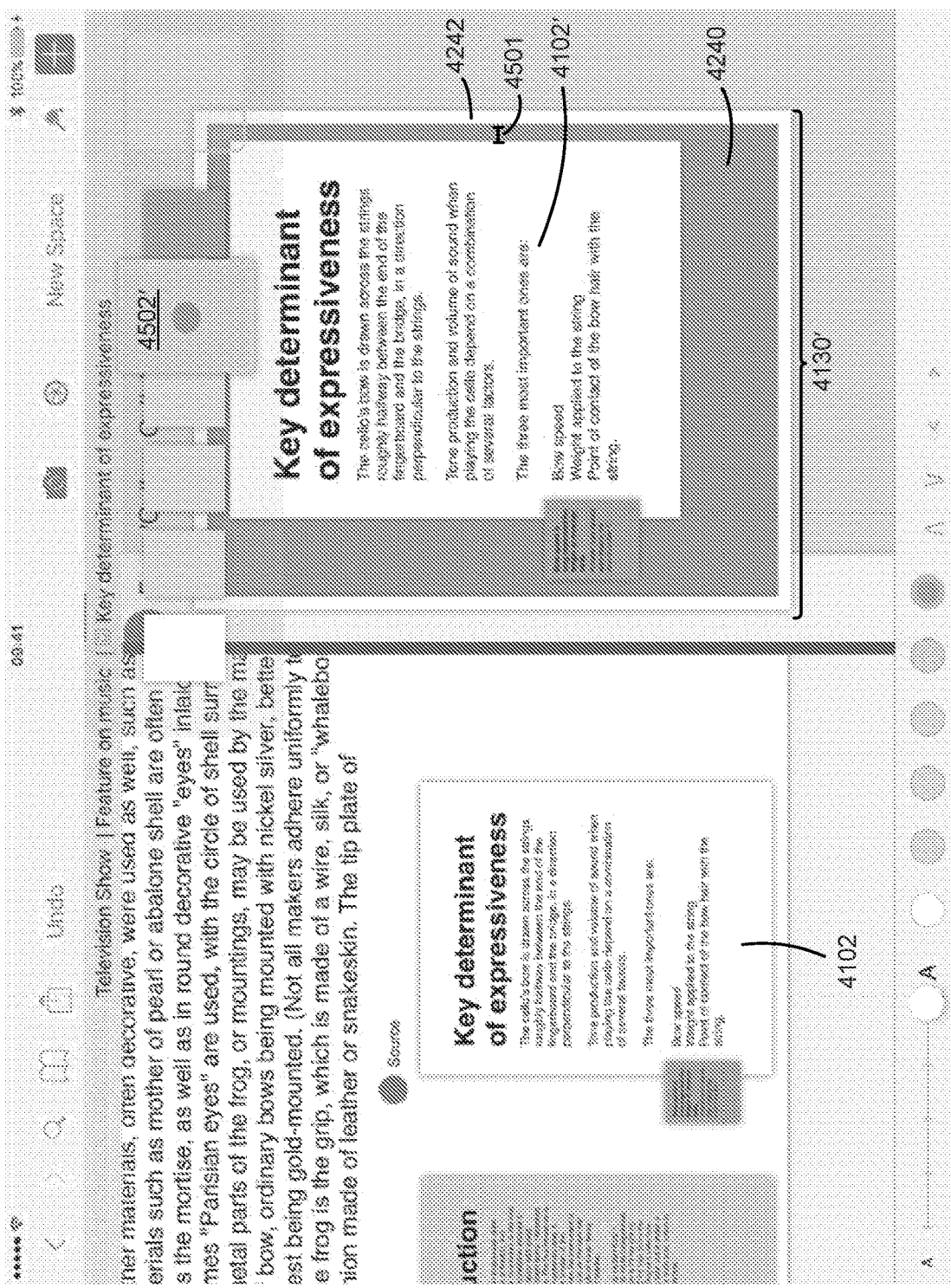
FIGS. 45A-45C illustrate adding a new child graphical information unit to a shared graphical information unit within a link graphical information unit, in accordance with some implementations.

In FIG. 45A, the user has picked up a new potential Zzote 4502' from the Add bar. This is about to be dragged into the Zzote-Link 4130'. Note the distance 4501 (within the Zzote-Link background 4240) between the right-edge of the "Key determinant of expressiveness" Zzote 4102' within the Zzote-Link 4130' and the right-side inner edge of the Zzote-Link border/frame 4242. As a result of the next action, this distance will increase slightly, and the area of the Zzote 4102' (and its sub-Zzotes and any further level of descendants if present) as represented in the Zzote-Link 4130' will decrease relative to the contained area of the Zzote-Link border 4242.

Figure 45B:
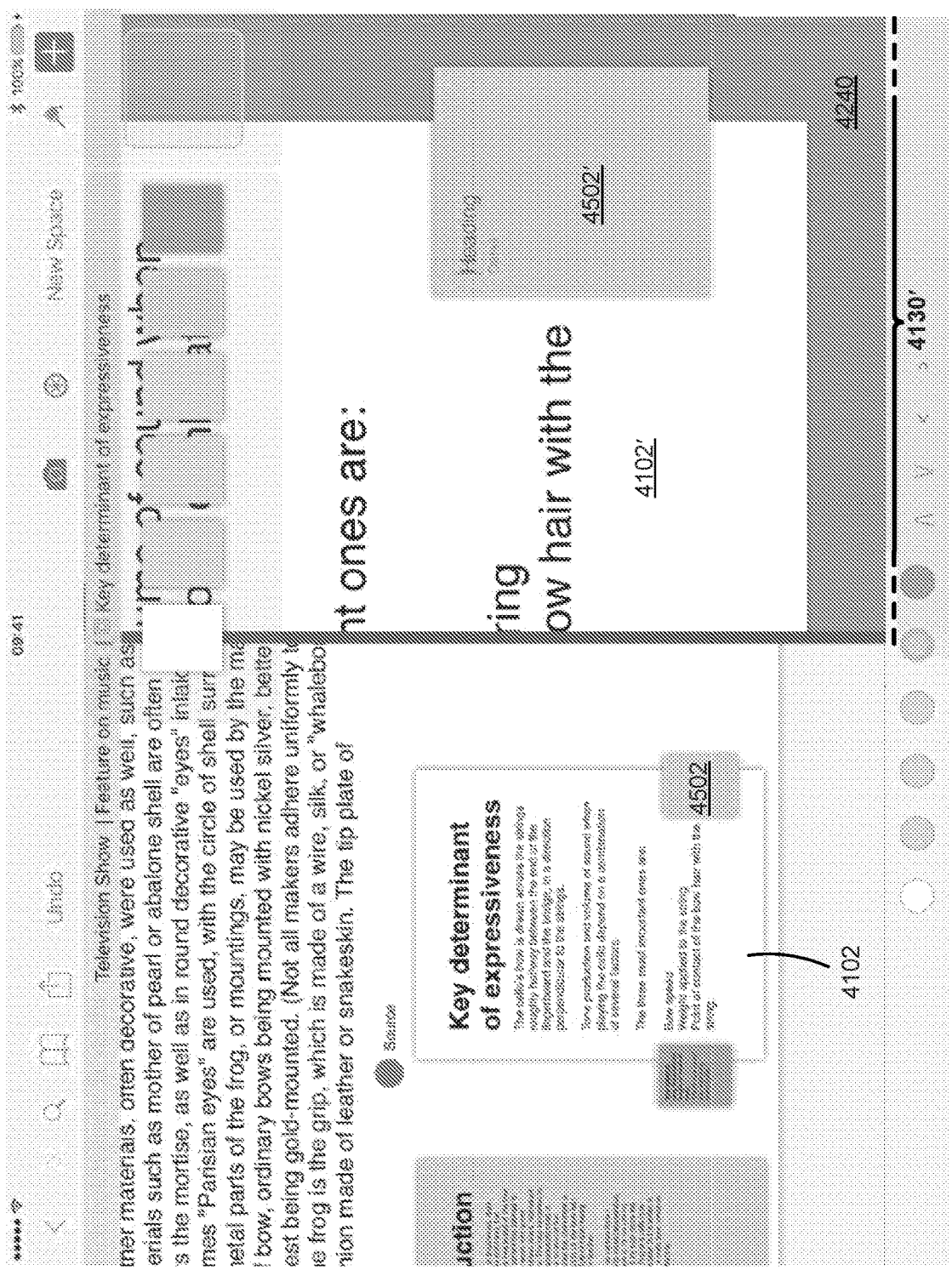

In FIG. 45B, using just the right side of the split-screen, the user has positioned and sized the new Zzote 4502' to the lower-right of "Key determinant of expressiveness" Zzote 4102' within the Zzote-Link 4130'. The user interface has entered a typing mode. Note that the corresponding new Zzote 4502 is displayed at the source, as seen on the left side of the Split-Screen. By the end of the action depicted in FIG. 45B, 4502' has now become a real Zzote. This process started as the new Potential Zzote 4502' from FIG. 45A and continued up until the user finished positioning/sizing it into Zzote-Space in FIG. 45B. Therefore, at the end of the action, as depicted in FIG. 45B, 4502 is also a real Zzote.

On the right side of the split-screen, the new Zzote 4502' has been added and has entered a typing mode, with the standard placeholders for Heading and Detail. The viewport on the right-side of the Split-Screen has zoomed in so that the text is readable. The right side of the Split-Screen is now zoomed in and depicting a view of Zzote-Space as though through a "portal" into the Zzote-Link 4130'. The width of the Zzote-Link 4130' in FIG. 45B is in fact wider than the entire right side viewport.

On the left side of the split-screen, the same new (still empty) Zzote 4502 is also viewed in the source Zzote 4102. In both cases, the new Zzote is placed in the lower-right of the "Key determinant of expressiveness" Zzote (4102 at the source and 4102' in the Zzote-Link), just overhanging the right margin. This is because both viewports (from the "Key determinant of expressiveness" Zzote (4102 and 4102') inwards) represent the same data.

As seen on the right side of the Split-Screen within the Zzote-Link 4130', the depiction of the source and all of its descendants are positioned within the Zzote-Link background 4240, without any overhanging descendants going beyond the inner boundary of the Zzote-Link frame/border. Specifically, this can be inferred from FIG. 45B because 4502' is seen to not extend rightwards outside of the Zzote-Link background 4240. This "Descendant aware positioning of the source" prevents having any descendants of a source Zzote overlapping the Zzote-Link frame/border. Consequently, this prevents having some sub-Zzotes (or further descendants) of the inner 'source' unintentionally appearing to overlap the Zzote-Link frame 4242 of Zzote-Link 4130' and therefore appearing to be sub-Zzotes of Zzote-Link 4130' itself. The same process also prevents the possibility of appearing to overlap and hence be connected (e.g., as parent or sub-Zzote) with Zzotes that are outside of the Zzote-Link 4130' (ones that are just nearby the location of Zzote-Link 4130'). The Zzote-Link frame/border 4242 is seen in FIG. 45A, but is now outside of the right side viewport in FIG. 45B due to the viewport being zoomed-in.

In FIG. 45B, the entire representation of the Zzote-Link's content (i.e. the "Key determinant of expressiveness" source Zzote 4102' and all its descendants) has actually shrunk into the Zzote-Link 4130' and altered its position because the new positioning of the new sub-Zzote 4502' overhangs the right-margin of 4102'. Because 4502' must be rendered in full within the Zzote-Link, the width of the Zzote-Link's content is now greater but the source and its descendants still need to 'fit in' within an adequate amount of Zzote-Link background 4240 depicted within the Zzote-Link 4130'. In this case, adding the new sub-Zzote 4502' has caused the entire contents of the Zzote-Link's representation of its source to shrink into itself slightly. Some implementations display the shrinking as an animation.

In FIG. 45B, it is not entirely obvious that this shrink has occurred because the viewport is zoomed in and the change is only slight. The change is more apparent comparing the representation of the entire Zzote-Link structure 4130' on the right side of the Split-Screens between FIGS. 45A and 45D. FIGS. 45A and 45D are respectively before and after the new Zzote 4502' has been added to overhang the right margin of 4102'. FIG. 45B still indicates that this "shrink" has taken place because it shows a "buffer" of Zzote-Link background space 4240 to the right of the new overhanging sub-Zzote 4502'.

If the "Descendant aware positioning of the source" had not occurred, this new sub-Zzote 4502' would be overhanging the previously existing area of Zzote-Link background, and over the Zzote-Link frame/border. If the overhang at the source were greater it could overhang outside of the Zzote-Link frame/border. For example, in this instance 4502' could potentially then overlap and therefore seem to be a parent or sub-Zzote of another nearby hypothetical Zzote that was located nearby to Zzote-Link 4130' itself. This is the situation that "Descendant aware positioning of the source" avoids.

In some implementations, the content of a Zzote-Link (the source and its descendants) are always represented within the confines of the Zzote-Link frame/border and within the slight buffer space provided by the Zzote-Link background.

Figure 45C:
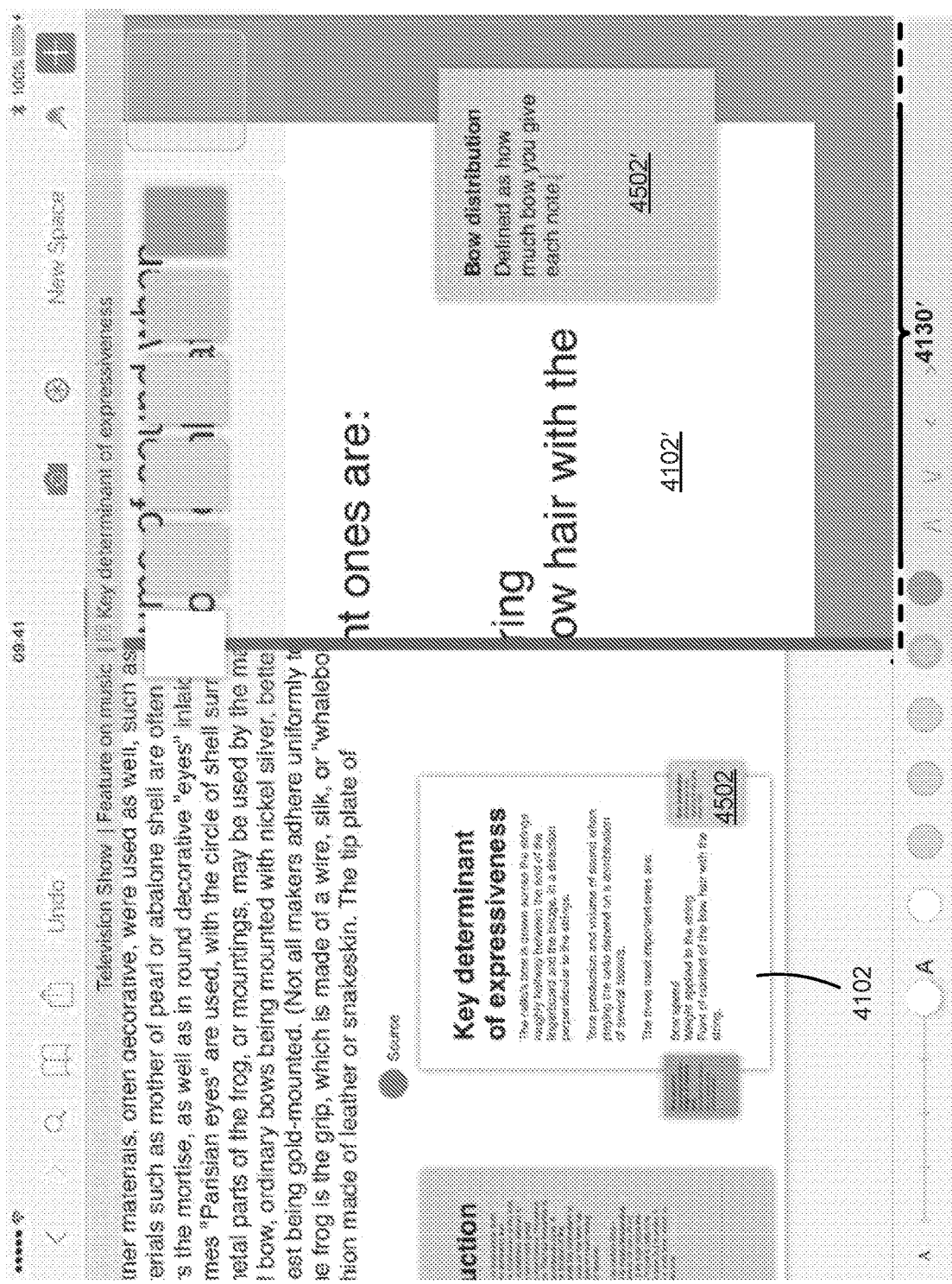
Figure 45D:
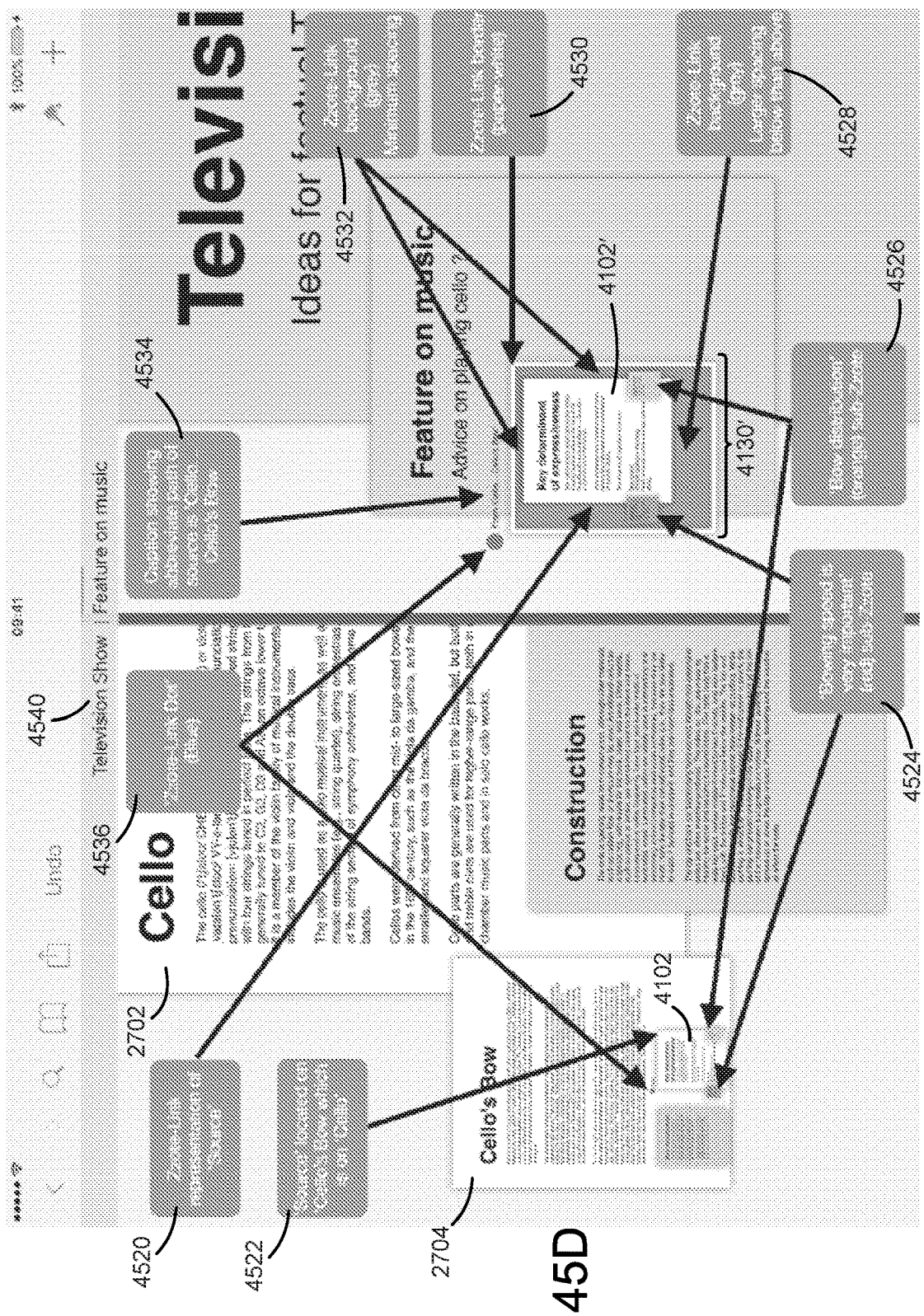
FIG. 45D illustrates labelled components of the resultant shared graphical information unit and its descendants, in accordance with some implementations.

In FIG. 45C, the user types into the new Zzote 4502' within the Zzote-Link 4130' on the right side of the split-screen. The viewport on the left side of the split-screen is also updated as the content of the Zzote 4502' changes (noting the identical Zzote 4502 in particular). This is thereby one illustration of the benefits of a live in situ link portal (containing shared graphical information unit(s) within a Zzote-Link).

FIG. 45D reviews the result of updating and adding content from within a Zzote-Link while also graphically summarizing some aspects of Zzote-Links. Following on from FIG. 45C, the user zooms and pans out both viewports in order to visually clarify the complete picture. FIG. 45D contains multiple explanatory boxes 4520-4536, with arrows pointing to features they describe. FIG. 45D therefore illustrates labelled components of the resultant shared graphical information unit (4102'/4102) and its descendants, in accordance with some implementations.

The reason for the user zooming out both viewports (on either side of the split-screen) in FIG. 45D may be for visual benefit. However, in this case, the broader view is primarily to help clarify this explanation. FIG. 45D more clearly shows both the source Zzote 4102 and the Zzote-Link 4130' (containing 4102', which is the identical equivalent to 4102 but within the link) in nearly their full contexts. FIG. 45D thus more clearly represents the end result of the zoomed-in user's actions in FIGS. 45B/45C and the entirety of how the Zzote-Link 4130' is rendered using "Descendant aware positioning of the source" principles.

On the right side of the split-screen, the "Key determinant of expressiveness Zzote" 4102' is selected within its Zzote-Link 4130'. See Box 4520. This "Key determinant of Expressiveness" Zzote on the right-side of the split-screen has a "selected ring" around it. The Path bar 4540 thus displays "Television Shows|Feature on music." This is the location of the Zzote-Link 4130' itself. The "source" Zzote 4102 for This Zzote-Link is indicated by Box 4522. Therefore, the same "Key determinant of expressiveness" Zzote is indicated on the right side of the split-screen within a Zzote-Link (Box 4520), and on the left side of the split-screen at its "source" (Box 4522). It is the same Zzote but in different contexts.

Two sub-Zzotes of the "Key determinant of expressiveness" Zzote are visible, and they are visible on both the left side of the split-screen (at the source) and the larger representation in the Zzote-Link (on the right side of the split-screen). See Boxes 4524 and 4526.

Overhanging the left margin of the "Key determinant of expressiveness" Zzote is a red sub-Zzote. Though it cannot be read at this scale, it is the "Bowing speed is very important for length of music note" Zzote. See Box 4524

There is another sub-Zzote overhanging the right-margin of the "Key determinant of expressiveness" Zzote. It is the "Bow distribution" Zzote (4502/4502' from FIG. 45C) just created. See Box 4526.

On the right side of the split screen, the user interface displays the entire shape of the Zzote-Link and its internal representation of its source. See Box 4520. The Zzote-Link frame (border) is currently paper-white for this Zzote-Link. See Box 4530. The Zzote-Link background provides a dark grey (or alternative color in other implementations) inner blank distinctive buffer space within which the source is represented. See Boxes 4528 and 4532.

The "Key determinant of expressiveness" Zzote and its overhanging sub-Zzotes have been fitted into the available space of the Zzote-Link. It allows some Zzote-Link background to be seen. To do this, the user interface shrunk the "Key determinant of expressiveness" Zzote into the Zzote-Link background and the Zzote-Link frame (border). This is shrunk further than would have been required if it did not have the overhanging sub-Zzotes.

In some implementations, there is a bias towards aligning the Zzote-Link contents upwards within the Zzote-Link background. In this implementation, the "Key determinant of expressiveness" Zzote and its overhanging sub-Zzotes have been fitted into the available internal space of the Zzote-Link background but then aligned towards the top margin (allowing for a minimum level of empty Zzote-Link background buffer space on all sides as a starting point). See Boxes 4528 and 4532.

This content is thus not symmetrically placed vertically, whereas it is symmetrically placed horizontally in this instance. The reason for this is that Zzotes are often viewed from the top-down in the same way that text is often read from the top downwards. In the case of a Zzote, the Heading at the top is particularly important to read. Therefore, in some implementations, the layout of Zzotes within a Zzote-Link is skewed to prioritize this feature rather than appearing centralized within the Zzote-Link frame (border) under all circumstances. However, other implementations vary from this vertical alignment principle. For example, other implementations vary from this bias towards aligning the Zzote-Link contents upwards within the Zzote-Link background.

The user can change the color of the Zzote-Link border/frame using the same techniques as changing the background color of a Zzote. In fact, in some implementations, the Zzote-Link border/frame is the "backing" (hence with the same background color) of the basic Zzote-aspect of the Zzote-Link itself. The "backing" is actually the Zzote "background" of the Zzote-Link itself (this however is not the "Zzote-Link background" which is something else specific to Zzote-Links as described above).

A choice of color can help to distinguish between different Zzote-Links or indicate urgency or other color-coordinated characteristic for a Zzote-Link (e.g., to distinguish a specific Zzote-Link from other Zzote-Links to a common source). In this instance, the color of the Zzote-Link border/frame is still the default paper-white. See Box 4530.

As indicated in Box 4522, the source Zzote is a sub-Zzote of the Cello's Bow Zzote 2704, which is a sub-Zzote of the Cello Zzote 2702. Boxes 4536 and 4534 point out the Zzote-Link dots and associated caption, as described in more detail above.

Further Aspects of Links to Shared Graphical Information Units

Figure 46A:
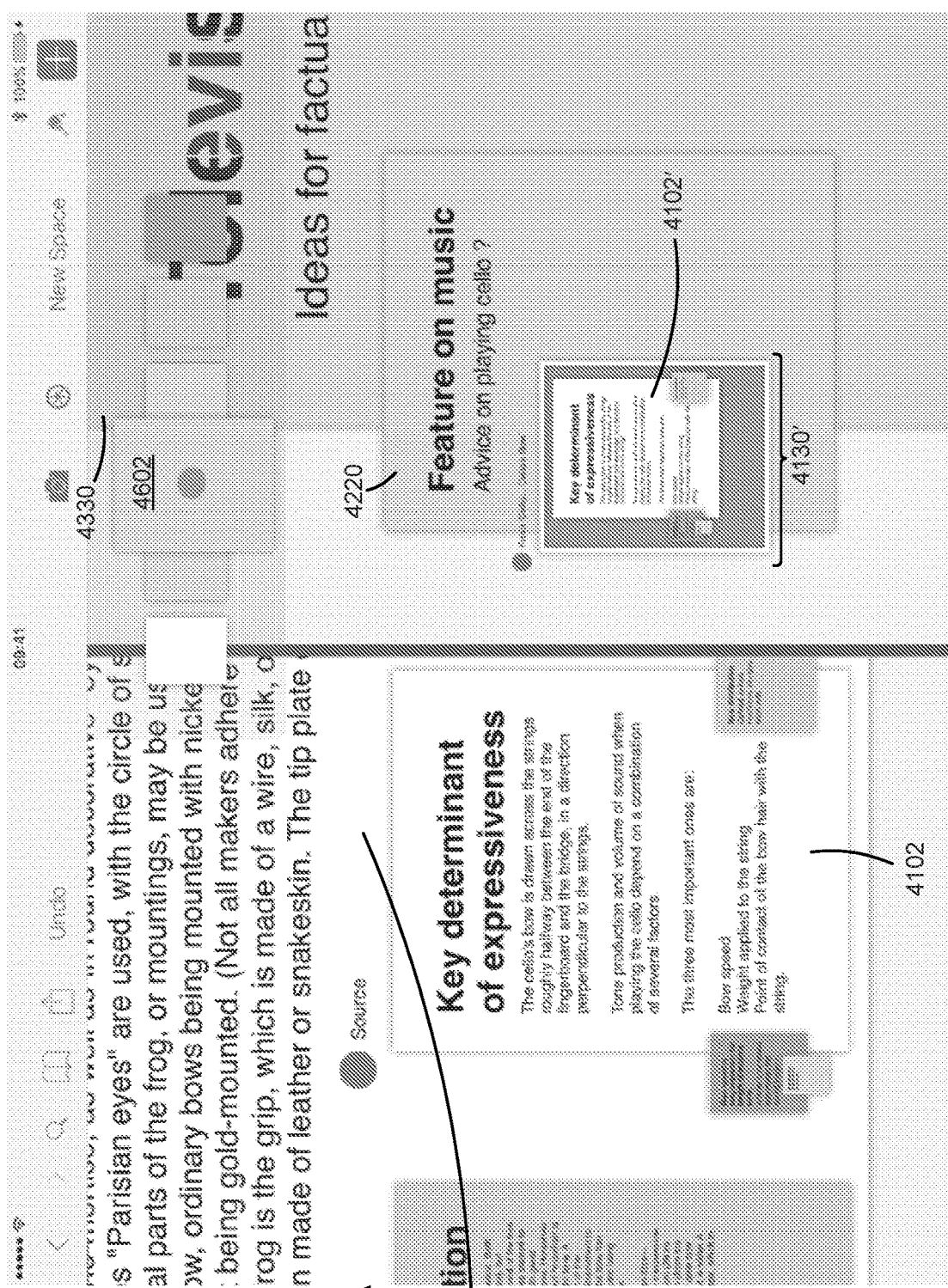
FIGS. 46A-46C illustrate adding local-only annotations to a common shared graphical information unit, in accordance with some implementations.
Figure 46B:
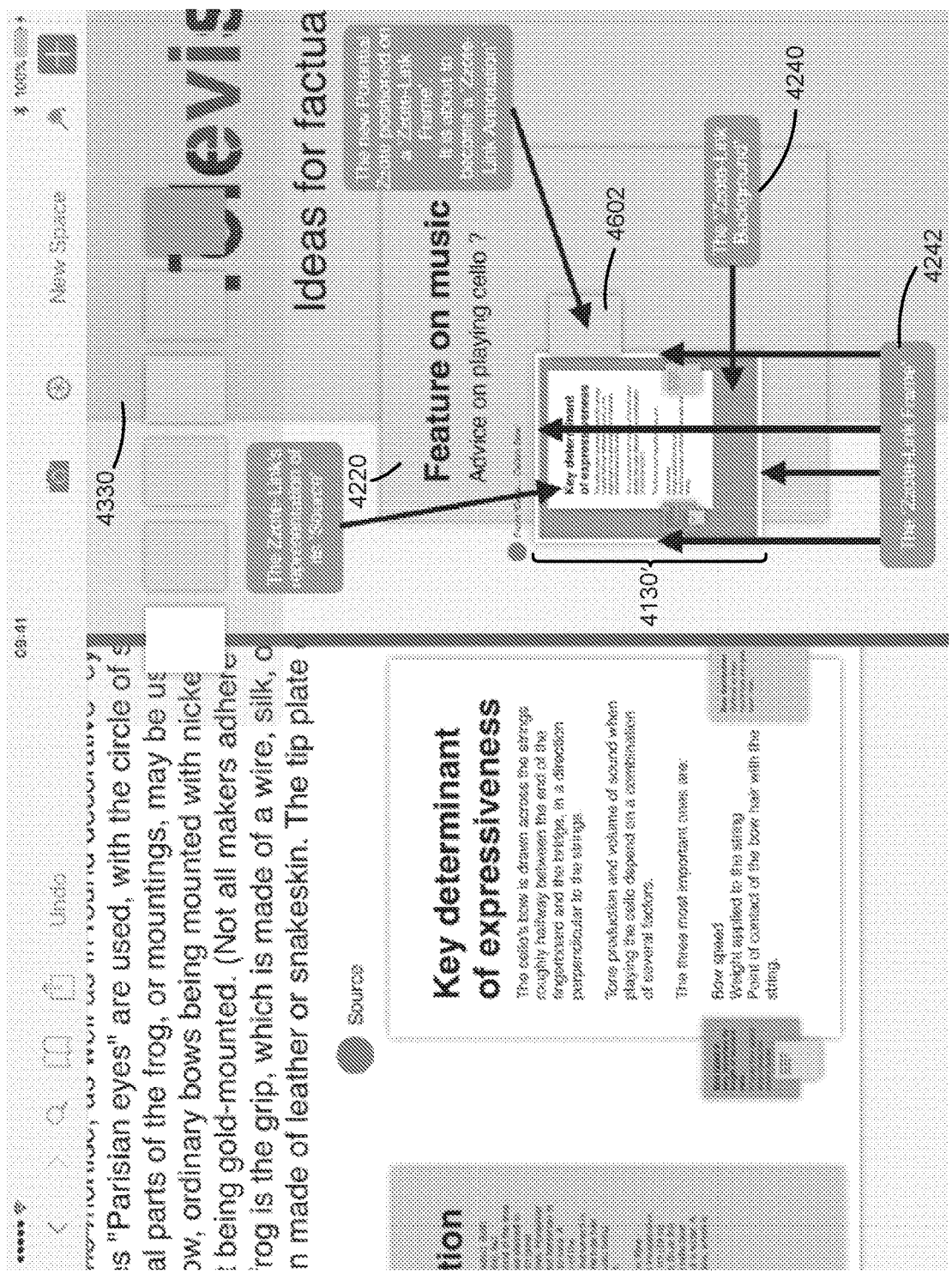
Figure 46C:
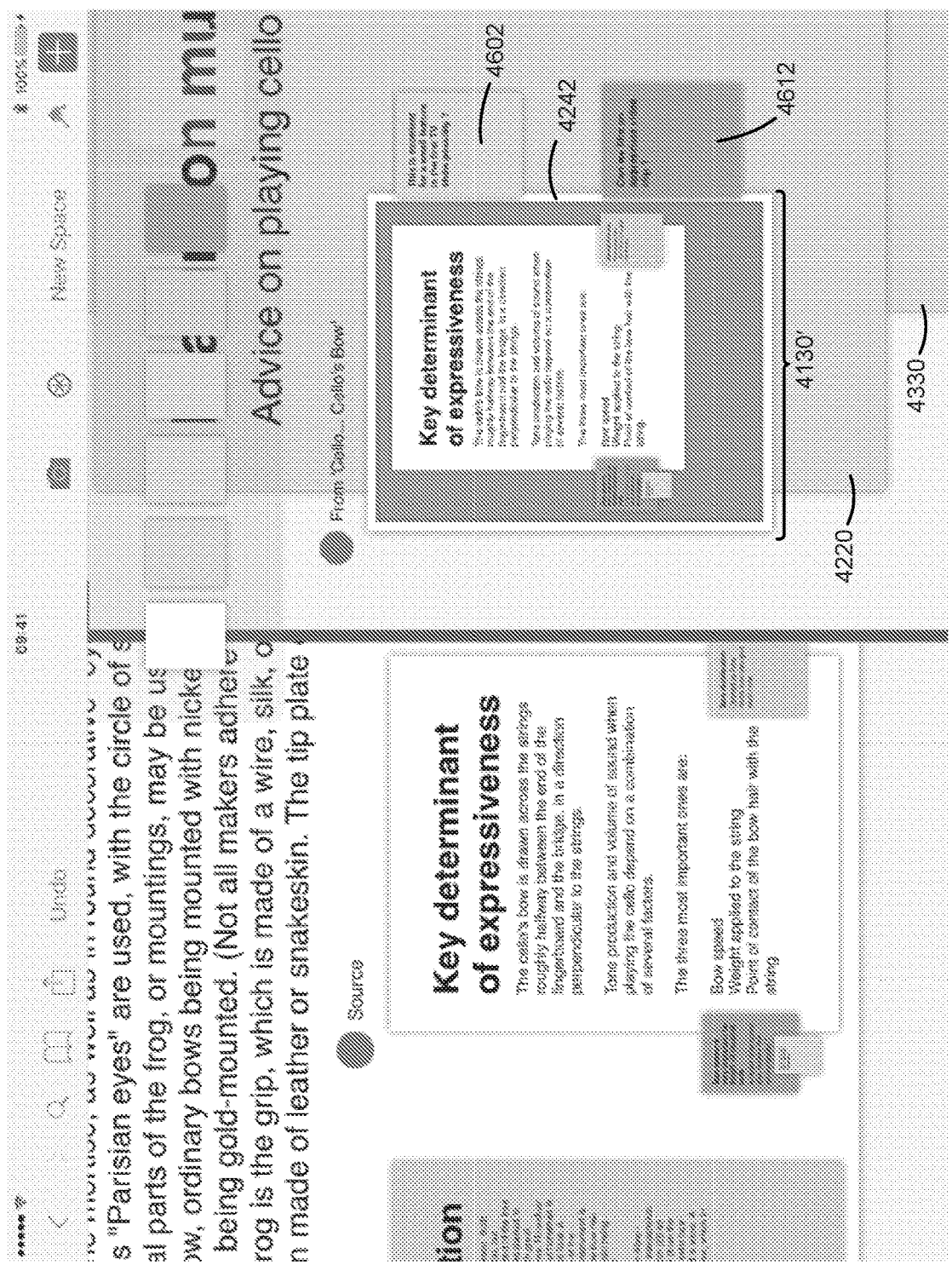
Figure 47A:
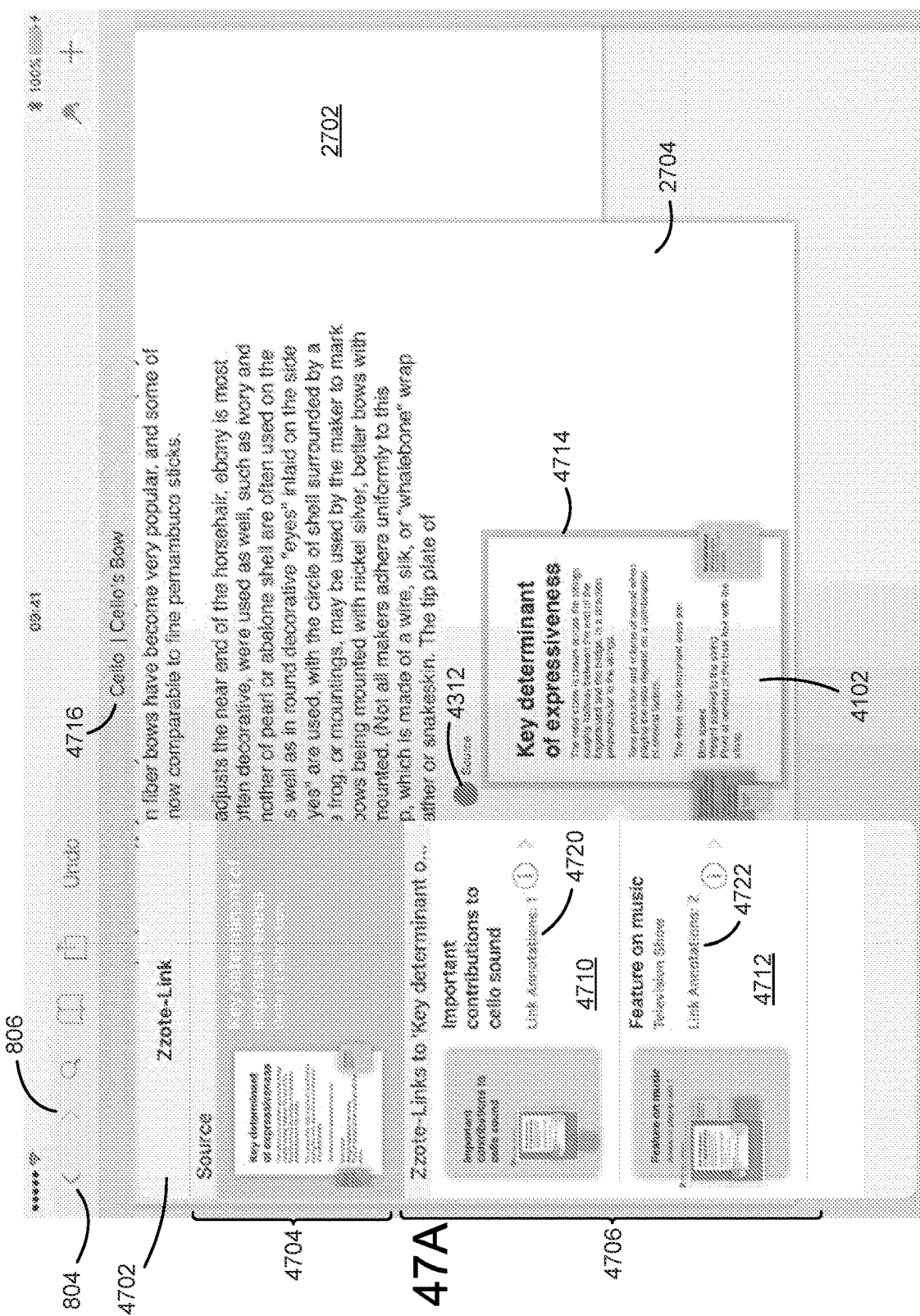
FIGS. 47A-47C illustrate a tool to navigate the multiple places where a common shared graphical information unit resides, in accordance with some implementations. Additionally, the tool allows easy access to any local-only specific annotations.
Figure 47B:
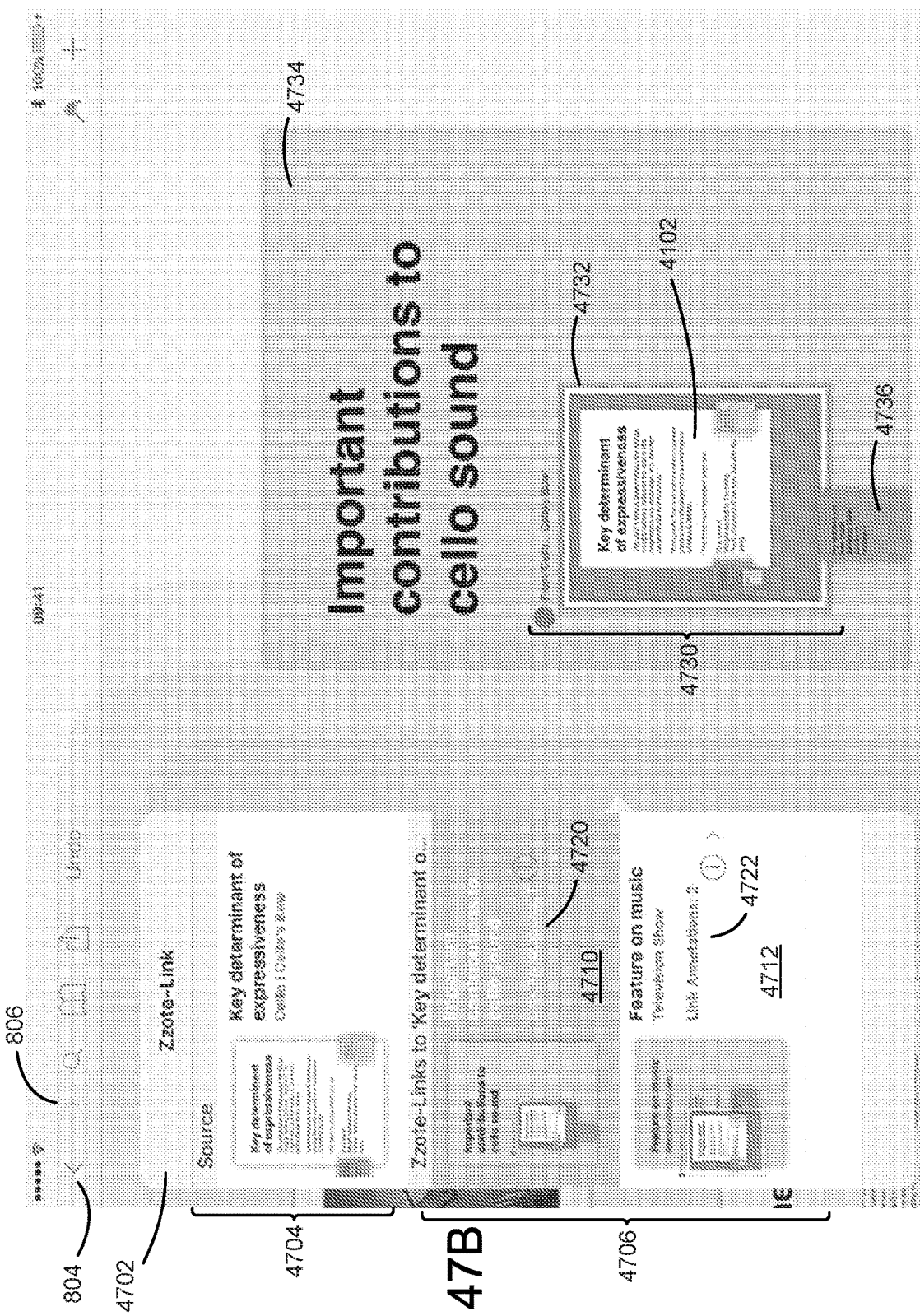
Figure 47C:
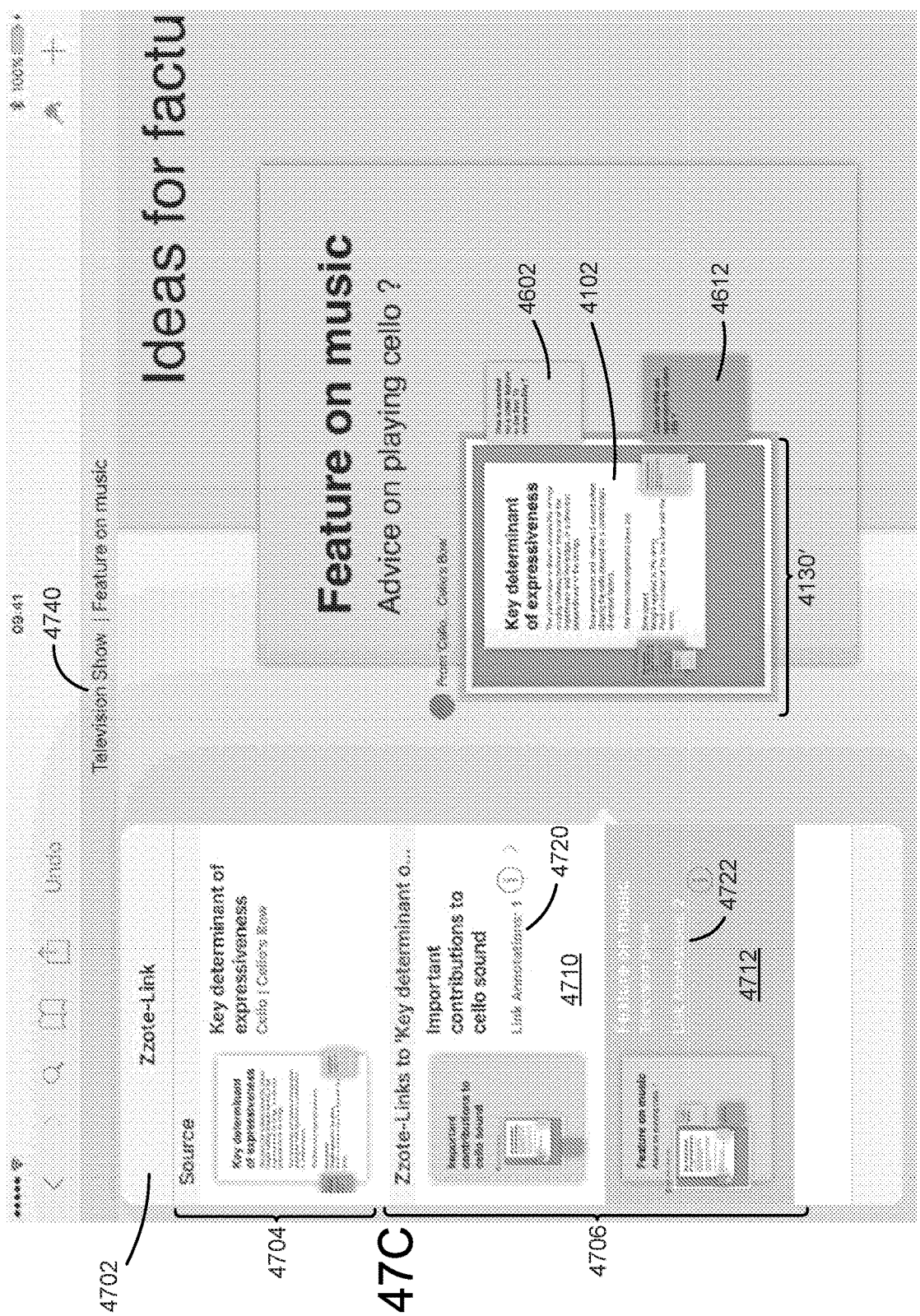

FIGS. 46A-46C illustrate adding local-only annotations (sometimes referred to as Zzote-Link annotations) to a common shared graphical information unit, in accordance with some implementations. Such annotations are added to a specific Zzote-Link to a shared Zzote, and does not apply to the other Zzote-Links to the shared Zzote.

Zzote-Link annotations enable specific local contextual annotations to be applied only at the site of a specific Zzote-Link. This local information is in addition to common shared information. In some implementations, the "source" of a Zzote-Link is shared between all Zzote-Links to the same "source." If any modifications are made within a Zzote-Link (or at the source itself), then those changes occur at the source and appear in all Zzote-Links to it. The contents of any other Zzote-Links to the same source are also identically changed.

However, under some circumstances a user may want to annotate a particular Zzote-Link within the context of the link itself (e.g., how cello playing affects this Television Show). Such an annotation shows up only in the context of this Zzote-Link.

In FIG. 46A, using the previously create Zzote-Link 4130', the user now wishes to annotate this Zzote-Link to the "Key determinant of expressiveness" Zzote 4102' in such a way that it applies only to the Zzote-Link 4130' in 'Television|Features on music" (seen on the right side of the split screen) and does not affect the source Zzote 4102 in "Cello|Cello's Bow" (seen on the left side of the split screen).

For this purpose, in FIGS. 46A-46C, newly created Zzote-Link annotations will relate to information that the user believes relate to the "Key determinant of expressiveness" Zzote 4102', but are contextually specific only within the 'Feature on music" Zzote 4220 in the "Television Show" Zzote 4330 (illustrated on the right side of the split screen in FIG. 46A). The user does not believe that such annotations would be relevant to users reading the same "Key determinant of expressiveness" Zzote 4102' in other contexts such as at its source Zzote 4102 (illustrated on the left side of the split screen in FIG. 46A), or within other Zzote-Links to the same source.

Some implementations, however, do provide a complementary means to rapidly access all the Zzote-Links annotations across all the Zzote-Links that are linked to the same common source. Some implementations provide this feature through a Zzote-Link lister tool. (One implementation of such a tool is illustrated in FIGS. 47A-47C, and is described below.)

As shown in FIG. 46A, the user begins by selecting a new potential Zzote 4602 to add. The new Potential Zzote 4602 (third in from the left) has just been picked up from the Add-Bar.

In FIG. 46B, the user has positioned and sized the new Potential Zzote 4602 on the Zzote-Link frame 4242. (As noted above, the Zzote-Link frame is also referred to as the Zzote-Link border.) Some of the features are pointed out by the boxes in FIG. 46B. The Zzote-Link frame 4242 is really the backing of the Zzote-Link itself, so items can be added to the frame 4242 independently of the Zzote-Link's inner contents (i.e., the common "source").

The Zzote-Link frame 4242 is the outer outline around the Zzote-Link background 4240. It behaves like the normal (user) variable-colored "backing" of any Zzote, but in this example of a Zzote-Link, only the outer frame 4242 is still visible because most of the Zzote "backing" is obscured by a "Zzote-Link Background" 4240 containing the Zzote-Link's source. Note that it is from the Zzote-Link background inwards that the Zzote-Link behavior is distinct from a conventional Zzote. Within the Zzote-Link background is a representation of the Zzote-Link's source, inset by a small "buffer" amount on every side.

Given that every Zzote inside the Zzote-Link is a depiction of its source, only the Zzote-Link frame 4242 of the Zzote-Link behaves as a normal Zzote. The Zzote-Link background 4240 is effectively a buffer between the depiction of the Zzote-Link's source and the Zzote-Link frame 4242. The distinctive appearance of the buffer 4240 (dark grey in the illustrated implementation) helps a user to identify a Zzote-Link as distinct from other Zzotes.

When finalized here, the Potential Zzote 4602 will be a real Zzote belonging as a sub-Zzote of the specific Zzote-Link 4130' itself. This is because Zzote 4602 is only over the Zzote-Link frame 4242, and not within the inner (shared) Zzote-Link content. Adding to the Zzote-Link frame 4242 does not affect the shared source (e.g., the Zzote "Key determinant of expressiveness" and its descendants) in any way.

The Zzote-Link 4130' itself exists as a sub-Zzote belonging to the "Feature on music" Zzote 4220, as seen on the right side of the split screen in FIG. 46B. The "Feature on music' Zzote 4220 belongs to the "Television Show" Zzote 4330. Because this Zzote-Link itself only exists within the "Feature on Music" Zzote 4220 within the "Television Show" Zzote 4330, the new Zzote 4602 (a Zzote-Link annotation) will not directly "write back" in any way to the source "Key determinant of expressiveness" Zzote (or any of its ancestors, such as the Cello's Bow Zzote). Also, this Zzote-Link annotation 4602 will not appear on any other Zzote-Links to this source.

In FIG. 46C, the user has released their finger(s) to finalize the first Zzote 4602 as a first Zzote-Link annotation and added a heading to it. The user has then added a second Zzote-Link annotation 4612 and likewise added a heading to that also. The user has manually zoomed and panned the "Key Determinant of expressiveness" Zzote-Link 4130' (on the right side of the split screen) to see the Zzote-Link and it's two Zzote-Link annotations more clearly. The two Zzote-Link annotations are effectively "affixed" on the right side of the Zzote-Link frame 4242.

On the left side of the split screen is the same source (the "Key determinant of expressiveness" source Zzote and its descendants) as depicted within the Zzote-Link on the right side of the split screen. Note that the Zzote-Link annotations are not depicted at the source (because the Zzote-Link annotations were not actually attached to it in any way).

In the example in FIG. 46C, the two Zzote-Link annotations 4602 and 4612 are comments or questions about the source information (on the subject of a sub-section of Cello playing), which the user is considering using in a new television show. The Zzote-Link annotations are really only relevant to the context of this Zzote-Link (e.g., how the linked Cello subject matter relates to a "Feature on Music" in a "Television show").

The first Zzote-Link annotation 4602 is a comment that states "This is excellent for a small feature in the first TV show possibly?" The user has chosen to mark this in a green color. As with all Zzotes, the choice of color can be either purely aesthetic or follow (not necessarily rigorously) some meaning.

In this case the Zzote might be green because it is a positive comment. The green color may indicate that the user wants to designate the source (in this context) as potentially useful. (The user may go on to Zzote-Link other ideas for the "Television Show" and only those with green Zzote-Link annotations on them will be considered at a later date.)

The second Zzote-Link annotation 4612 is a question that asks "Can we film an appropriate video clip?" The expectation is that in the future someone should answer it, and at that point should either amend this Zzote or add sub-Zzotes to it that answer the question. At some point, someone may decide to remove the red color from this Zzote, thus removing a distinctive "urgent" red mark from the Zzote cluster.

Colors stand out visually in Zzote-Space even when they are very small. Additionally, in some implementations the user is able to specifically search with a "Search tool" in any context and globally for Zzotes having a given color. In this way, it may be common for a user to search for any red Zzotes, which can be interpreted as labelling them "Things to do." Often however, a benefit of Zzote-Space is that the search can instead be just a simple visual inspection of Zzote-Space for the required colors accompanied by some viewport panning and zooming in/out if required.

Neither of the two Zzote-Link annotations 4602 or 4612 is directly relevant to the source Zzote, but they are relevant in the context of the "Television Show" Zzote. If it is determined that something in these annotations is relevant to all viewers of the shared "Key determinant of expressiveness" Zzote as depicted in potentially various different locations in Zzote-Space, the user could have placed the new Zzotes directly into the source material. Note that a user can change this after the fact as well, moving a Zzote-Link annotation into the source (at which point it is no longer a Zzote-Link annotation).

In some implementations, it is also possible, using the basic principles of Zzote-Space, to combine functionality: both adding information to the original source material (in situ) to be shared by all, and placing special comments regarding this shared information but affixed only to a specific Zzote-Link. This can be accomplished by additional Zzote-Linking from a Zzote within the source out to a local Zzote-Link annotation. In some implementations, it is also possible to create a new descendant of the source, which is itself a new Zzote-Link to an existing Zzote-Link annotation.

FIGS. 47A-47C illustrate a tool (sometimes referred to as a "Zzote-Link lister") to navigate the multiple places where a common shared graphical information unit resides, in accordance with some implementations. Additionally, the tool allows easy access to any local-only specific annotations (sometimes referred to as "Zzote-Link annotations").

FIG. 47A shows the viewport after the user has zoomed and panned to see the context of the "Key determinant of expressiveness" Zzote 4102. The Zzote 4102 is located as a sub-Zzote of a Cello's Bow" Zzote 2704, which is located on the "Cello" Zzote 2702. The Zzote-Link dot 4312 is associated directly with the "Key determinant of expressiveness" Zzote 4102 that it is next to. The Zzote-Link dot provides access to the Zzote-Link lister navigation tool as required. The user taps on the Zzote-Link dot 4312, which brings up the Zzote-Link lister 4702. The "Key determinant of expressiveness" Zzote 4102 also shifts right if necessary so as not to be obscured by the Zzote-Link lister 4702. In this example, the Zzote-Link lister 4702 now contains multiple Zzote-Links to the same source. In particular, the lister 4702 has three entries in two sections 4704 and 4706.

The first section 4704 is headed "Source". The one item in the first section 4704 is a thumbnail view of the source Zzote (Zzote 4102 in this example). Within section 4704, the text to the right of this thumbnail shows the Heading of the Zzote as "Key determinant of expressiveness". Beneath this, the location of this Zzote is shown as the path "Cello|Cello's Bow." By default, this first item in the first section 4704 starts off as highlighted (in some implementations depicted with inverted background and foreground colors) in the Zzote-Link lister 4702, as shown in FIG. 47A. The item in section 4704 is highlighted because this is the Zzote 4102 selected in Zzote-Space. It can be seen in FIG. 47A that this same Zzote 4102 is selected (with a distinctive ring 4714 around it) in the main viewport of Zzote-Space. The path description 4716 for the selected Zzote within the viewport (seen just above the main viewport) is thus the same text "Cello|Cello's Bow" as previously described to the right of the thumbnail in section 4704.

The second section 4706 shows the Zzote-Links to the "Key determinant of expressiveness" source Zzote 4102. The individual thumbnail image for each Zzote-Link focuses on showing its (primary) parent Zzote. This therefore shows each Zzote-Link (to the same source) in its specific context as a sub-Zzote of its specific parent Zzote. Additionally, any Zzote-Link annotations on a specific Zzote-Link instance may be visible in miniature within the same thumbnail.

The first item 4710 in the second section 4706 is a Zzote-Link within an "Important Contribution to cello sound" Zzote. This "Important Contribution to cello sound" Zzote is located in Zzote-Space, with no further ancestors, so no further location information is needed for this Zzote-Link referred to in 4710. Within item 4710, the text information 4720 indicates that there is exactly one Zzote-Link annotation belonging to this instance of the Zzote-Link. The text reads "Link Annotations: 1". To the immediate right of this text is a navigation symbol (in this illustration the symbol is a lower case "i" in a circle with a right-arrow symbol '>') In some implementations, tapping on such a symbol will cause the Zzote-Link Lister tool to present a list of these Zzote-Link annotations (in this example just the one). Such a list of the Zzote-Link annotations may be useful to briefly inspect them without changing the view in the active Zzote-Space viewport. In some implementations, each item in this new list may include the key text and/or thumbnail of each Zzote-Link annotation. (A Zzote-Link annotation as described above, is a Zzote that is a sub-Zzote of an instance of a Zzote-Link itself because it is located on the Zzote-Link frame/border of the Zzote-Link). Additionally, in some implementations, the user can choose to select (e.g., by tapping) an item in such a list of Zzote-Link annotations. This would cause the active viewport to 'select' and 'jump'/animate directly to the selected Zzote-Link annotation.

The second item 4712 in the second section 4706 is the Zzote-Link 4130' created earlier. This Zzote-Link is located in the "Features on music" Zzote 4220, which is located in the 'Television Show" Zzote 4330. (Zzote-Link 4130' was created in FIGS. 42A-42E. Additionally, two Zzote-Links Annotations were affixed to 4130' in FIGS. 46A-46C.) In FIG. 47A, as seen in the second item 4712, the phrase "Television Show" is displayed beneath "Feature on music" to indicate the path of the "Feature on music" parent of the Zzote-Link 4130'. This list entry 4712 also indicates the presence of Zzote-Link Annotations. The text information 4722 indicates that there are exactly two Zzote-Link annotations belonging to this instance of the Zzote-Link. The text reads "Link Annotations: 2". These are the Zzote-Link annotations 4602 and 4612, as depicted in FIG. 46C.

Starting from the situation depicted in FIG. 47A, the user then taps the first item 4710 in the second section 4706 of the Zzote-Link lister 4702. In some implementations, the user can tap nearly anywhere within the rectangular region of item 4710. In some implementations, a valid example is therefore tapping directly on the thumbnail image on the left side of 4710. However, one smaller sub-area within 4710 which would instead cause a different response, is if the user were to tap the previously described symbol to the right of Zzote-Link annotation information text 4720 (e.g., a lower case "i" in a circle with a right-arrow symbol '>') which would instead displays a list of Zzote-Link annotations as described above. However, in the example of FIGS. 47A/ 47B, the user taps a general area of item 4710 (e.g., the thumbnail of 4710) which causes this specific instance of the Zzote-Link to be 'selected'. As shown in FIG. 47B, the user interface of some implementations subsequently highlights the entire item 4710.

Also, FIG. 47B shows the end result of the viewport then jumping/animating to the region of Zzote-Space containing the now newly 'selected' instance of the Zzote-Link. The result therefore is that the viewport moves to show this selected Zzote-Link 4730 in context (based on the "viewport adjustment algorithm" and focusing on clearly viewing this Zzote-Link 4730's parent Zzote 4734 and the Zzote-Link 4730 itself within it). When the change in distance and/or zoom level is not too great, this viewport transportation from FIG. 47A to 47B occurs as an animation; otherwise there is a discontinuous jump. In some implementations there is a complementary simultaneous animation of a temporary additional representation of the "Key determinant of expressiveness" Zzote 4102 (e.g., possibly as minimal as just an animated transparent grey rectangle or a fuller animated representation of the "source" itself) animating from where it resides in FIG. 47A, to where the other representation of this same "Key determinant of expressiveness" Zzote resides within the Zzote-Link 4730 in the main viewport of FIG. 47B.

The chosen Zzote-Link 4730 is selected in Zzote-Space, as indicated in FIG. 47B by the distinctive ring 4732 around it. In the Zzote-Space location as depicted for this selected Zzote-Link 4730, the full path ("Important contributions to cello sound") can already be inferred by a viewer of the viewport. This is because the only ancestor of the selected Zzote-Link 4730 is the "Important contributions to cello sound" Zzote 4734 and its heading is already clearly seen in the viewport. Therefore, in some implementations, no 'path bar' needs to be shown for the main viewport at this time.

The user can use the main toolbar Back button 804 and Forward button 806 to complement the navigation with the Zzote-Link lister 4702. If (from FIG. 47B) the user were to press the Back arrow 804 on the main toolbar, the display would revert to the display shown in FIG. 47A. In the viewport and the Zzote-Link lister 4702, the same result (starting from FIG. 47B) would occur in the viewport if the user pressed the first item in the first section 4704 of the Zzote-Link lister 4702.

Because of this, the user has confidence to explore the Zzote-Links in the Zzote-Link lister 4702 knowing how easy it is to go back and forth.

Under normal circumstances, when a user selects an item in the Zzote-Link lister 4702, the viewport position for the new "jumped to" Zzote-Link is determined so that the newly selected Zzote-Link (or source) can be seen at a "good" size, but with any parent clearly visible also. The Zzote-Link inner content is identical in all instances, so what is of interest to the user is the contextual environment (e.g., location/scale and parentage of each specific Zzote-Link, and any Zzote-Link annotations for each specific Zzote-Link). Therefore, the specific link is shown in context. This is the case in FIG. 47B where the viewport calculation does not prioritize making the inner contents of the Zzote-Link 4730 readable, but the heading of its parent 4734 clearly is readable. It can also be seen that this Zzote-Link instance 4730 (to the common source) has a single Zzote-Link annotation 4736 placed on the lower edge of its Zzote-Link frame. This is, as the information within item 4710 had indicated, including the thumbnail image there.

In some implementations there is an exception to the above viewport calculation used by the Zzote-Link lister 4702. This exception occurs when returning to a viewport configuration from where the Zzote-Link lister 4702 was first invoked. An example would be if in FIG. 47B, the user were to tap the list-item within section 4704 to return once more to show the viewport situation from where the Zzote-Link lister had first been invoked in FIG. 47A. In some implementations, when returning to a viewport configuration from where the Zzote-Link lister 4702 was first invoked, it is ensured that the viewport always returns to the exact same viewport position and scale (after moving out of the way of the Zzote-Link lister 4702 if necessary) that the viewport was in when the user originally invoked the Zzote-Link lister 4702. (This is instead of simply using the 'viewport adjustment algorithm" to determine an idealized framing of the jumped to Zzote-Link/source, as in the immediate example above from FIG. 47A to FIG. 47B.) Under those circumstances of returning to the invoked configuration, such a returning to the exact same starting location/scale of the viewport, would prevent confusion of the spatial memory of the user, who remembers the starting environment.

Under such an example scenario of returning to the invocation point, in particular it is often ensured in some implementations that if the Zzote-Link lister was first invoked within any levels of nested Zzote-Links, it is that precise representation of the position/scale/nested Zzote-Link levels that is returned to in the viewport. In most other cases of items in the Zzote-Link lister, the Zzote-Link lister causes any required viewport jump to be to the "true" location of any Zzote-Link or "source."

However, the user does not wish to return to where the Zzote-Link was first invoked, so next in FIG. 47B, the user taps in the main area of the second item 4712 (but not the Zzote-Link annotation symbol). As a result, in FIG. 47C the second item 4712 of the second section 4706 in the Zzote-Link lister 4702 is highlighted to indicate the selection.

In FIG. 47C, the viewport concurrently moves to the position and scale required to depict the newly selected Zzote-Link 4130'. If the change in distance and zoom level is not too great, this transportation occurs as an animation, and otherwise there is a jump. In some implementations there is a complementary simultaneous animation of a temporary additional representation of the "Key determinant of expressiveness" Zzote 4102 (e.g., possibly as minimal as just an animated transparent grey rectangle or a fuller animated representation of the "source" itself) animating from where it resides in FIG. 47B within the Zzote-Link 4730, to where the new representation of this same "Key determinant of expressiveness" Zzote resides within the newly selected Zzote-Link 4130' in the main viewport of FIG. 47C.

Also of note in FIG. 47C, the Zzote-Link 4130' is now selected and subsequently the path 4740 is displayed, describing the location of this selected Zzote-Link. The path 4740 is displayed, because at this viewport position/scale, the full hierarchy of the selected Zzote (the Zzote-Link 4130'), cannot be fully seen in the viewport. Additionally, it can also be seen that this instance 4130' of the Zzote-Link has the two Zzote-Link annotations 4602 and 4612 placed on the right edge of the Zzote-Link frame. In can be noted that these two Zzote-Link annotations are seen to be visible in the viewport in FIG. 47C. In FIGS. 47A, 47B, (and 47C) this is just as the text information 4722 within item 4712 had indicated and the thumbnail image within 4712 had shown in miniature.

Figure 48:
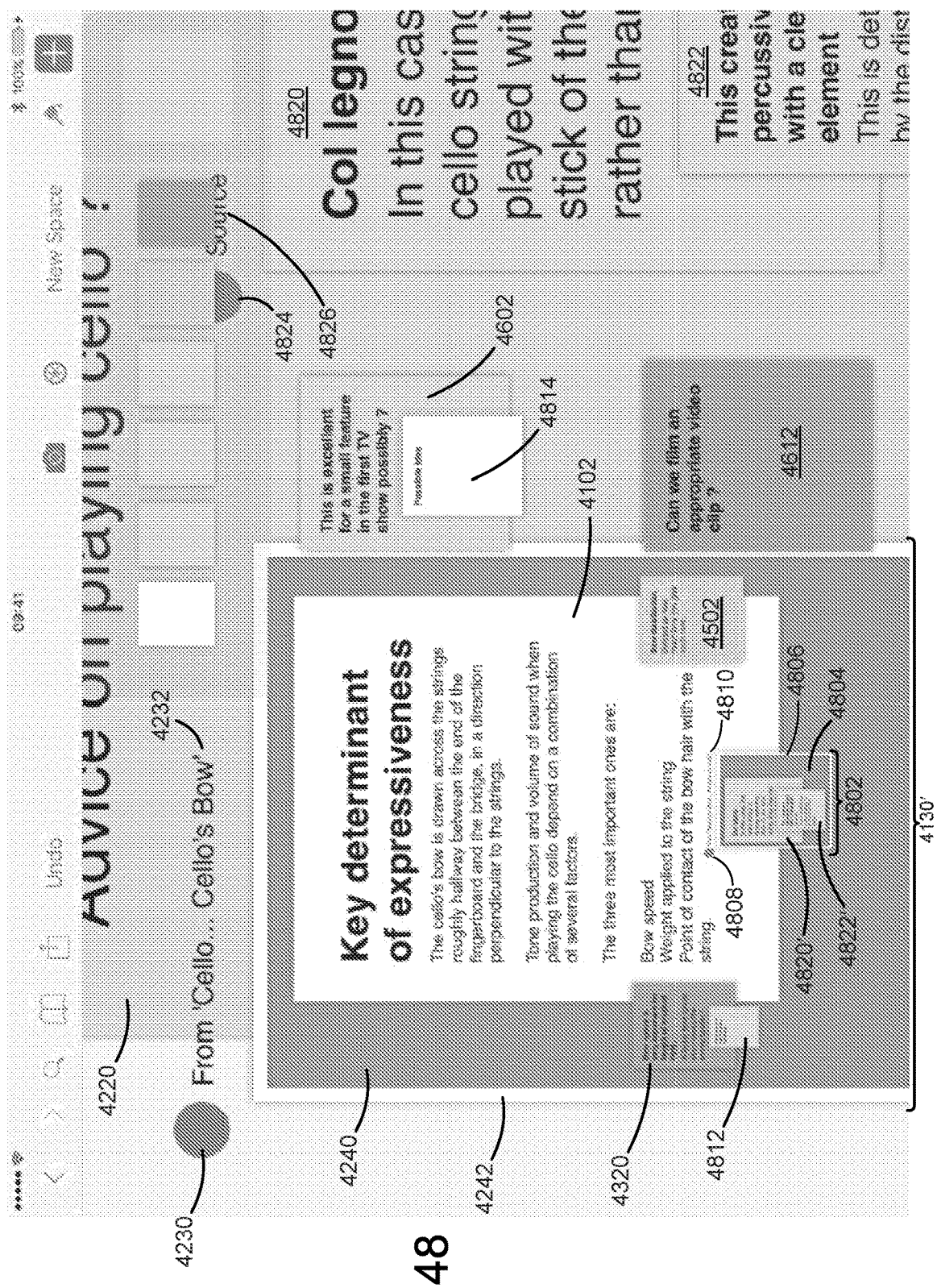
FIG. 48 depicts a link graphical information unit nested within another link graphical information unit, in accordance with some implementations.

FIG. 48 depicts a link graphical information unit nested within another link graphical information unit, in accordance with some implementations.

The Zzote-Link 4130' is depicted in FIG. 48. This is the same Zzote-Link 4130' as depicted and progressively modified in many of the previous figures from FIGS. 42E to 47C. However, FIG. 48 depicts the situation after the user has made a number of further relevant additions/modifications to Zzote-Space. In particular, it can be seen that the Zzote-Link 4130' now contains within itself a nested Zzote-Link 4802.

The source of the Zzote-Link 4130' is the Zzote 4102 as previously described. In FIG. 48, the Zzote 4102 is still seen to have the sub-Zzotes 4320 (as seen in FIG. 44A) and 4502 (as seen in FIG. 45C). In FIG. 48, a user has added an additional sub-Zzote 4812 to the Zzote 4320. This further illustrates how Zzote clusters tend to be added to by users over time. The previously created Zzote-Link annotations 4602 and 4612 (to Zzote-Link 4130') are also shown. In FIG. 48, the Zzote 4814 has been added as a new sub-Zzote of the Zzote 4602. This illustrates how Zzote-Link annotations can themselves contain sub-Zzotes and further levels of descendants as required.

In FIG. 48, the Zzote 4102 now has the additional sub-Zzote 4802. This Zzote 4802 is a Zzote which is a "Zzote-Link," and this is a new Zzote-Link to an entirely different source Zzote. This Zzote-Link 4802 is thereby "nested" within Zzote-Link 4130'.

The Zzote-Link 4802 has its own independent Zzote-Link background 4804 and its own independent Zzote-Link border 4806 (also referred to as a Zzote-Link frame). For comparison, the Zzote-Link 4130', which is currently seen in the viewport to have the Zzote-Link 4802 nested within it, has its own previously described Zzote-Link background 4240 and Zzote-Link border/frame 4242. In some implementations, a Zzote-Link background is rendered as a dark grey color. Both Zzote-Link frames 4242 and 4806 are currently paper-white. However, in some implementations, users may choose to change the color of any Zzote-Link frame/border in the same manner in which they change the Zzote background color of a conventional (non Zzote-Link) Zzote.

The source of the Zzote-Link 4802 is the Zzote 4820. In FIG. 48, the actual source Zzote 4820 can be seen (approximately half of it is visible in the viewport) at a large size and actually next to (but not within) the Zzote-Link 4130'. In many other situations it is common that a Zzote-Link such as 4802 would not be so near to its source, or visible in the same viewport. However, in some information situations, the proximity of the source Zzote and the Zzote-Link can be useful, as in FIG. 48.

The source Zzote 4820 currently has one sub-Zzote 4822. As previously described, any Zzote-Link to the Zzote 4820 inherently includes all of its sub-Zzotes and any further level of descendants. This can be seen within the Zzote-Link 4802. The rendered depiction of the Zzote 4820 within the Zzote-Link 4802 is the Zzote 4820', which is seen to have the sub-Zzote 4822' (which is likewise a rendered depiction of the Zzote 4822). The previously described "descendant-aware positioning of the source" of the inner contents of Zzote-Link 4802 has rendered the Zzote cluster of 4820 and its descendants (the Zzote 4822) within the Zzote-Link frame 4806 so that there is a small amount of Zzote-Link background 4804 on all sides.

As previously described, some implementations include a dot 4230 above and to the left of the top left corner of the Zzote-Link 4130'. The abbreviated path description 4232 is displayed to the right of this dot (e.g., "Cello . . . Cello's Bow"). This relates to the location of the source Zzote 4102 of Zzote-Link 4130' (i.e., where the source is "From"). In some implementations, if the user taps the dot 4230, it enables access to a Zzote-Link lister navigation tool as previously described.

Likewise, some implementations include a dot 4808 above and to the left of the top left corner of the (nested) Zzote-Link 4802. The abbreviated path description 4810 is displayed to the right of this dot 4808. In FIG. 48, at the current viewport scale, the text of 4810 is too small to clearly read. If the user wanted to read the text, the user could, for example, briefly zoom in and out the viewport. On some display devices, the dot pitch makes it is possible to read the text at the current scale despite its small size. In fact, the text of the path description 4810 reads "From 'Television Show . . . Feature on music'." This path relates to the location of the source Zzote 4820 of the Zzote-Link 4802 (i.e., where the source is "From").

In FIG. 48, the Zzote 4820 is located as a sub-Zzote of the Zzote 4220, as is its sibling Zzote, the Zzote-Link 4130'.

In FIG. 48, Zzote 4220 seems so large that it is most of the background of the viewport. However, referring to earlier FIG. 43B (before a number of additions such as the Zzote 4820 had been added), it is readably visible that the "Feature on Music" Zzote 4220 is a sub-Zzote of the "Television Show" Zzote 4330. Therefore, in FIG. 48, the text 4810 (i.e., "From 'Television Show . . . Feature on music',") is descriptive of the path of the source (Zzote 4820) for the Zzote-Link 4802.

In some implementations, if the user taps the dot 4808, it enables access to a Zzote-Link Lister navigation tool as previously described. Relatedly, there is the dot 4824 above and to the left of the Zzote 4820. This is alongside the text 4826, which reads "Source," and thus indicates that the Zzote 4820 is a source for Zzote-Links such as the Zzote-Link 4802. In many situations a source Zzote has multiple Zzote-Links to it. In some implementations, if the user taps on the dot 4824, it also enables access to a Zzote-Link lister navigation tool. In this example, if the user presses either the dot 4824 or the dot 4808, the Zzote-Link navigation tool shows the same list of related Zzote-Links to the source 4820 (and to the Zzote 4820 itself). By contrast, in some implementations, if the user taps on the dot 4230, the Zzote-Link navigation tool instead shows the list of Zzote-Links to the Zzote 4102 (and to the Zzote 4102 itself).

In some implementations, the user may have created the Zzote-Link 4802 by dragging the source Zzote 4820 into the Zzote-Link 4130' (and selecting an option to "Create Zzote-Link") This is an example of creating a new Zzote-Link by dragging a Zzote across the previously discussed "Zzote-Link barrier" as described herein. There are other techniques for creating a Zzote-Link, as described herein.

FIG. 48 thereby illustrates the nesting of a link graphical information unit (Zzote-Link 4802) within another link graphical information unit (Zzote-Link 4130'). In some implementations, the Zzote-Link 4802 itself can contain nested Zzote-Links and so forth. For example, a new Zzote-Link to any source can be added as a sub-Zzote (or further level of descendant) of the Zzote 4820' or the Zzote 4822'. This follows the same previously described principles.

It will be understood that, although the terms "first" and "second" may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. An electronic device, comprising:
   a display;
   one or more processors;
   memory;
   one or more programs stored in the memory, which, when executed, cause the electronic device to:
   display a graphical user interface having a viewport of a canvas containing a plurality of individually positioned and sized graphical information units, including always displaying smaller graphical information units in front of overlapping larger graphical information units according to relative size determination using a specific-size-metric;
   deduce a current respective hierarchical relationship between each pair of graphical information units according to their current respective sizes and positions, including:
   deducing no relationship between the respective pair of graphical information units that has no displayed overlap; and
   determining a larger graphical information unit of the respective pair according to relative size determination using the specific-size metric, and deducing the larger graphical information unit as a parent of the other graphical information unit in the respective pair when the graphical information units in the respective pair have full or partial displayed overlap; and
   adjust size and/or position of a selected graphical information unit according to user input, wherein:
   adjusting size and/or position of the selected graphical information unit applies concurrently and proportionally to all descendants, if any, of the selected graphical information unit according to the hierarchical relationships as deduced prior to the user input; and
   during the user input, displaying both adjusted and non-adjusted graphical information units on the canvas according to their current sizes and positions, with smaller graphical information units always displayed in front of overlapping larger graphical information units according to relative size determination using the specific-size-metric.

2. The electronic device of claim 1, wherein the viewport is adjustable, by user input to zoom and/or move, to show a user-selected portion of the canvas at a user-selected magnification.

3. The electronic device of claim 1, wherein a first graphical information unit and a second graphical information unit, which does not overlap with the first graphical information unit, are both deduced as parents of a third graphical information unit, and adjusting a size or position of either the first graphical information unit or the second graphical information unit causes a concurrent adjustment of the third graphical information unit.

4. The electronic device of claim 1, wherein at a first time $T_1$ a first graphical information unit is displayed behind a second graphical information unit that is smaller than the first graphical information unit, according to relative size determination using the specific-size-metric, and fully or partially overlaps the first graphical information unit, and the one or more programs further cause the electronic device to, in response to a first user action at a subsequent second time $T_2$, (i) resize the second graphical information unit so that it is larger than the first graphical information unit, according to relative size determination using the specific-size-metric, and still fully or partially overlaps with it, and (ii) display the first graphical information unit in front of the second graphical information unit according to relative size determination using the specific-size-metric.

5. The electronic device of claim 4, wherein at a third time $T_3$ subsequent to the second time $T_2$, in response to a second user action to move and/or resize the second graphical information unit, concurrently and proportionally moving and/or resizing the first graphical information unit according to deducing the second graphical information unit as a parent of the first graphical information unit.

6. The electronic device of claim 1, wherein the graphical user interface further comprises a toolbar displaying a plurality of graphical information unit pads, and each graphical information unit pad is a source of blank potential graphical information units that are colored according to the respective graphical information unit pad, and wherein a potential graphical information unit is displayed along with the plurality of graphical information units on the canvas, in response to a user gesture, but is only saved to the canvas upon completion of the user gesture over the canvas.

7. The electronic device of claim 6, wherein the one or more programs further cause the electronic device to, in response to initiation of the user gesture in the toolbar, create a potential graphical information unit from a first graphical information unit pad at a location where the user gesture was initiated.

8. The electronic device of claim 7, wherein the user gesture uses two of the user's fingers, and:
    moving the two fingers in a same direction causes the potential graphical information unit to move in that same direction;
    reducing separation of the two fingers causes the potential graphical information unit to shrink in size; and
    increasing separation of the two fingers causes the potential graphical information unit to increase in size.

9. The electronic device of claim 8, wherein the shrinking in size or increasing in size is according to a multiplicative magnification factor of the corresponding reduction or increase in the separation of the two fingers.

10. The electronic device of claim 8, wherein the one or more programs further cause the electronic device to:
    during the user gesture, display the potential graphical information unit so that it is always displayed in front of already displayed overlapping graphical information units having larger specific-size-metric and behind already displayed overlapping graphical information units having smaller specific-size-metric.

11. The electronic device of claim 10, wherein, prior to the user gesture, a first graphical information unit fully or partially overlaps a second graphical information unit that is smaller than the first graphical information unit according to relative size determination using the specific-size-metric, and, in response to completing user placement of the potential graphical information unit overlapping both the first graphical information unit and the second graphical information unit so that the potential graphical information is smaller than the first graphical information unit but larger than the second graphical information unit, (i) saving the potential graphical information unit as a new graphical information unit on the canvas and (ii) deducing a hierarchical position of the new graphical information unit as a child of the first graphical information unit and a parent of the second graphical information unit.

12. The electronic device of claim 7, wherein the one or more programs further cause the electronic device to save the potential graphical information unit to the canvas upon completion of the user gesture over the canvas.

13. The electronic device of claim 1, wherein the graphical user interface includes a toolbar including one or more cluster icons, each cluster icon representing a respective previously created cluster of graphical information units; and
    in response to initiation of a user gesture in the toolbar on a first cluster icon of the one or more cluster icons, the graphical user interface creates a cluster of potential graphical information units represented by the first icon, and places the cluster of the potential graphical information units over the canvas according to size and position specified by the user gesture;
    wherein the potential graphical information units in the cluster are displayed along with the plurality of graphical information units on the canvas, in response to the user gesture, but are only saved to the canvas upon completion of the user gesture over the canvas.

14. The electronic device of claim 1, wherein the one or more programs further cause the device to:
    in response to user selection of a cluster and initiation of a user gesture using two of the user's fingers:
        when the two fingers move in a same direction, move the cluster in that same direction;
        when separation of the two fingers is reduced, shrink the cluster in proportion to the separation reduction, with the graphical information units in the cluster maintaining proportionate relative sizing and positioning; and
        when separation of the two fingers increases, expand the cluster in proportion to the separation increase, with the graphical information units in the cluster maintaining proportionate relative sizing and positioning.

15. The electronic device of claim 14, wherein the shrinking or expansion is according to a multiplicative magnification factor of the corresponding reduction or increase in the separation of the two fingers.

16. The electronic device of claim 1, wherein the one or more programs further cause the device to:
    create and display link graphical information units that contain links to source clusters of graphical information units; and
    upon selection of a first graphical information unit, adjust both the first graphical information unit and each linked representation of the first graphical information unit concurrently according to user input on the first graphical information unit.

17. The electronic device of claim 1, wherein the one or more programs further cause the device to:
    create and display link graphical information units, which contain links to source clusters of graphical information units and display virtual representations of the source graphical information units; and
    upon selection of a first virtual graphical information unit inside a first link graphical information unit, adjust the corresponding source graphical information unit and each linked representation of the corresponding source graphical information unit, including the first virtual graphical information unit, concurrently according to user input on the first virtual graphical information unit.

18. The electronic device of claim 1, wherein the specific-size metric measures graphical information units based on width.

19. The electronic device of claim 1, wherein the specific-size metric measures graphical information units based on area.

20. The electronic device of claim 1, wherein the specific-size metric measures graphical information units based on height.

21. A method, comprising:
at an electronic device having a display, one or more processors, and memory storing one or more programs configured for execution by the one or more processors:
displaying a graphical user interface of a viewport of a canvas containing a plurality of individually positioned and sized graphical information units, including always displaying smaller graphical information units in front of overlapping larger graphical information units according to relative size determination using a specific-size-metric;
deducing a current respective hierarchical relationship between each pair of graphical information units according to their current respective sizes and positions, including:
deducing no relationship between the respective pair of graphical information units that has no displayed overlap; and
determining a larger graphical information unit of the respective pair according to relative size determination using the specific-size metric, and deducing the larger graphical information unit as a parent of the other graphical information unit in the respective pair when the graphical information units in the respective pair have full or partial displayed overlap; and
receiving user input to adjust size and/or position of a selected graphical information unit according to the user input, wherein:
adjusting size and/or position of the selected graphical information unit applies concurrently and proportionally to all descendants, if any, of the selected graphical information unit, according to the hierarchical relationships as deduced prior to the user input; and
during the user input, displaying both adjusted and non-adjusted graphical information units on the canvas according to their current sizes and positions, with smaller graphical information units always displayed in front of overlapping larger graphical information units according to relative size determination using the specific-size-metric.

22. A non-transitory computer-readable storage medium storing one or more programs configured to execute at an electronic device having a display, one or more processors, and memory, the one or more programs comprising instructions for:
displaying a graphical user interface of a viewport of a canvas containing a plurality of individually positioned and sized graphical information units, including always displaying smaller graphical information units in front of overlapping larger graphical information units according to relative size determination using a specific-size-metric;
deducing a current respective hierarchical relationship between each pair of graphical information units according to their current respective sizes and positions, including:
deducing no relationship between the respective pair of graphical information units that has no displayed overlap; and
determining a larger graphical information unit of the respective pair according to relative size determination using the specific-size metric, and deducing the larger graphical information unit as a parent of the other graphical information unit in the respective pair when the graphical information units in the respective pair have full or partial displayed overlap; and
receiving user input to adjust size and/or position of a selected graphical information unit according to the user input, wherein:
adjusting size and/or position of the selected graphical information unit applies concurrently and proportionally to all descendants, if any, of the selected graphical information unit, according to the hierarchical relationships as deduced prior to the user input; and
during the user input, displaying both adjusted and non-adjusted graphical information units on the canvas according to their current sizes and positions, with smaller graphical information units always displayed in front of overlapping larger graphical information units according to relative size determination using the specific-size-metric.

\* \* \* \* \*